US012566401B2

(12) United States Patent
Itabashi et al.

(10) Patent No.: US 12,566,401 B2
(45) Date of Patent: Mar. 3, 2026

(54) IMAGE FORMING APPARATUS HAVING PROCESS CARTRIDGE WITH ELECTRICAL CONTACTS AND MEMORY CONTACT FACING OUTWARD

(71) Applicant: BROTHER KOGYO KABUSHIKI KAISHA, Nagoya (JP)

(72) Inventors: Nao Itabashi, Nagoya (JP); Misato Osuka, Nagoya (JP); Keita Shimizu, Nagoya (JP); Go Iwasa, Nagoya (JP); Kazutoshi Nakamura, Kuwana (JP); Ryosuke Hayashi, Nagoya (JP); Tsubasa Kiriyama, Toyoake (JP); Naoya Kamimura, Ichinomiya (JP); Yuwen Wang, Nagoya (JP); Masaaki Furukawa, Nagoya (JP); Kazuma Hinoue, Nagoya (JP); Kenta Tosuji, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/636,478

(22) Filed: Apr. 16, 2024

(65) Prior Publication Data

US 2024/0272575 A1 Aug. 15, 2024

Related U.S. Application Data

(63) Continuation of application No. 18/153,437, filed on Jan. 12, 2023, now Pat. No. 12,066,784, which is a (Continued)

(30) Foreign Application Priority Data

Jul. 15, 2020 (JP) ................................ 2020-121573
Jul. 16, 2020 (JP) ................................ 2020-121798

(Continued)

(51) Int. Cl.
*G03G 15/00* (2006.01)
*G03G 15/02* (2006.01)

(Continued)

(52) U.S. Cl.
CPC ......... *G03G 15/80* (2013.01); *G03G 15/0863* (2013.01); *G03G 21/1652* (2013.01);

(Continued)

(58) Field of Classification Search
CPC ............... G03G 15/80; G03G 15/0863; G03G 15/0216; G03G 15/087; G03G 15/5008;

(Continued)

(56) References Cited

U.S. PATENT DOCUMENTS

2009/0190958 A1 7/2009 Wang et al.
2010/0080615 A1 4/2010 Kikuchi (Continued)

FOREIGN PATENT DOCUMENTS

JP 2009-180918 A 8/2009
JP 2010-102285 A 5/2010

(Continued)

OTHER PUBLICATIONS

Office Action in corresponding Japanese Patent Application No. 2020-166287, Oct. 22, 2024.

(Continued)

*Primary Examiner* — Joseph S Wong
(74) *Attorney, Agent, or Firm* — Merchant & Gould P.C.

(57) ABSTRACT

An image forming apparatus includes a main housing, a drawer, and a cartridge. The drawer is movable between an inside position inside the main housing and an outside position outside the main housing. The cartridge is installable into and removable from the drawer. The cartridge includes a photosensitive drum configured to rotate about a drum axis. The drawer comprises a lock member movable (Continued)

between a lock position in which the drawer is locked to the main housing, and an unlock position in which the drawer is unlocked from the main housing. The cartridge installed in the drawer is rotatable about the drum axis between a first position and a second position. The lock member is positioned in the lock position when the cartridge is positioned in the first position, and positioned in the unlock position when the cartridge is positioned in the second position.

12 Claims, 91 Drawing Sheets

Related U.S. Application Data continuation of application No. PCT/JP2021/026242, filed on Jul. 13, 2021.

(30) Foreign Application Priority Data

| | | |
|---|---|---|
| Jul. 31, 2020 | (JP) | 2020-130778 |
| Sep. 17, 2020 | (JP) | 2020-156540 |
| Sep. 30, 2020 | (JP) | 2020-166287 |
| Sep. 30, 2020 | (JP) | 2020-166288 |
| Sep. 30, 2020 | (JP) | 2020-166289 |

(51) Int. Cl.

| | |
|---|---|
| ***G03G 15/08*** | (2006.01) |
| ***G03G 21/16*** | (2006.01) |
| ***G03G 21/18*** | (2006.01) |

(52) U.S. Cl.

CPC ..... *G03G 21/1803* (2013.01); *G03G 21/1867* (2013.01); *G03G 21/1871* (2013.01); *G03G 21/1875* (2013.01); *G03G 21/1878* (2013.01); *G03G 21/1882* (2013.01); *G03G 21/1885* (2013.01); *G03G 15/0216* (2013.01); *G03G 15/087* (2013.01); *G03G 15/5008* (2013.01); *G03G 21/1846* (2013.01); *G03G 2215/00713* (2013.01); *G03G 2215/0872* (2013.01); *G03G 2221/166* (2013.01); *G03G 2221/1823* (2013.01)

(58) Field of Classification Search

CPC ........... G03G 21/1652; G03G 21/1803; G03G 21/1867; G03G 21/1871; G03G 21/1875; G03G 21/1878; G03G 21/1882; G03G 21/1885; G03G 21/1846; G03G 2215/00713; G03G 2215/0872; G03G 2221/166; G03G 2221/1823

See application file for complete search history.

(56) References Cited

U.S. PATENT DOCUMENTS

| | | | | |
|---|---|---|---|---|
| 2010/0124432 | A1 | 5/2010 | Takayama | |
| 2011/0064457 | A1 | 3/2011 | Okabe et al. | |
| 2011/0164897 | A1 | 7/2011 | Kikuchi | |
| 2012/0328331 | A1 | 12/2012 | Sato | |
| 2014/0126929 | A1 | 5/2014 | Tomatsu | |
| 2014/0376943 | A1 | 12/2014 | Nishimura | |
| 2015/0168911 | A1 | 6/2015 | Kuruma et al. | |
| 2015/0227110 | A1 | 8/2015 | Yoshimura et al. | |
| 2018/0314185 | A1 | 11/2018 | Mn et al. | |
| 2019/0041792 | A1 | 2/2019 | Kishi et al. | |
| 2019/0079425 | A1 | 3/2019 | Lin | |
| 2019/0089078 | A1 | 3/2019 | Shiranita | |
| 2019/0302681 | A1 | 10/2019 | Wang et al. | |
| 2019/0369550 | A1 * | 12/2019 | Kishi | G03G 21/1871 |
| 2020/0012228 | A1 | 1/2020 | Sato et al. | |
| 2020/0133188 | A1 | 4/2020 | Amann et al. | |
| 2020/0142348 | A1 | 5/2020 | Amann et al. | |
| 2022/0011716 | A1 | 1/2022 | Sato | |
| 2023/0176514 | A1 | 6/2023 | Itabashi et al. | |

FOREIGN PATENT DOCUMENTS

| | | | |
|---|---|---|---|
| JP | 2010-122465 | A | 6/2010 |
| JP | 2011-59510 | A | 3/2011 |
| JP | 2013-3519 | A | 1/2013 |
| JP | 2013-41110 | A | 2/2013 |
| JP | 2014-92676 | A | 5/2014 |
| JP | 2015-4807 | A | 1/2015 |
| JP | 2015-118140 | A | 6/2015 |
| JP | 2016-138900 | A | 8/2016 |
| JP | 2018-180556 | A | 11/2018 |
| JP | 2019-179129 | A | 10/2019 |
| JP | 2020-8726 | A | 1/2020 |
| JP | 2022-16170 | A | 1/2022 |
| JP | 2022-27022 | A | 2/2022 |
| WO | 2019/026345 | A1 | 2/2019 |

OTHER PUBLICATIONS

Office Action in corresponding Japanese Patent Application No. 2020-166288, Oct. 22, 2024.

Office Action in corresponding Japanese Patent Application No. 2020-166289, Oct. 22, 2024.

International Search Report issued in corresponding International Patent Application No. PCT/JP2021/026242, Sep. 7, 2021.

International Preliminary Report on Patentability issued in corresponding International Patent Application No. PCT/JP2021/026242, Jan. 17, 2023.

* cited by examiner

SECOND DIRECTION
OTHER SIDE ↔ ONE SIDE

IMAGE FORMING APPARATUS HAVING PROCESS CARTRIDGE WITH ELECTRICAL CONTACTS AND MEMORY CONTACT FACING OUTWARD

REFERENCE TO RELATED APPLICATIONS

This application is a continuation of U.S. patent application Ser. No. 18/153,437, filed Jan. 12, 2023, now U.S. Pat. No. 12,066,784, which is a continuation of International Application No. PCT/JP2021/026242 filed on Jul. 13, 2021 which claims priority from Japanese Patent Application No. 2020-121573 filed on Jul. 15, 2020, Japanese Patent Application No. 2020-121798 filed on Jul. 16, 2020, Japanese Patent Application No. 2020-130778 filed on Jul. 31, 2020, Japanese Patent Application No. 2020-156540 filed on Sep. 17, 2020, and Japanese Patent Application Nos. 2020-166287, 2020-166288, 2020-166289 filed on Sep. 30, 2020. The disclosures of these applications are incorporated herein by reference in their entirety.

BACKGROUND ART

An image forming apparatus known in the art comprises a main housing, a drawer, and a cartridge. The drawer is movable between an inside position inside the main housing and an outside position outside the main housing. The cartridge is installable into and removable from the drawer.

DESCRIPTION

In such a structure as described above, it is conceivable to adapt a structure capable of locking the drawer to and unlocking the drawer from the main housing. Specifically, the drawer may comprise a handle graspable by a user and a lock member for locking the drawer to the main housing. In this case, the handle may, for example, be rotatable relative to a side wall of the drawer. Further, the lock member may, for example, be configured to move in conjunction with the handle. In such configuration, the user can rotate the handle to unlock the lock member when moving the drawer from the inside position to the outside position.

However, it will be necessary to make the side wall on which the handle is provided thicker to some degree in order to allow the handle to rotate. Accordingly, the image forming apparatus may become larger in size in a direction in which the drawer moves.

It would be desirable to downsize the image forming apparatus in the direction in which the drawer moves.

In one aspect, an image forming apparatus of the present disclosure comprises a main housing, a drawer, and a cartridge. The drawer is movable in directions parallel to a first direction between an inside position inside the main housing and an outside position outside the main housing. The cartridge is installable into and removable from the drawer. The cartridge includes a photosensitive drum configured to rotate about a drum axis oriented in a second direction non-parallel to the first direction. The drawer comprises a lock member movable in directions parallel to the second direction between a lock position in which the drawer is locked to the main housing, and an unlock position in which the drawer is unlocked from the main housing. The cartridge installed in the drawer is rotatable about the drum axis between a first position and a second position. The lock member is positioned in the lock position when the cartridge is positioned in the first position, and positioned in the unlock position when the cartridge is positioned in the second position.

According to this configuration, since the drawer can be unlocked from the main housing by rotating the cartridge from the first position to the second position, it will no longer be necessary to provide a handle on the drawer for unlocking the drawer. Thus, the image forming apparatus can be downsized in the first direction which is the direction in which the drawer moves.

The cartridge may comprise a memory including an electrical contact, the main housing may comprise a housing contact contactable with the electrical contact, and the electrical contact may move away from the housing contact when the cartridge rotates from the first position to the second position.

According to this configuration, since the electrical contact moves away from the housing contact when the cartridge rotates from the first position to the second position, the housing contact is unlikely to obstruct the rotation of the cartridge from the first position to the second position.

The electrical contact may face downward, and the housing contact may face upward.

The electrical contact may contact the housing contact when the cartridge is positioned in the first position, and the electrical contact may be positioned apart from the housing contact when the cartridge is positioned in the second position.

The cartridge may comprise a drum coupling rotatable about the drum axis to transfer a drive force to the photosensitive drum, and be rotatable between the first position and the second position about the drum coupling.

The cartridge may comprise a handle graspable by a user, and the main housing may have an opening through which the drawer is allowed to pass, and which makes the handle accessible in a state where the drawer with the cartridge installed therein is positioned in the inside position.

According to this configuration, since the handle of the cartridge is accessible through the opening, the user can easily grasp the handle of the cartridge.

The handle may protrude in a direction parallel to the first direction from the cartridge to an outside of the opening in the state where the drawer with the cartridge installed therein is positioned in the inside position.

According to this configuration, since the handle protrudes to the outside of the opening in a direction parallel to the first direction, the user can easily grasp the handle of the cartridge.

The main housing may comprise a recess positioned on an inner surface of the main housing facing in a direction parallel to the second direction, and at least a part of the lock member may be positioned in the recess when the lock member is positioned in the lock position, and positioned apart from the recess in the second direction when the lock member is positioned in the unlock position.

The cartridge may comprise a first projection that contacts the lock member to move the lock member from the lock position to the unlock position, and the lock member may comprise an end portion that contacts the main housing to restrain the drawer positioned in the inside position from moving to the outside position, the end portion protruding from a side wall of the drawer facing in a direction parallel to the second direction, and a first cam surface that contacts the first projection, the first cam surface being inclined in such a manner that the closer to the end portion, the farther from the first projection the first cam surface is positioned.

According to this configuration, since the lock member moves from the lock position to the unlock position by the first protrusion contacting the first cam surface, the structure for unlocking the drawer can be configured to have a simple structure.

The drawer may further comprise a spring configured to bias the lock member from the unlock position toward the lock position in a direction parallel to the second direction.

According to this configuration, since the spring biases the lock member from the unlock position toward the lock position, the lock member can be moved by the spring from the unlock position to the lock position when the cartridge is rotated from the second position to the first position.

The main housing may comprise a housing contact portion that contacts the end portion of the lock member positioned in the lock position in the process of the drawer being moved from the outside position to the inside position, and at least one of the housing contact portion and the end portion may have a second cam surface inclined in such a manner that the farther downstream in a direction of installation of the drawer, the closer to the cartridge the second cam surface is positioned.

According to this configuration, since at least one of the housing contact portion and the end portion has a second cam surface, the lock member can be moved from the lock position to the unlock position by the action of the second cam surface when the drawer is moved from the outside position to the inside position without the user's intervention to rotate the cartridge. Thus, the end of the lock member positioned in the lock position is unlikely to get caught on the housing contact when the drawer is moved from the outside position to the inside position.

The cartridge may comprise a second projection, the cartridge being installable into and removable from the drawer in directions parallel to a third direction non-parallel to the first direction and to the second direction, the drawer may comprise a restriction portion configured to restrain the cartridge positioned in the second position from being separated apart from the drawer, and the second projection may not overlap the restriction portion as viewed from a direction parallel to the third direction when the cartridge is positioned in the first position, and may overlap the restriction portion when the cartridge is positioned in the second position.

According to this configuration, since the second projection overlaps the restriction portion as viewed from a direction parallel to the third direction when the cartridge is positioned in the second position, the cartridge positioned in the second position may be restrained from being detached from the drawer.

The above and other aspects, their advantages and further features will become more apparent by describing in detail illustrative, non-limiting embodiments thereof with reference to the accompanying drawings briefly described below:

Figure 14B:
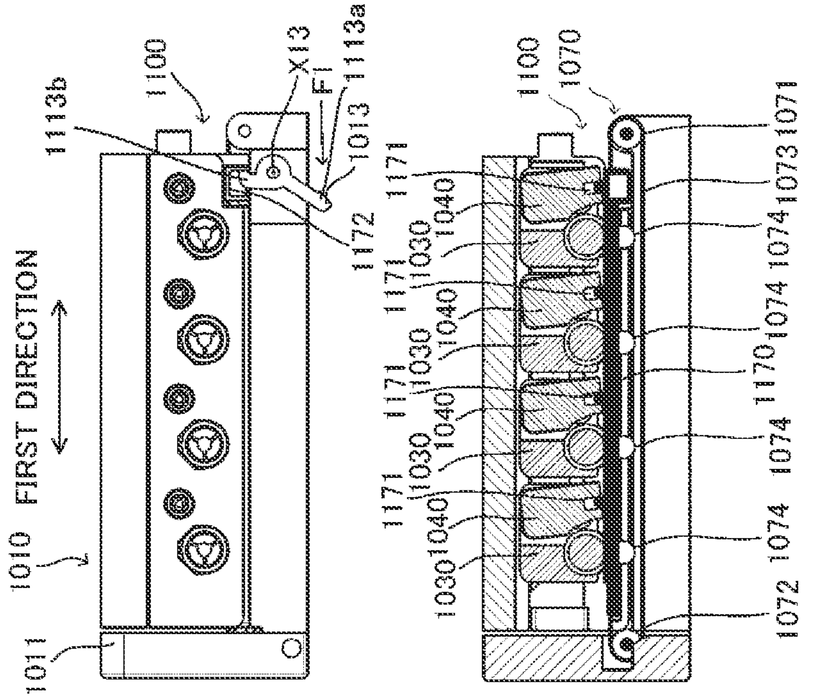
Figure 14A:
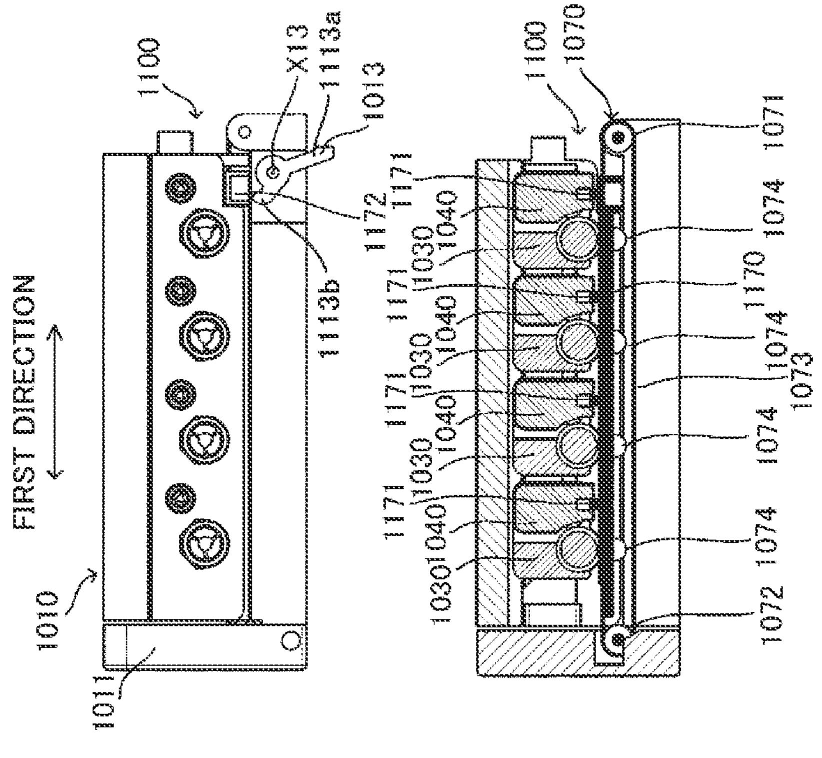

FIG. 14A includes illustrations showing the relationship among a drawer, a transfer device and a main housing as viewed in a second direction as observed when translation cam is positioned in a first position.

FIG. 14B includes illustrations showing the relationship among the drawer, the transfer device and the main housing as viewed in the second direction as observed when the translation cam is positioned in a second position.

Figure 15:
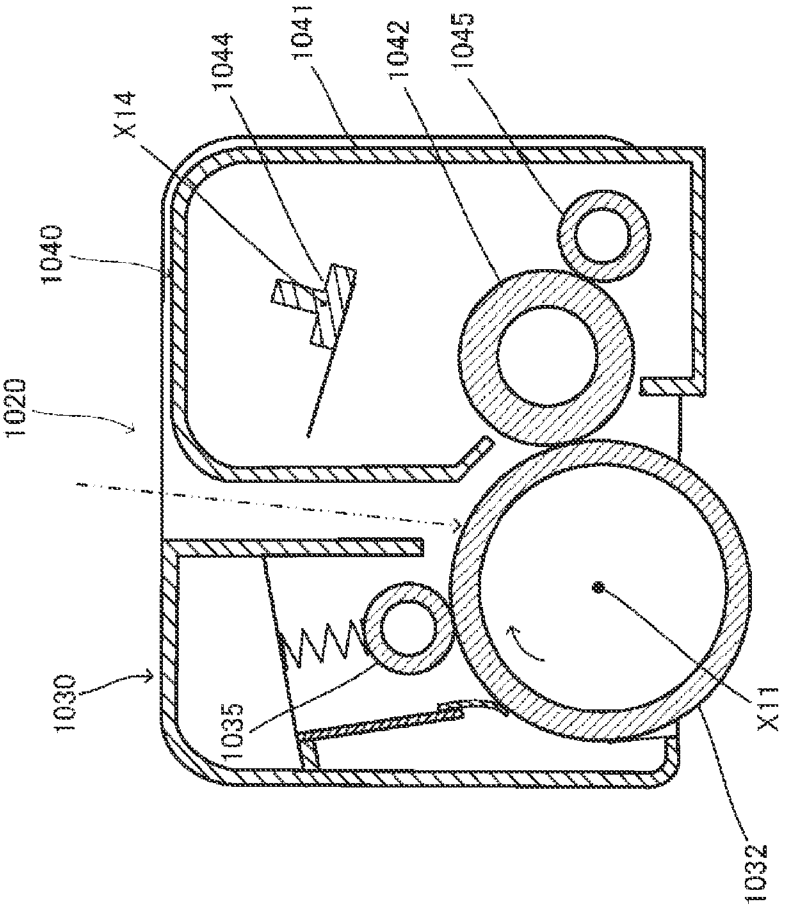

FIG. 15 is a cross-sectional view of a cartridge as viewed in the second direction.

Figure 16:
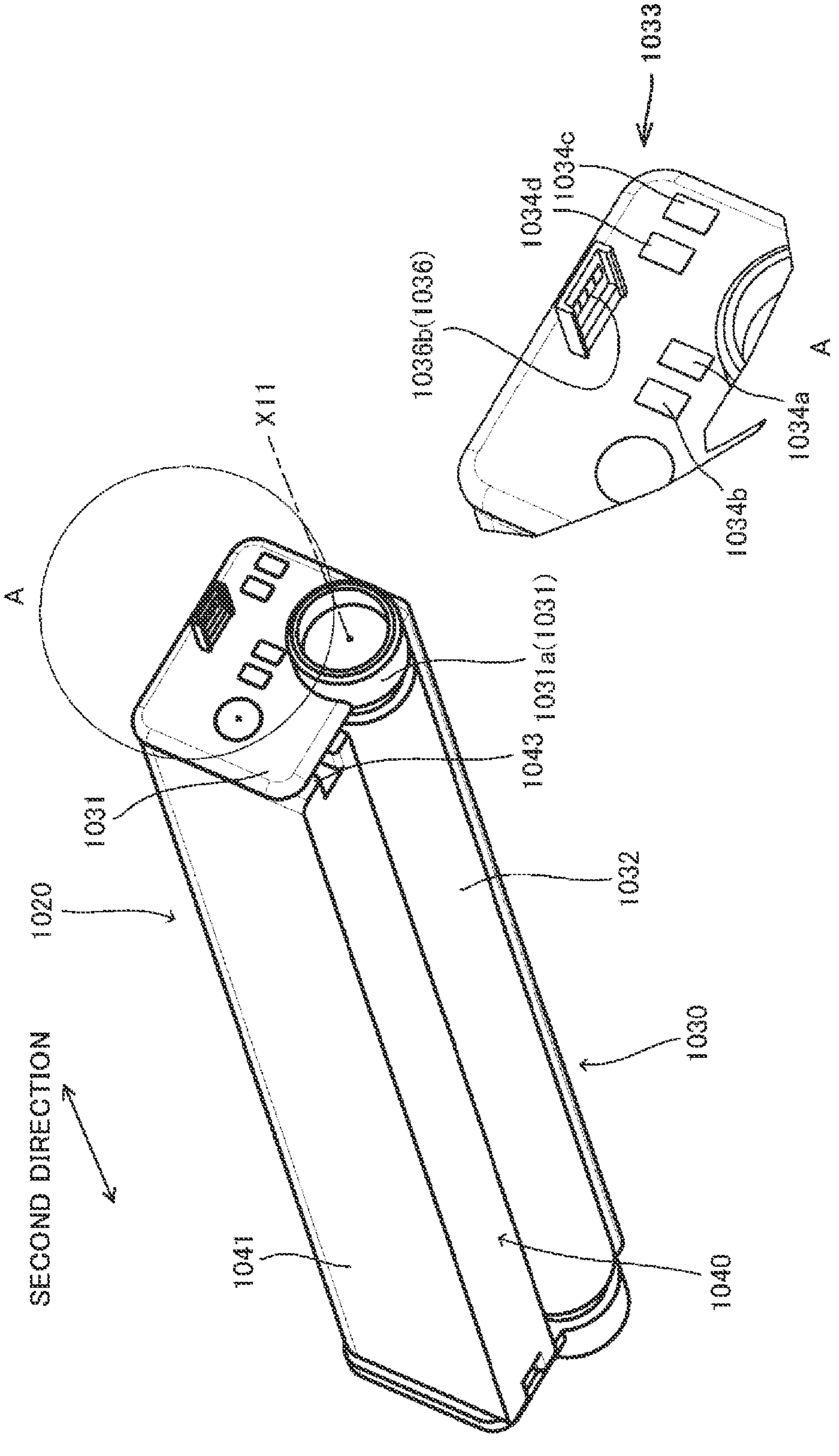

FIG. 16 includes a perspective view and a partially enlarged view of the cartridge as viewed from one side of the cartridge in the second direction.

Figure 17:
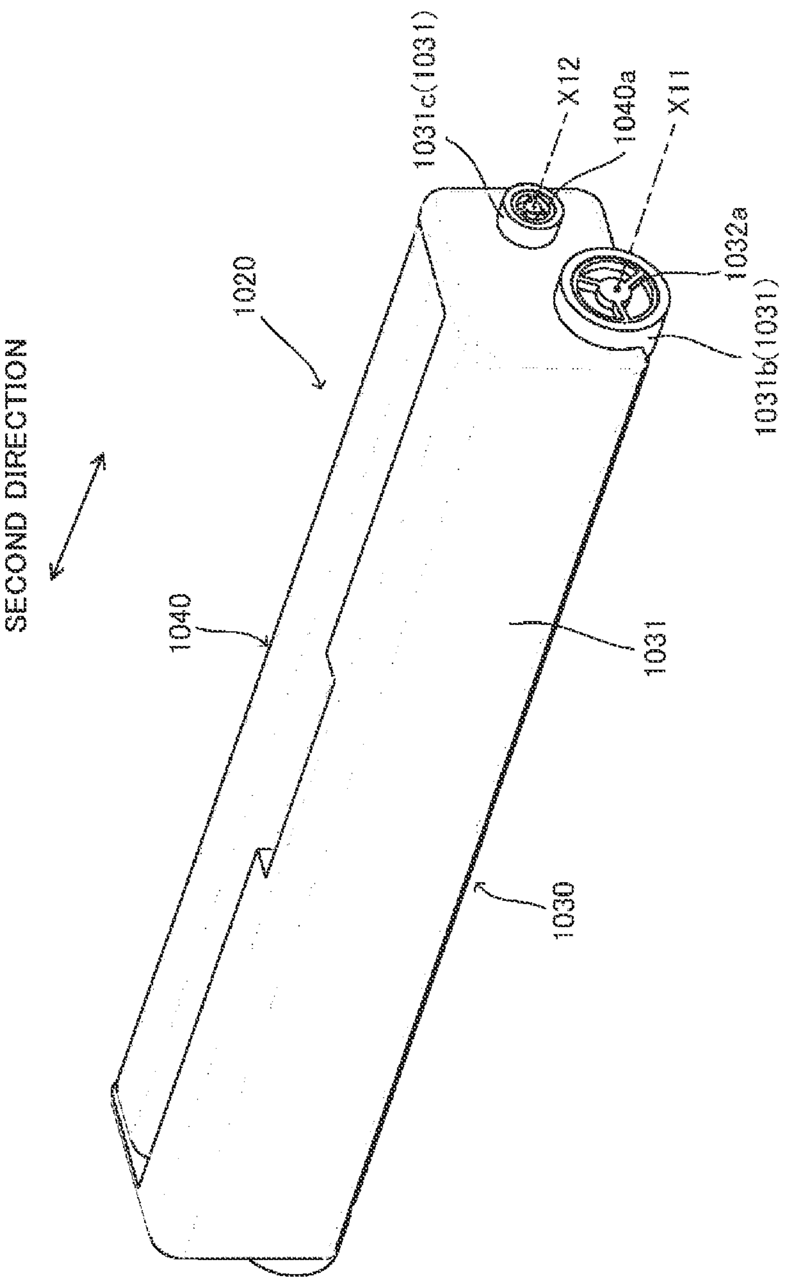

FIG. 17 is a perspective view of the cartridge as viewed from the other side of the cartridge in the second direction.

Figure 18:
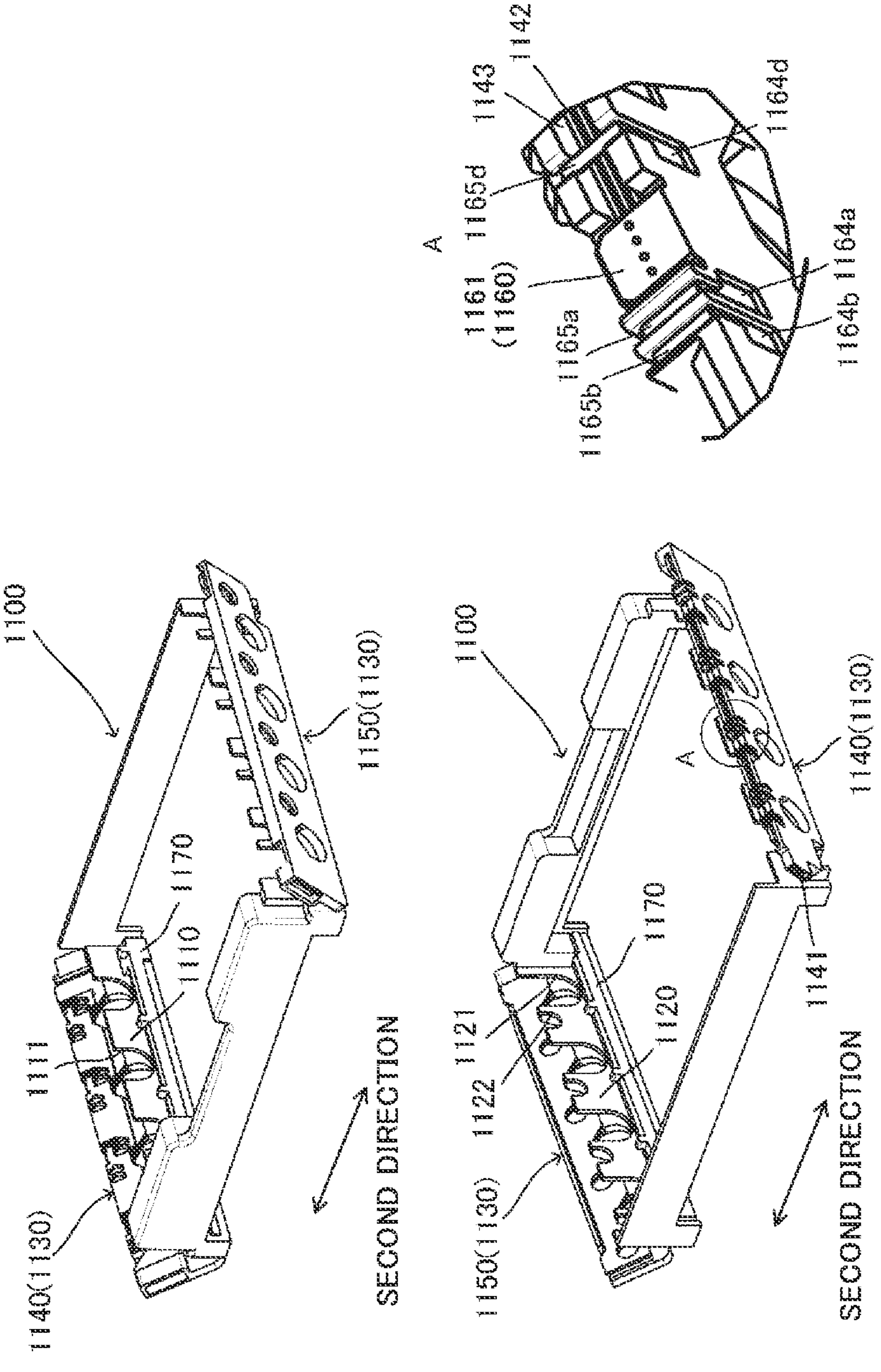

FIG. 18 includes perspective views and a partially enlarged view of the drawer with a latch positioned in the unlock position.

Figure 19:
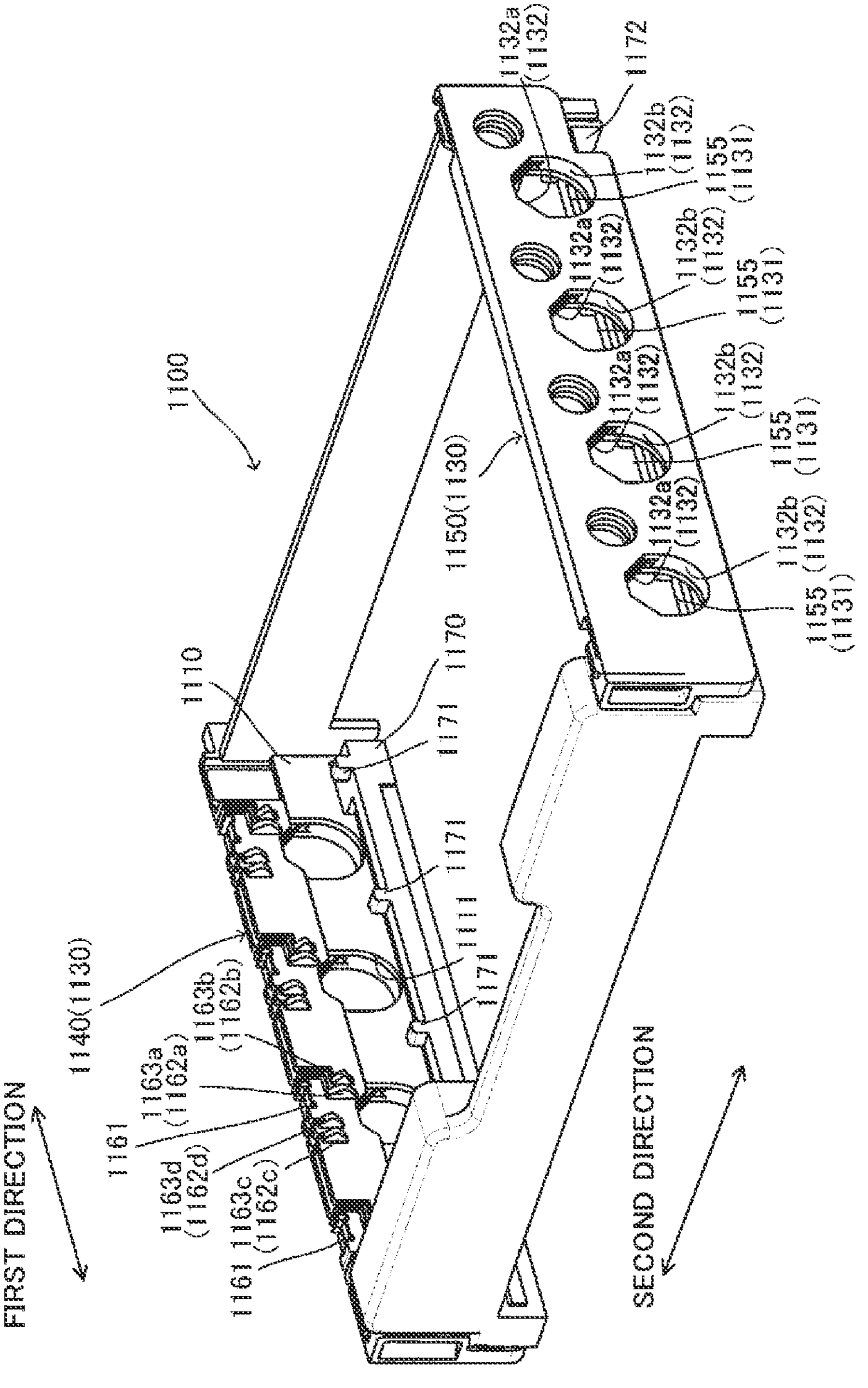

FIG. 19 is a perspective view of the drawer showing the other side of the drawer facing in a direction parallel to the second direction.

Figure 20:
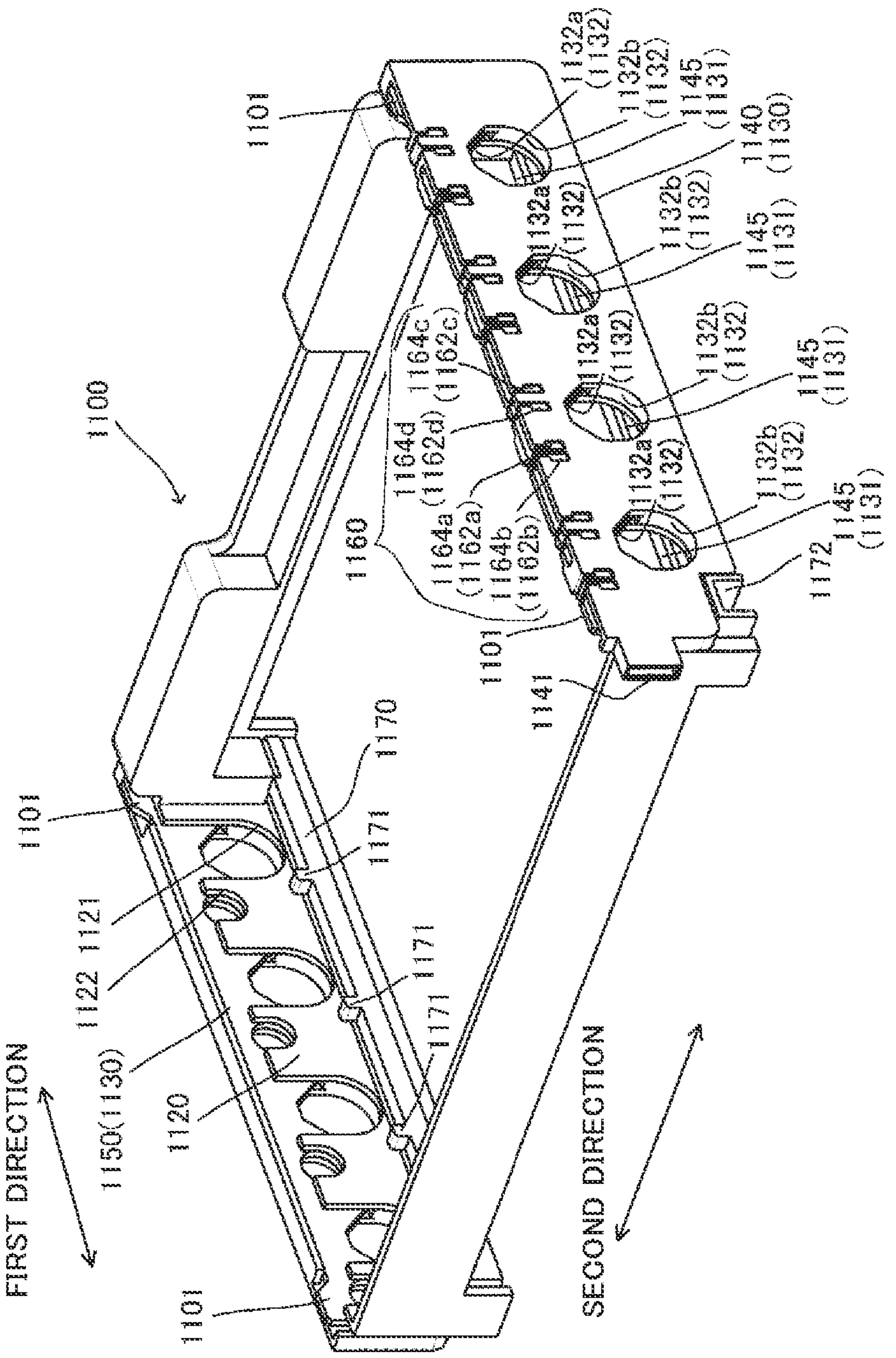

FIG. 20 is a perspective view of the drawer showing one side of the drawer facing in a direction parallel to the second direction.

Figure 21:
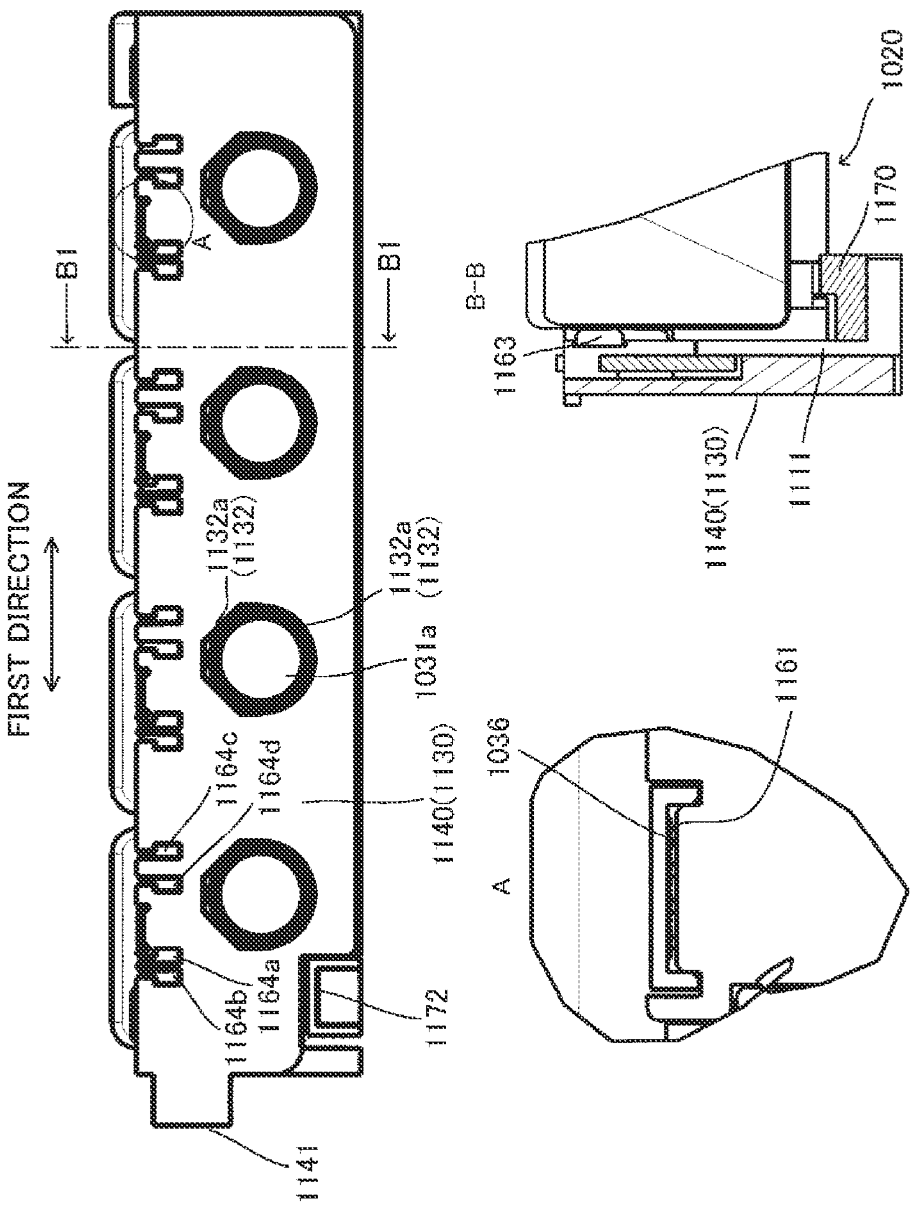

FIG. 21 is a side view and partial sectional views of the drawer and cartridges installed in the drawer.

Figure 22B:
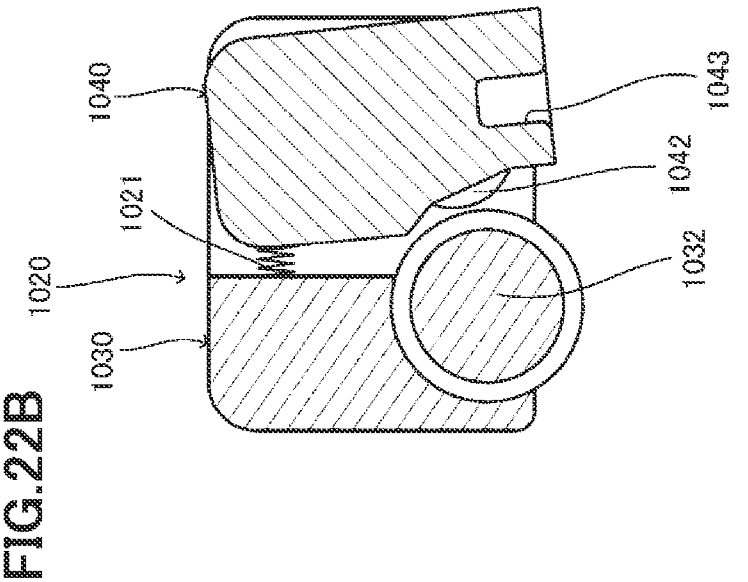
Figure 22A:
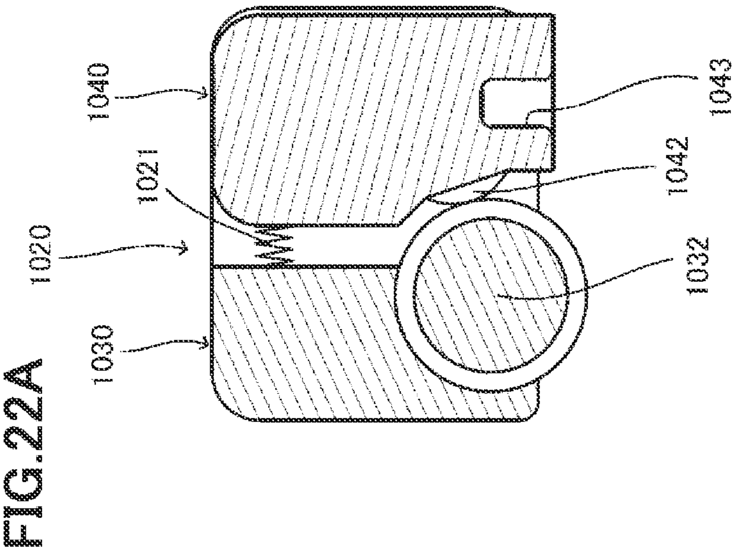

FIG. 22A is a schematic view of the cartridge as viewed in the second direction showing a contact state.

FIG. 22B is a schematic view of the cartridge as viewed in the second direction showing a separate state.

Figure 23A:
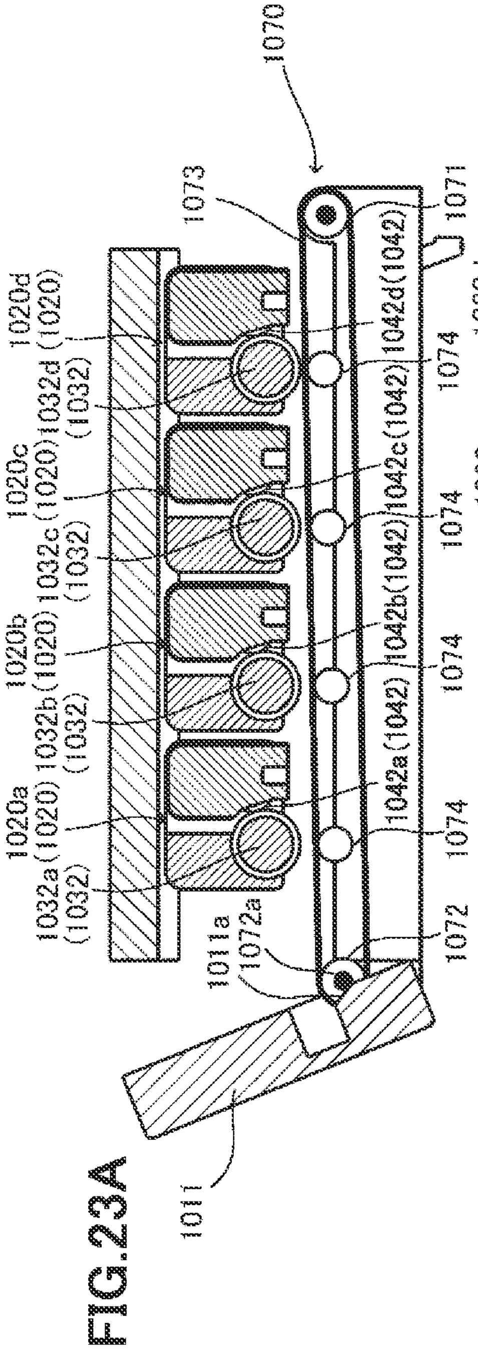

FIG. 23A is an illustration showing the intermediate transfer belt moved to a belt separate position and thus separated apart from photosensitive drums in response to an opening motion of a cover.

Figure 23B:
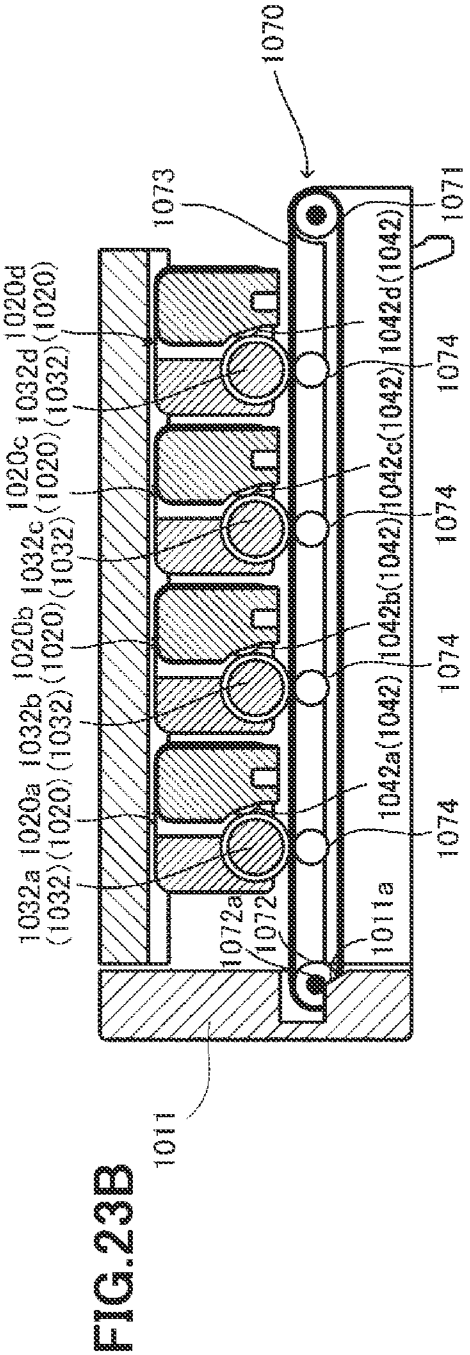

FIG. 23B is an illustration showing the intermediate transfer belt moved to a belt contact position and thus positioned in contact with the photosensitive drums in response to a closing motion of the cover.

Figure 24:
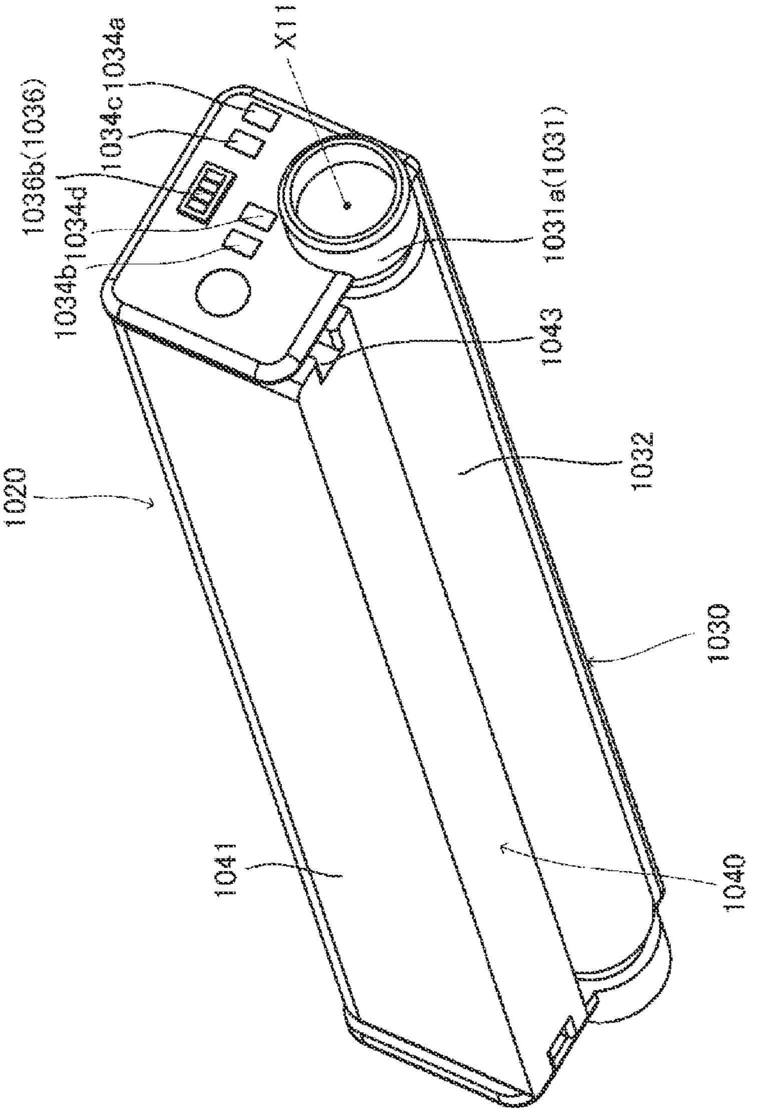

FIG. 24 is a perspective view of a cartridge according to a modification of the second example.

Figure 25:
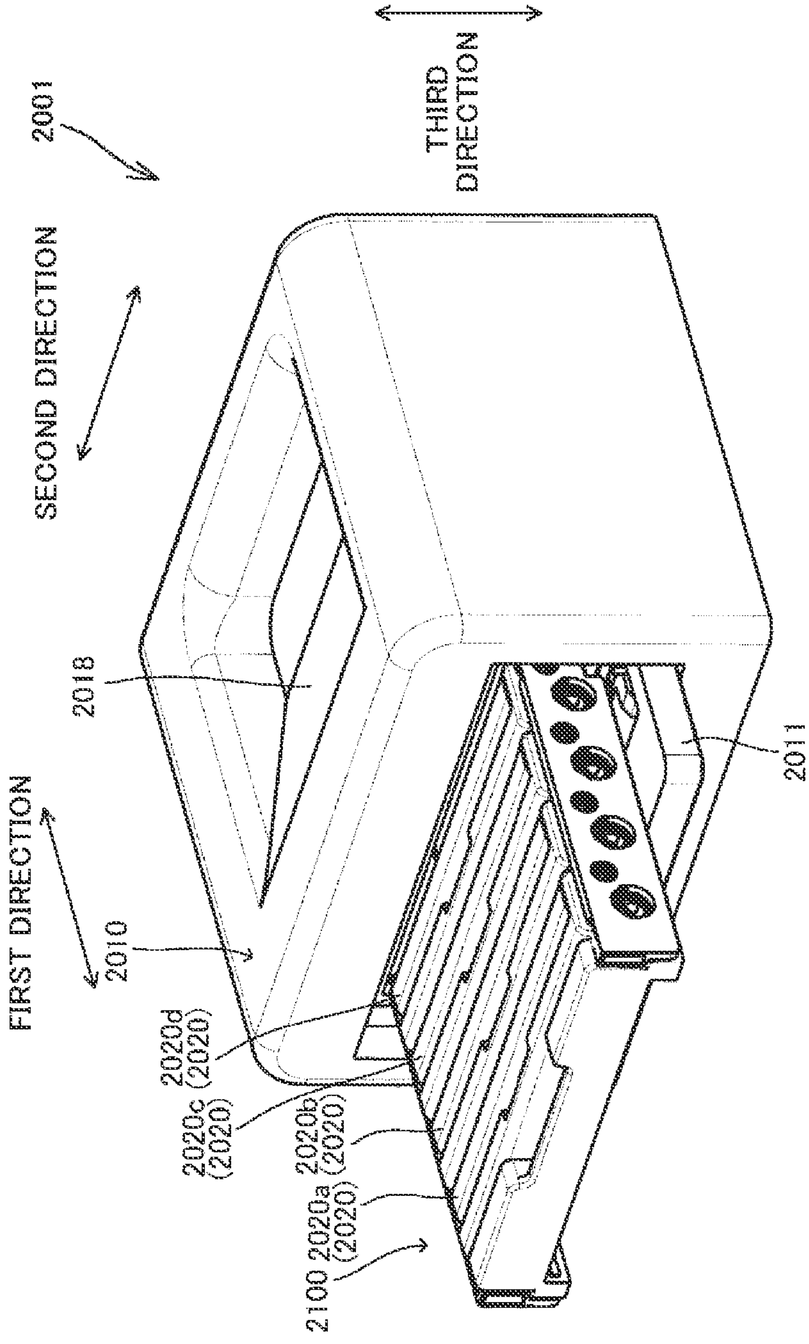

FIG. 25 is a perspective view of an image forming apparatus according to a third example.

Figure 26:
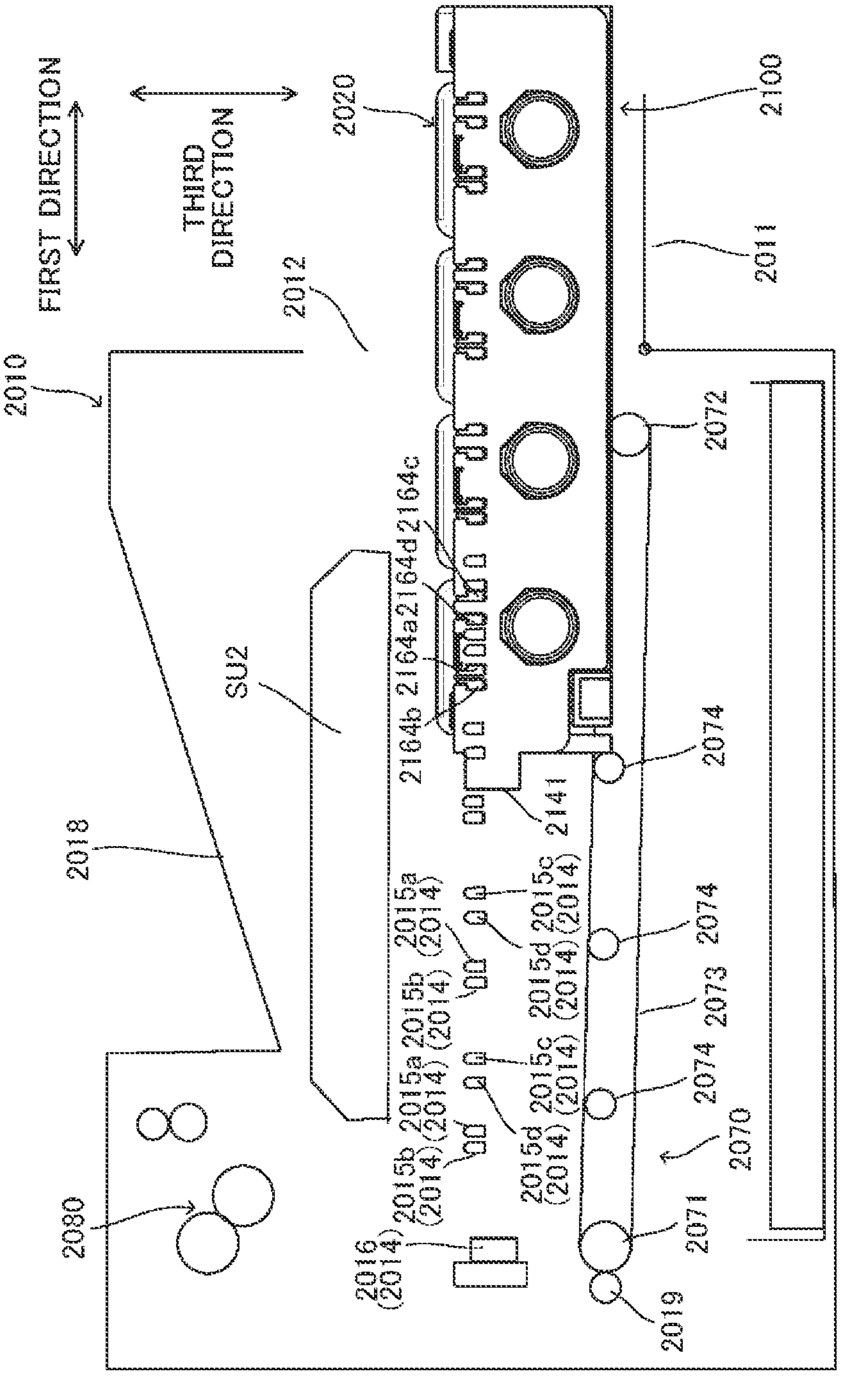

FIG. 26 is a schematic view of the image forming apparatus.

Figure 27B:
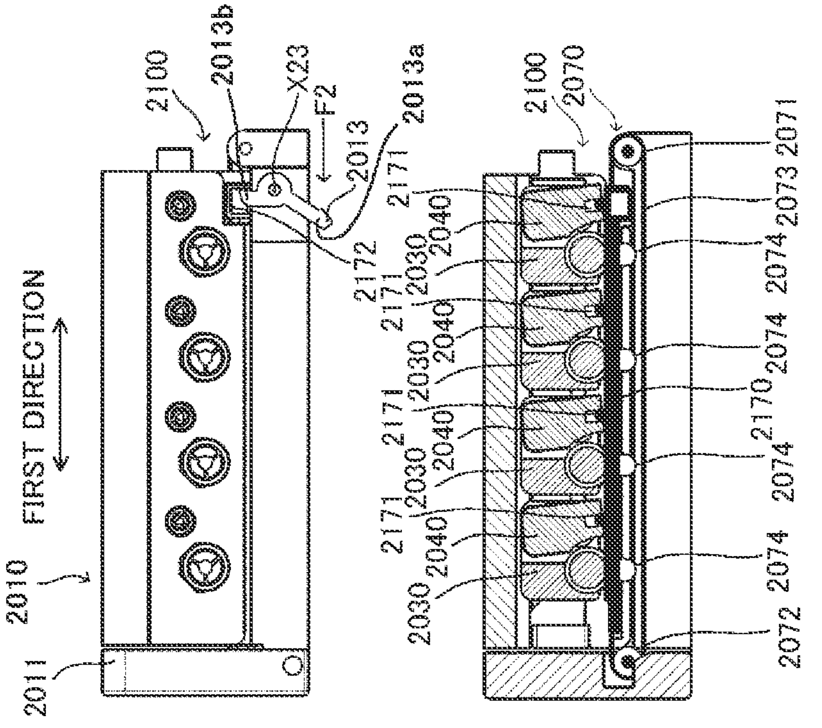
Figure 27A:
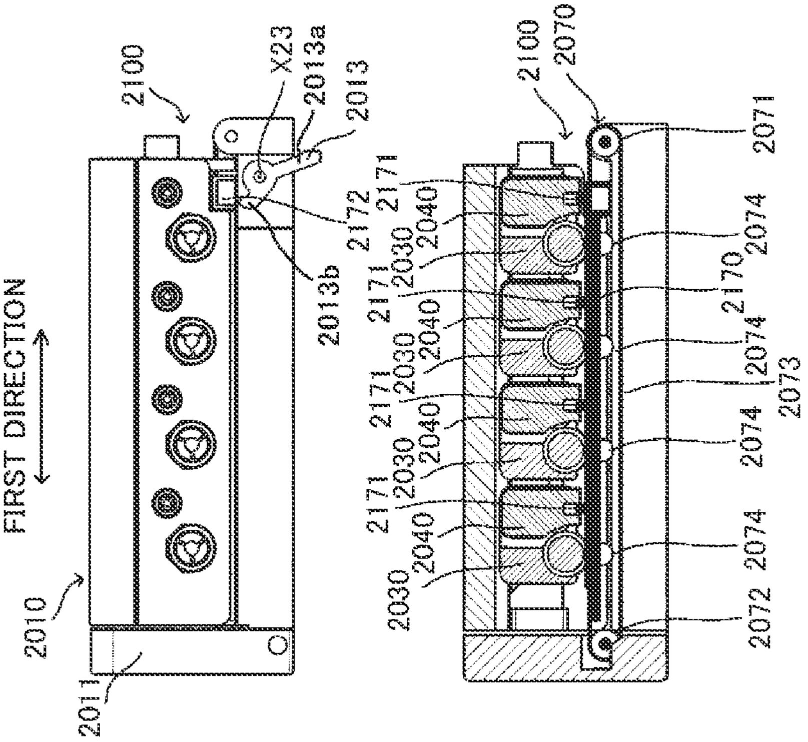

FIG. 27A includes illustrations showing the relationship among a drawer, a transfer device and a main housing as viewed in the second direction as observed when a translation cam is positioned in a first position.

FIG. 27B includes illustrations showing the relationship among the drawer, the transfer device and the main housing as viewed in the second direction as observed when the translation cam is positioned in a second position.

Figure 28:
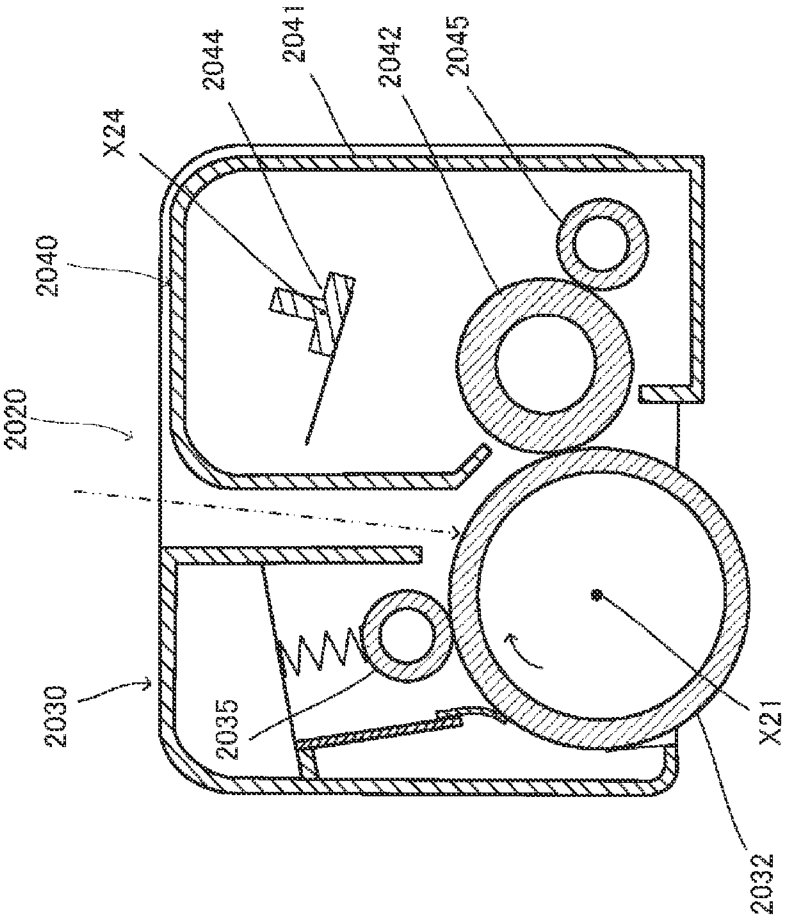

FIG. 28 is a cross-sectional view of a cartridge as viewed in the second direction.

Figure 29:
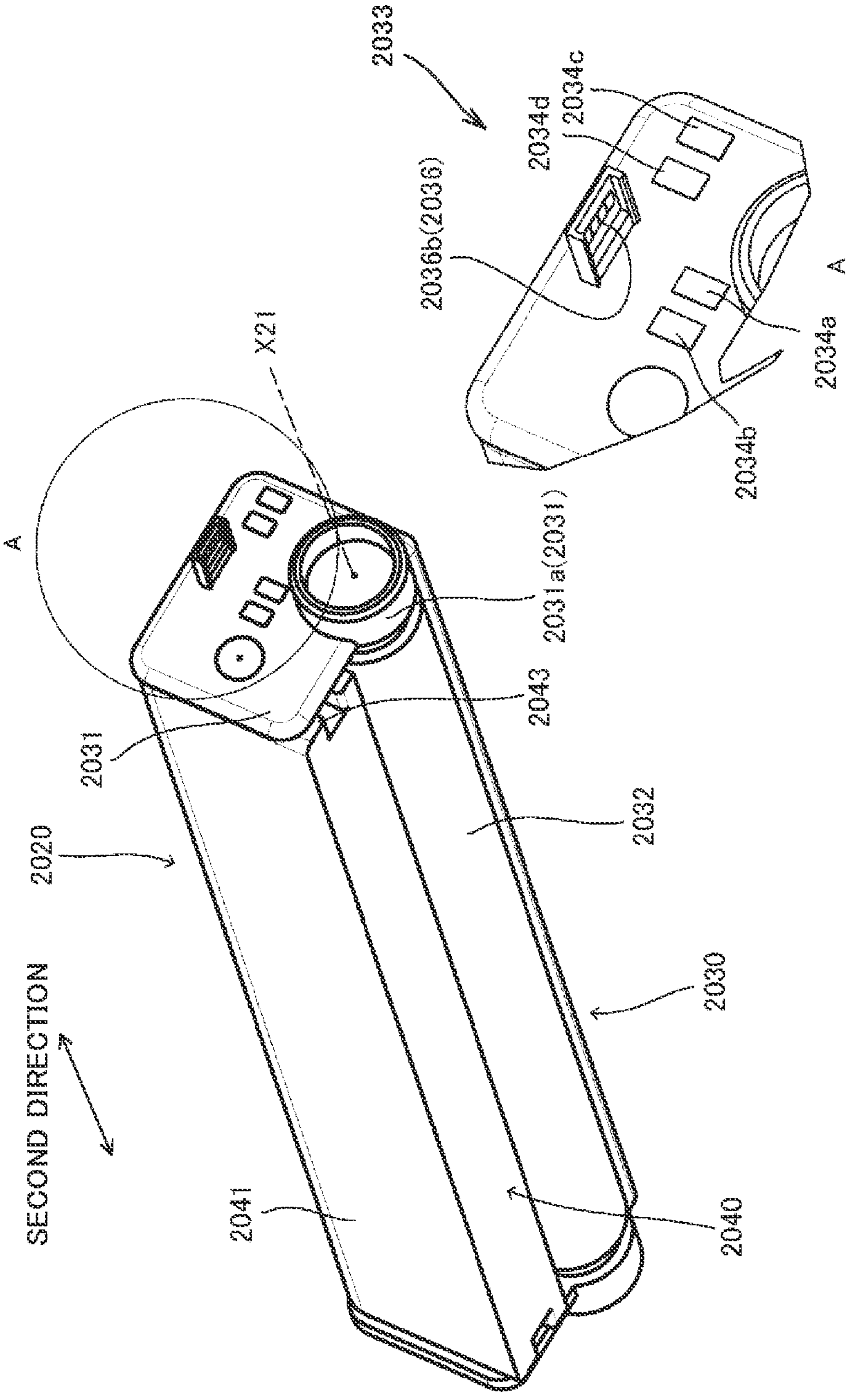

FIG. 29 includes a perspective view and a partially enlarged view of the cartridge as viewed from one side of the cartridge in the second direction.

Figure 30:
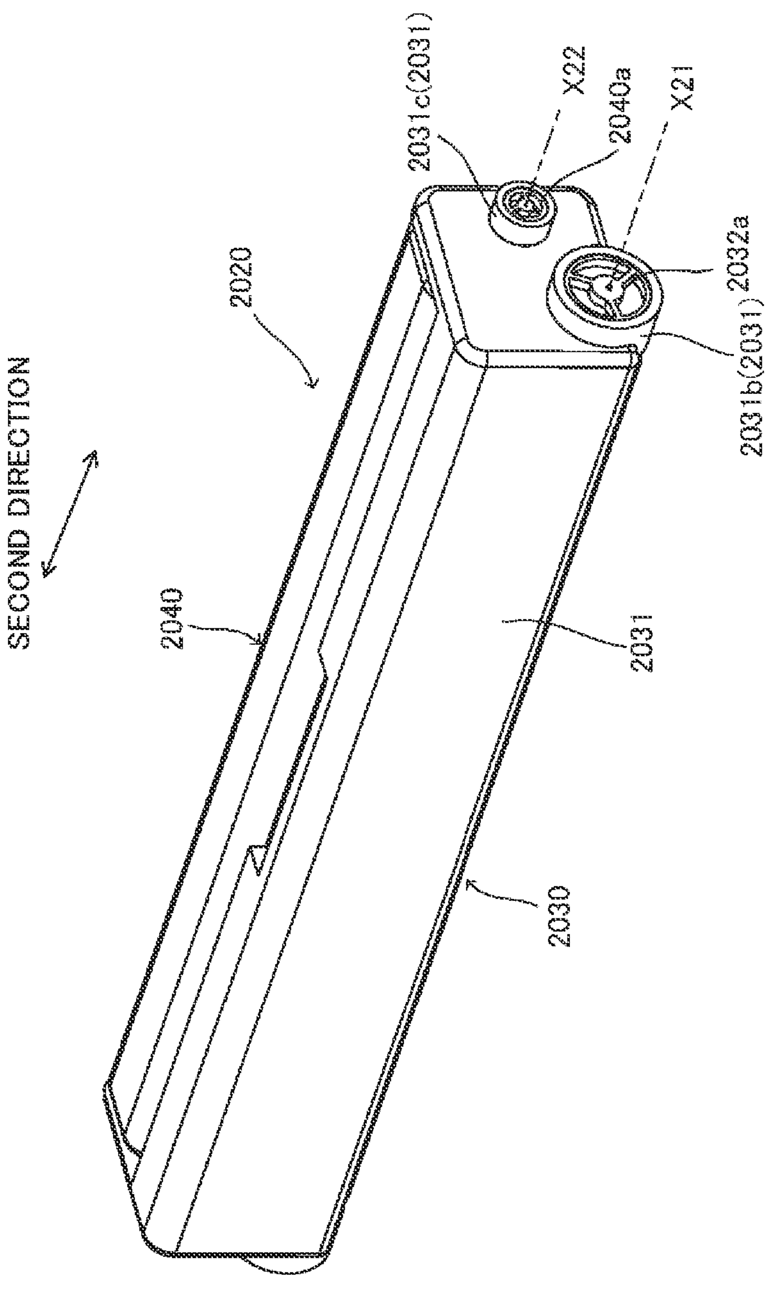

FIG. 30 is a perspective view of the cartridge as viewed from the other side of the cartridge in the second direction.

Figure 31:
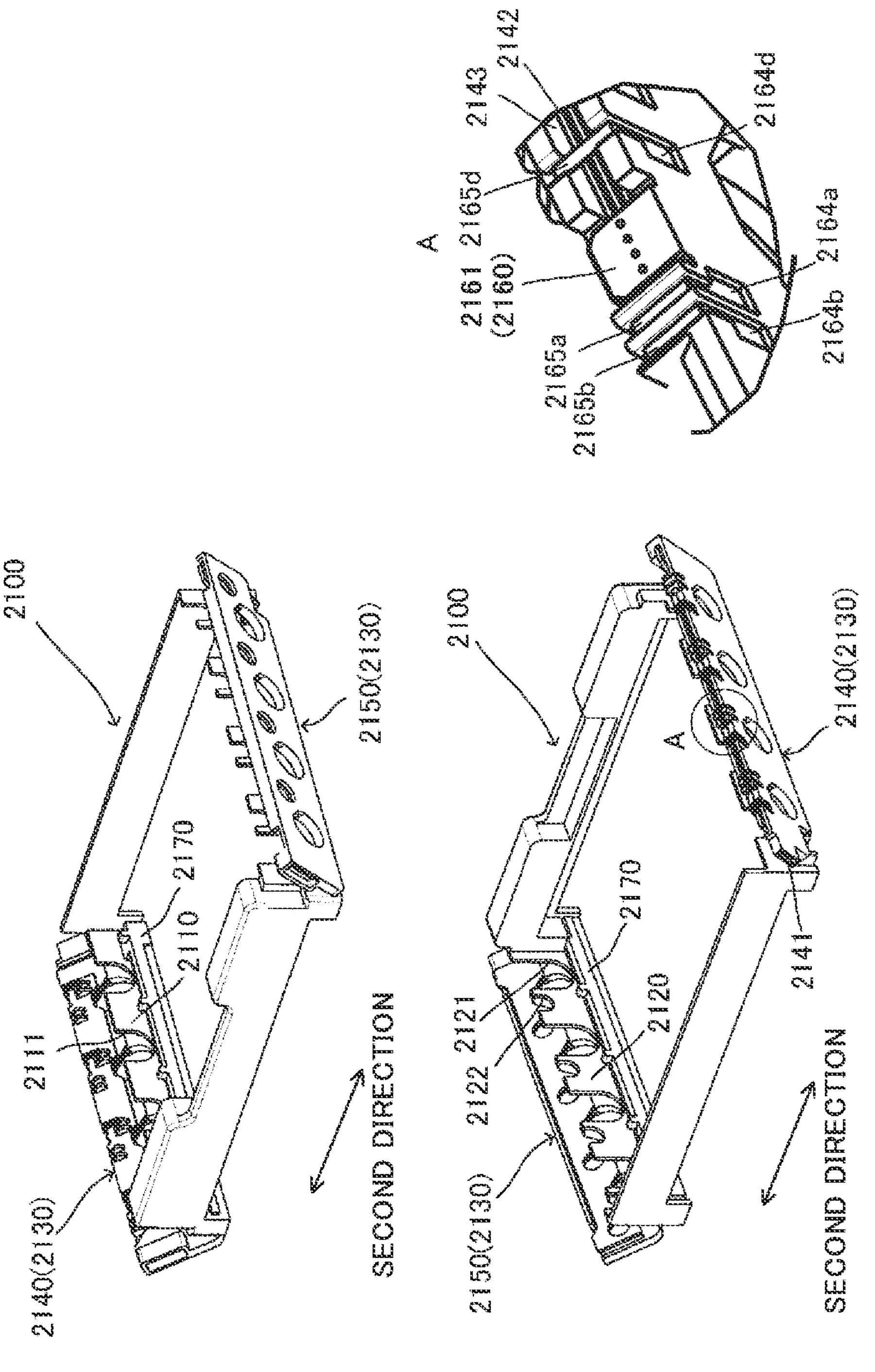

FIG. 31 includes perspective views and a partially enlarged view of the drawer with a latch positioned in the unlock position.

Figure 32:
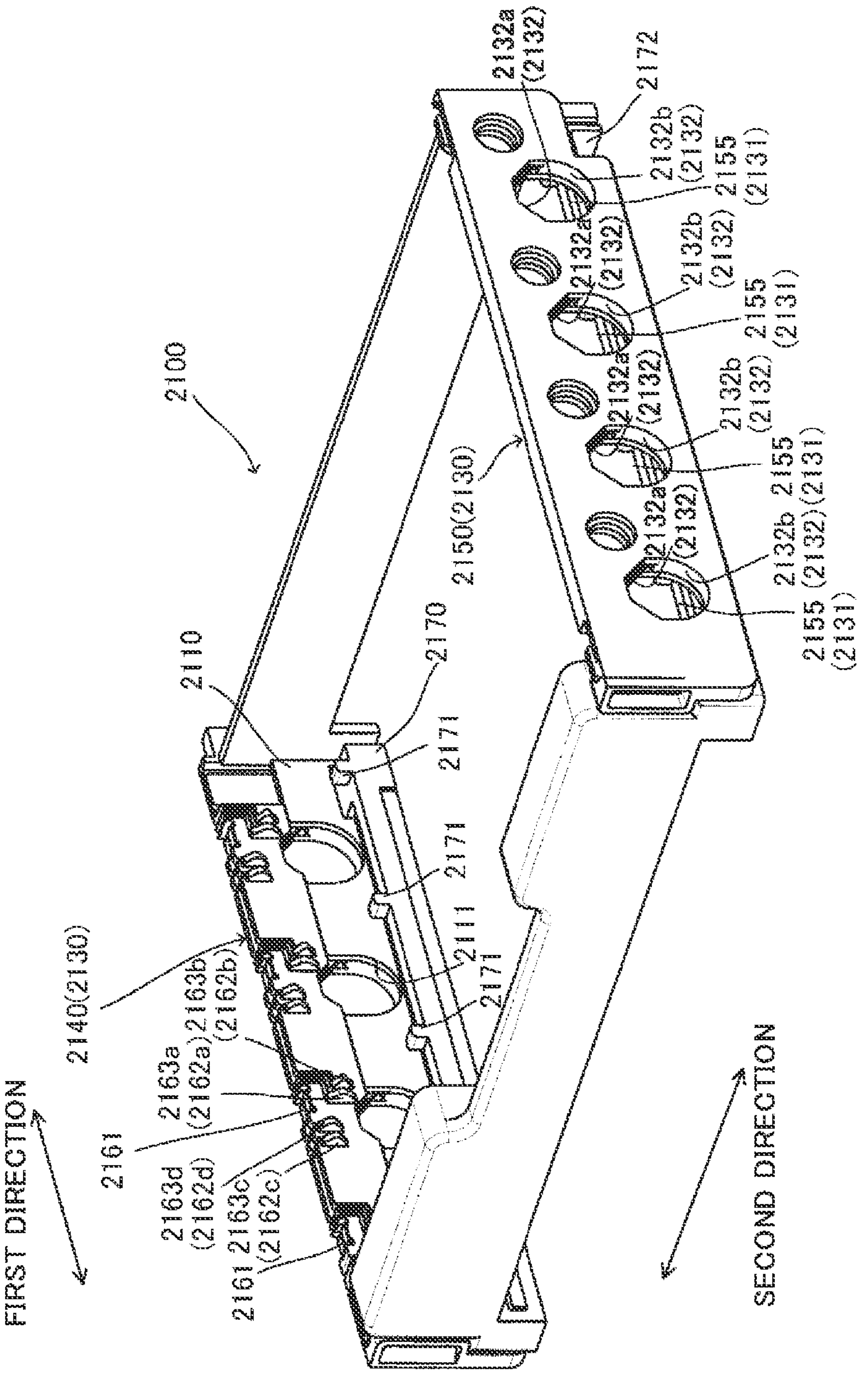

FIG. 32 is a perspective view of the drawer showing the other side of the drawer facing a direction parallel to the second direction.

Figure 33:
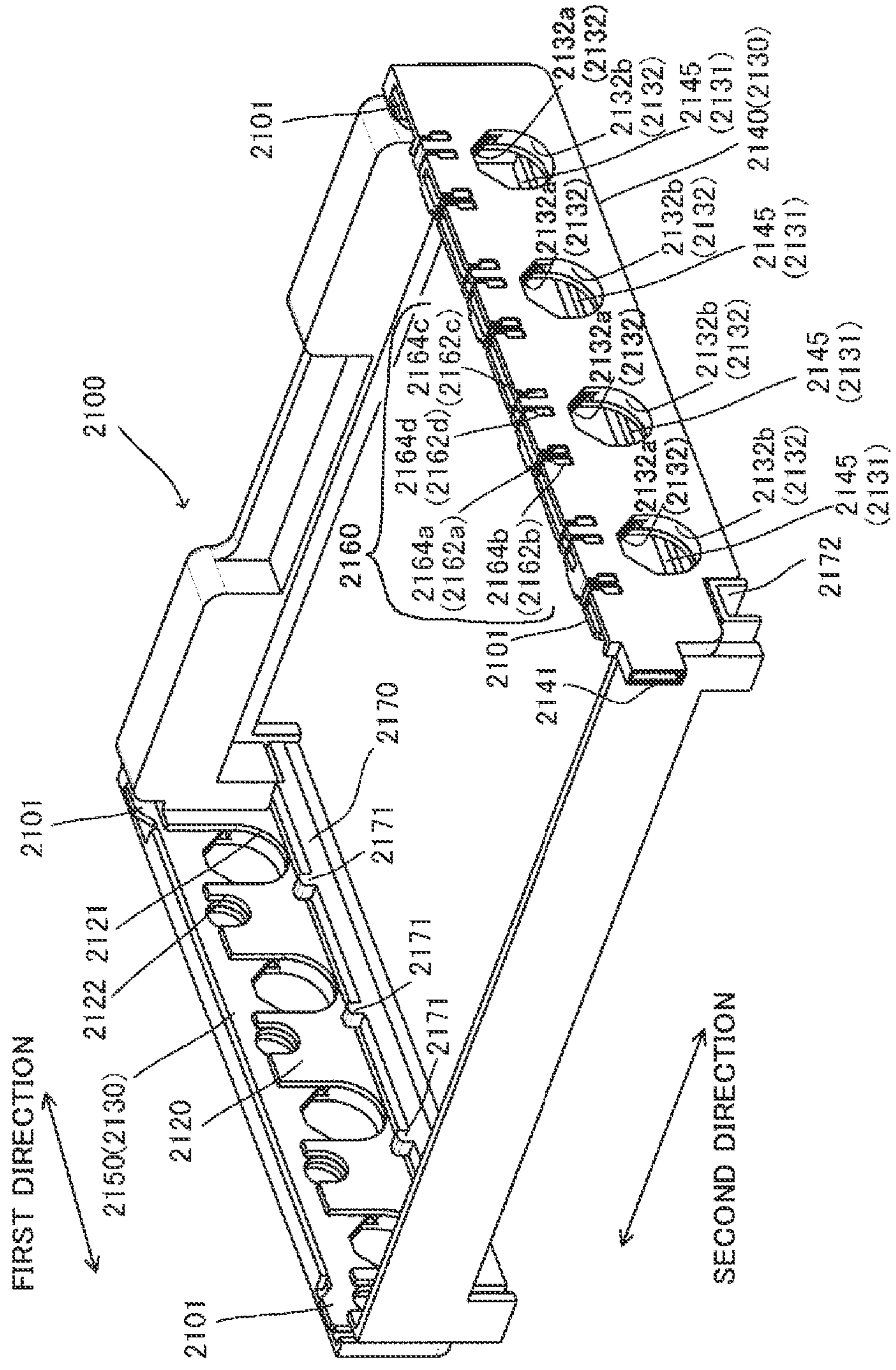

FIG. 33 is a perspective view of the drawer showing one side of the drawer facing a direction parallel to the second direction.

Figure 34:
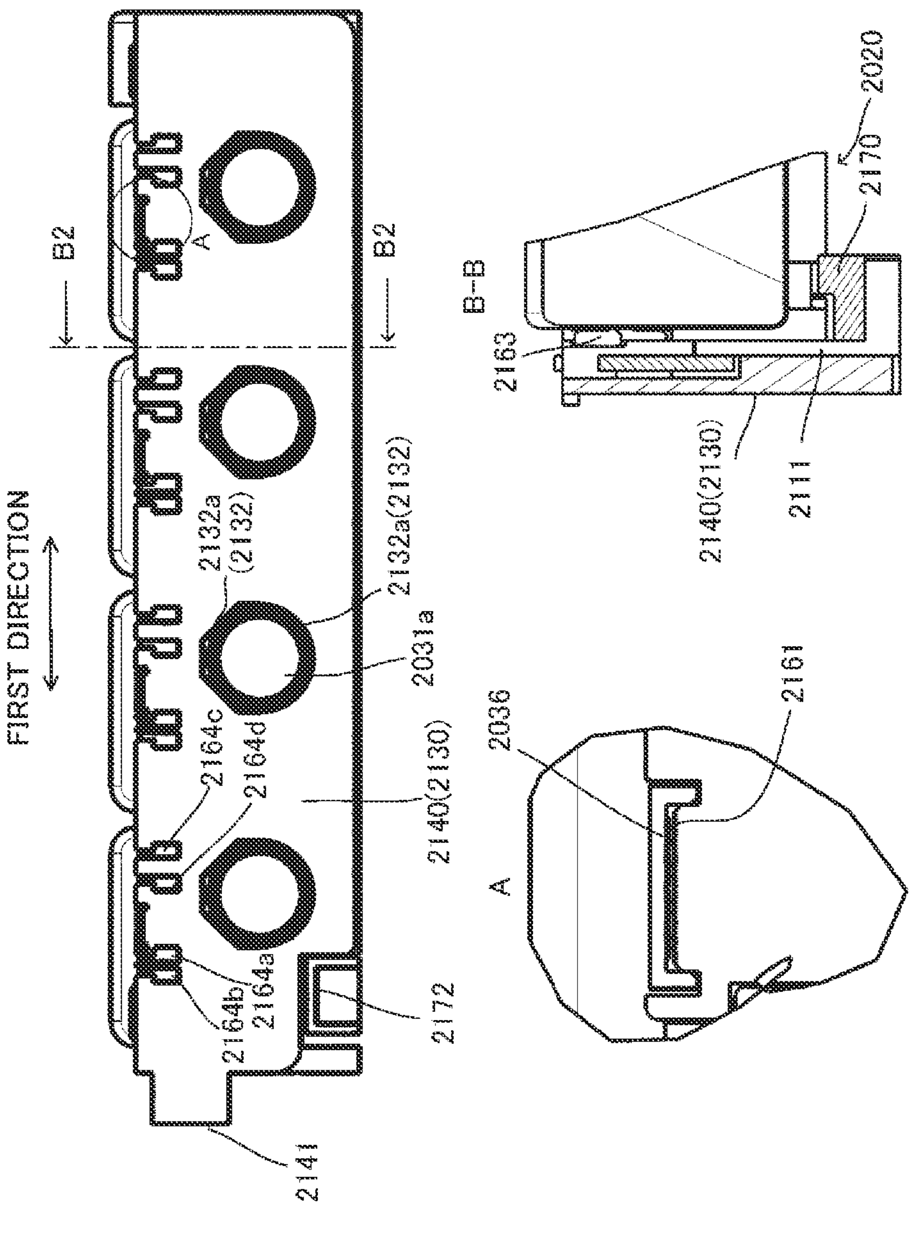

FIG. 34 is a side view and partial sectional views of the drawer and cartridges installed in the drawer.

Figure 35B:
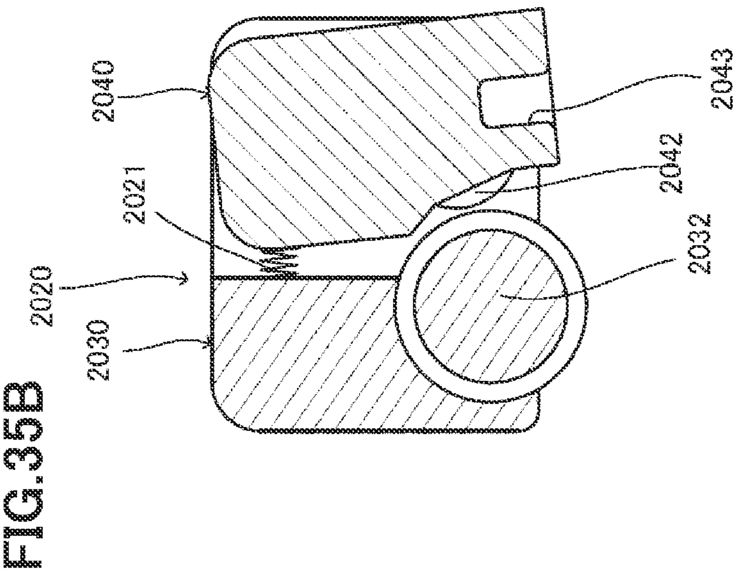
Figure 35A:
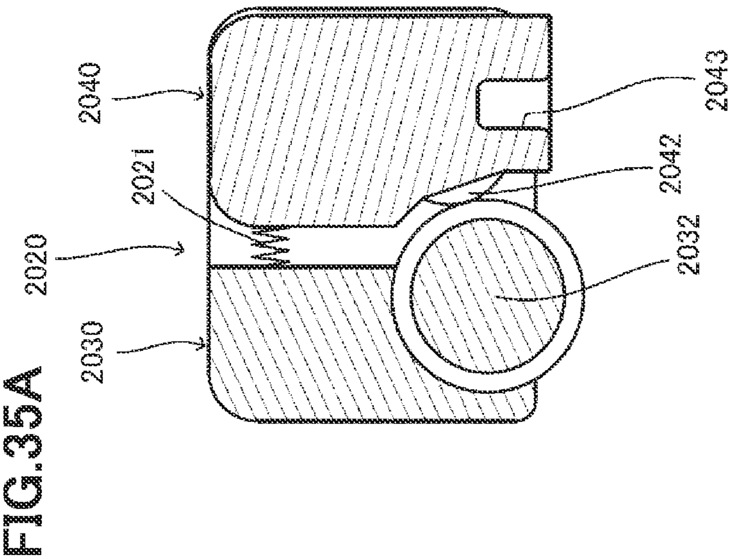

FIG. 35A is a schematic view of the cartridge as viewed in the second direction showing a contact state.

FIG. 35B is a schematic view of the cartridge as viewed in the second direction showing a separate state.

Figure 36A:
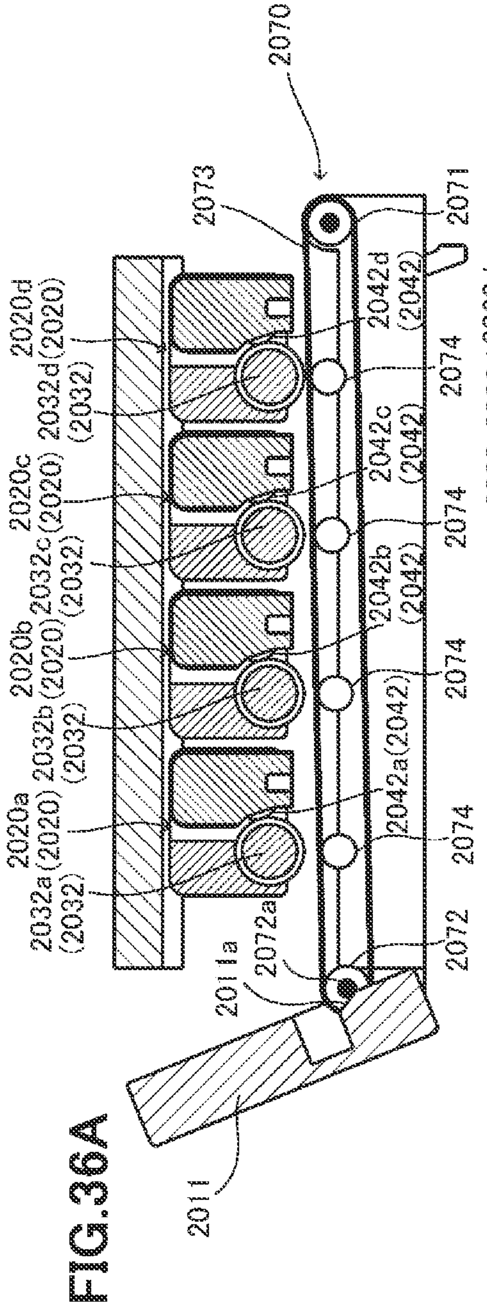

FIG. 36A is an illustration showing the intermediate transfer belt moved to a belt separate position and thus separated apart from photosensitive drums in response to an opening motion of a cover.

Figure 36B:
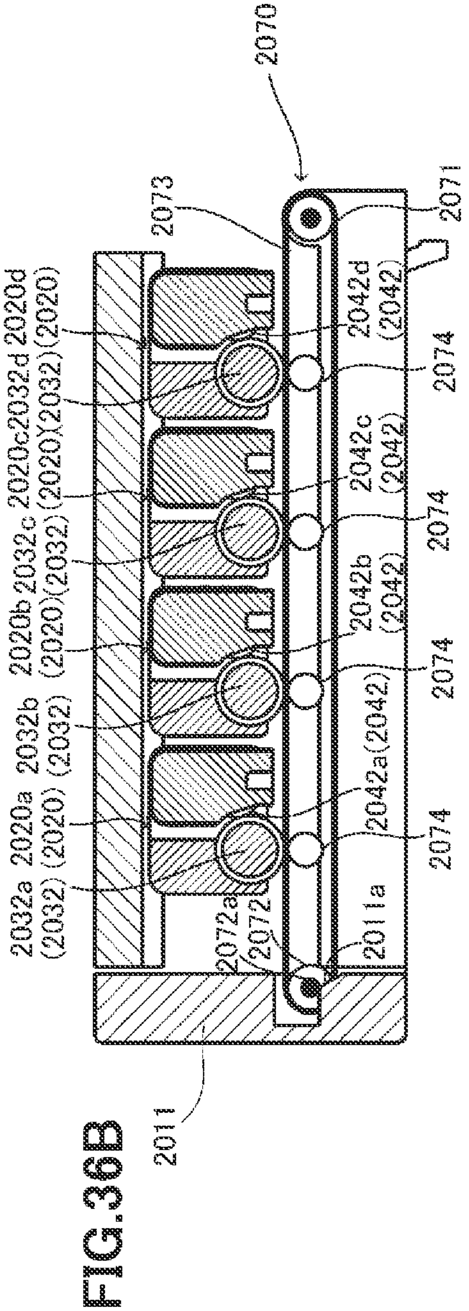

FIG. 36B is an illustration showing the intermediate transfer belt moved to a belt contact position and thus positioned in contact with the photosensitive drums in response to a closing motion of the cover.

Figure 37:
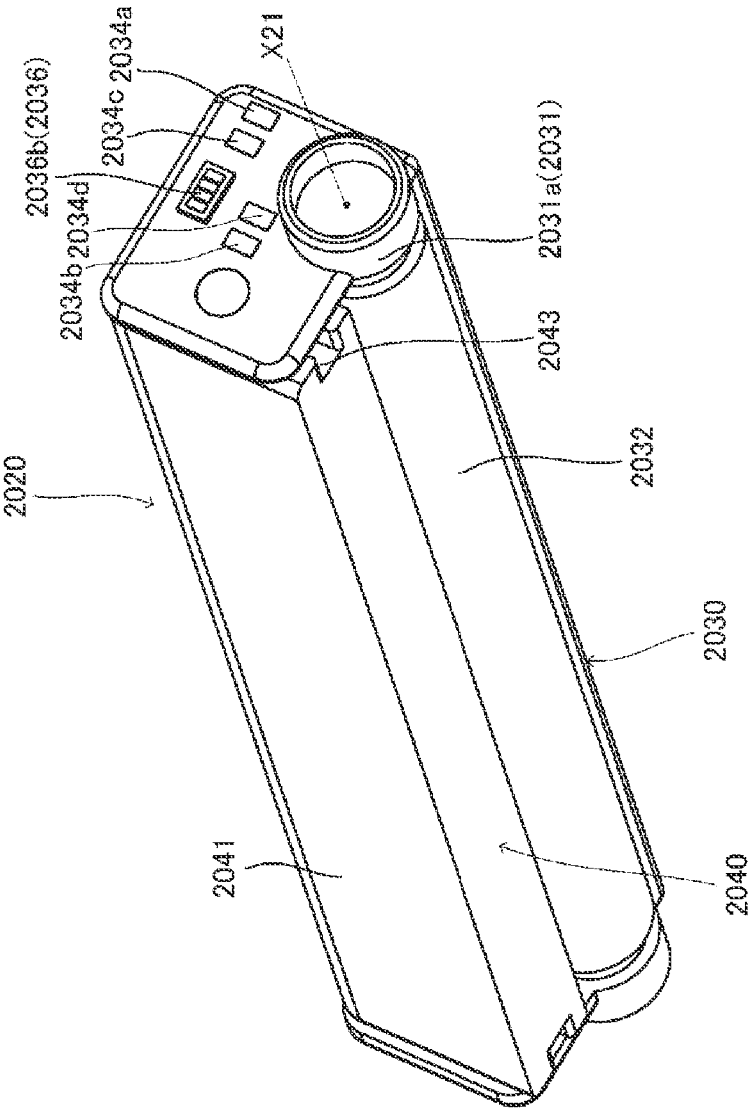

FIG. 37 is a perspective view of a cartridge according to a modification of the third example.

Figure 38:
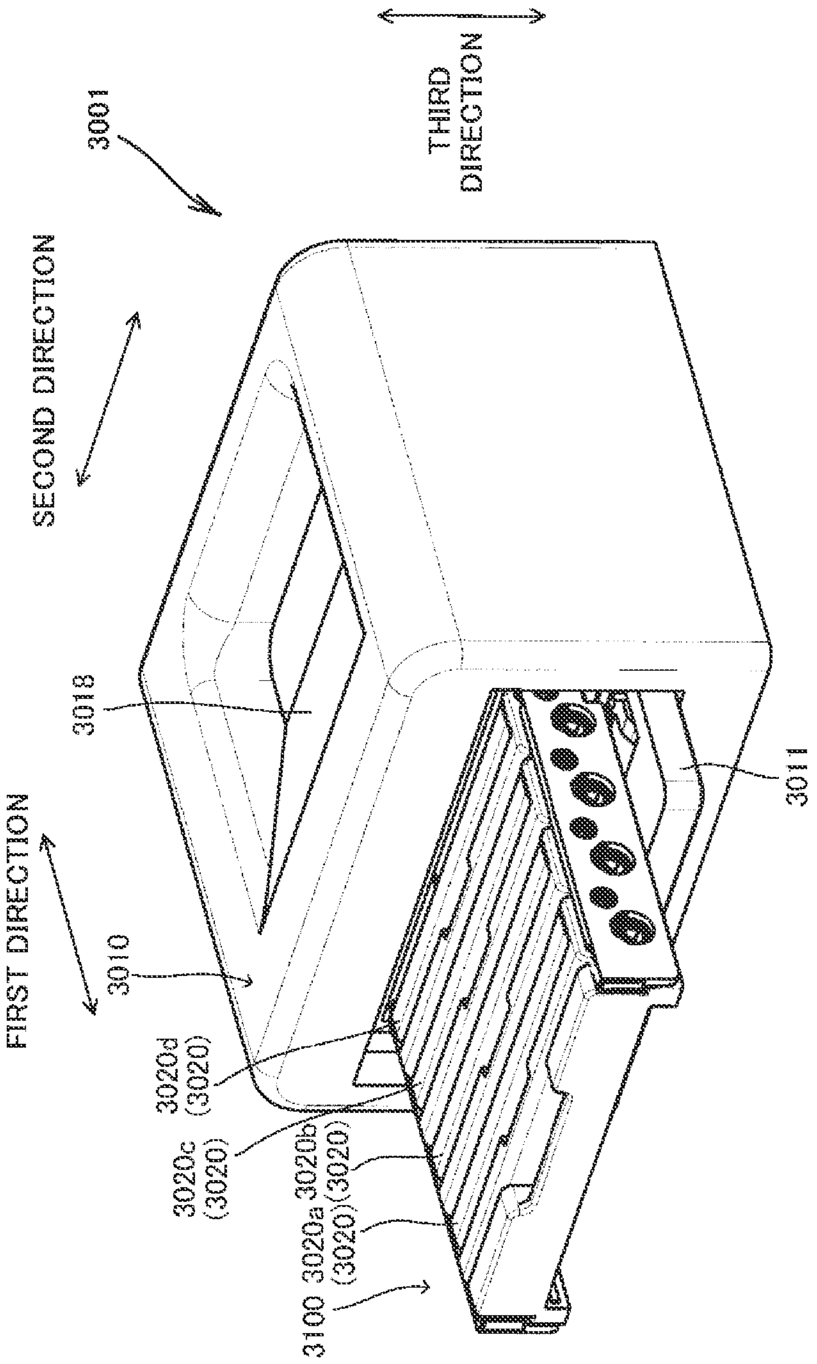

FIG. 38 is a perspective view of an image forming apparatus according to a fourth example.

Figure 39:
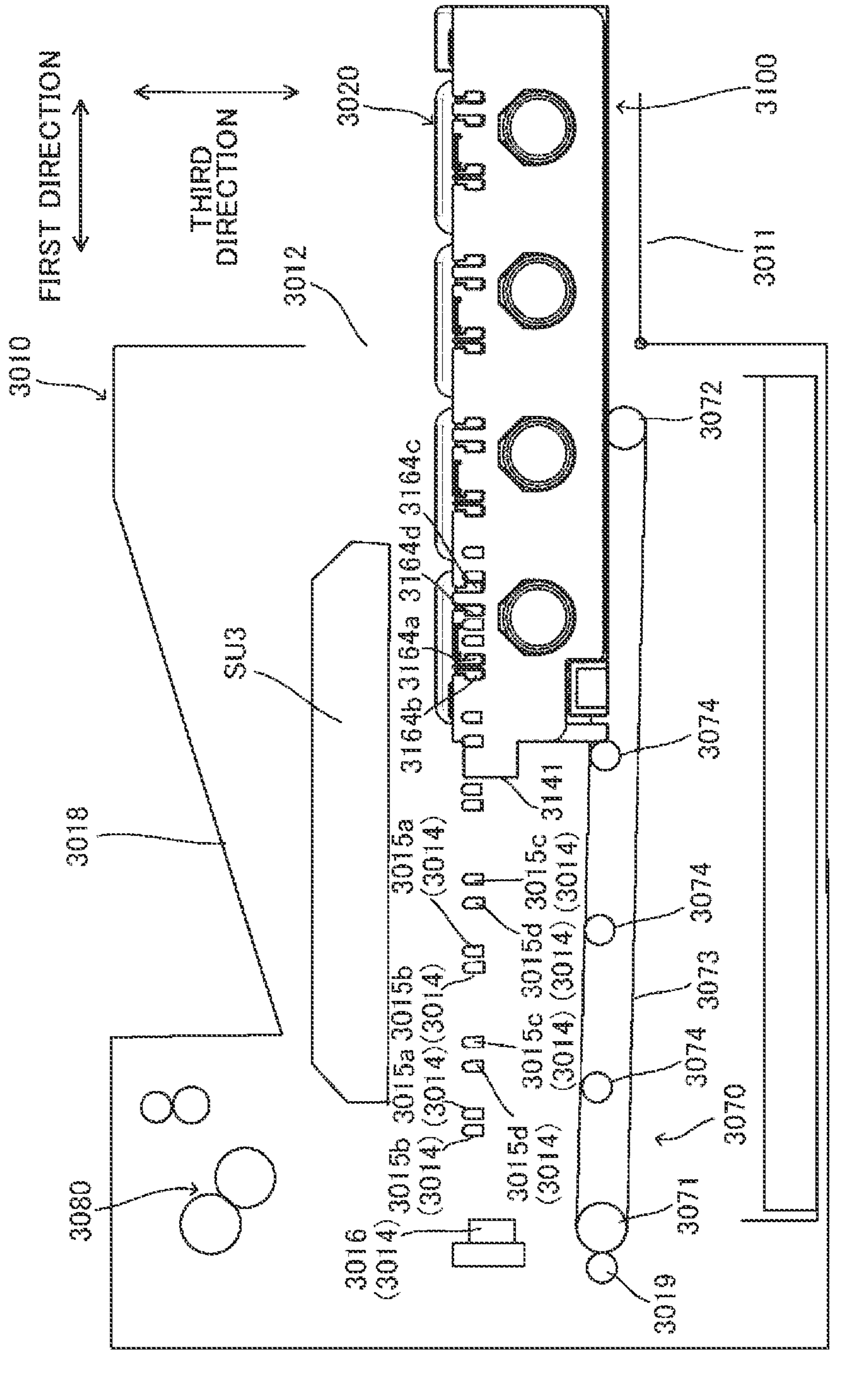

FIG. 39 is a schematic view of the image forming apparatus.

Figure 40B:
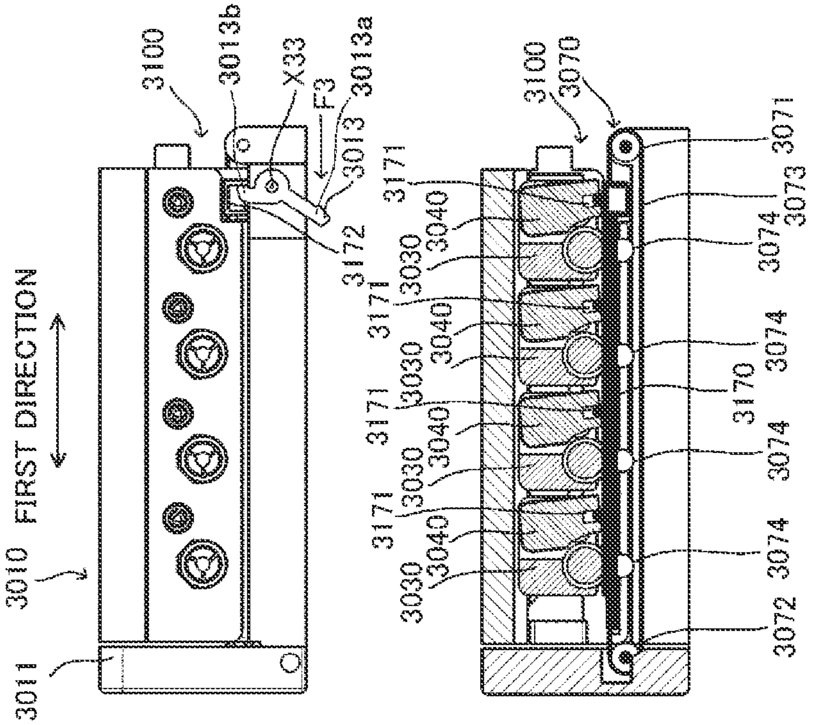
Figure 40A:
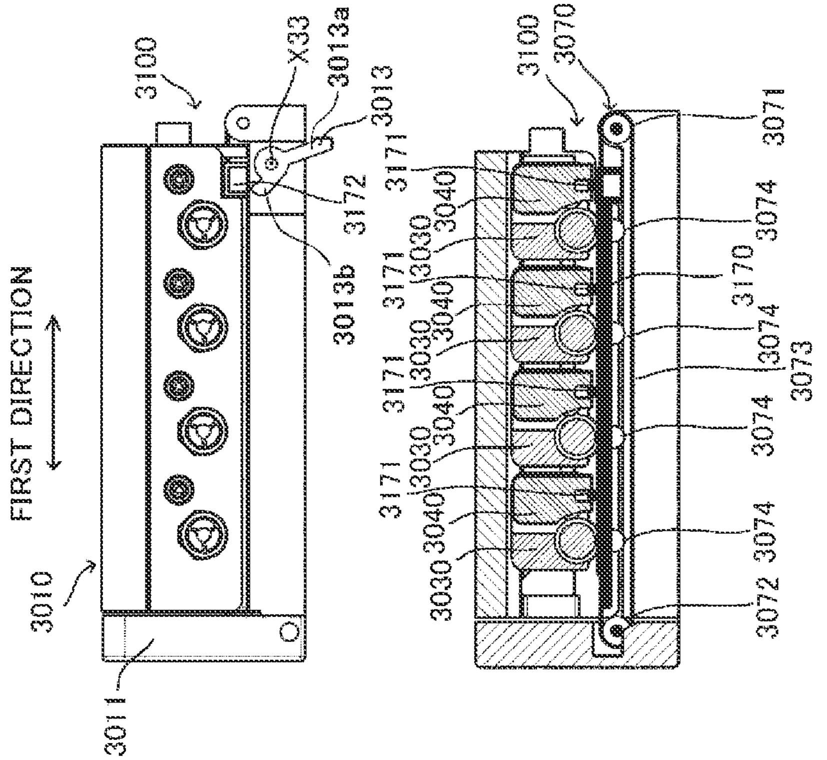

FIG. 40A includes illustrations showing the relationship among a drawer, a transfer device and a main housing as viewed in the second direction as observed when a translation cam is positioned in a first position.

FIG. 40B includes illustrations showing the relationship among the drawer, the transfer device and the main housing as viewed in the second direction as observed when the translation cam is positioned in a second position.

Figure 41:
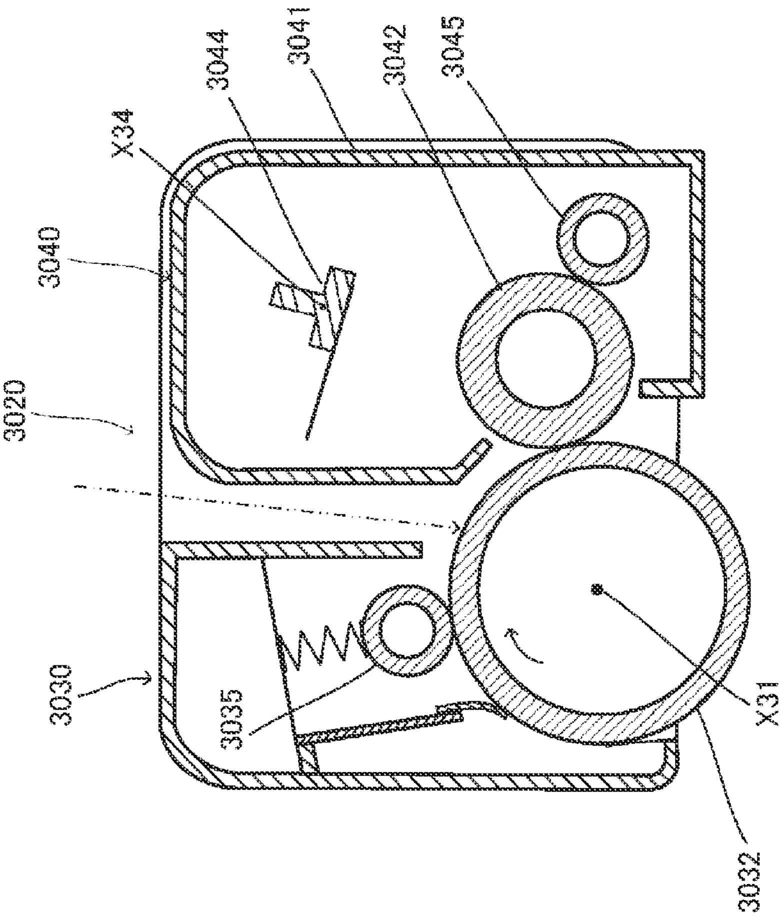

FIG. 41 is a cross-sectional view of a cartridge as viewed in the second direction.

Figure 42:
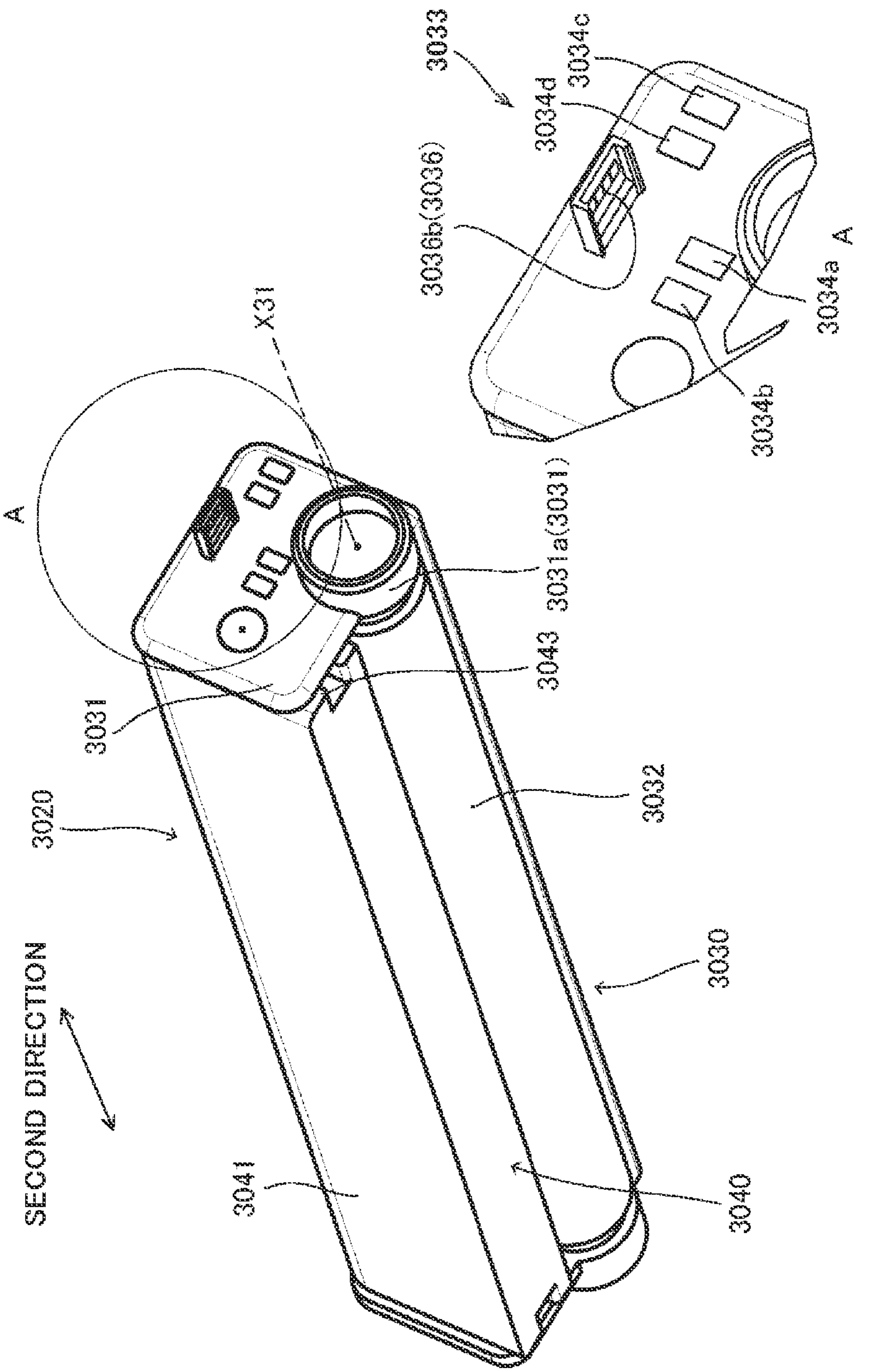

FIG. 42 includes a perspective view and a partially enlarged view of the cartridge as viewed from one side of the cartridge in the second direction.

Figure 43:
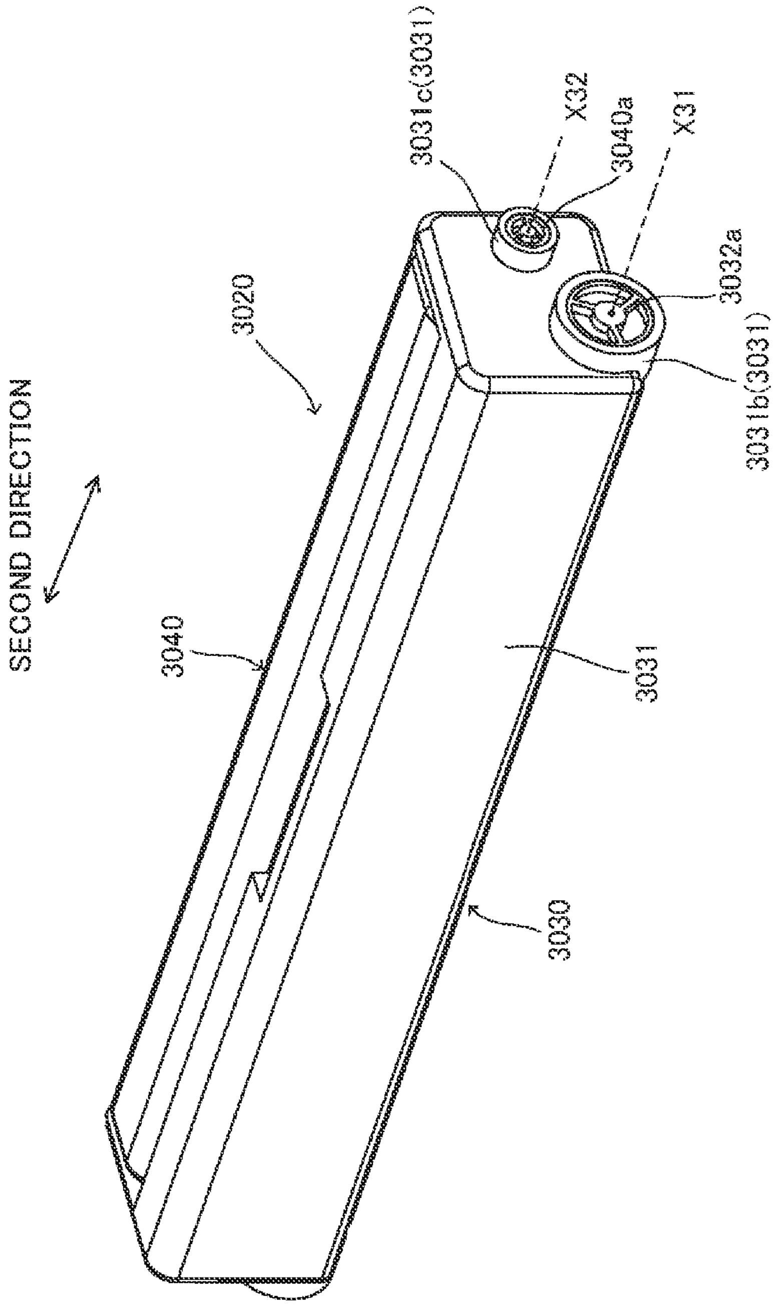

FIG. 43 is a perspective view of the cartridge as viewed from the other side of the cartridge in the second direction.

Figure 44:
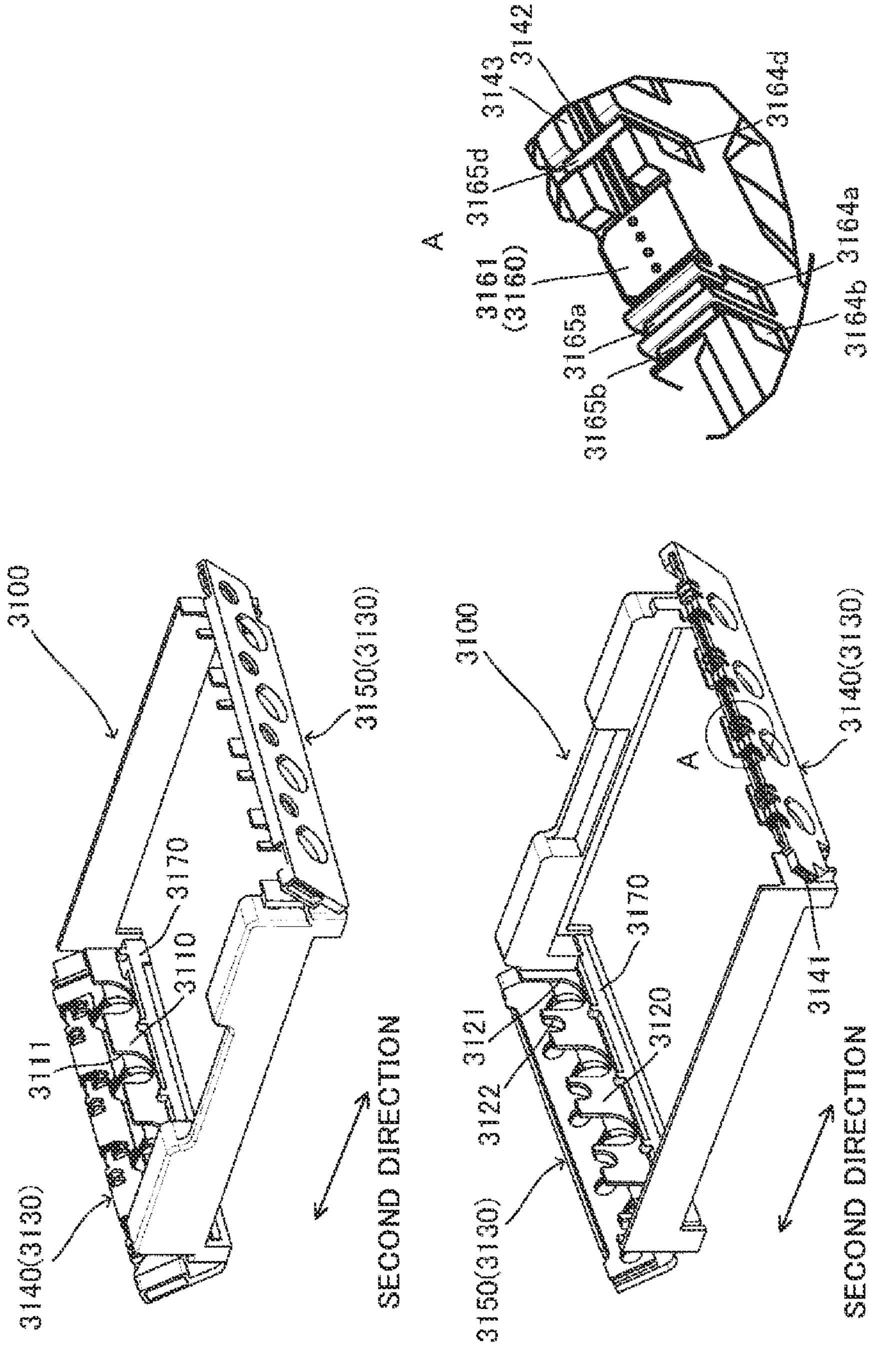

FIG. 44 includes perspective views and a partially enlarged view of the drawer with a latch positioned in the unlock position.

Figure 45:
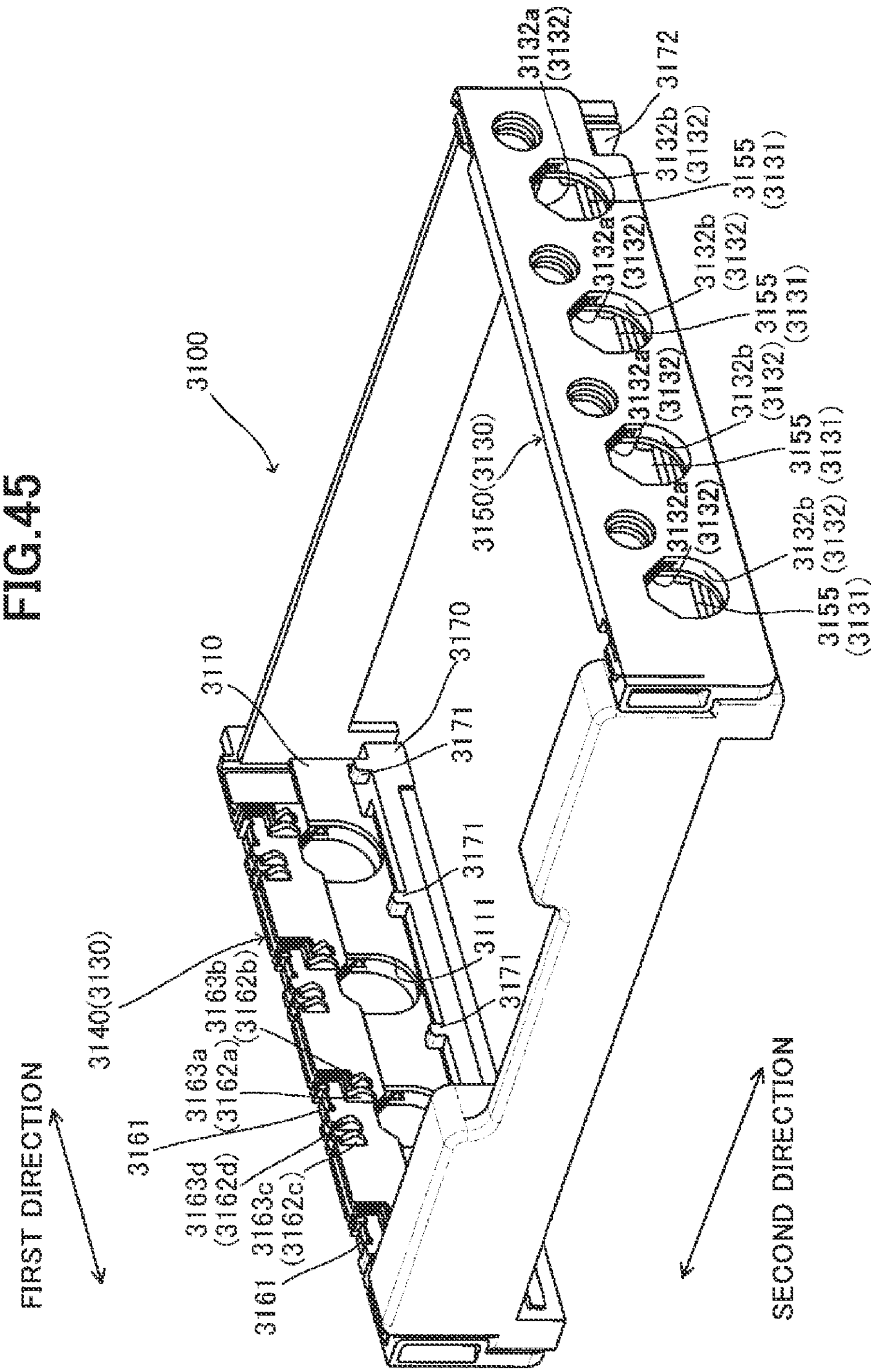

FIG. 45 is a perspective view of the drawer showing the other side of the drawer facing in a direction parallel to the second direction.

Figure 46:
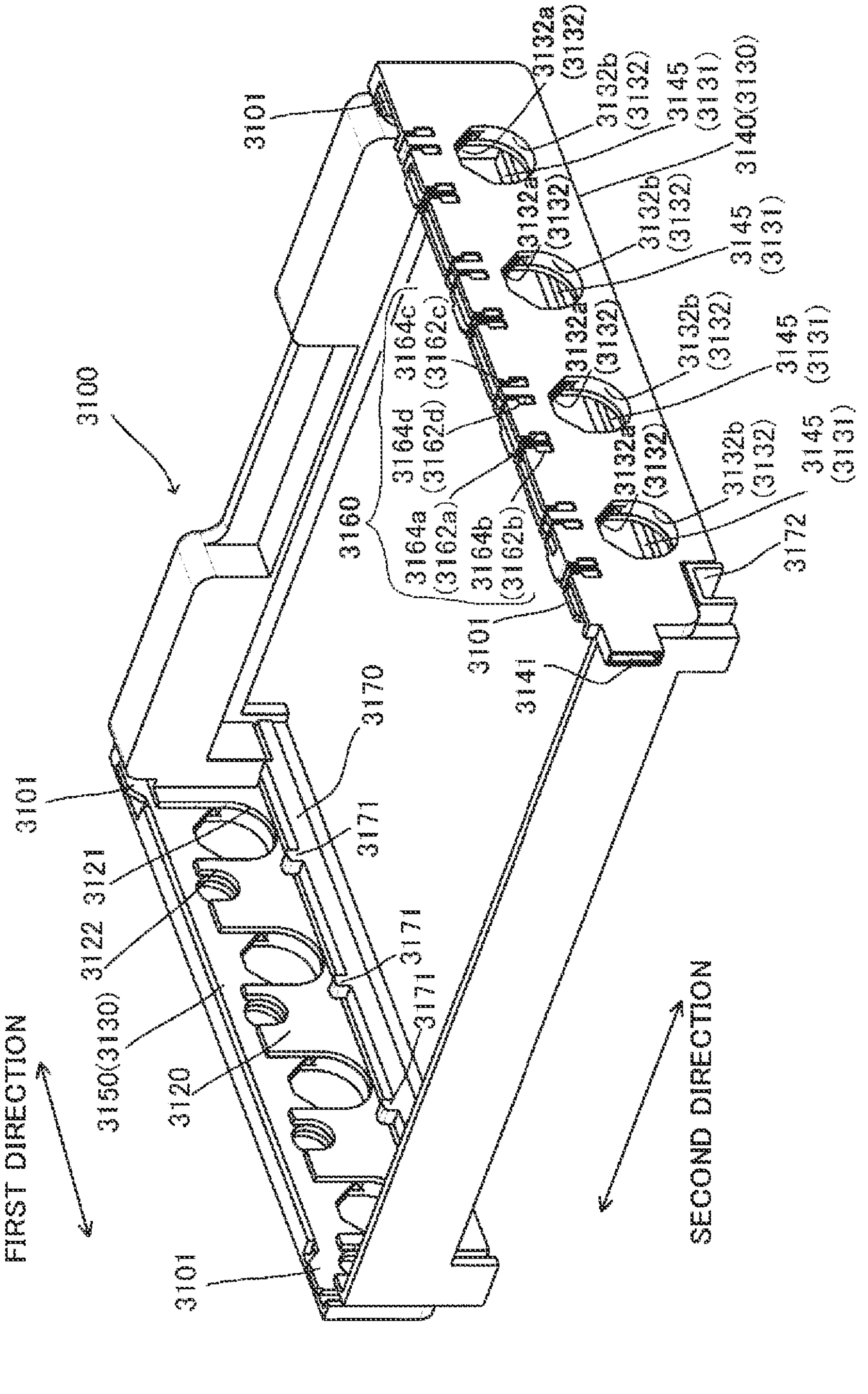

FIG. 46 is a perspective view of the drawer showing one side of the drawer facing in a direction parallel to the second direction.

Figure 47:
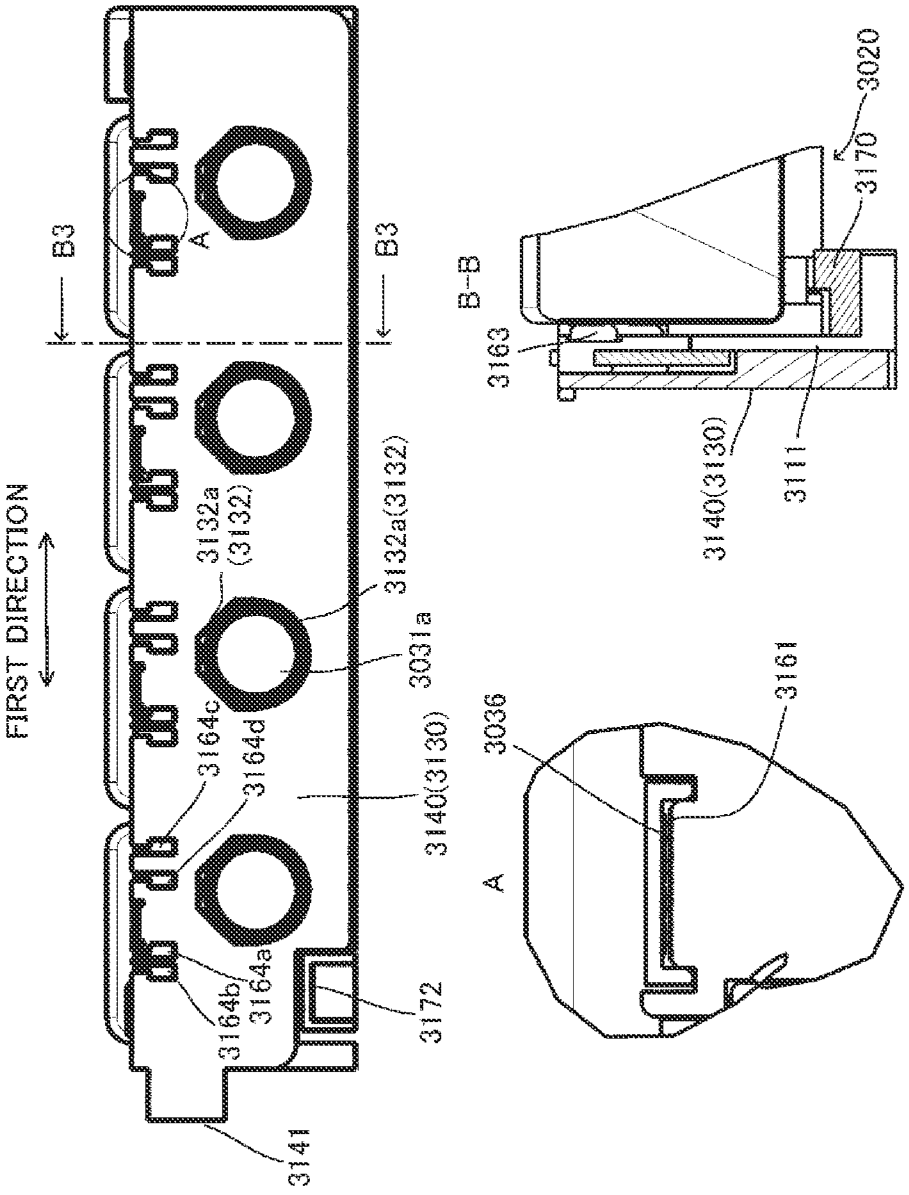

FIG. 47 is a side view and partial sectional views of the drawer and cartridges installed in the drawer.

Figure 48B:
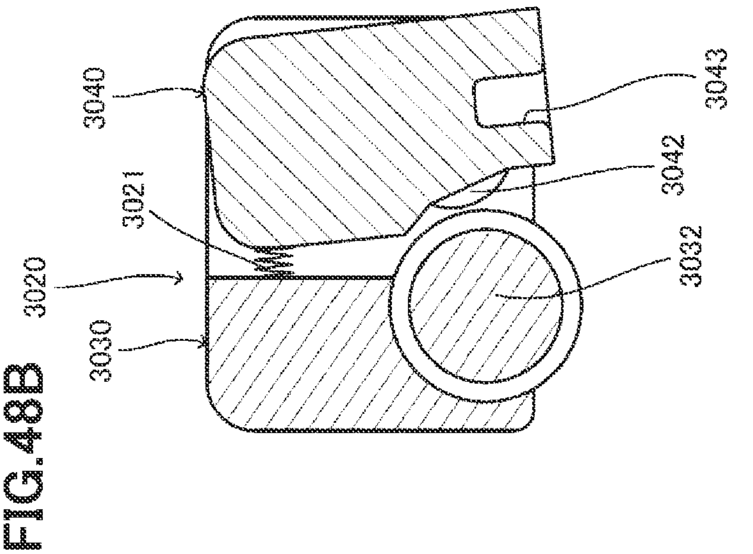
Figure 48A:
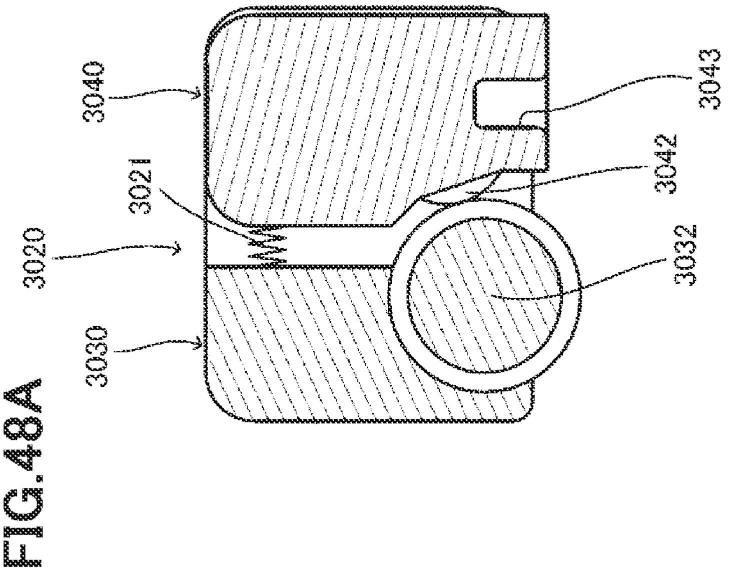

FIG. 48A is a schematic view of the cartridge as viewed in the second direction showing a contact state.

FIG. 48B is a schematic view of the cartridge as viewed in the second direction showing a separate state.

Figure 49A:
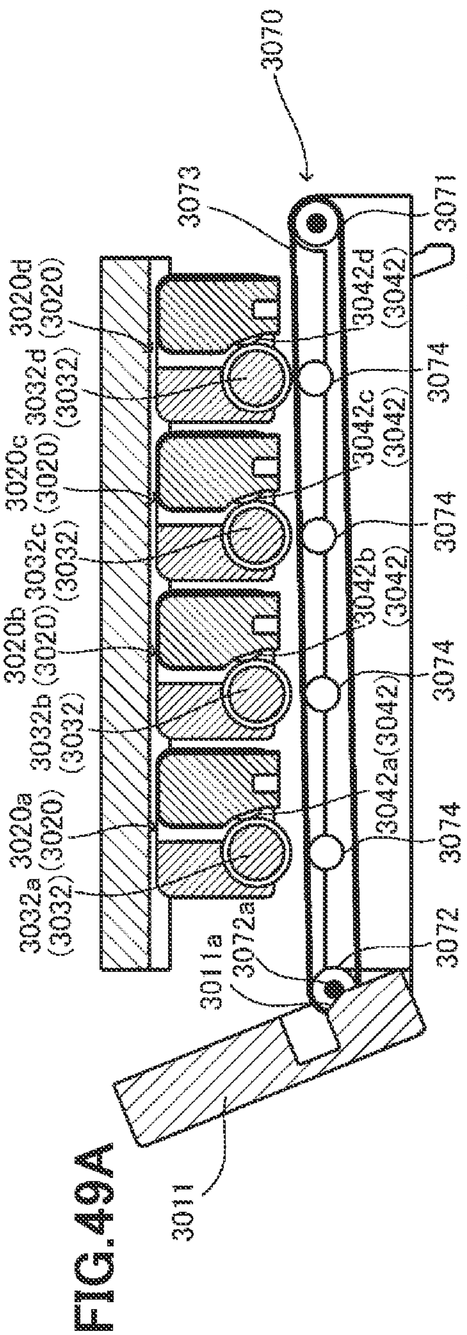

FIG. 49A is an illustration showing the intermediate transfer belt moved to a belt separate position and thus separated apart from photosensitive drums in response to an opening motion of a cover.

Figure 49B:
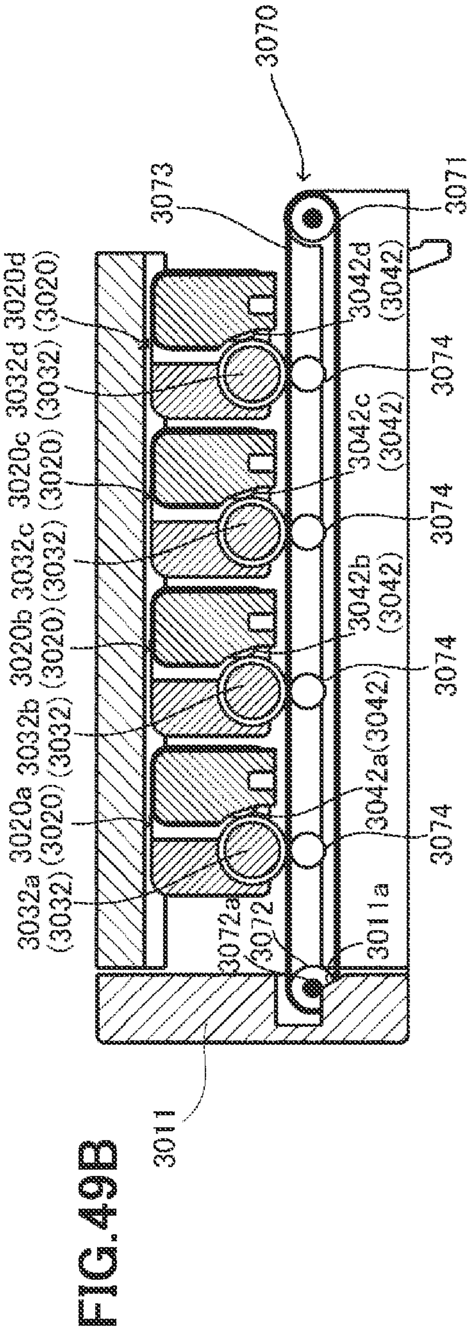

FIG. 49B is an illustration showing the intermediate transfer belt moved to a belt contact position and thus positioned in contact with the photosensitive drums in response to a closing motion of the cover.

Figure 50:
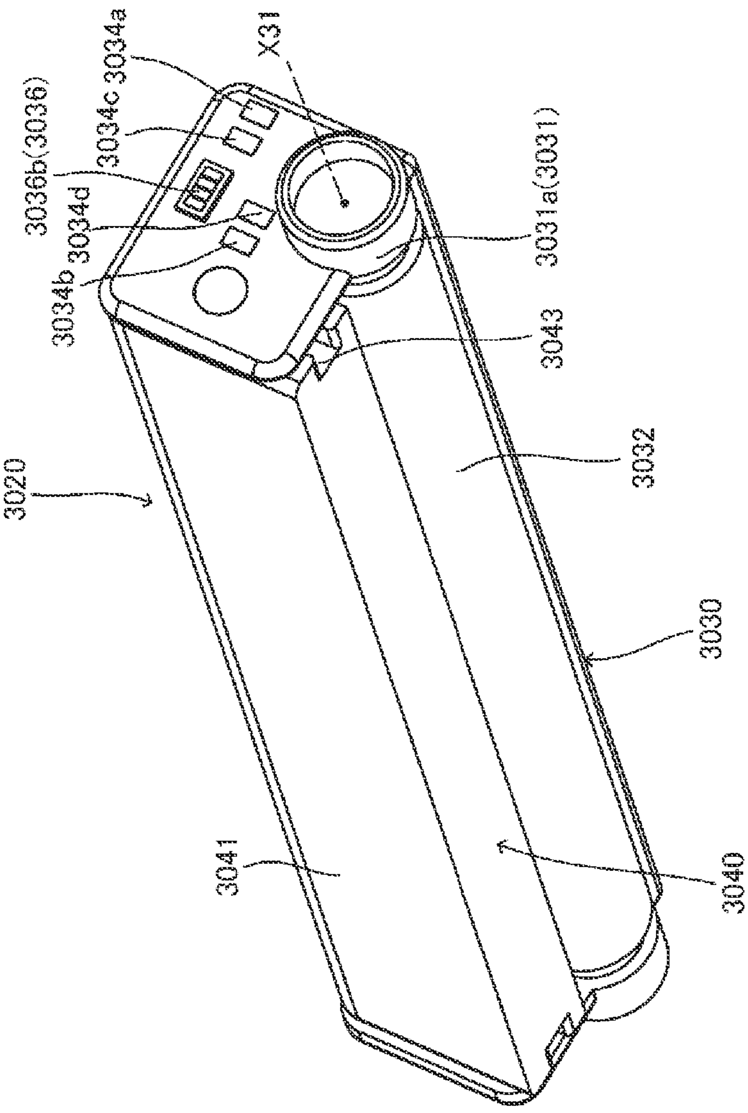

FIG. 50 is a perspective view of a cartridge according to a modification of the fourth example.

Figure 51:
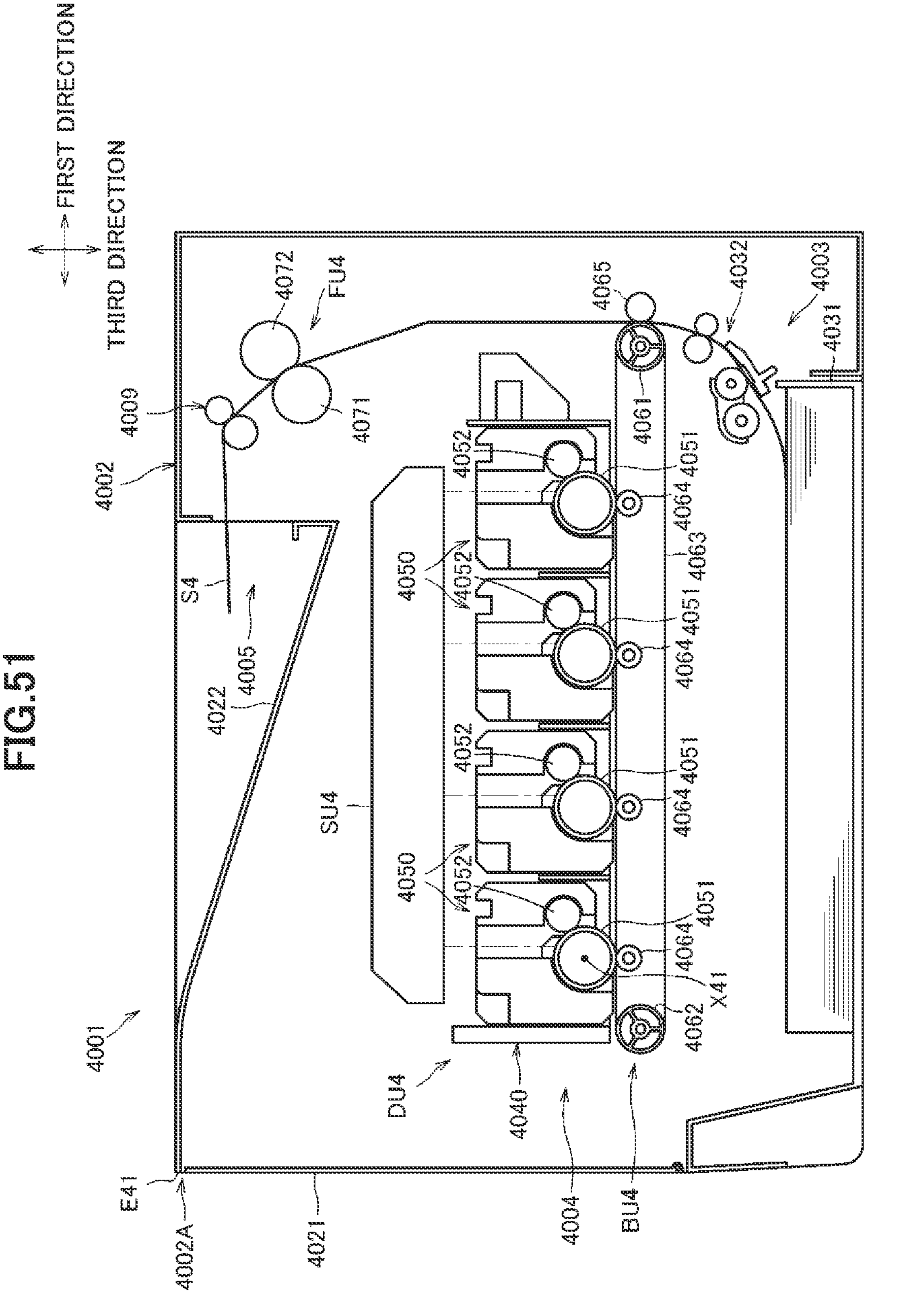

FIG. 51 is a cross-sectional view of an image forming apparatus according to a fifth example.

Figure 52:
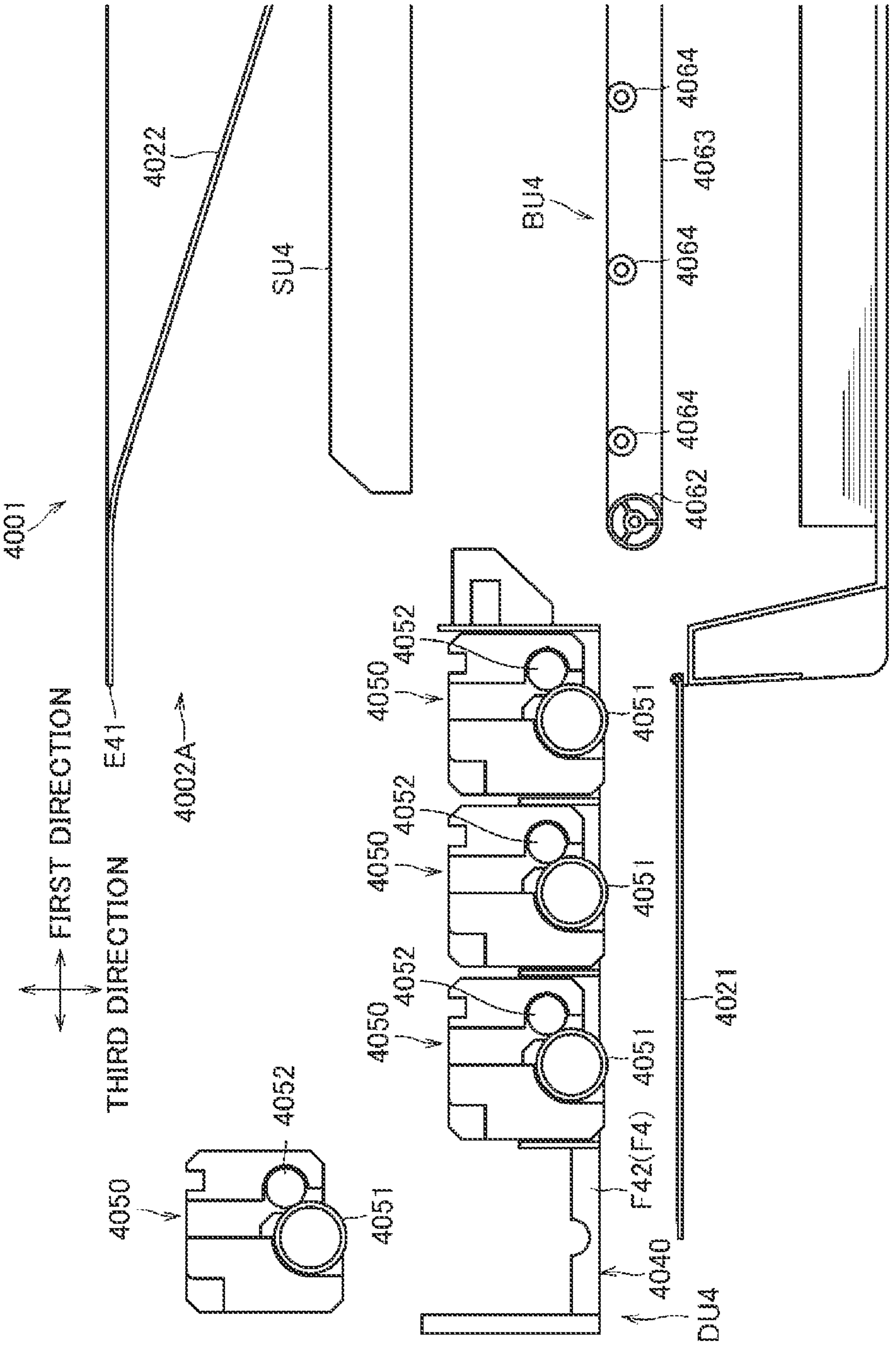

FIG. 52 is a cross-sectional view showing a drawer pulled out of a main housing.

Figure 53A:
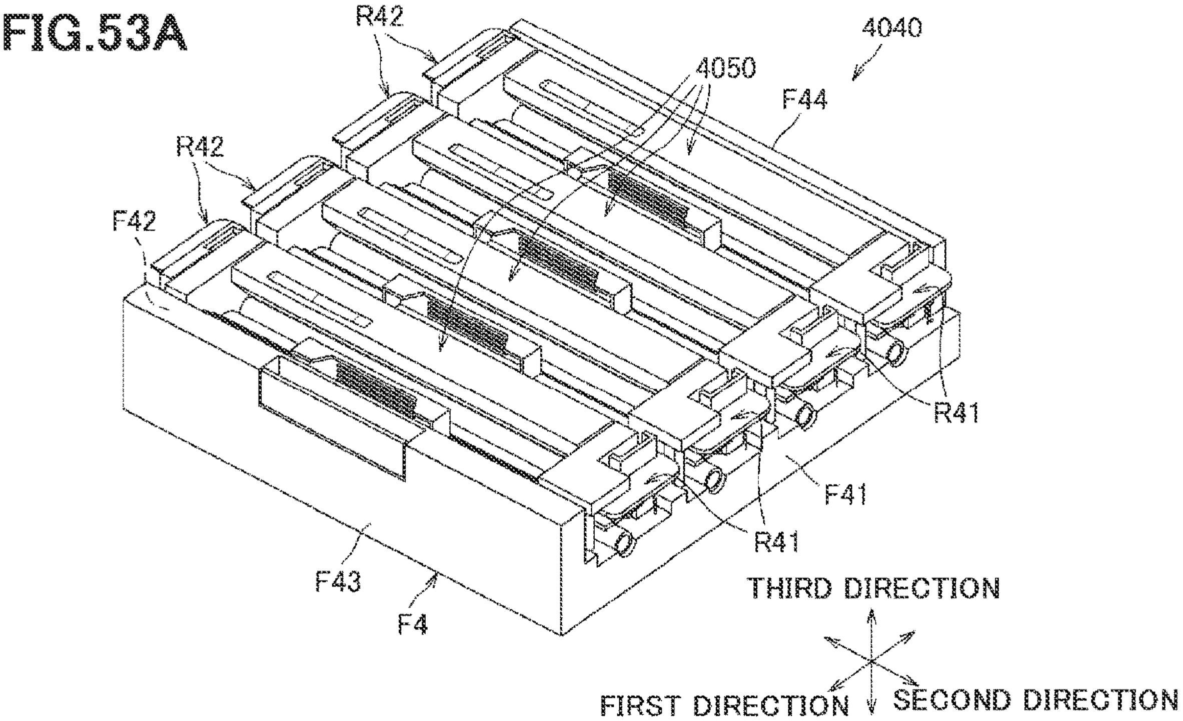
Figure 53B:
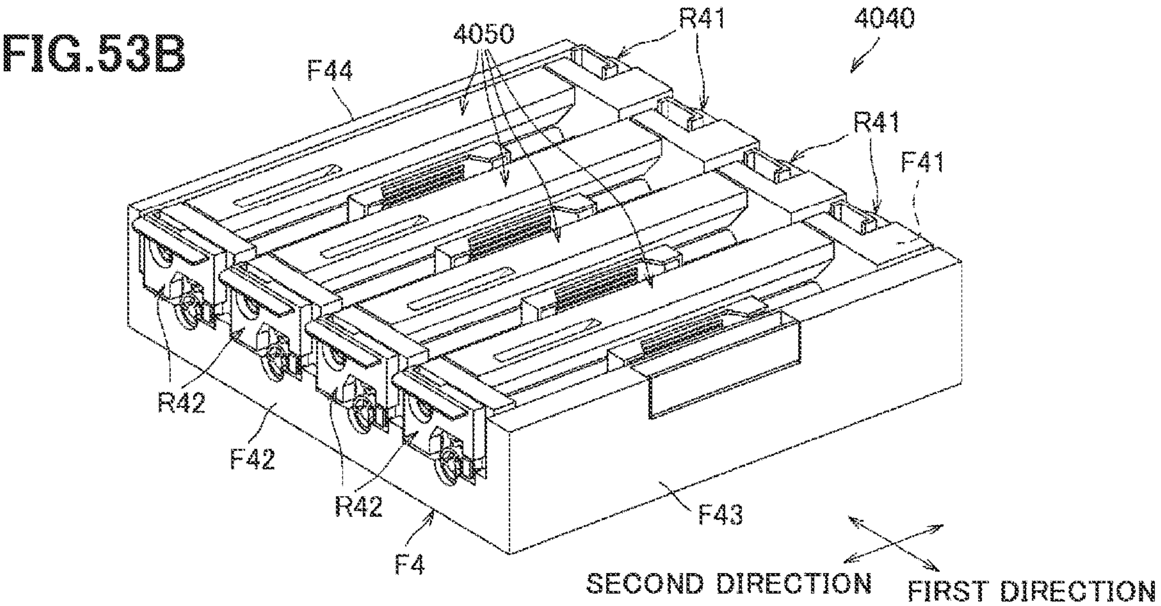

FIGS. 53A and 53B are perspective views of the drawer with lock levers in lock positions.

Figure 54A:
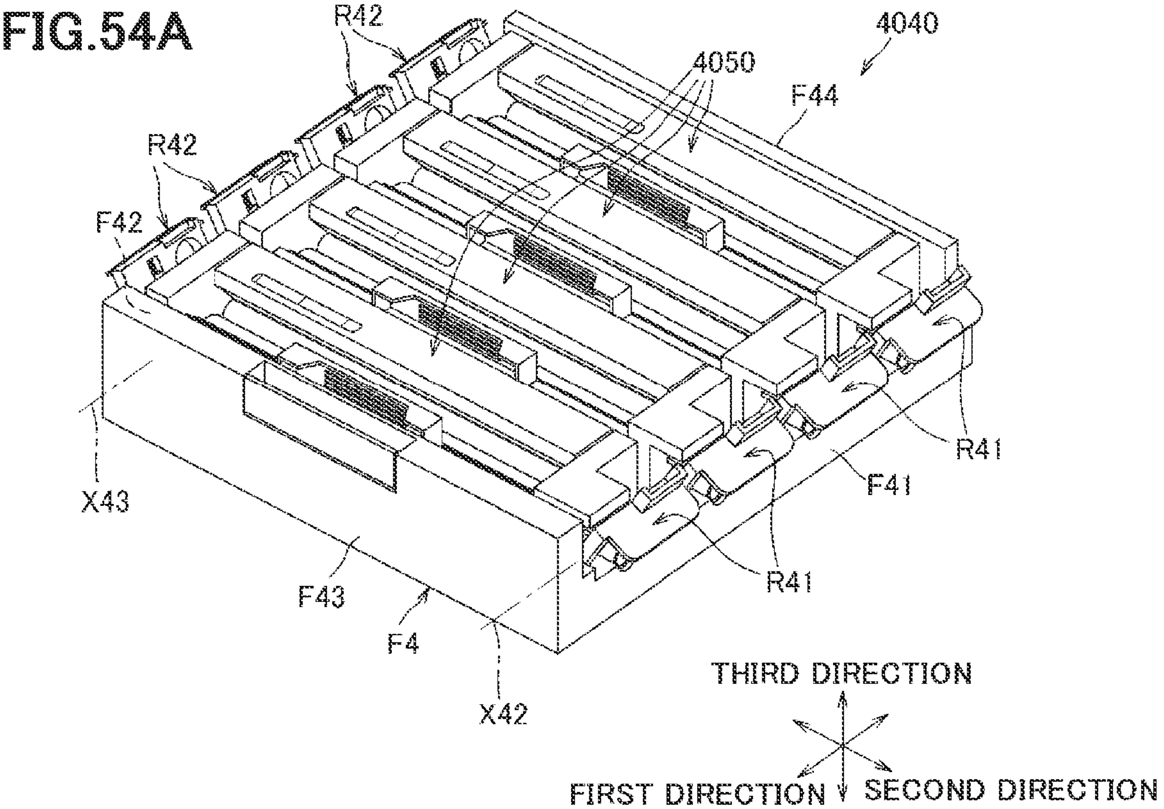
Figure 54B:
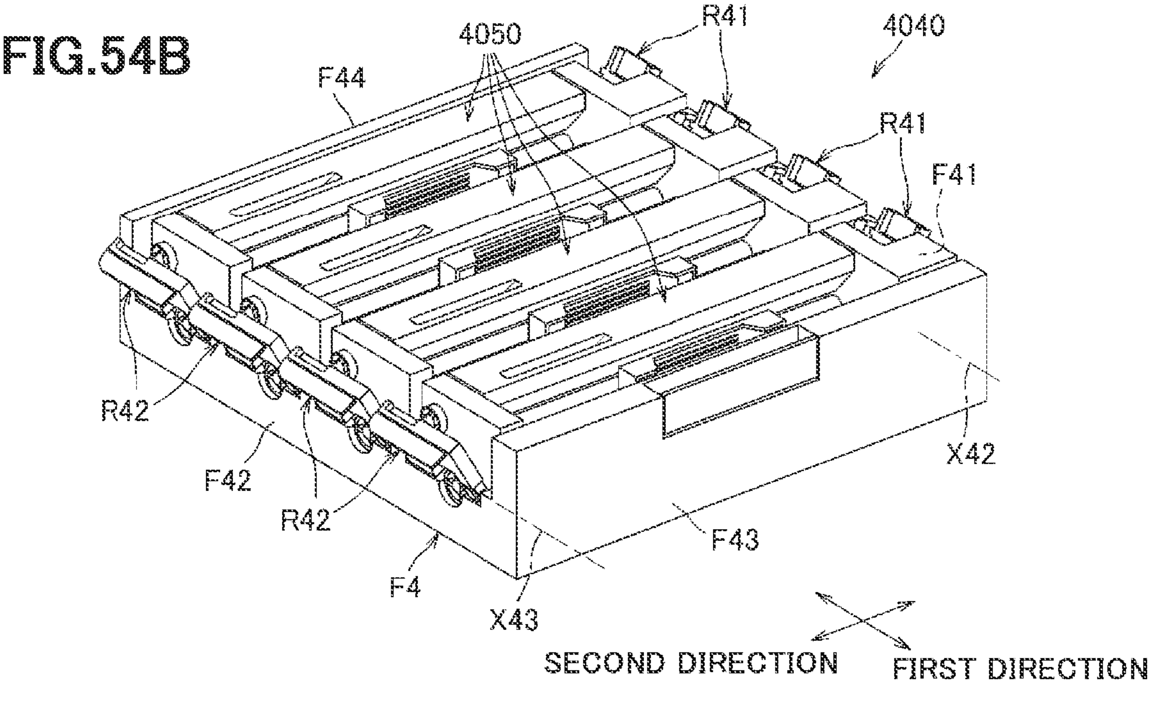

FIGS. 54A and 54B are perspective views of the drawer with lock levers in unlock positions.

Figure 55A:
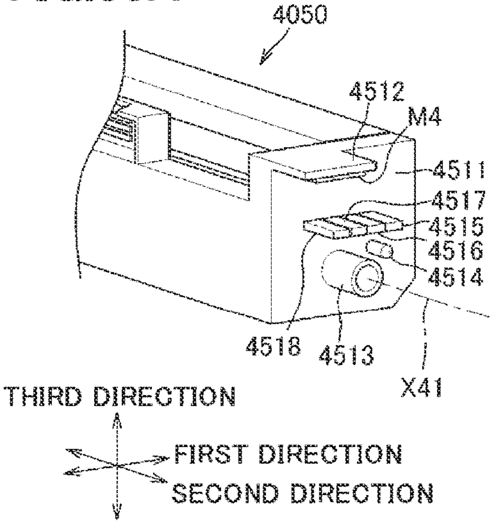

FIG. 55A is a perspective view showing one end of a cartridge facing in a direction parallel to the second direction.

Figure 55B:
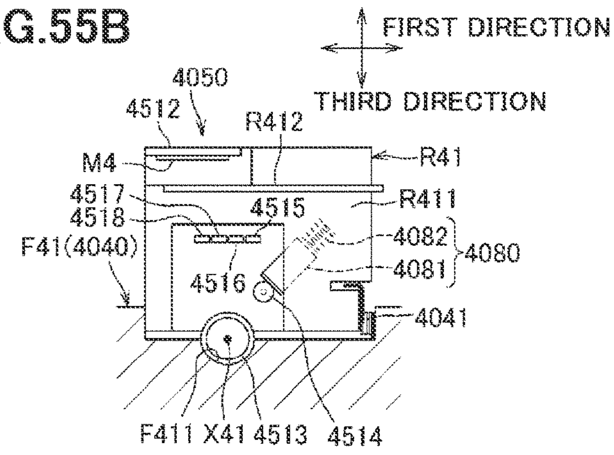

FIG. 55B is a side view showing structures of one side of the drawer facing in a direction parallel to the second direction and the one end of the cartridge installed in the drawer.

Figure 55C:
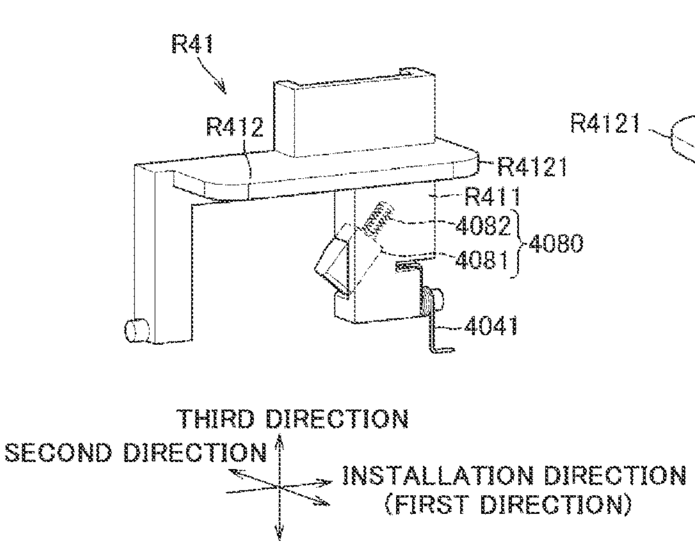
Figure 55D:
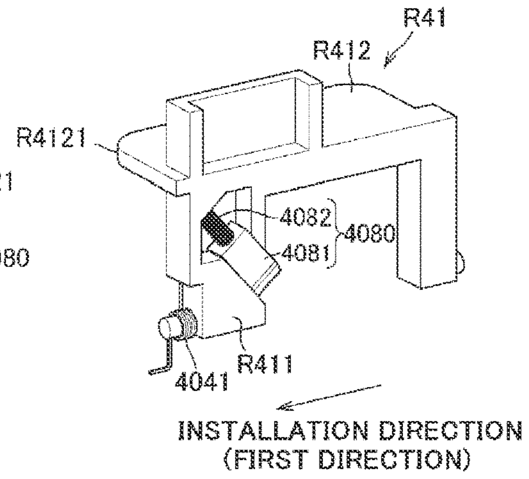

FIGS. 55C and 55D are perspective views of a first lock lever.

Figure 56A:
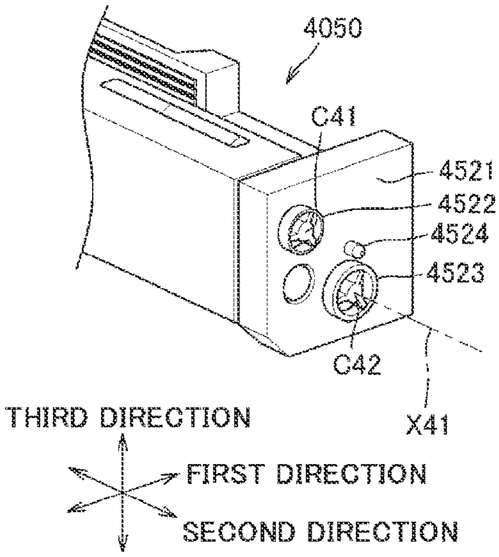

FIG. 56A is a perspective view showing the other end of the cartridge facing in a direction parallel to the second direction.

Figure 56B:
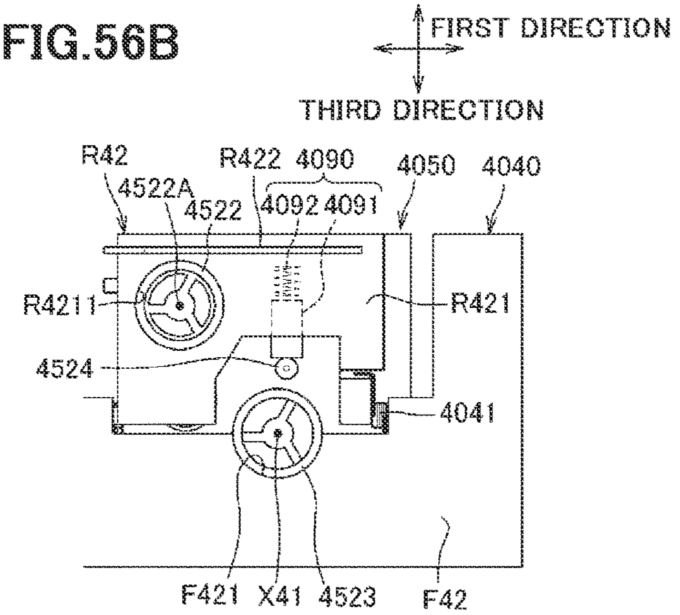

FIG. 56B is a side view showing structures of the other side of the drawer facing in a direction parallel to the second direction and the other end of the cartridge installed in the drawer.

Figure 56C:
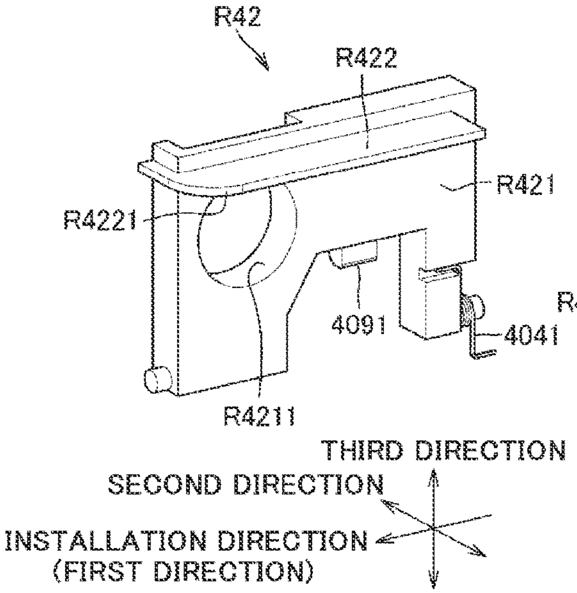
Figure 56D:
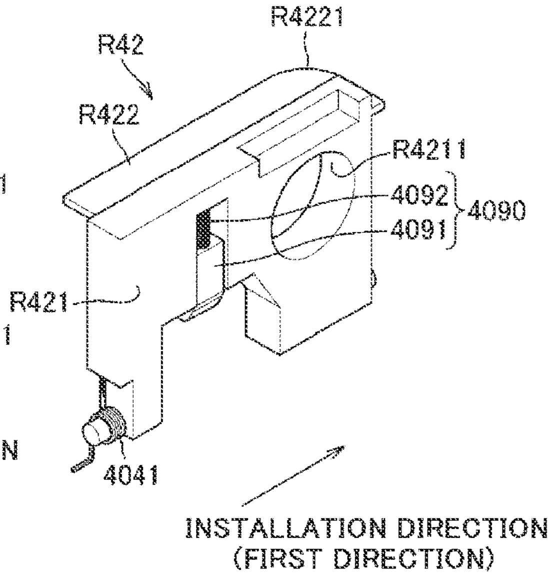

FIGS. 56C and 56D are perspective views of a second lock lever.

Figure 57A:
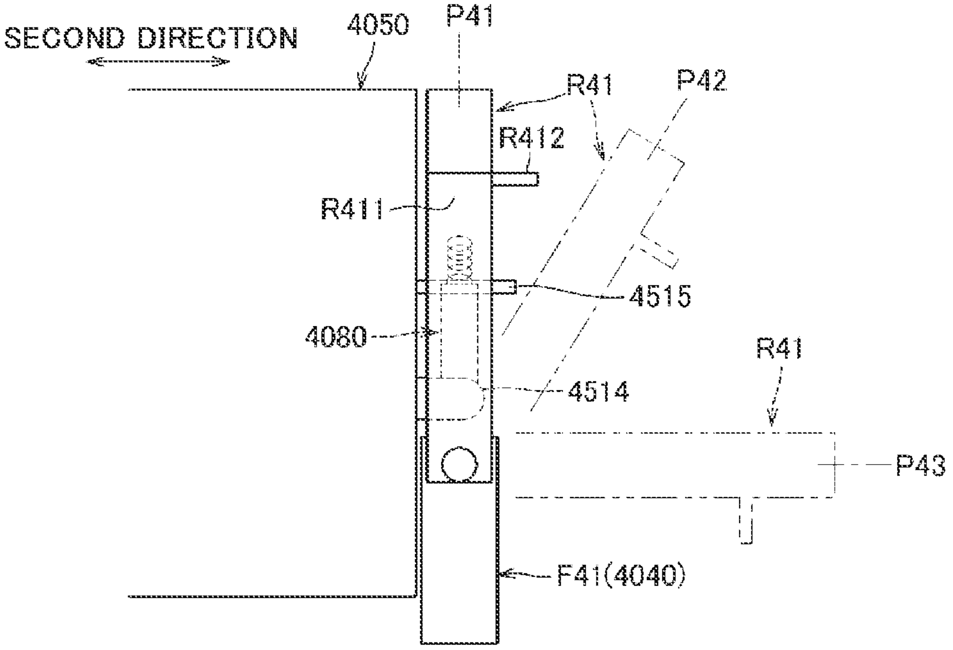

FIG. 57A is an illustration showing a lock position, an unlock position, and a release position of the first lock lever.

Figure 57B:
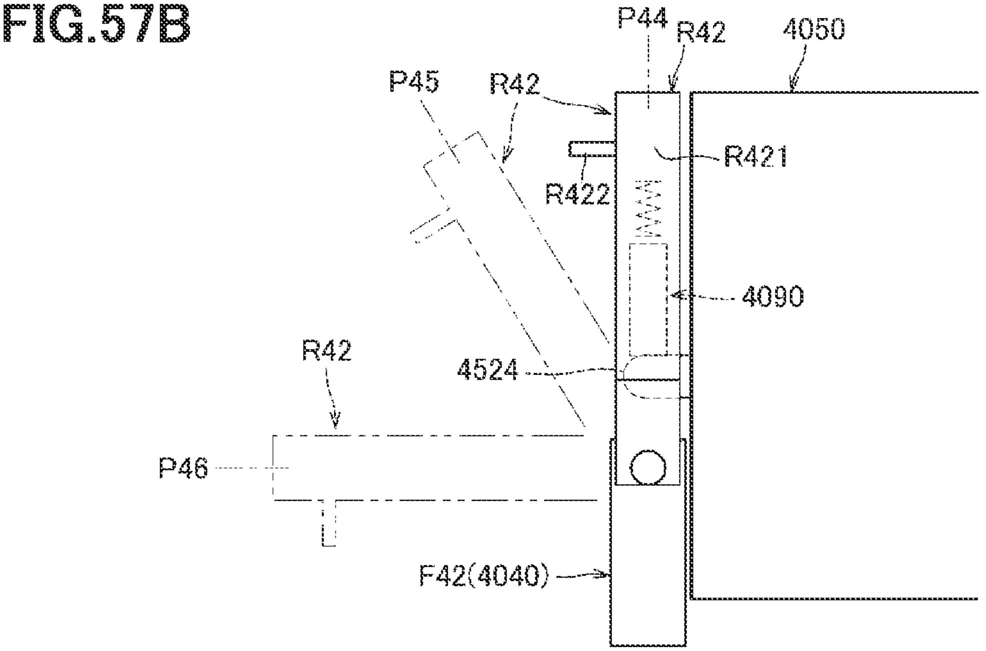

FIG. 57B is an illustration showing a lock position, an unlock position, and a release position of the second lock lever.

Figure 58:
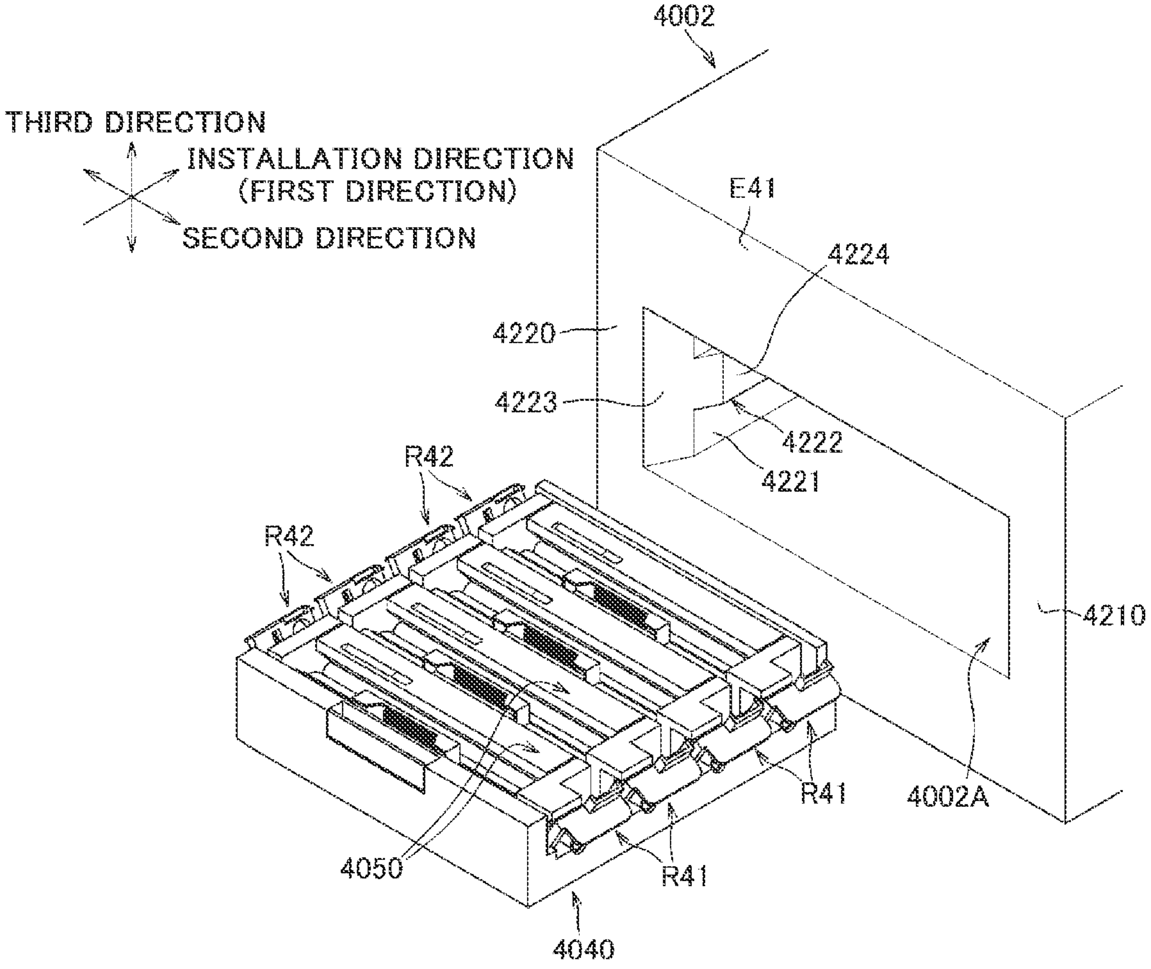

FIG. 58 is a perspective view showing the drawer pulled out of the main housing.

Figure 59:
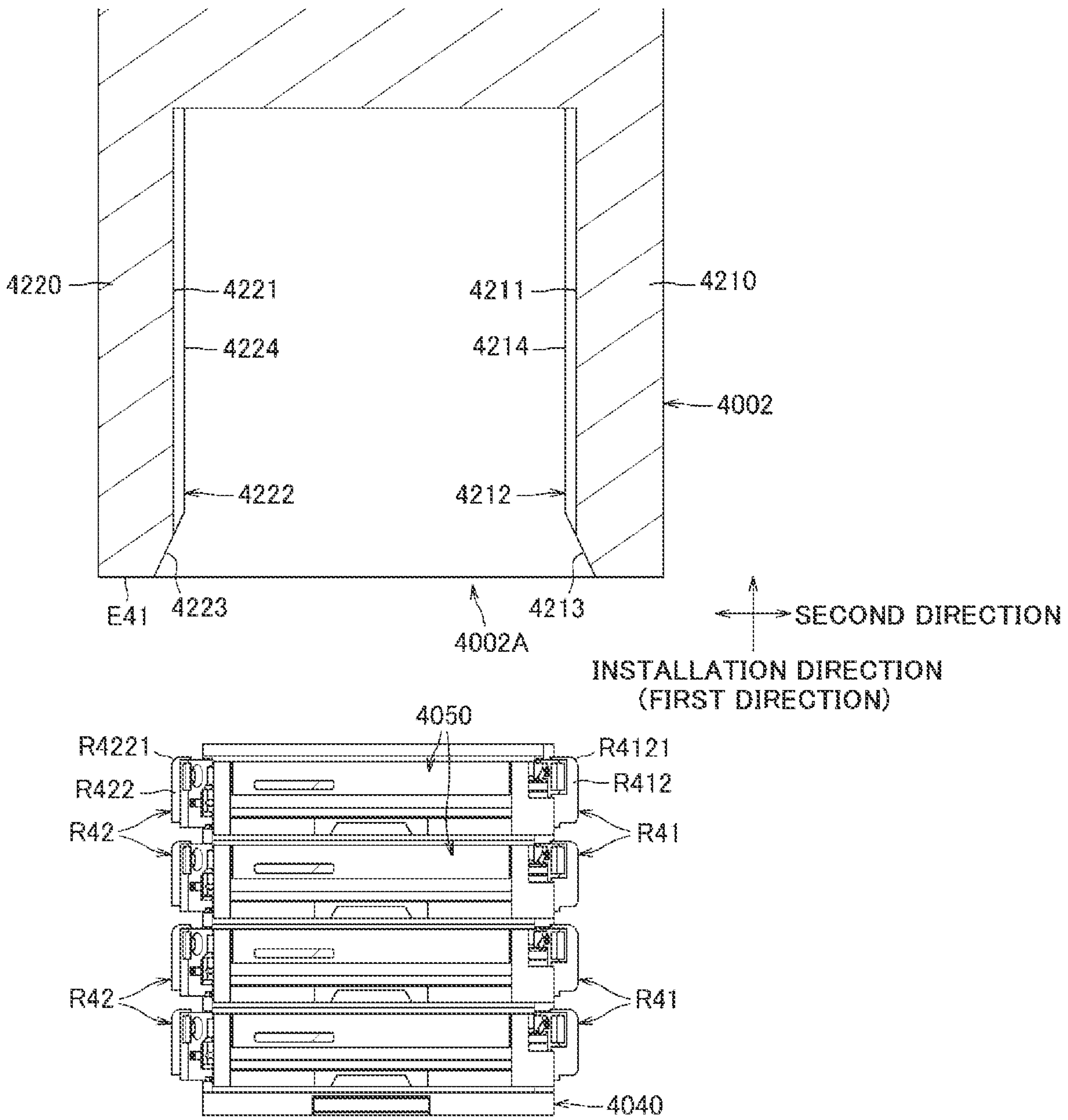

FIG. 59 is an illustration showing the relationship between the lock levers and the main housing.

Figures 60A, 60B, 60C:
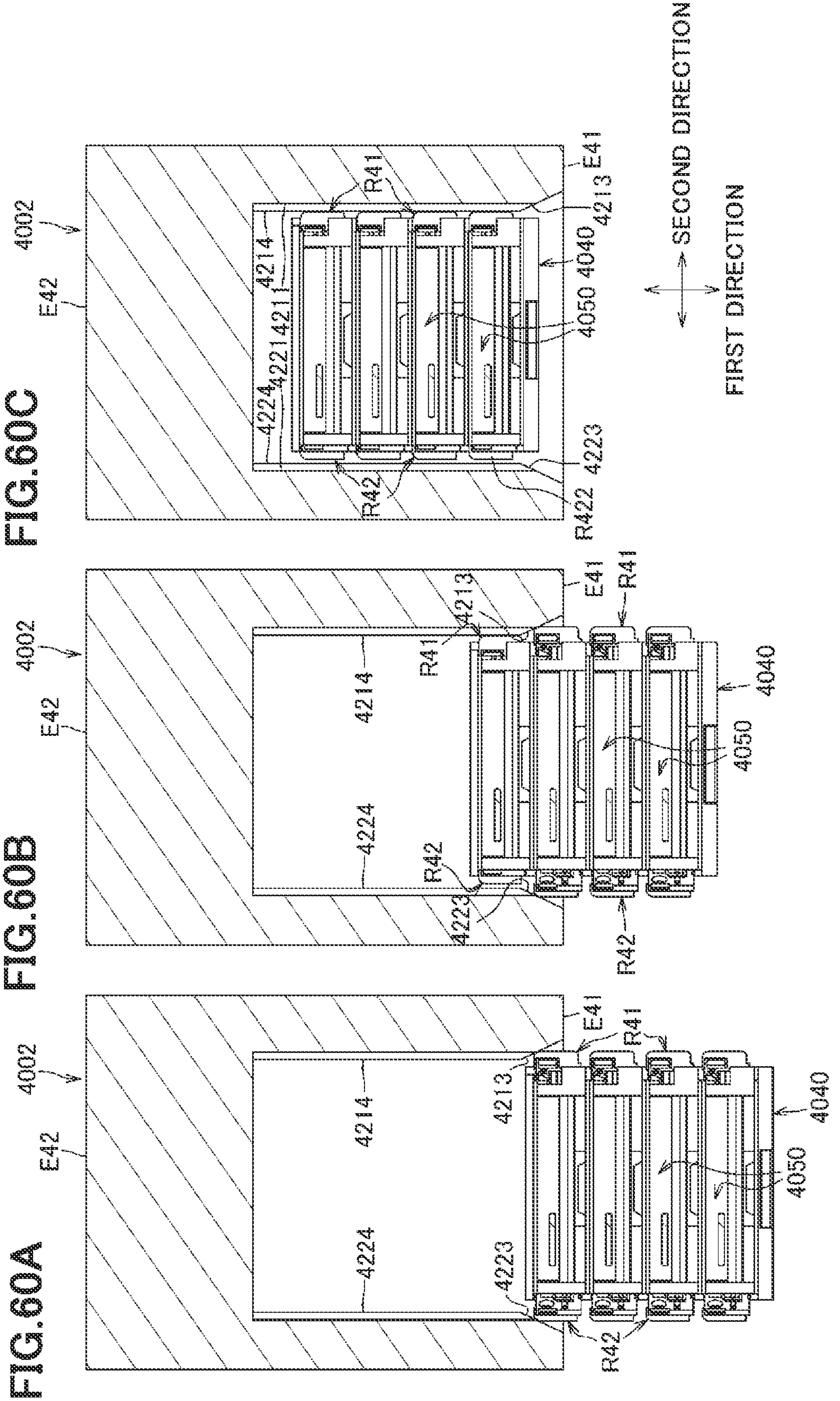

FIGS. 60A, 60B and 60C are illustrations showing interaction of parts of the main housing and the lock members when the drawer is being installed into the main housing.

Figure 61:
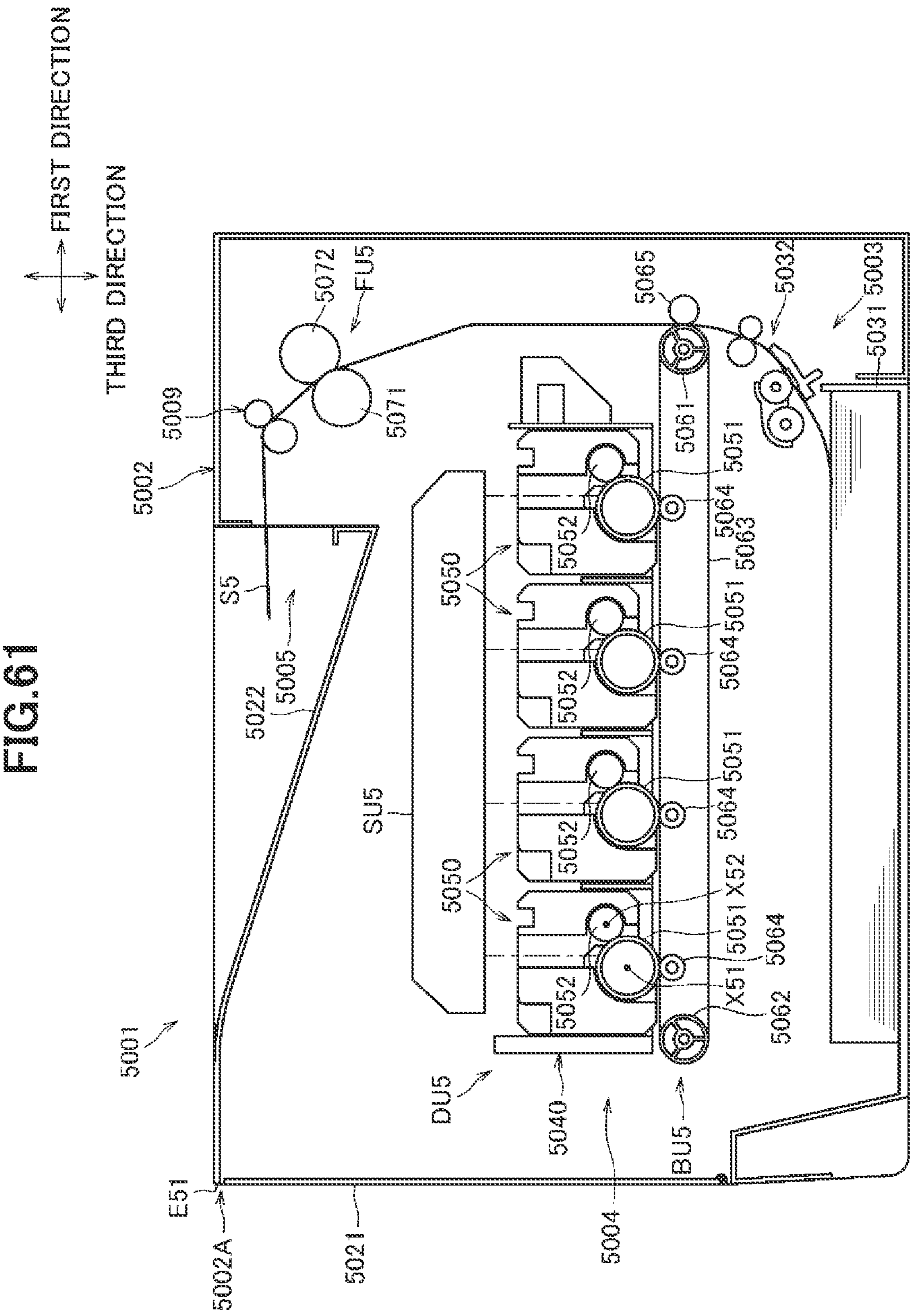

FIG. 61 is a schematic cross-sectional view of an image forming apparatus according to a sixth example.

Figure 62:
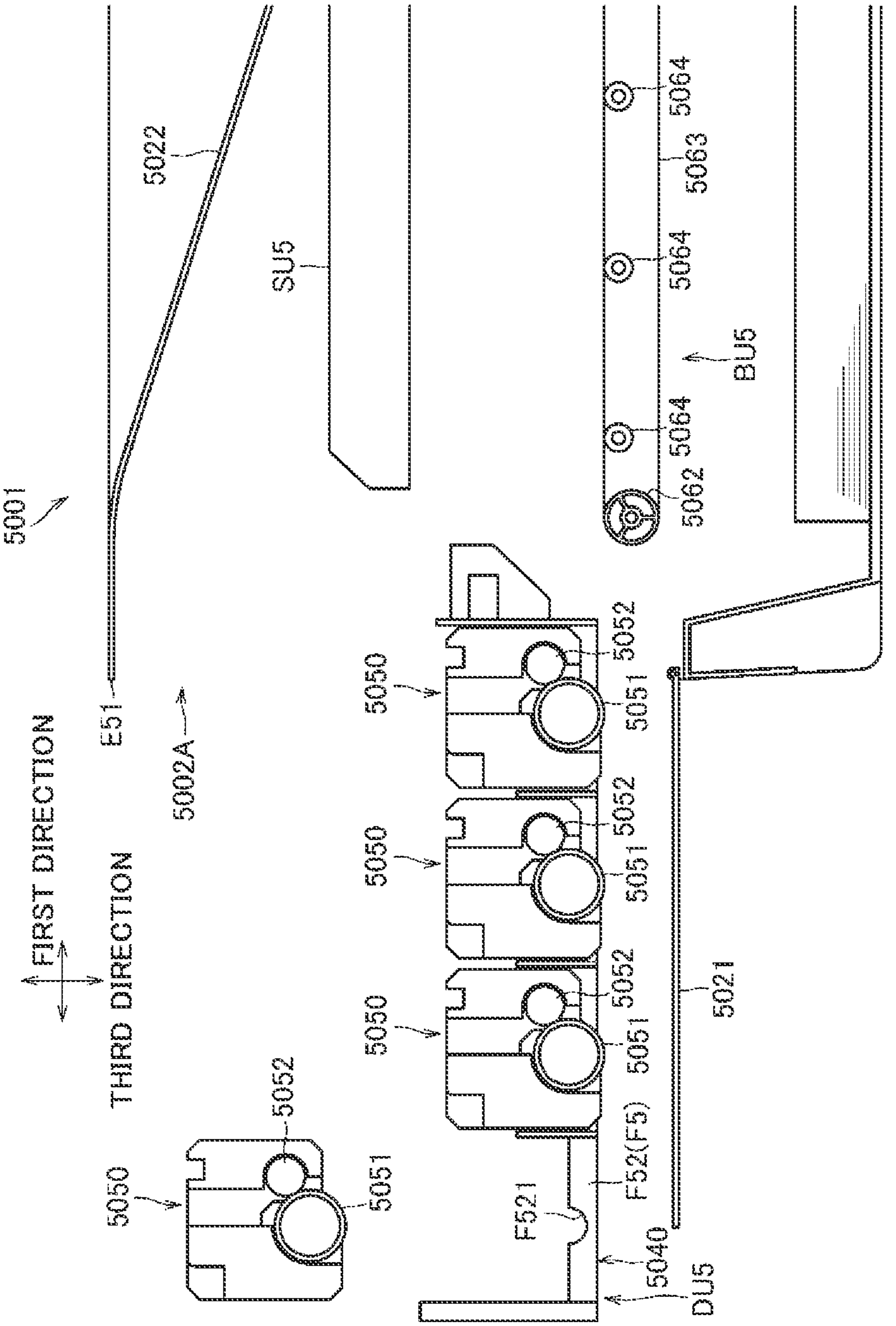

FIG. 62 is a cross-sectional view showing a drawer pulled out of a main housing.

Figure 63:
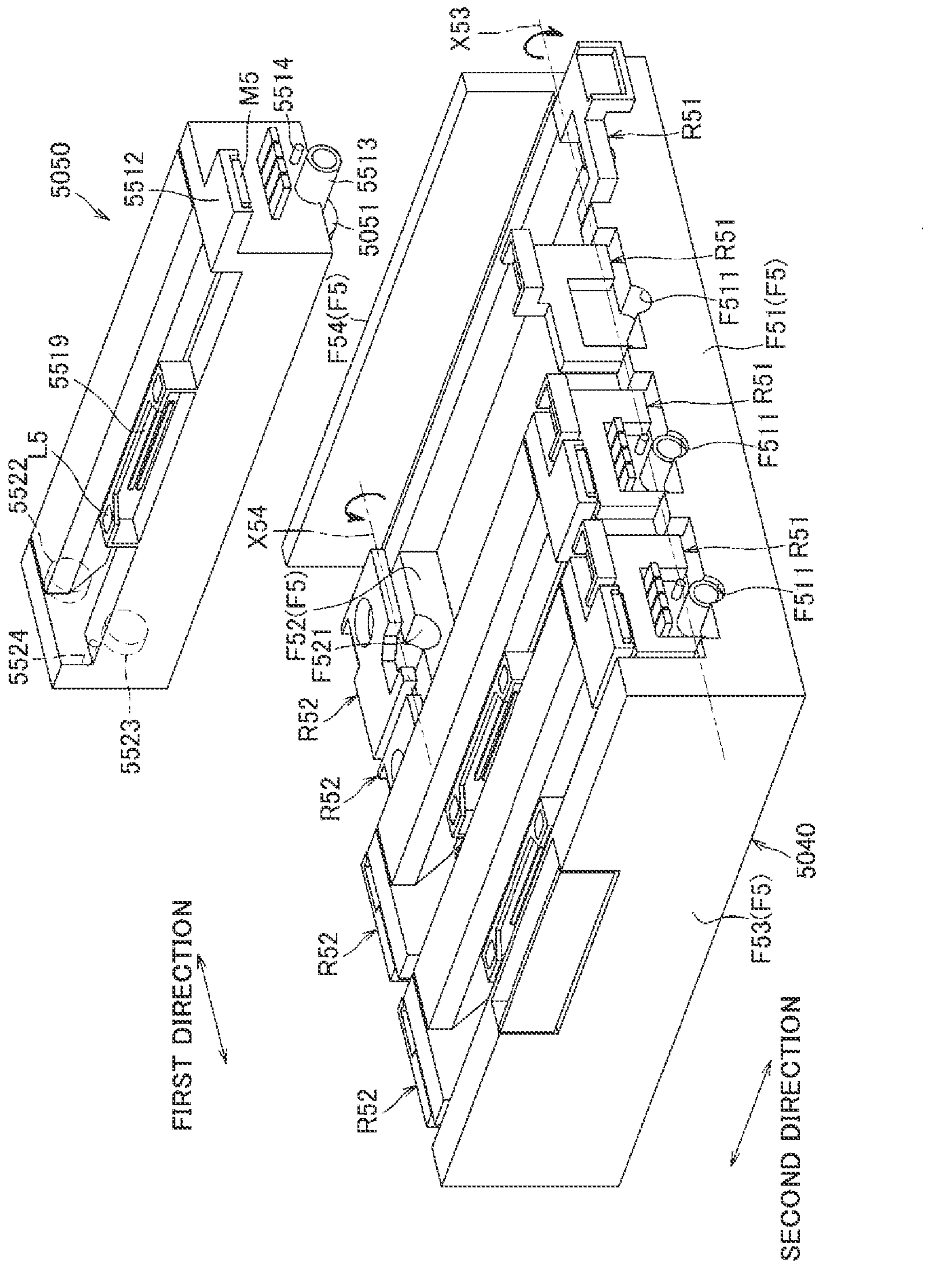

FIG. 63 is a perspective view of the drawer with some cartridges removed.

Figure 64A:
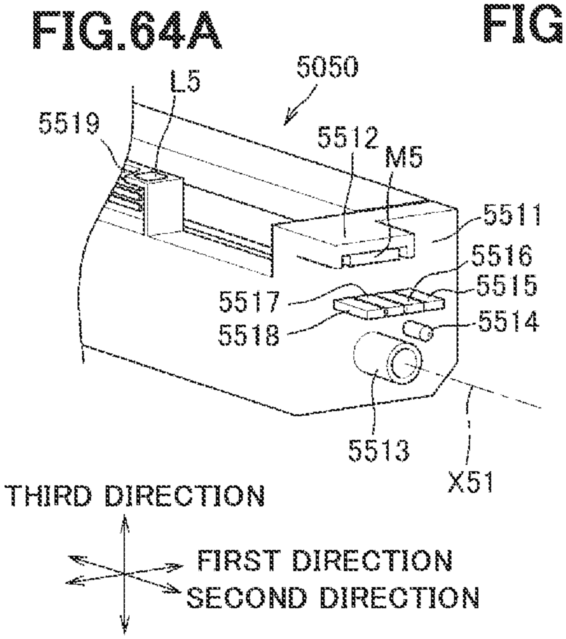

FIG. 64A is a perspective view showing one end of the cartridge facing in a direction parallel to the second direction.

Figure 64B:
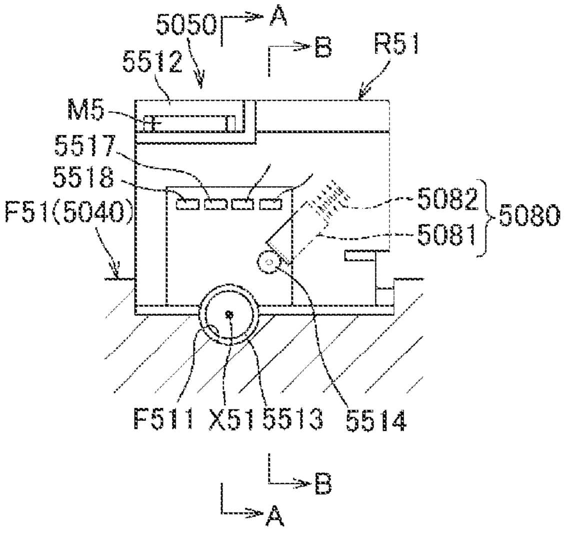

FIG. 64B is a side view showing structures of one side of the drawer facing in a direction parallel to the second direction and the one end of the cartridge installed in the drawer.

Figure 64C:
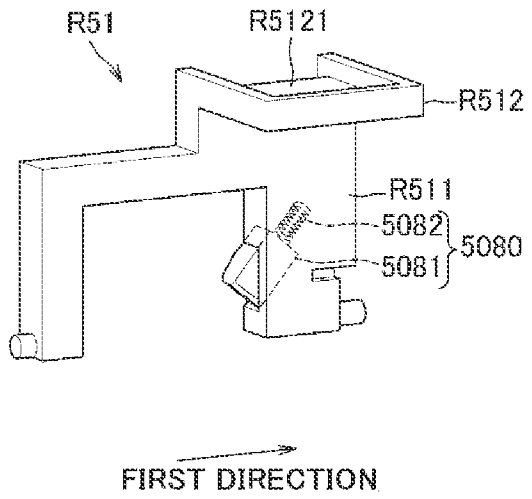
Figure 64D:
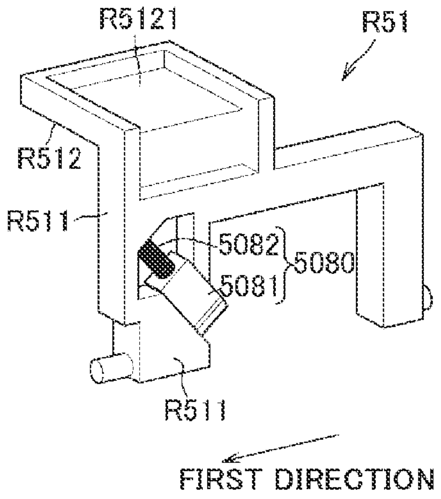

FIGS. 64C and 64D are perspective views of a first lock lever.

Figure 65A:
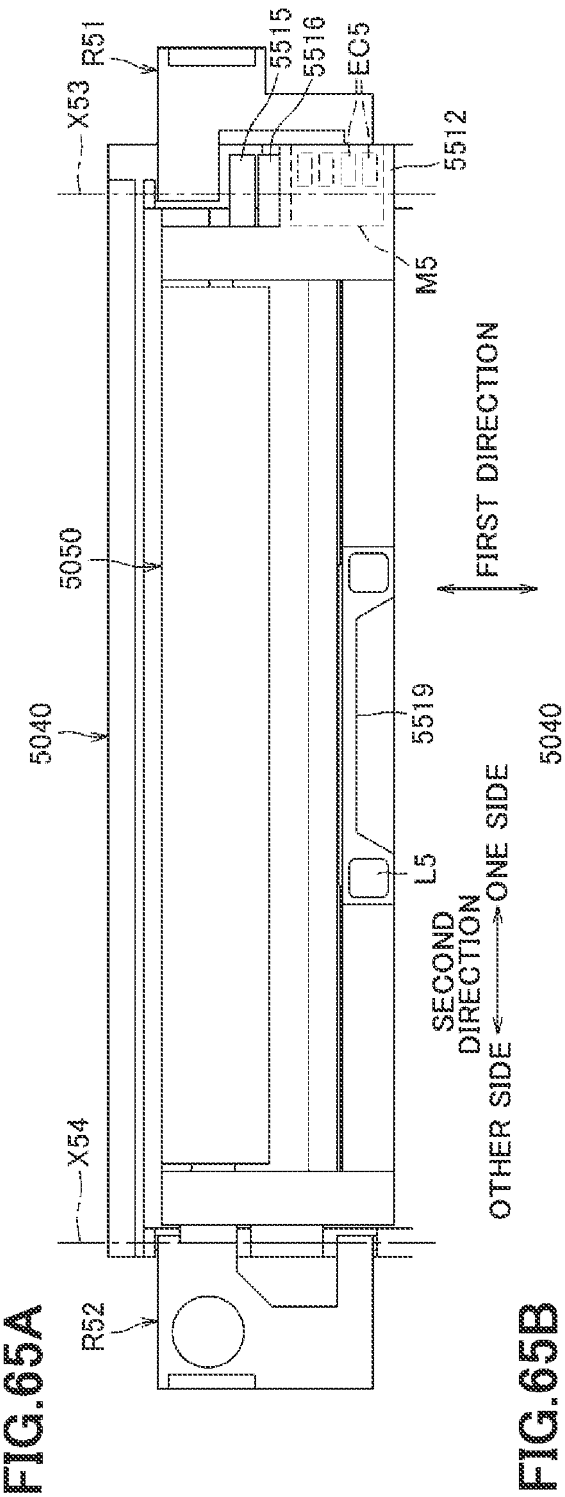

FIG. 65A is a top view of the drawer showing lock levers in unlock positions.

Figure 65B:
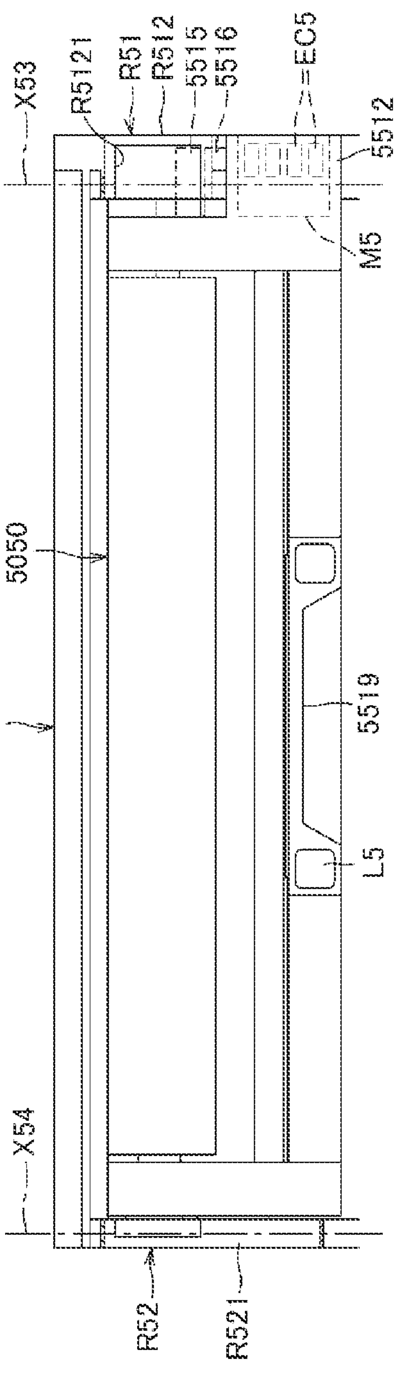

FIG. 65B is a top view of the drawer showing the lock levers in lock positions.

Figure 66:
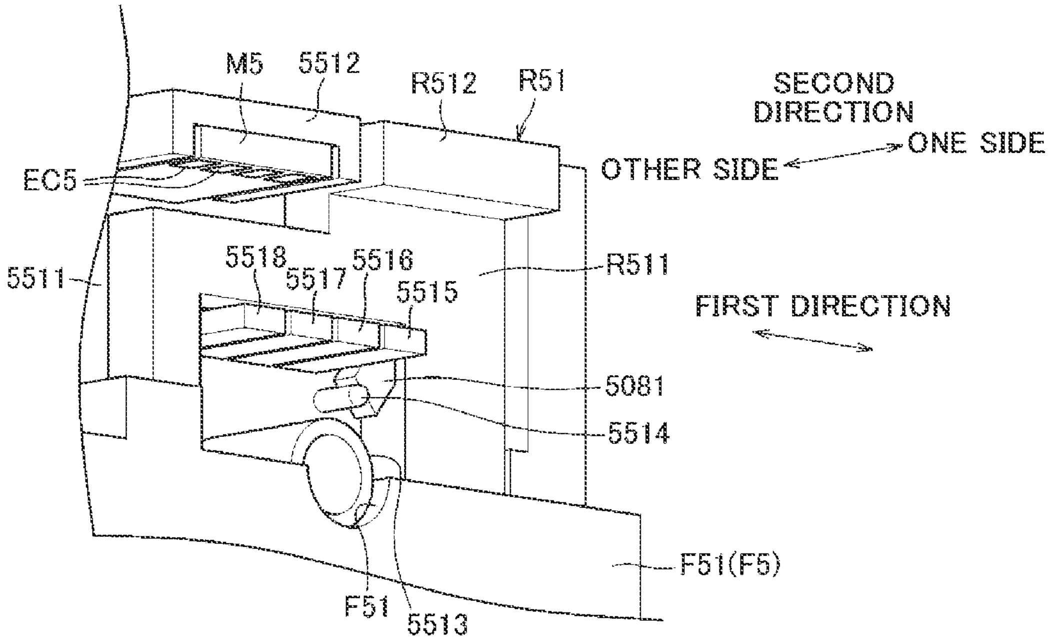

FIG. 66 is a perspective view of one side, of the cartridge installed in the drawer, facing in a direction parallel to the second direction, as viewed from below.

Figure 67A:
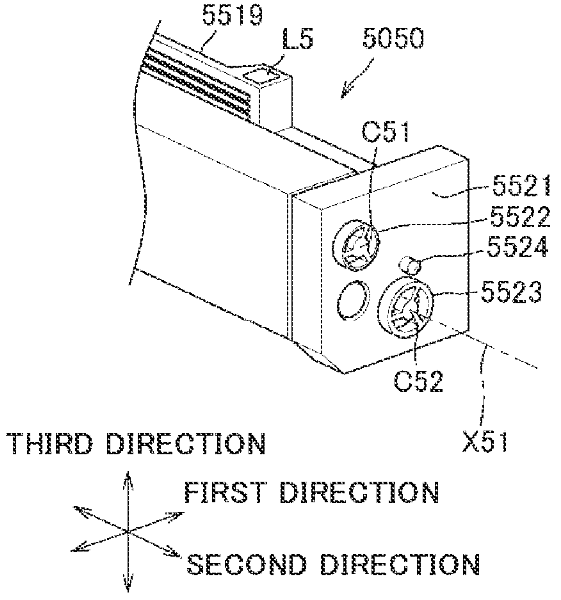

FIG. 67A is a perspective view of the other end of the cartridge facing away from the end shown in FIG. 64A.

Figure 67B:
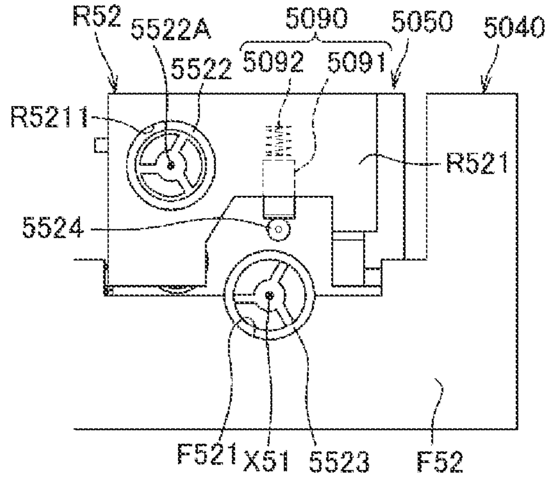

FIG. 67B is a side view showing structures of the other side of the drawer facing away from the end shown in FIG. 64B and the other end of the cartridge installed in the drawer.

Figure 67C:
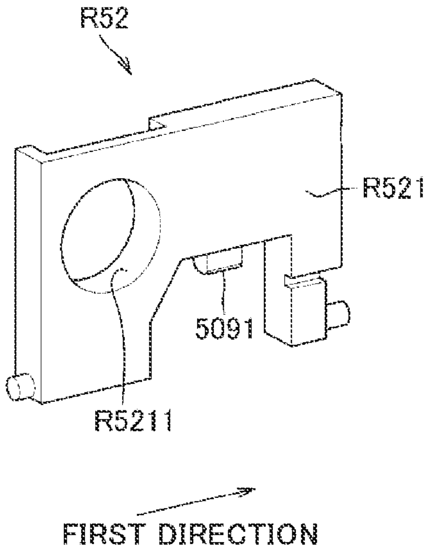
Figure 67D:
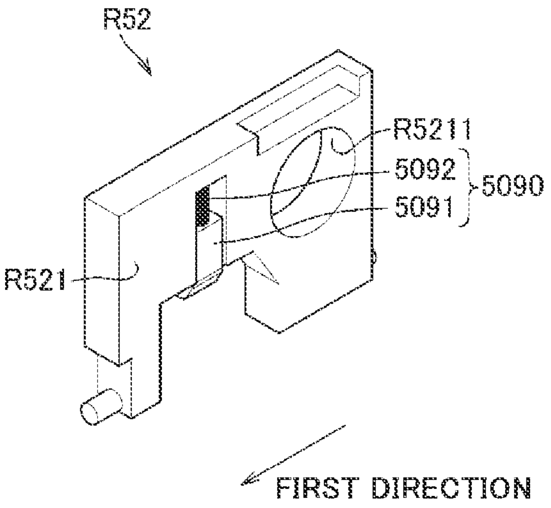

FIGS. 67C and 67D are perspective views of the second lock lever.

Figure 68:
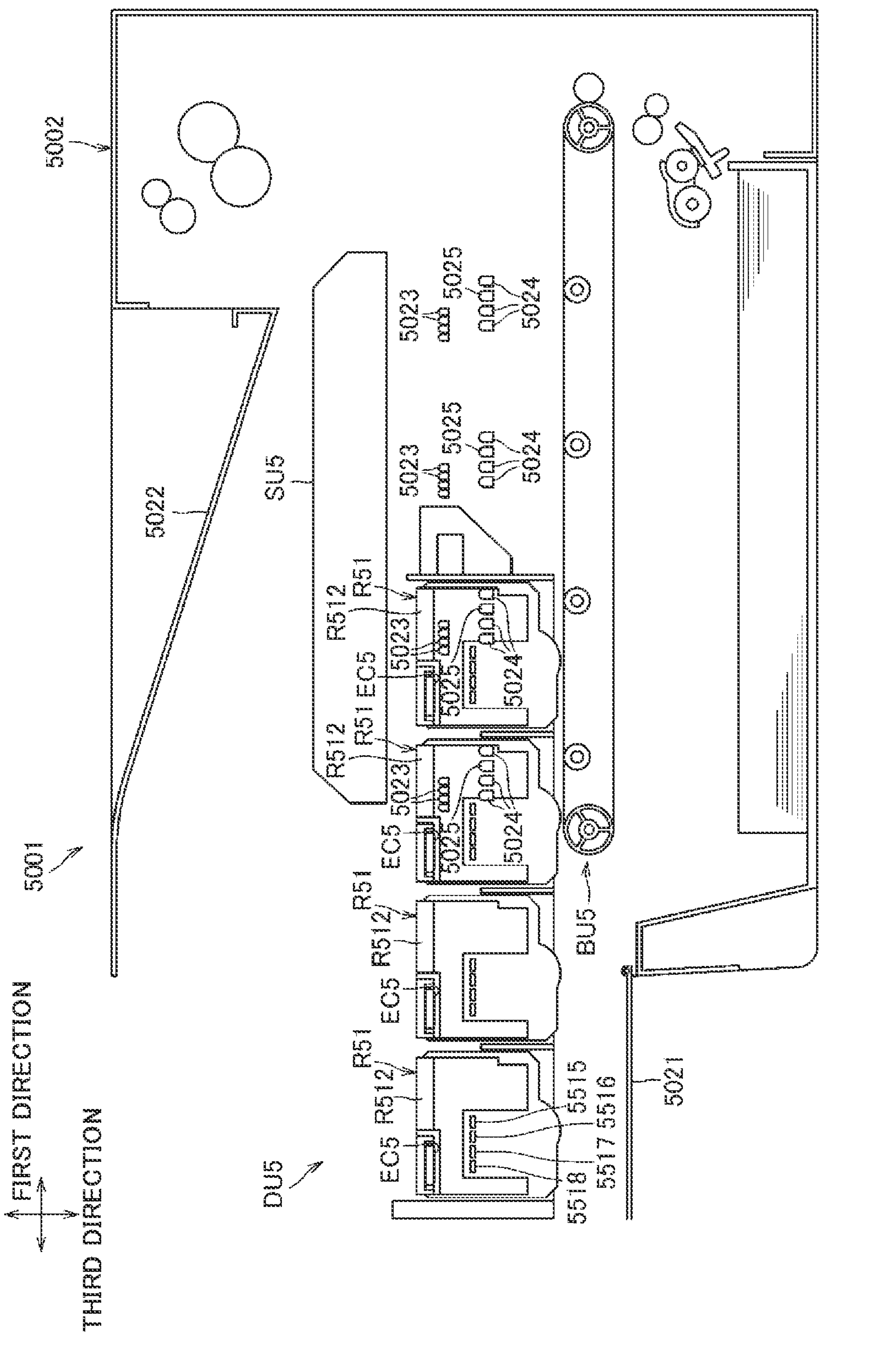

FIG. 68 is an illustration showing the drawer being moved from a position outside the main housing to a position inside the main housing for explaining the positional relationship between electrical contacts of the memories and the housing contacts.

Figure 69:
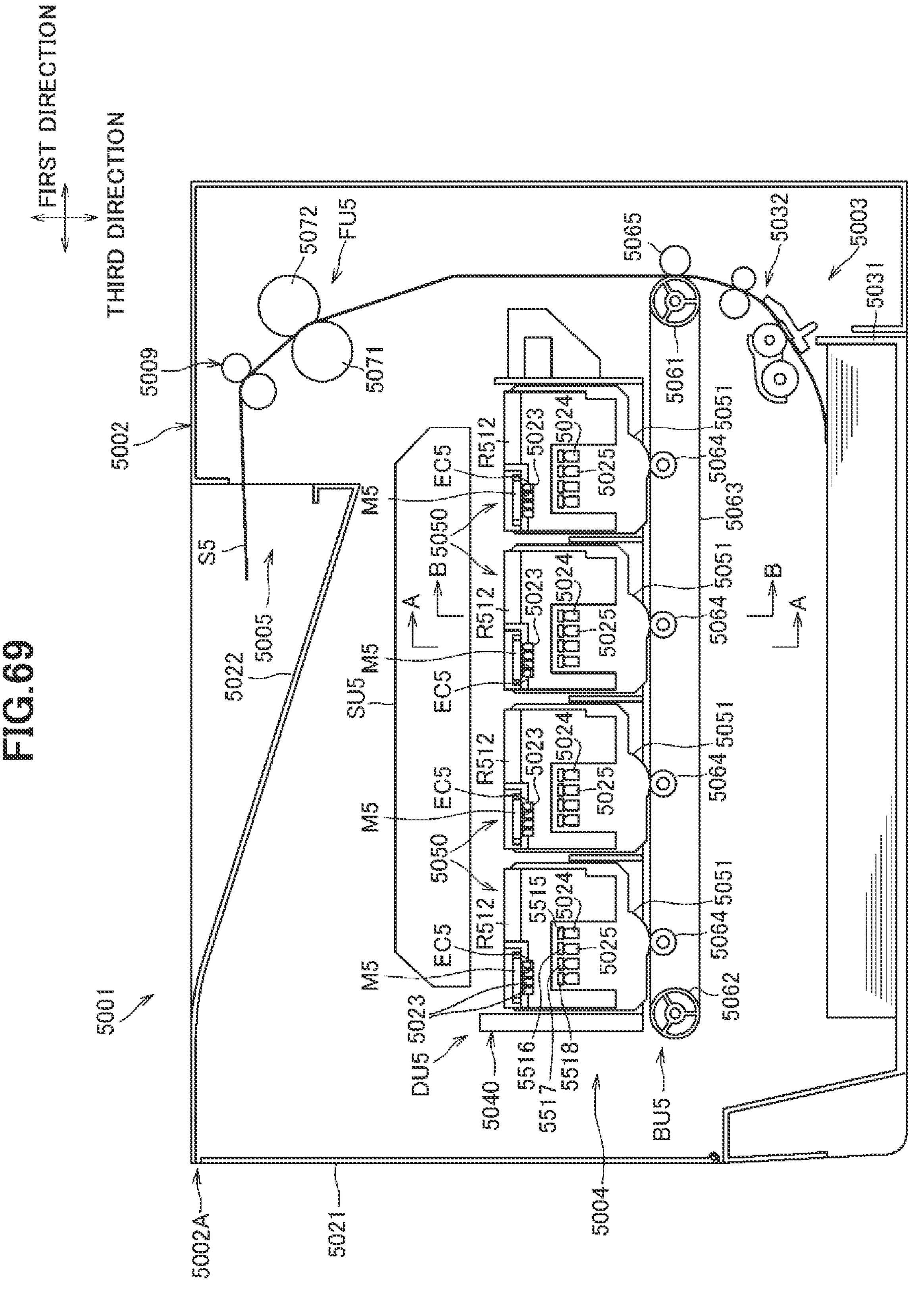

FIG. 69 is an illustration showing the drawer positioned inside the main housing for explaining the positional relationship between the electrical contacts of the memories and the housing contacts.

Figure 70A:
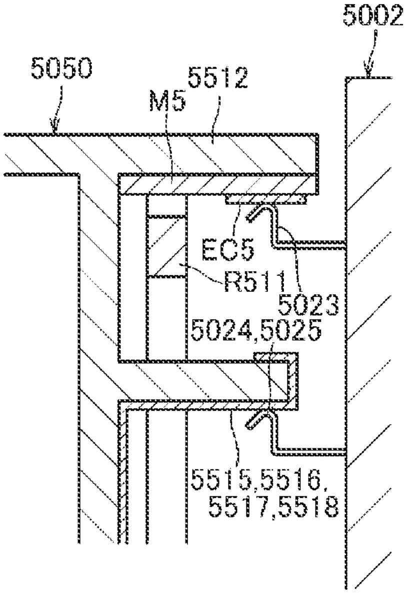

FIG. 70A is a cross-sectional view along line A-A of FIG. 69.

Figure 70B:
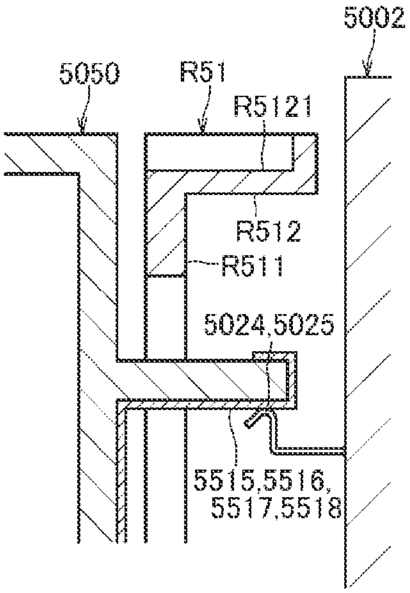

FIG. 70B is a cross-sectional view along line B-B of FIG. 69.

Figure 71:
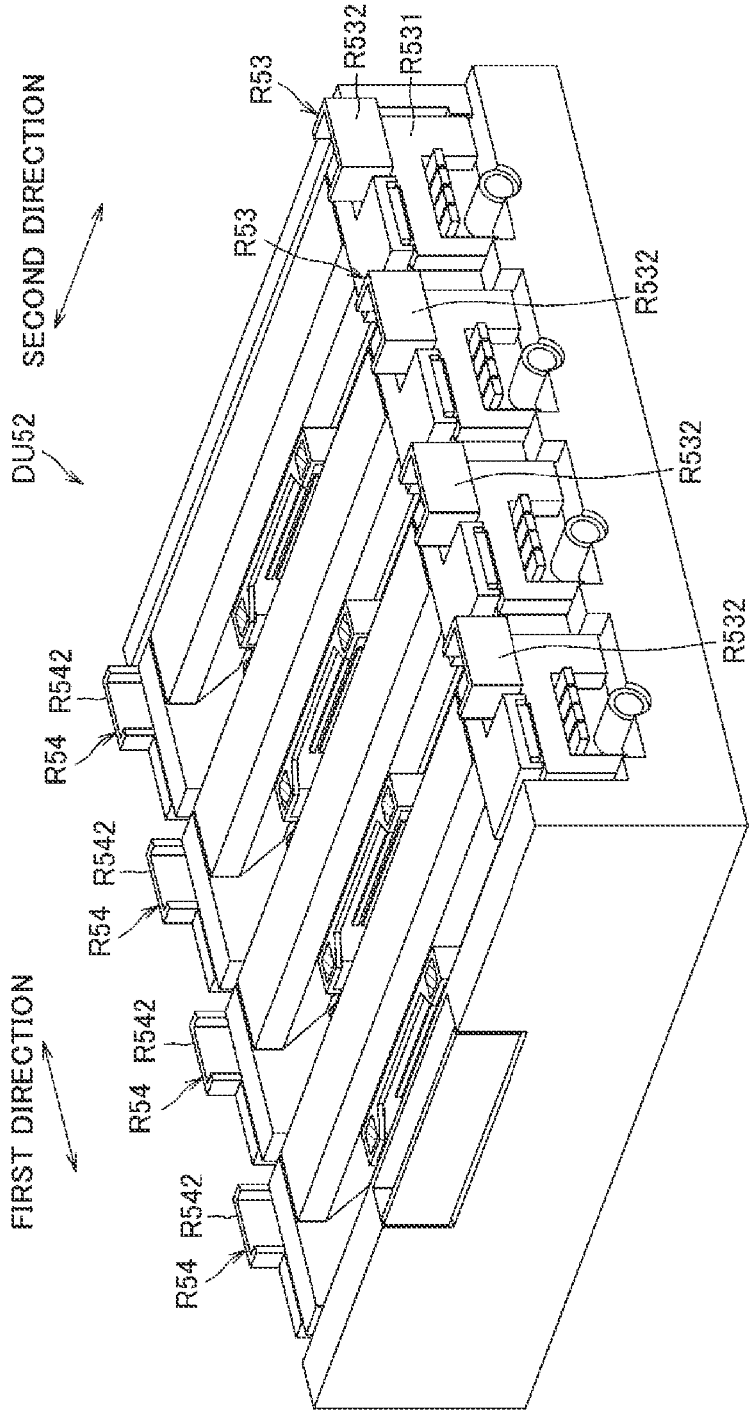

FIG. 71 is a perspective view of a drum unit according to a first modification of the sixth example.

Figure 72:
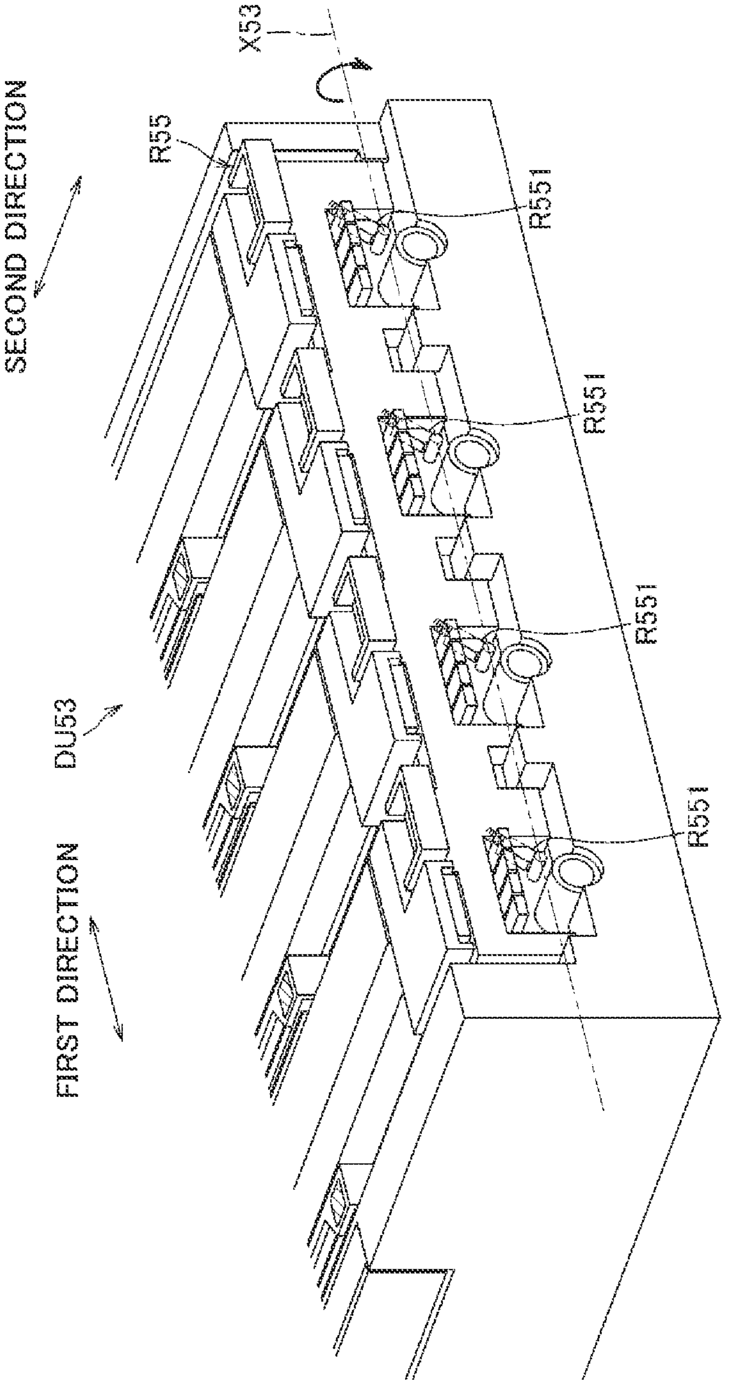

FIG. 72 is a perspective view of a drum unit according to a second modification of the sixth example.

Figure 73:
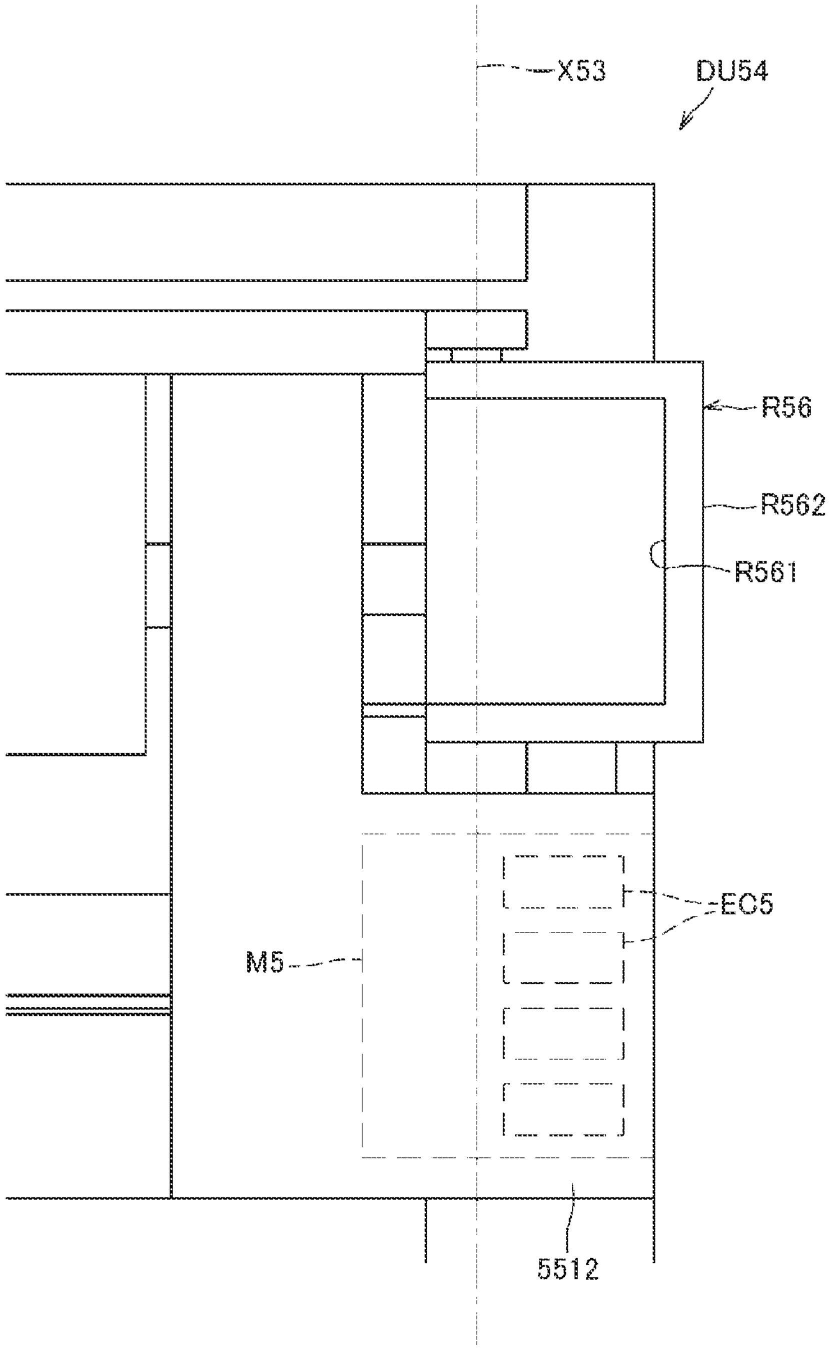

FIG. 73 is an illustration showing the relationship between a first lock lever and a cover covering a memory according to a third modification of the sixth example.

Figure 74:
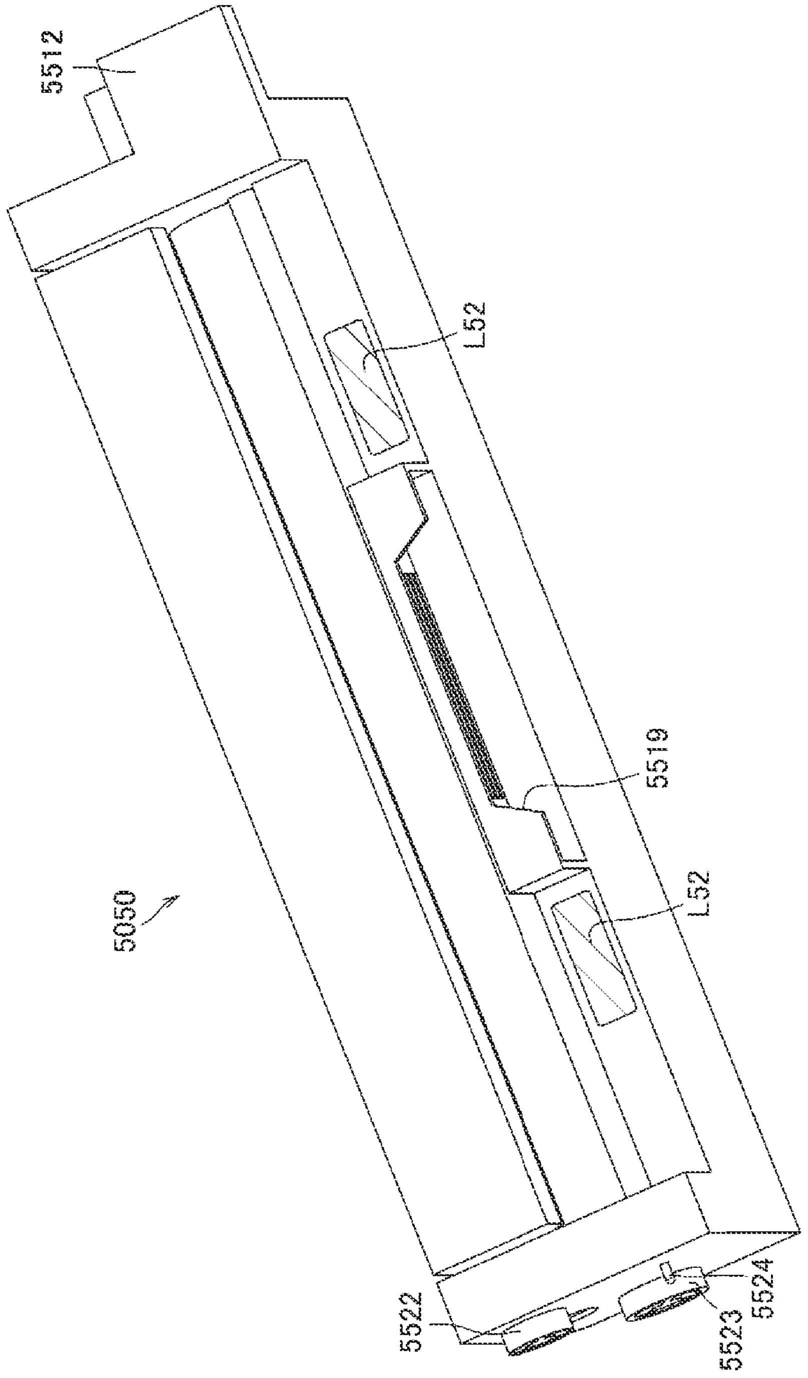

FIG. 74 is an illustration for explaining the positions of color identification labels of the cartridge according to another modification of the sixth example.

Figure 75:
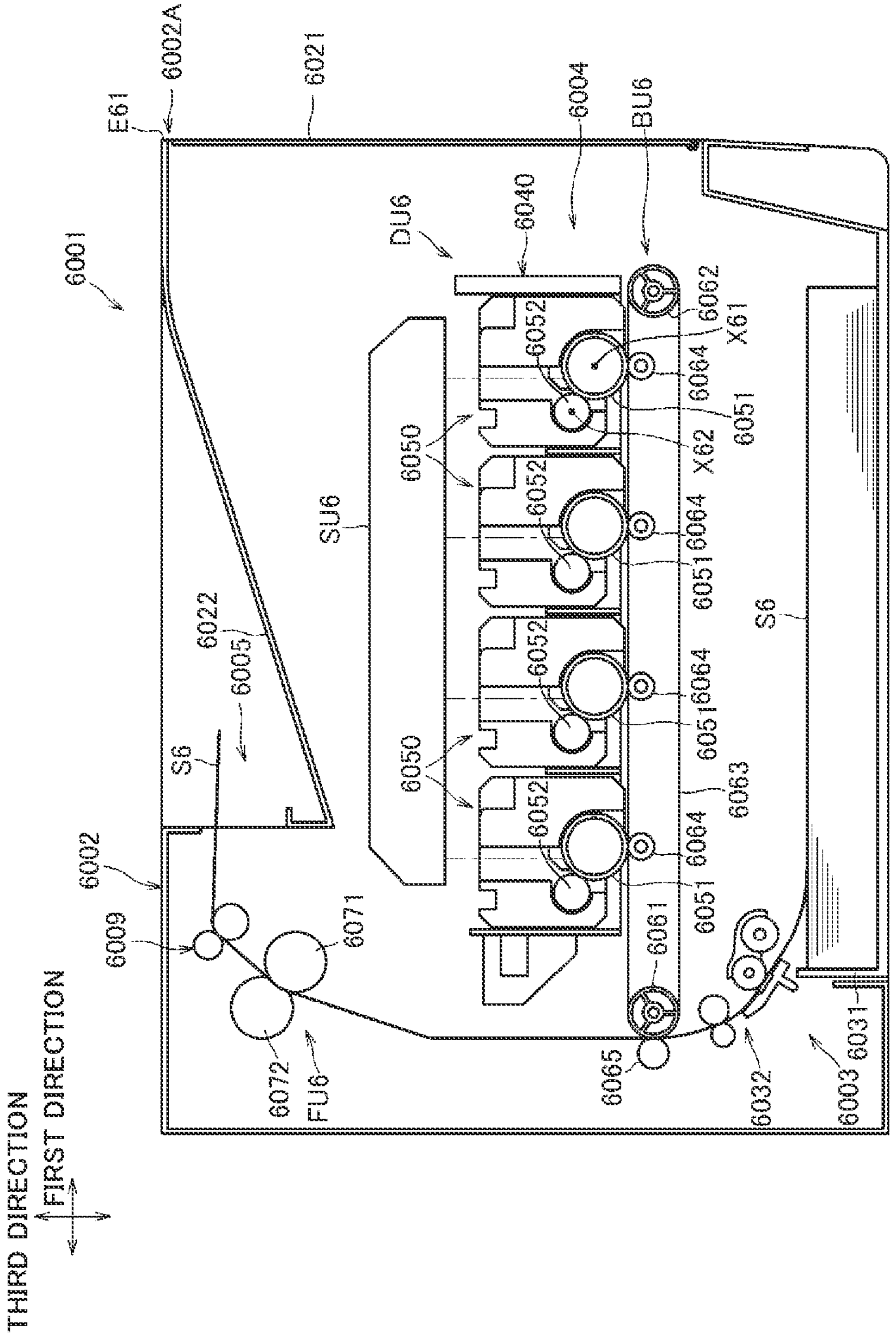

FIG. 75 is a schematic cross-sectional view of an image forming apparatus according to a seventh example.

Figure 76:
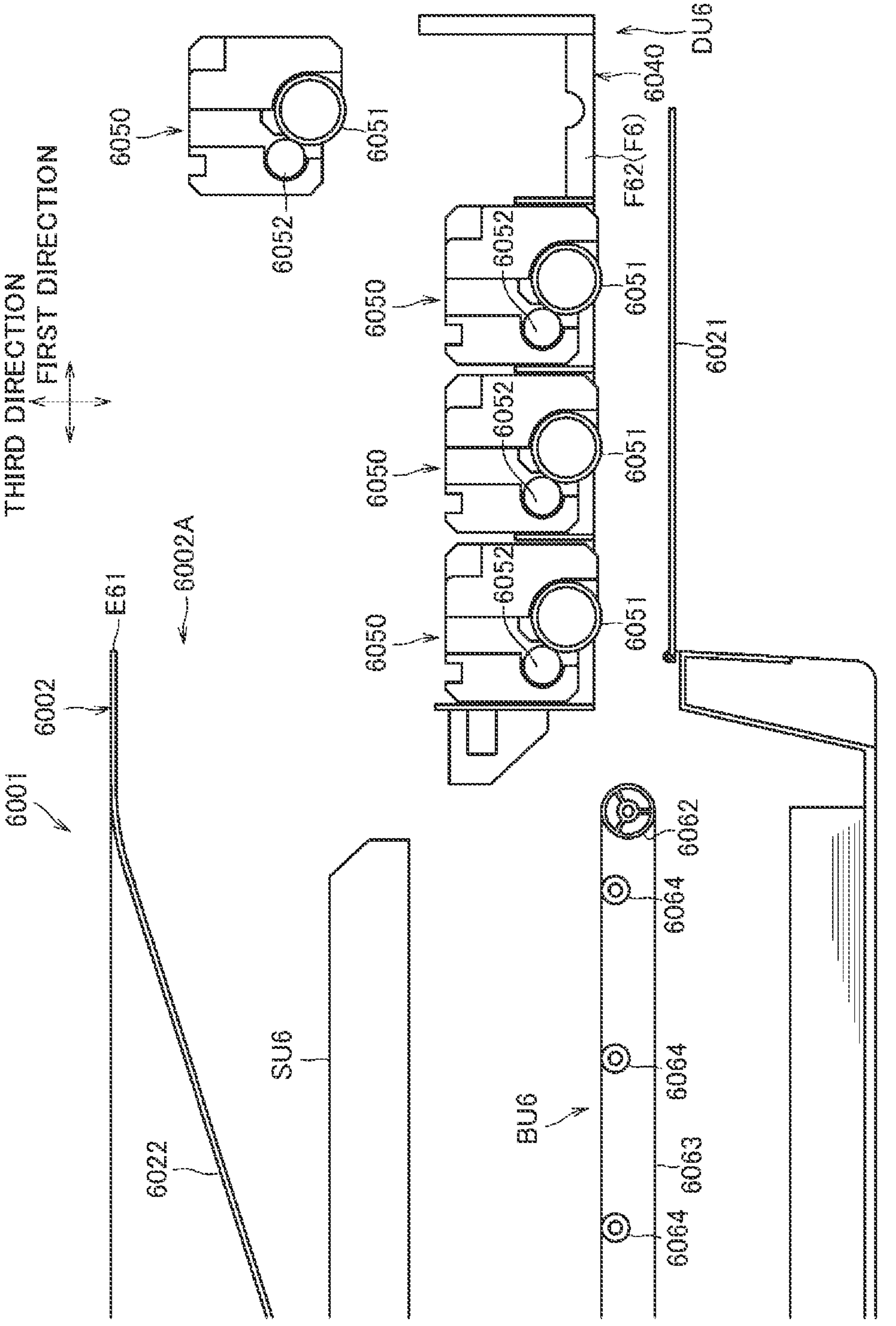

FIG. 76 is a cross-sectional view showing a drawer pulled out of a main housing.

Figure 77A:
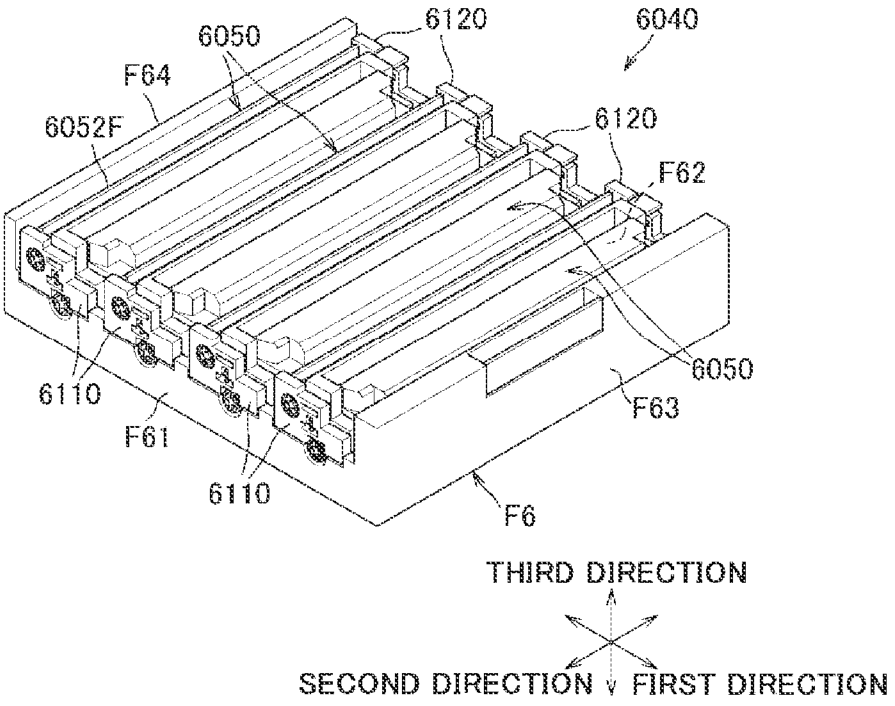

FIG. 77A is a perspective view of the drawer in which cartridges are installed with lock levers in lock positions.

Figure 77B:
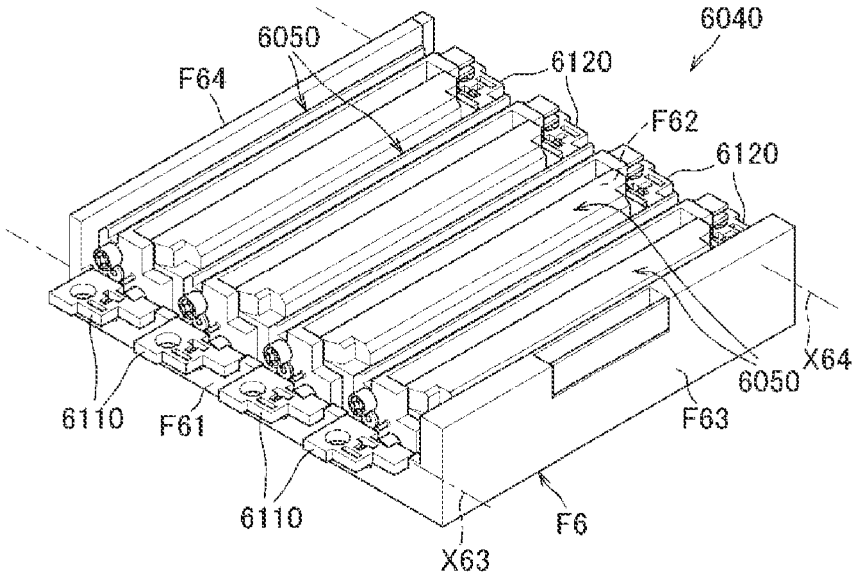

FIG. 77B is a perspective view of the drawer in which cartridges are installed with lock levers in unlock positions.

Figure 78A:
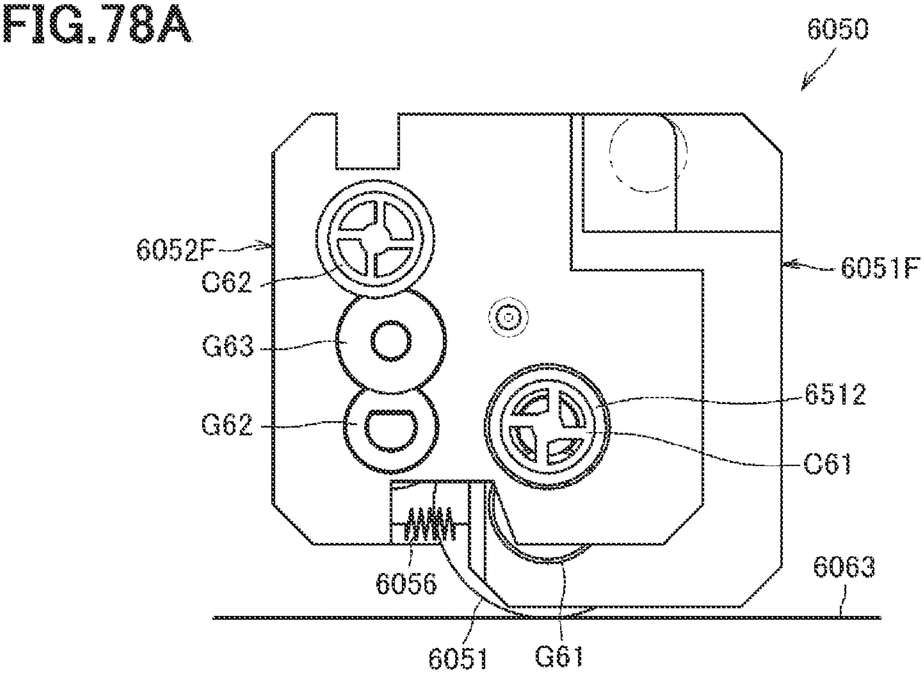

FIG. 78A is a side view of one end of the cartridge facing in a direction parallel to the second direction in a state where a drum frame is positioned in a contact position.

Figure 78B:
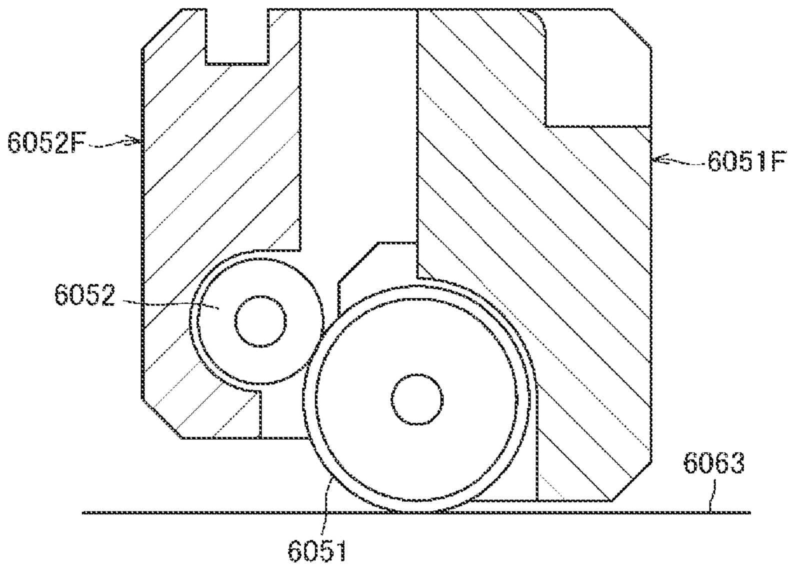

FIG. 78B is a cross-sectional view of the one end of the cartridge in a state where the drum frame is positioned in the contact position.

Figure 79A:
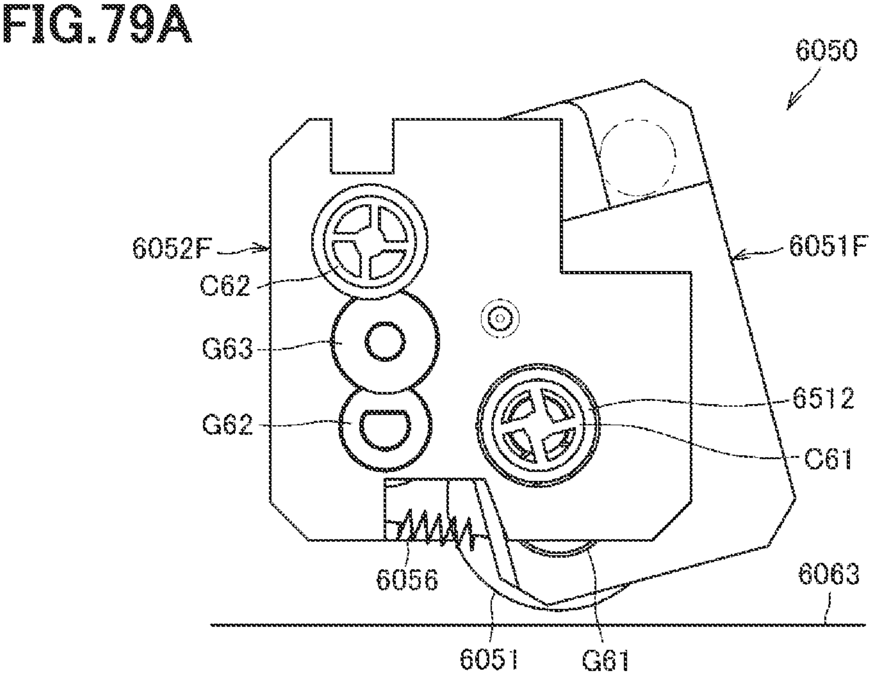

FIG. 79A is a side view of the one end of the cartridge in a state where the drum frame is positioned in a separate position.

Figure 79B:
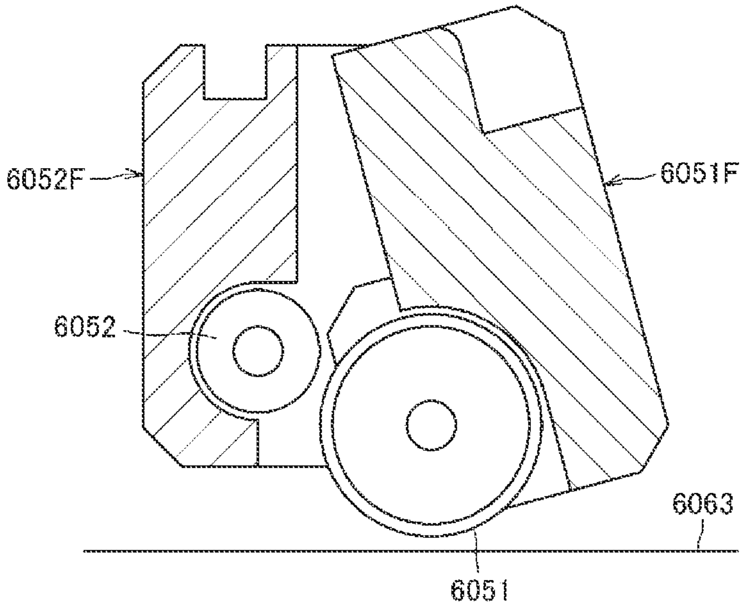

FIG. 79B is a cross-sectional view of the one end of the cartridge in a state where the drum frame is positioned in the separate position.

Figure 80A:
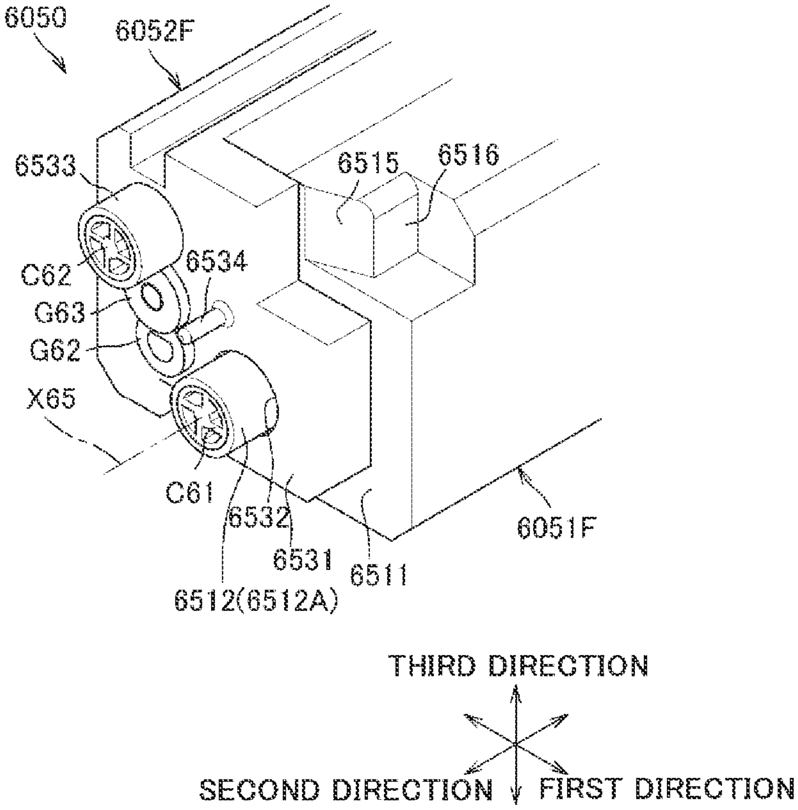

FIG. 80A is a perspective view showing the one end of the cartridge.

Figure 80B:
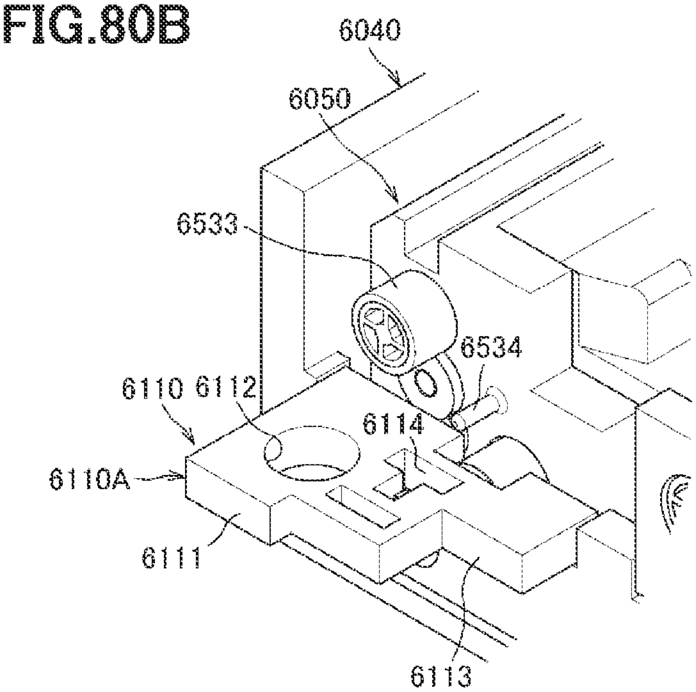

FIG. 80B is a perspective view showing structures of one side of the drawer facing in a direction parallel to the second direction and the cartridge installed therein with the first lock lever in the unlock position.

Figure 81A:
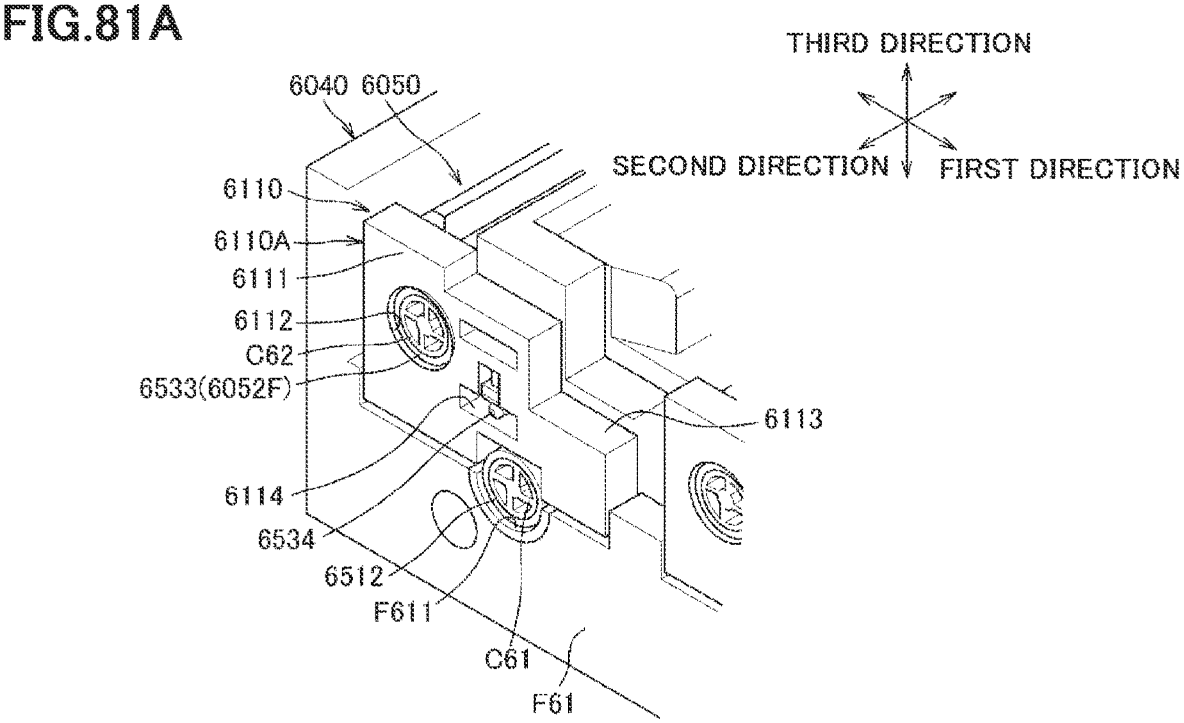

FIG. 81A is a perspective view showing structures of the one side of the drawer with the first lock lever in the lock position.

Figure 81B:
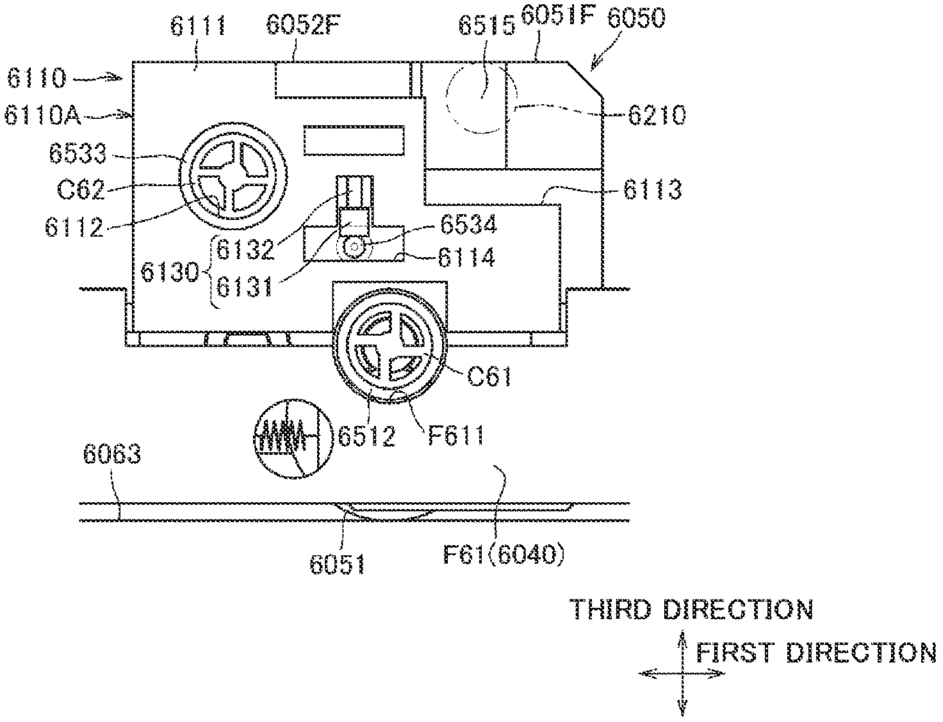

FIG. 81B is a side view showing structures of the one side of the drawer with the first lock lever in the lock position.

Figure 82A:
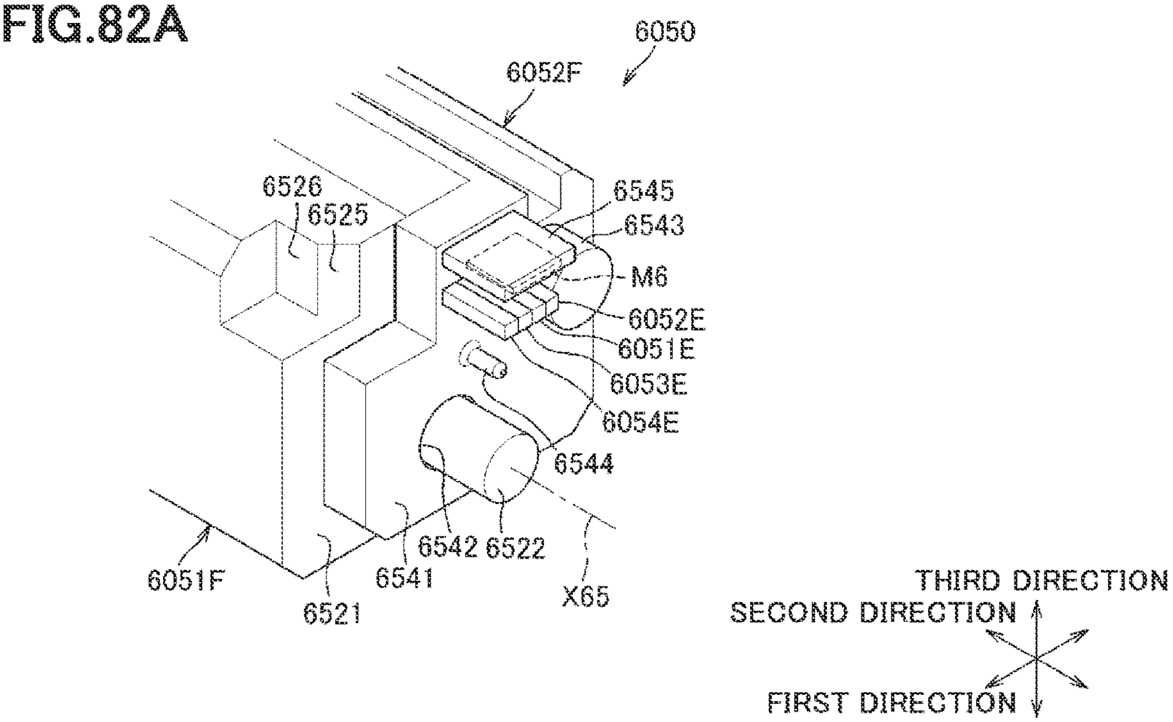

FIG. 82A is a perspective view showing the other end of the cartridge facing away from the end shown in FIGS. 78A to 80A FIG. 82B is a perspective view showing structures of the other side of the drawer facing away from the side shown in FIGS. 80B, 81A, 81B and the cartridge installed therein with the second lock lever in the unlock position.

Figure 83A:
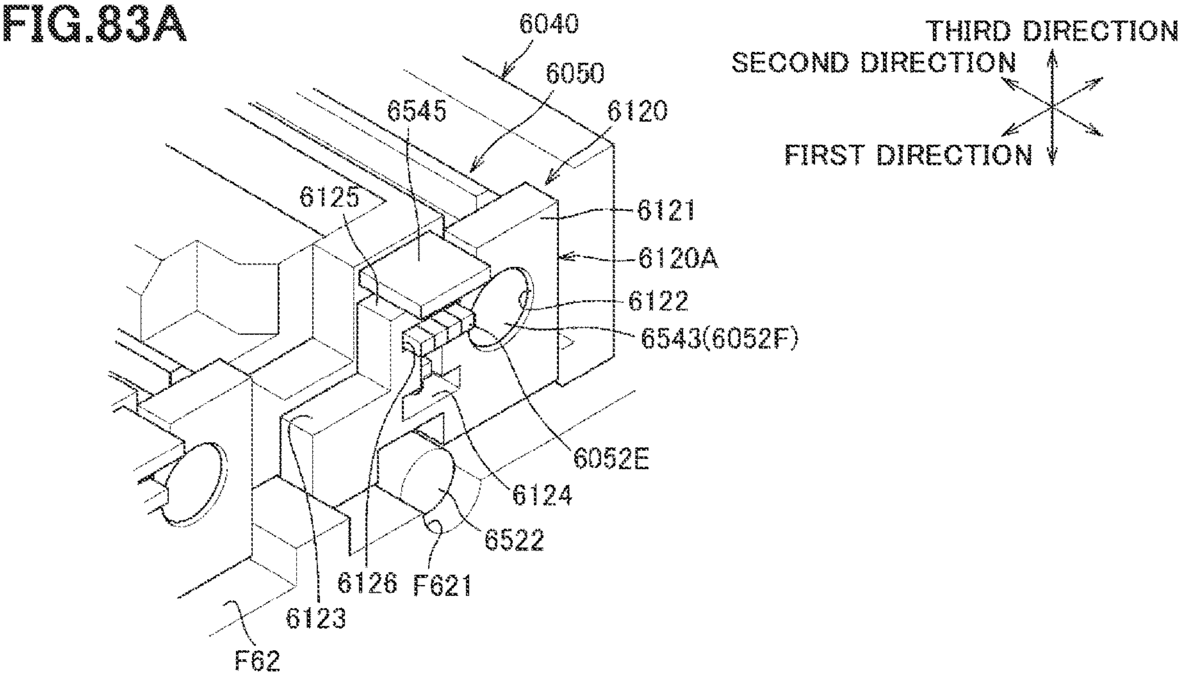

FIG. 83A is a perspective view showing structures of the other side of the drawer and the cartridges installed therein with the second lock lever in the lock position.

Figure 83B:
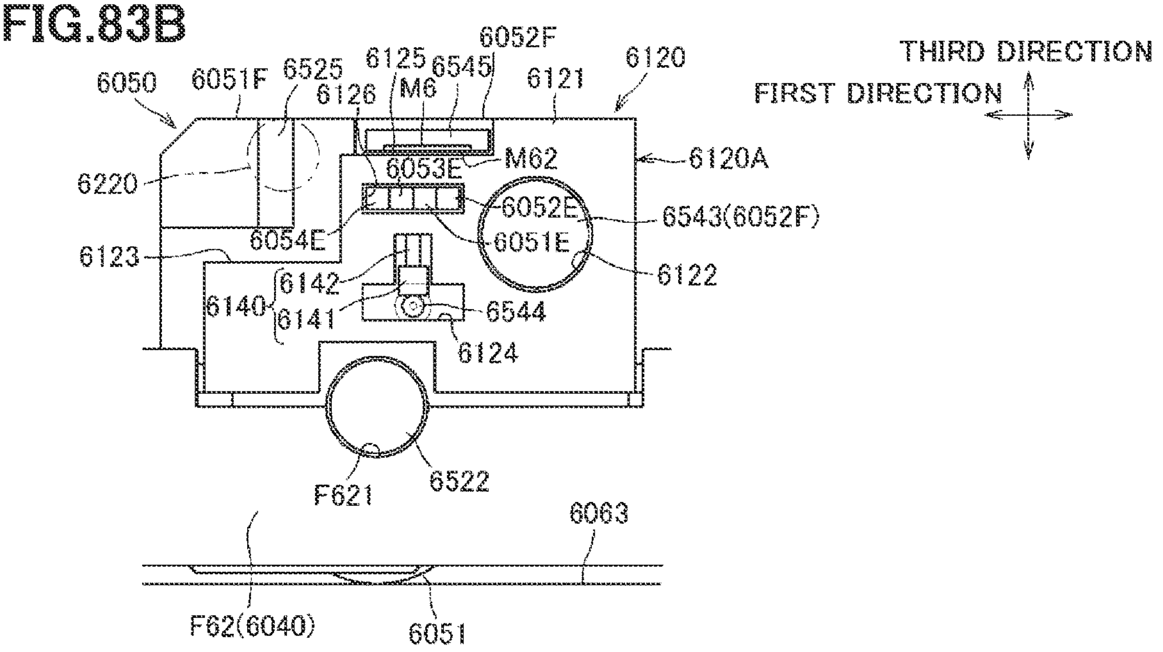

FIG. 83B is a side view showing structures of the other side of the drawer and the cartridges installed therein with the second lock lever in the lock position.

Figure 84A:
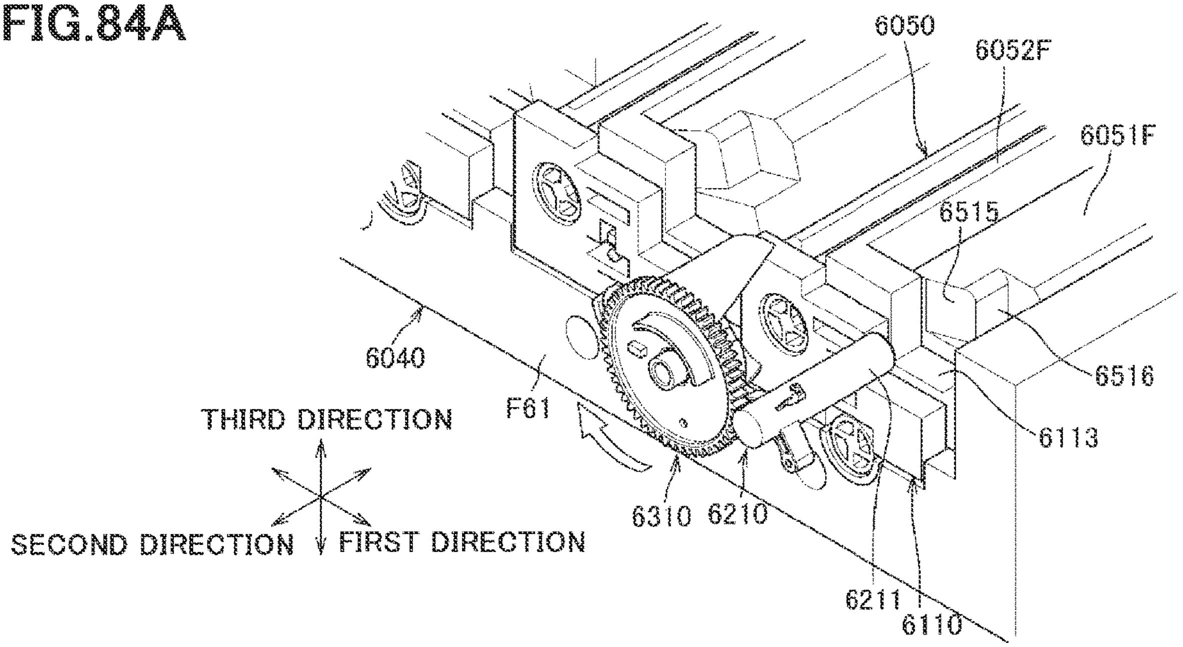

FIG. 84A is a perspective view showing the one side of the drawer, a first cam, and a first separation member positioned in a first position.

Figure 84B:
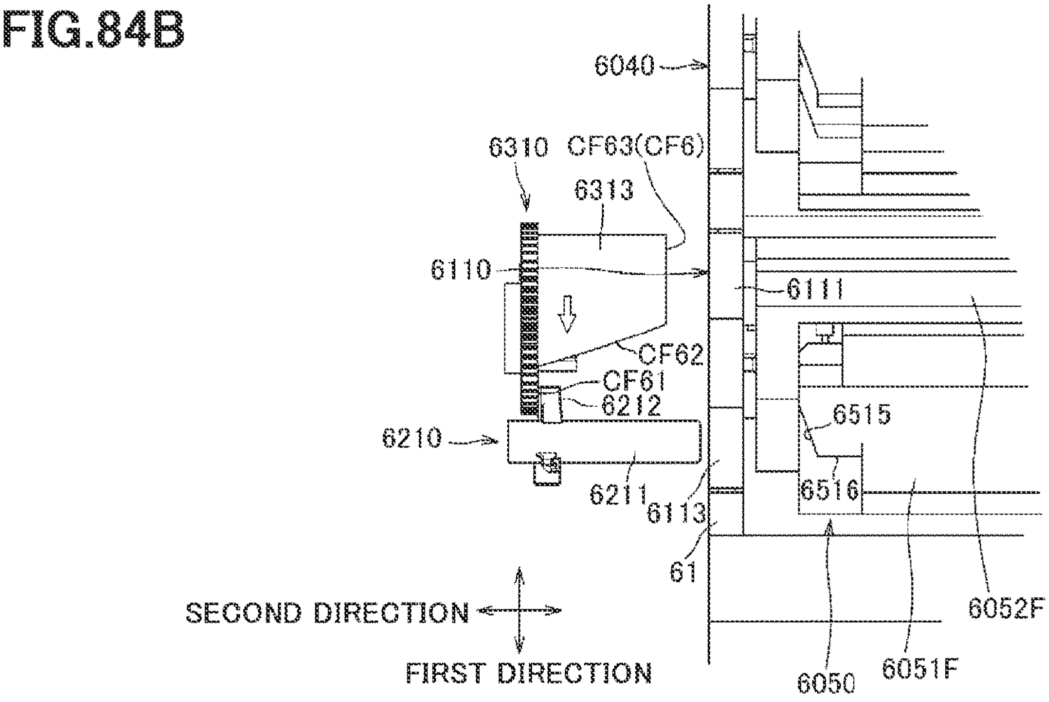

FIG. 84B is a plan view showing the one side of the drawer, the first cam, and the first separation member positioned in the first position.

Figure 85A:
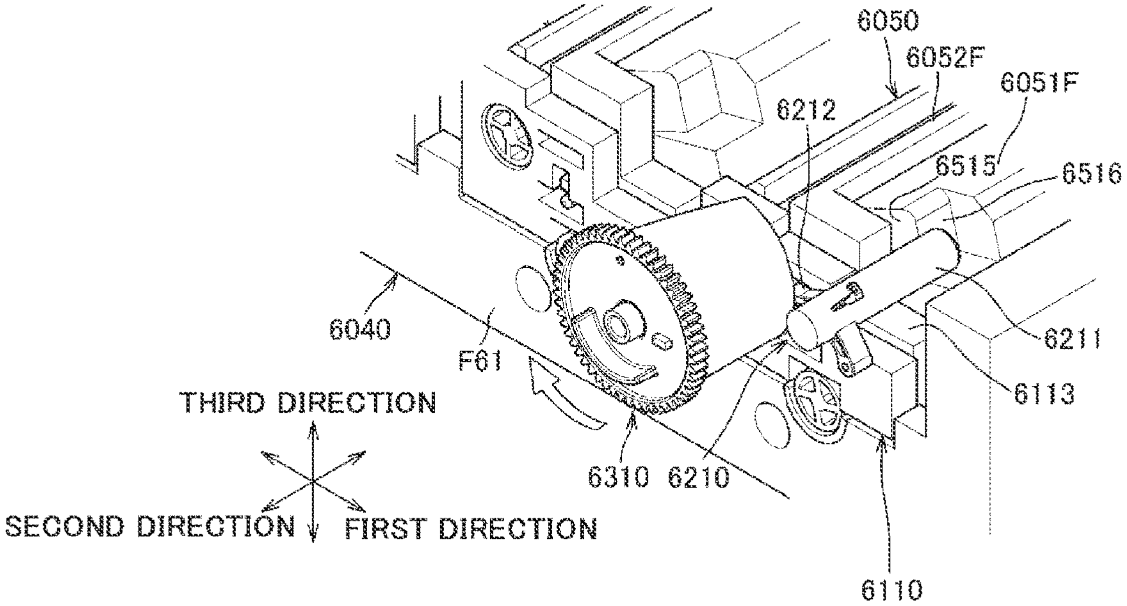

FIG. 85A is a perspective view showing the one side of the drawer, the first cam, and the first separation member positioned in a second position.

Figure 85B:
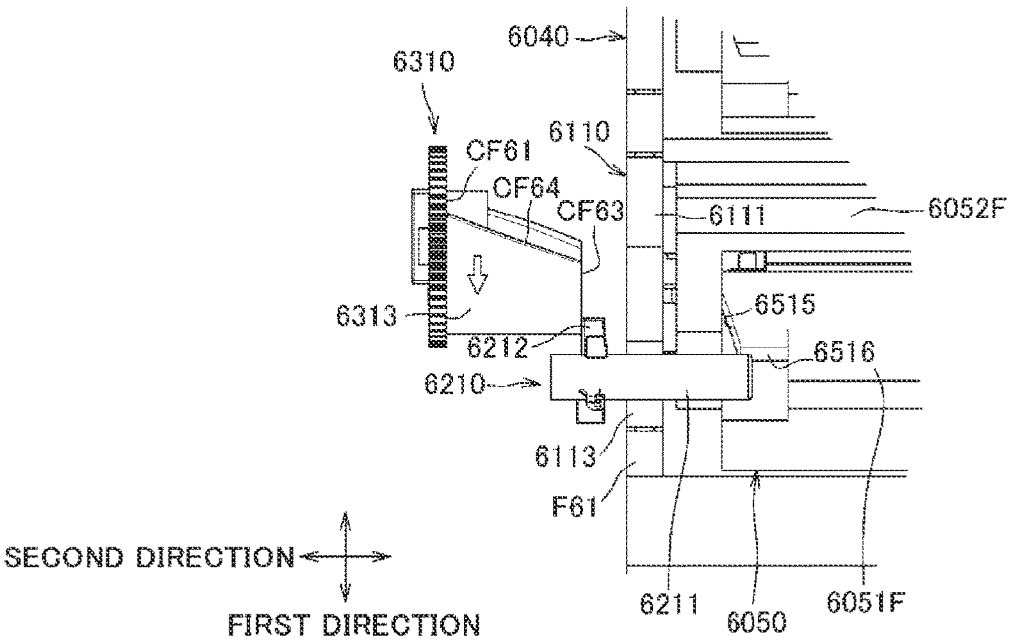

FIG. 85B is a plan view showing the one side of the drawer, the first cam, and the first separation member positioned in the second position.

Figure 86A:
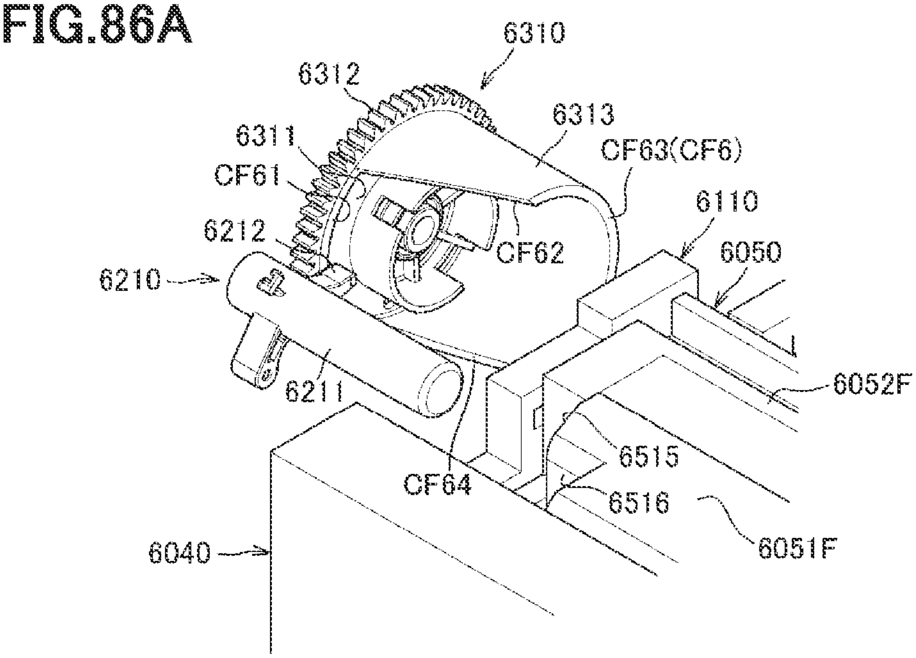
Figure 86A:
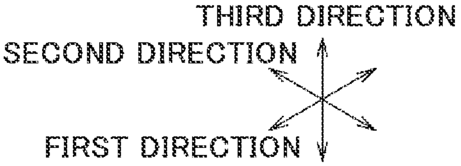

FIG. 86A is a perspective view of the first cam and the first separation member positioned in the first position.

Figure 86B:
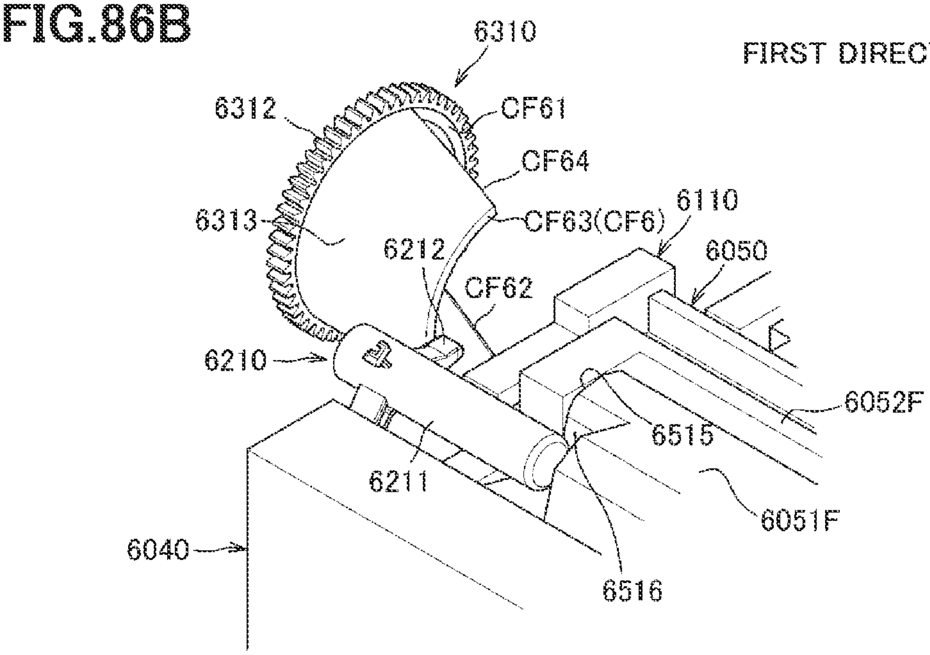

FIG. 86B is a perspective view of the first cam and the first separation member positioned in the second position.

Figure 87A:
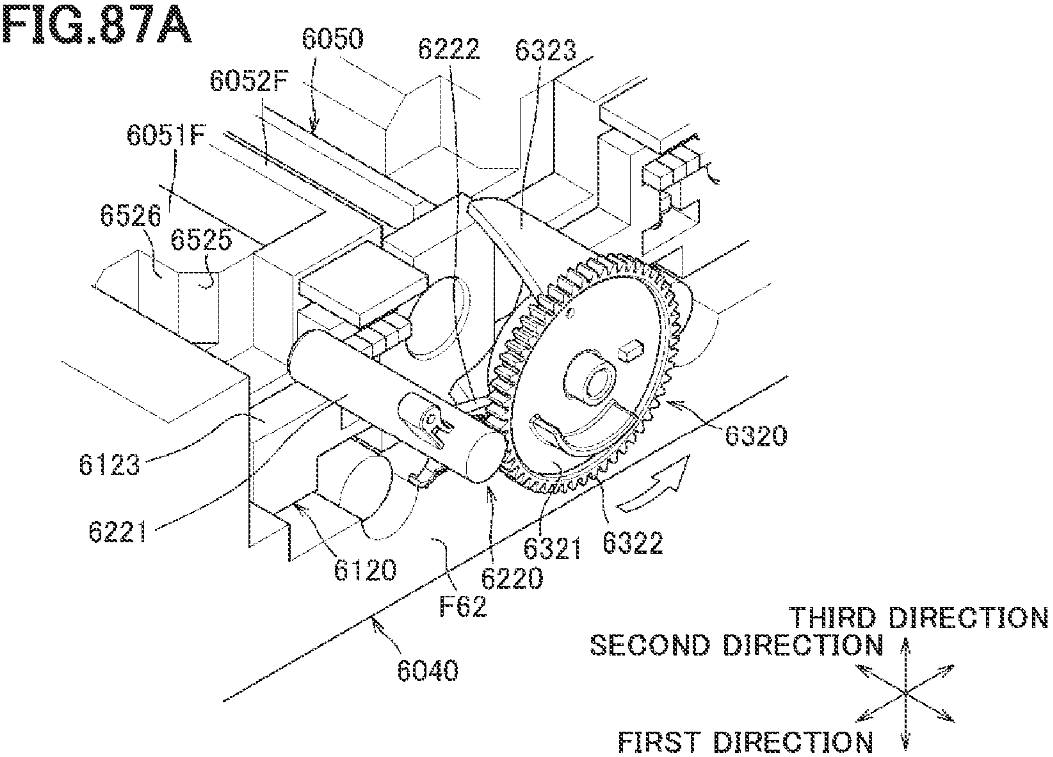

FIG. 87A is a perspective view showing the other side of the drawer, a second cam, and a second separation member positioned in a third position.

Figure 87B:
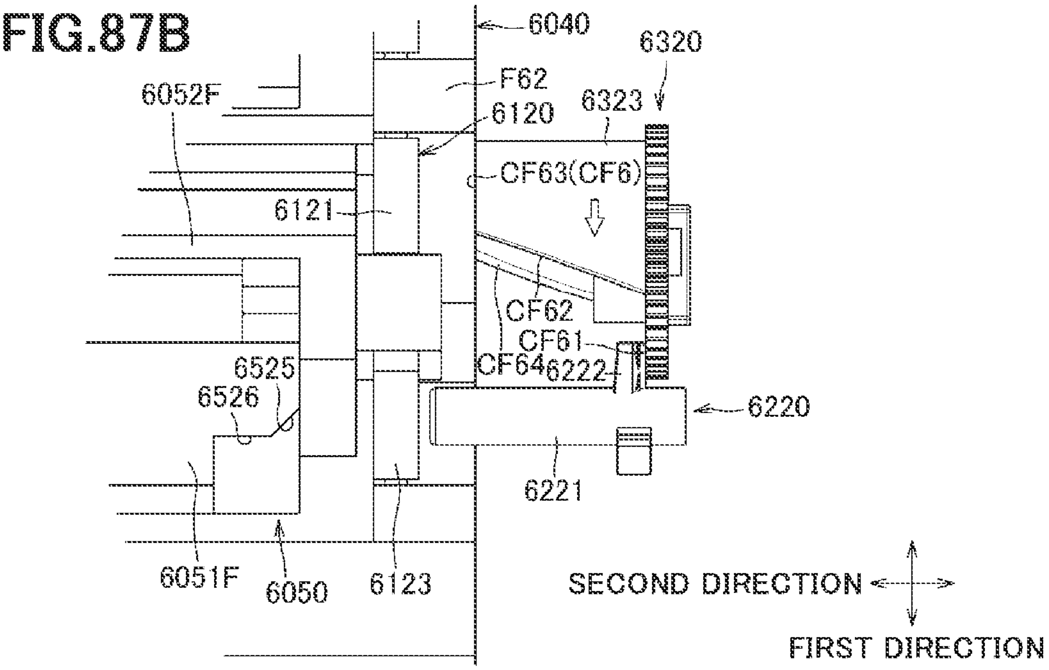

FIG. 87B is a plan view showing the other side of the drawer, the second cam, and the second separation member positioned in the third position.

Figure 88A:
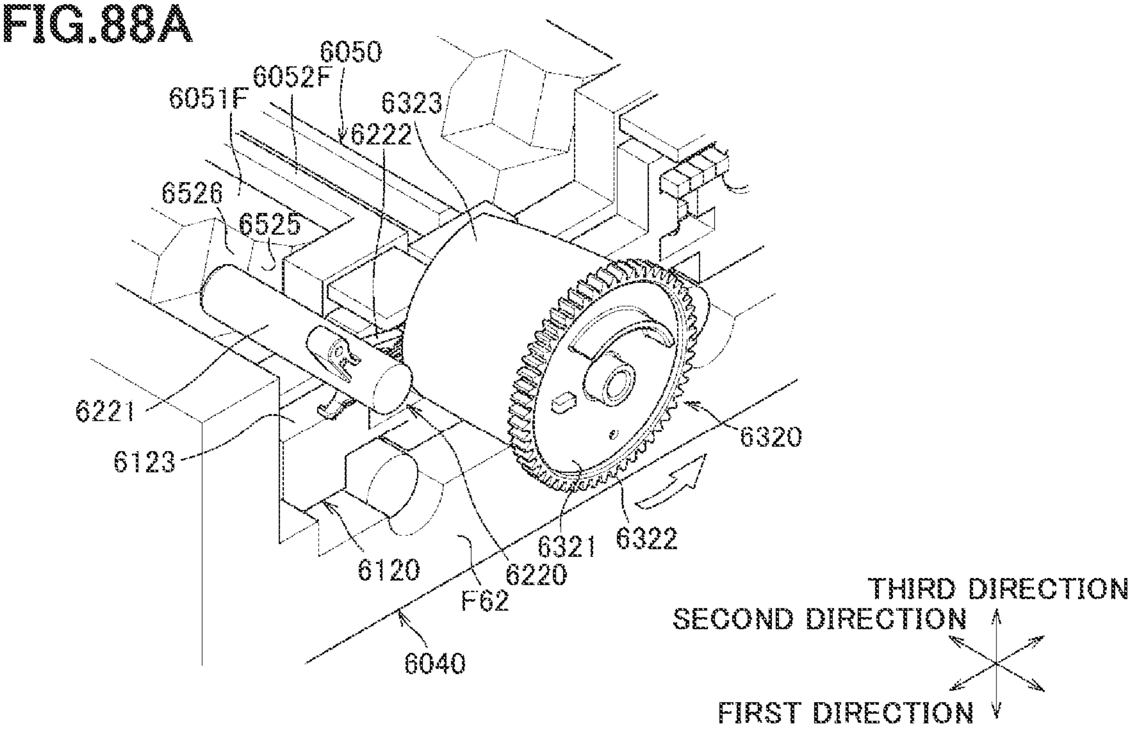

FIG. 88A is a perspective view showing the other side of the drawer, the second cam, and the second separation member positioned in a fourth position.

Figure 88B:
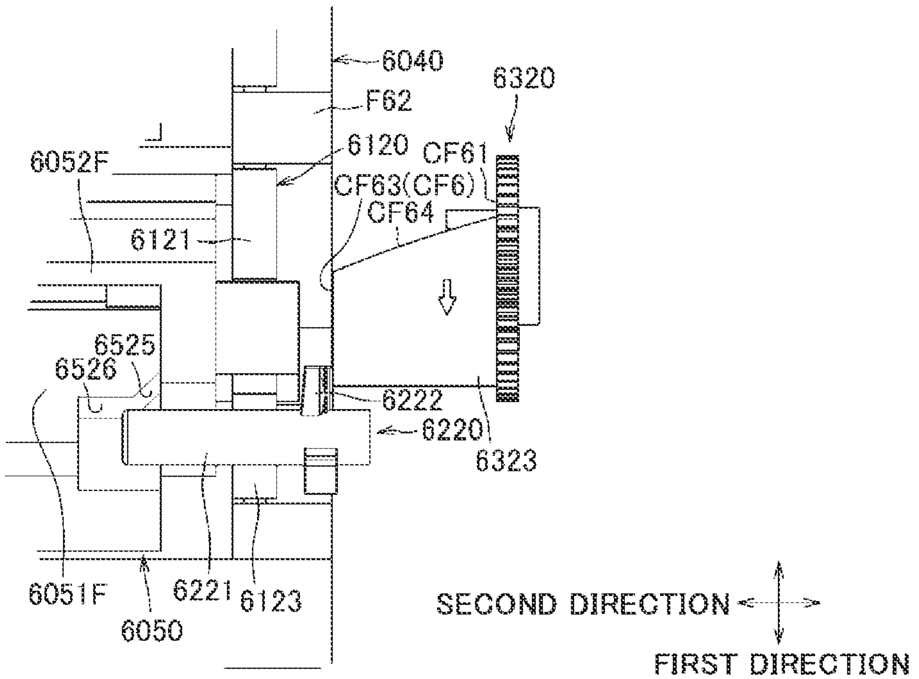

FIG. 88B is a plan view showing the other side of the drawer, the second cam, and the second separation member positioned in the fourth position.

Figure 89A:
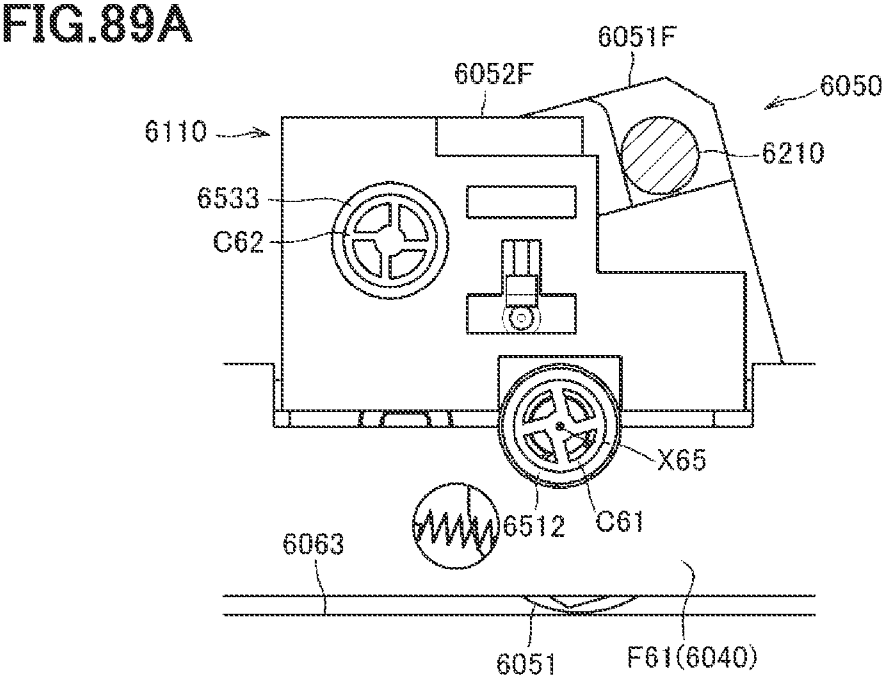

FIG. 89A is a side view showing the one side of the drawer and the cartridge installed therein with the drum frame positioned in the separate position.

Figure 89B:
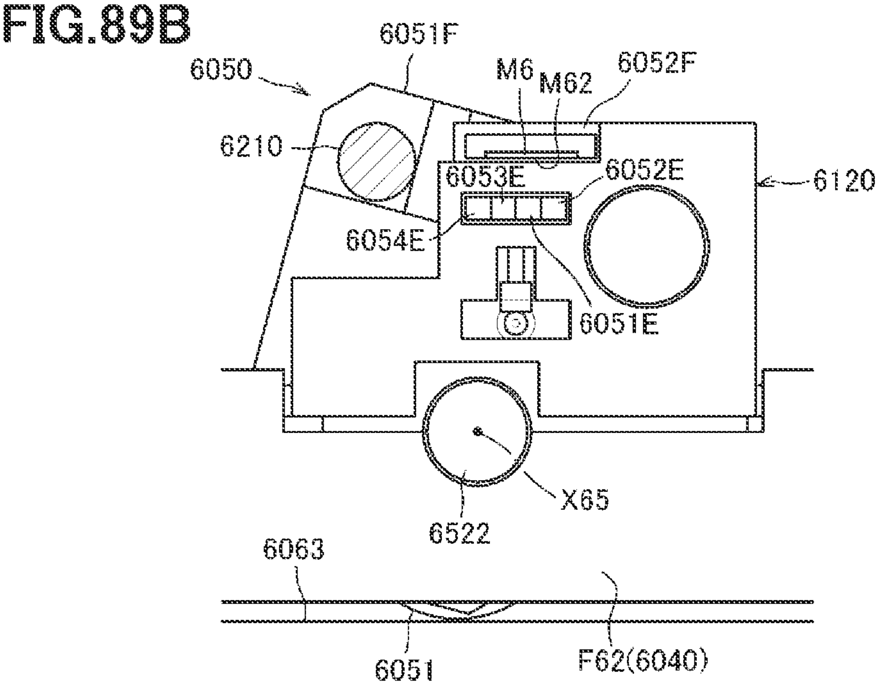

FIG. 89B is a side view showing the other side of the drawer and the cartridge installed therein with the drum frame positioned in the separate position.

Figure 90A:
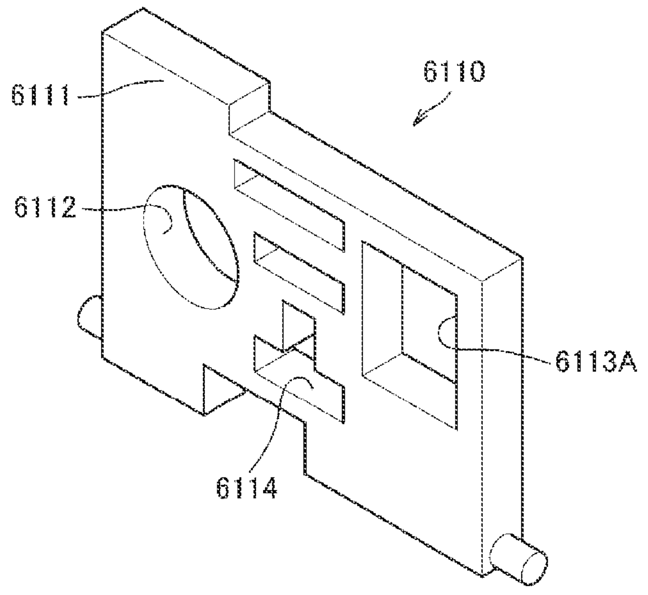

FIG. 90A is a perspective view of a first lock lever according to a first modification of the seventh example.

Figure 90B:
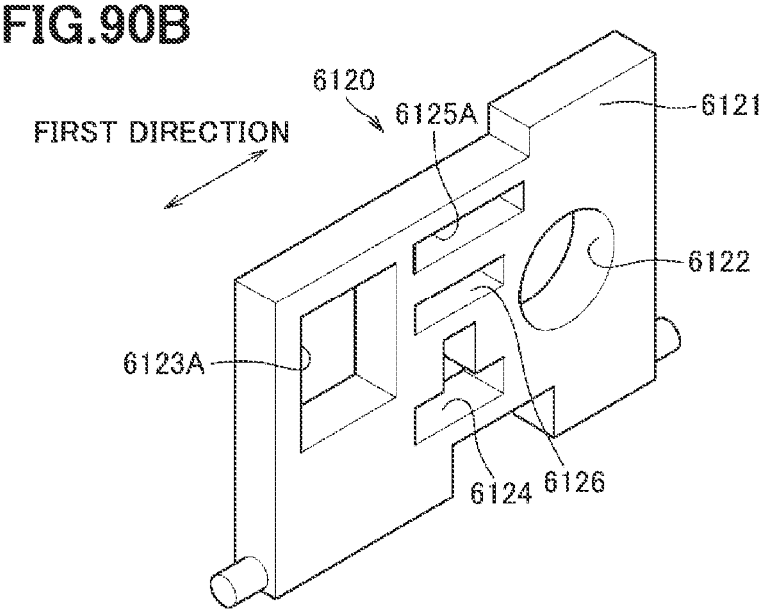

FIG. 90B is a perspective view of a second lock lever according to the first modification of the seventh example.

Figure 91A:
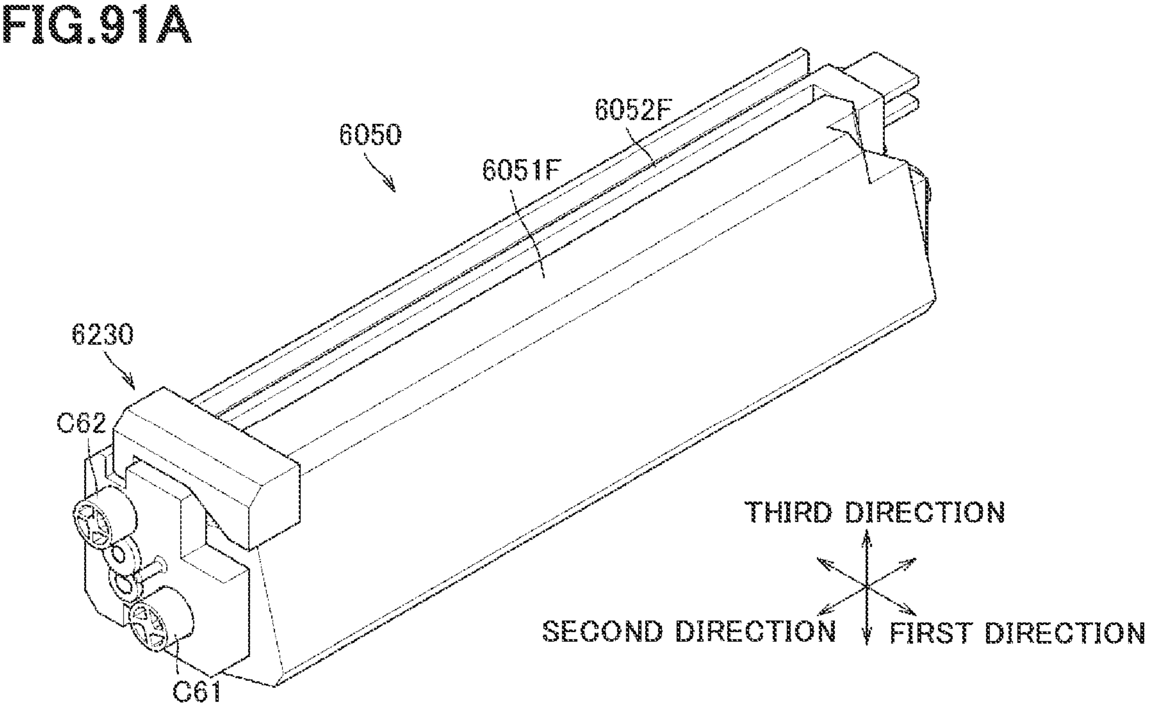

FIG. 91A is a perspective view showing a separation member and a cartridge according to a second modification of the seventh example.

Figure 91B:
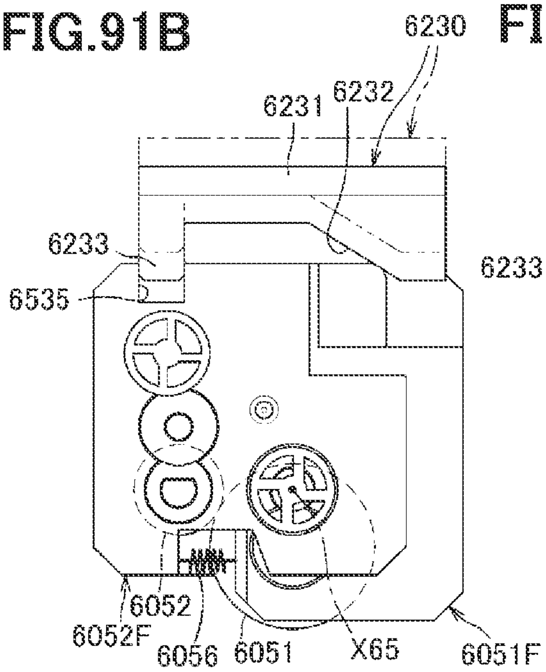
Figure 91C:
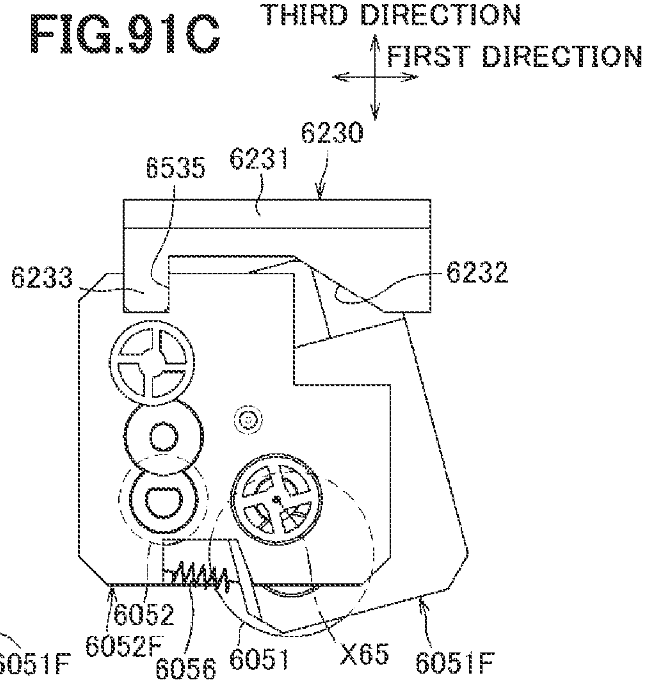

FIGS. 91B and 91C are a side views showing the separation member and the cartridge according to the second modification of the seventh example.

The first example of the present disclosure will be described in detail referring to the drawings where appropriate.

Figure 1:
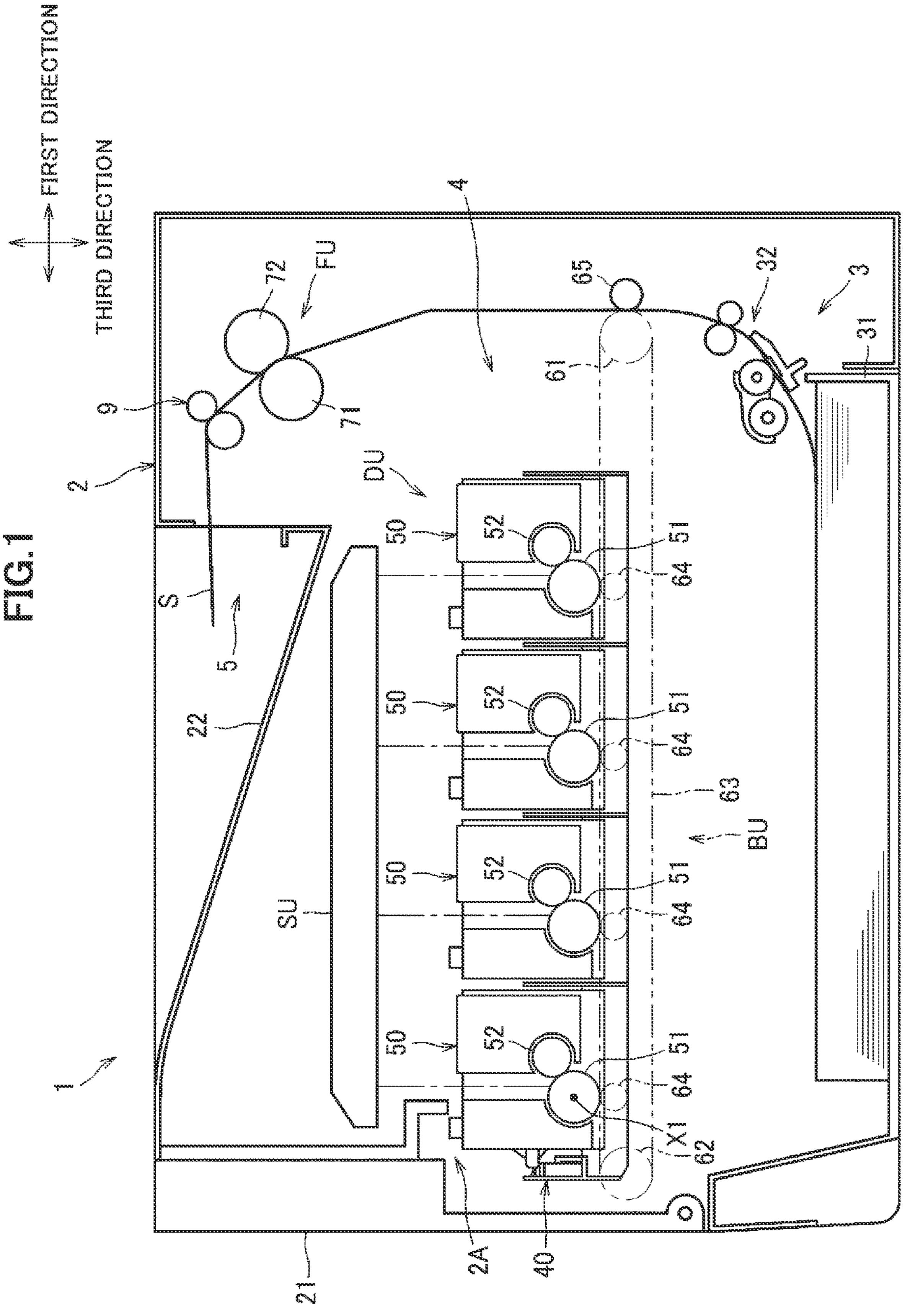
FIG. 1 is a cross-sectional view of an image forming apparatus according to the first example.

As shown in FIG. 1, a multicolor printer 1 as one example of an image forming apparatus comprises a main housing 2, a sheet feeder unit 3, an image forming unit 4, and an ejection unit 5. The sheet feeder unit 3 feeds a sheet S to the image forming unit 4. The image forming unit 4 forms an image on the sheet S. The ejection unit 5 ejects the sheet S to the outside of the main housing 2.

The main housing 2 has an opening 2A and a front cover 21. The opening 2A allows a drawer 40 which will be described later to pass therethrough. The front cover 21 is rotatable between an open position (see FIG. 2) in which the opening 2A is uncovered and a closed position in which the opening 2A is closed.

The sheet feeder unit 3 is positioned in a lower portion of the main housing 2. The sheet feeder unit 3 comprises a feed tray 31, and a feed mechanism 32. The feed tray 31 is installable into and removable from the main housing 2. The feed mechanism 32 conveys a sheet S from the feed tray 31 to the image forming unit 4.

The image forming unit 4 comprises a drum unit DU, a scanner unit SU, a belt unit BU and a fixing unit FU.

Figure 2:
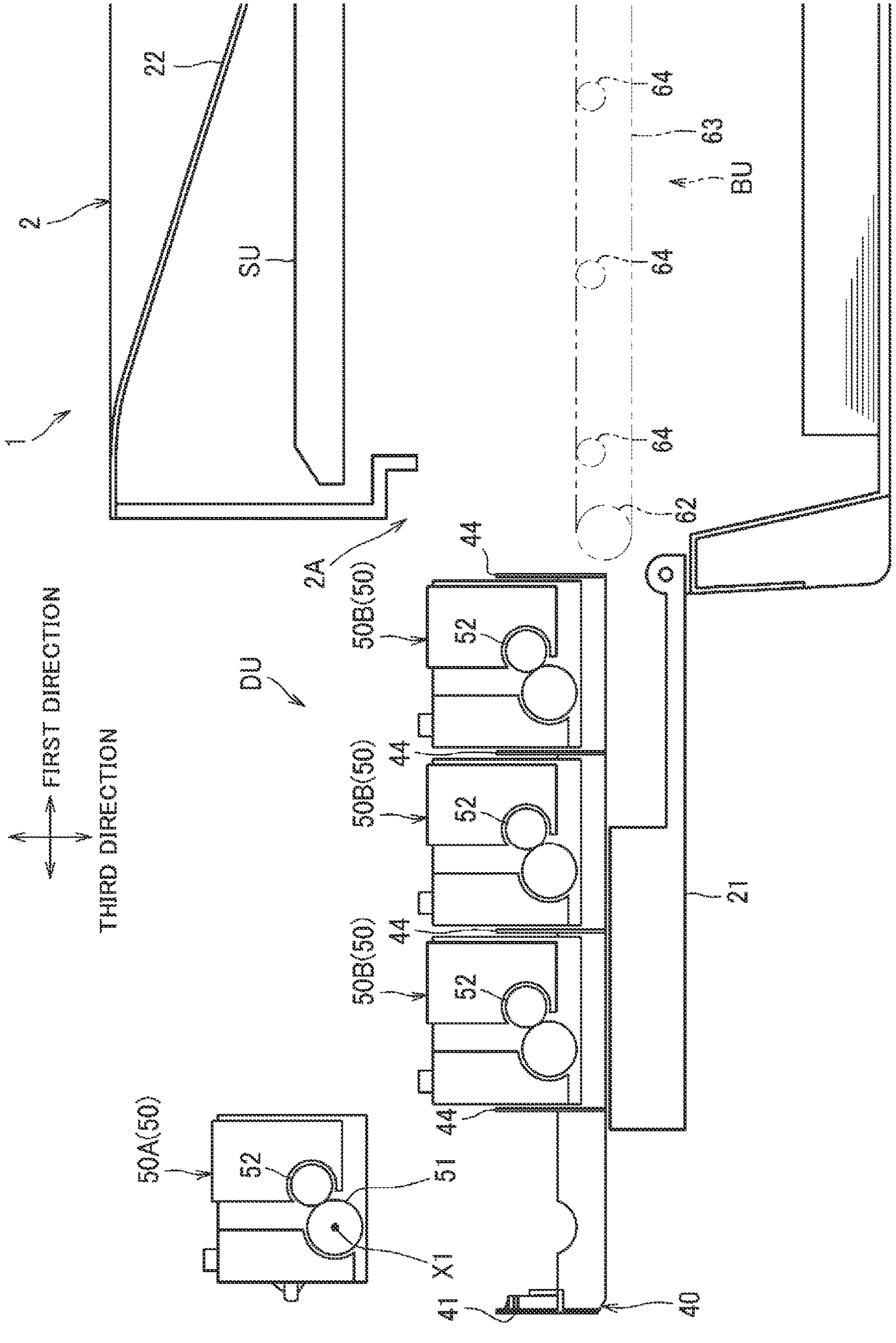
FIG. 2 is a cross-sectional view showing the image forming apparatus with a drawer pulled out of a main housing.

The drum unit DU comprises a drawer 40 and four cartridges 50. Four cartridges 50 can be installed in the drawer 40. As shown in FIGS. 1 and 2, the drawer 40 is movable relative to the main housing 2 in directions parallel to the first direction. Specifically, the drawer 40 is movable through the opening 2A of the main housing 2 between an inside position inside the main housing 2 and an outside position outside the main housing 2.

The inside position is a position in which the drawer 40 is positioned when an image is formed on a sheet S. The outside position is a position in which the drawer 40 is positioned when the cartridges 50 are installed into or removed from the drawer 40. In this example, the first direction is perpendicular to a second direction which will be described later and to a third direction which is the up-down direction.

Each of the four cartridges 50 contains toner of a color different from colors of toner contained in the other cartridges 50. The four cartridges 50 are aligned in the first direction. The cartridges 50 are installable into and removable from the drawer 40 in directions parallel to the third direction. The cartridges 50 each comprise a photosensitive drum 51 and a development roller 52. Although not shown in the drawings, each of the cartridges 50 also comprises a charge roller that charges the photosensitive drum 51, and other components.

The photosensitive drum 51 is rotatable about a drum axis X1 oriented in the second direction non-parallel to the first direction. In this example, the second direction is perpendicular to the first direction and to the third direction.

The development roller 52 is a roller that supplies toner to the photosensitive drum 51. The development roller 52 is rotatable about a rotation axis parallel to the drum axis X1.

The scanner unit SU is positioned above the drum unit DU. The scanner unit SU emits laser light toward each of the photosensitive drums 51.

The belt unit BU is positioned below the drum unit DU. The belt unit BU comprises a drive roller 61, a follower roller 62, an intermediate transfer belt 63, four primary transfer rollers 64, and a secondary transfer roller 65.

The intermediate transfer belt 63 is an endless belt. The drive roller 61 and the follower roller 62 cause the intermediate transfer belt 63 to rotate.

The drive roller 61, the follower roller 62, and the primary transfer rollers 64 are positioned to face an inside surface of the intermediate transfer belt 63. The intermediate transfer belt 63 is sandwiched between each of the primary transfer rollers 64 and a corresponding photosensitive drum 51.

The secondary transfer roller 65 is positioned to face an outer surface of the intermediate transfer belt 63. The intermediate transfer belt 63 is sandwiched between the secondary transfer roller 65 and the drive roller 61.

The fixing unit FU is positioned at a position higher than that of the intermediate transfer belt 63. The fixing unit FU comprises a heating roller 71 and a pressure roller 72. The pressure roller 72 is pressed against the heating roller 71.

The ejection unit 5 is positioned at an upper portion of the main housing 2. The ejection unit 5 comprises an ejection roller 9 and an output tray 22. The ejection roller 9 conveys a sheet S toward the output tray 22.

In the multicolor printer 1, first of all, the charge roller charges a surface of the photosensitive drum 51. Subsequently, the scanner unit SU exposes the surface of the photosensitive drum 51 to light to thereby form an electrostatic latent image thereon.

Next, the development roller 52 supplies toner to the electrostatic latent image formed on the surface of the photosensitive drum 51 to thereby form a toner image on the surface of the photosensitive drum 51. Then, the toner image on the surface of the photosensitive drum 51 is transferred onto the intermediate transfer belt 63.

The toner image on the intermediate transfer belt 63 is transferred onto a sheet S when the sheet S passes through between the intermediate transfer belt 63 and the secondary transfer roller 65. Thereafter, the toner image on the sheet S is fixed onto the sheet S at the fixing unit FU. The sheet S is subsequently ejected onto the output tray 22 by the ejection roller 9.

Next, the structures of the cartridge 50 and the drawer 40 will be described in detail. In the description given below, among the cartridges 50 arranged in the drawer 40, the cartridge 50 positioned upstreammost in a direction of installation of the drawer 40 (i.e., rearmost in the drawer 40 being installed into the main housing 2) is installed is also referred to as "first cartridge 50A", and each of the other cartridges 50 is also referred to as "second cartridge 50B".

Figure 3A:
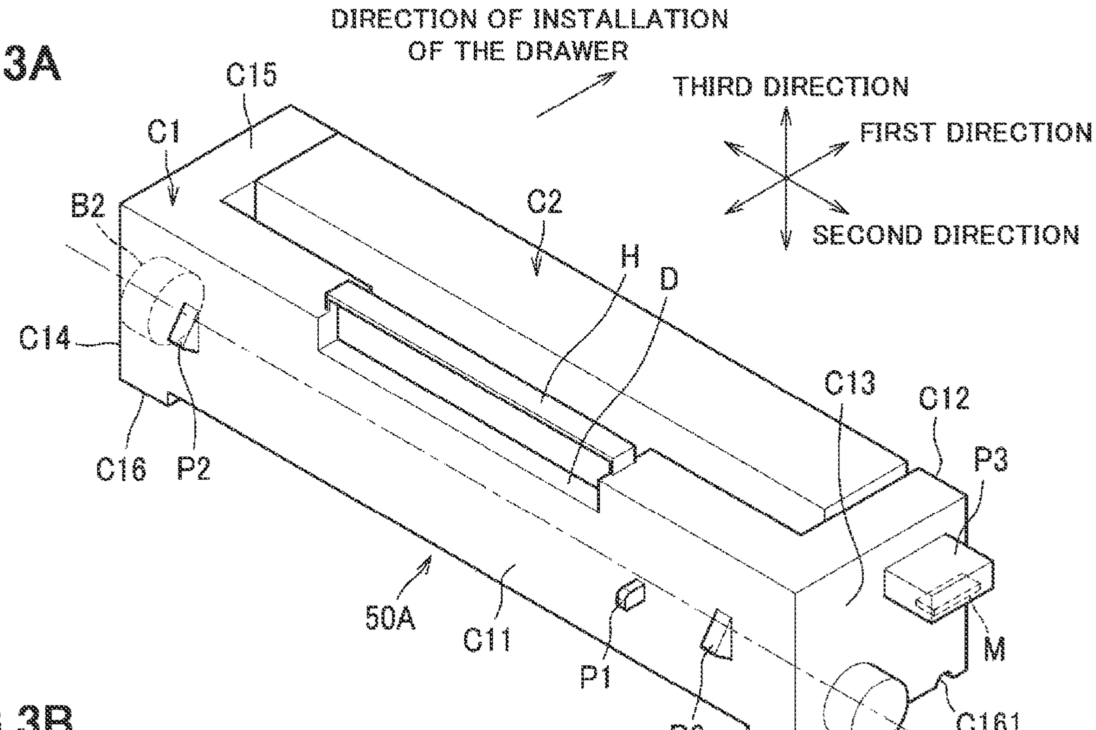
FIG. 3A is a perspective view of a first cartridge.

As shown in FIG. 3A, the first cartridge 50A comprises a drum cartridge C1 and a development cartridge C2. The drum cartridge C1 includes the photosensitive drum 51 described above. The development cartridge C2 includes the development roller 52 described above. The development cartridge C2 is undetachably attached to the drum cartridge C1.

The drum cartridge C1 has a first side surface C11, a second side surface C12, a third side surface C13, a fourth side surface C14, a top surface C15 and a bottom surface C16. The first side surface C11 is positioned at one end of the drum cartridge C1 in the first direction. Specifically, the first side surface C11 is positioned at an upstream end of the drum cartridge C1 in the direction of installation of the drawer 40.

The second side surface C12 is positioned at the other end of the drum cartridge C1 facing away from the first side surface C11. Specifically, the second side surface C12 is positioned at a downstream end of the drum cartridge C1 in the direction of installation of the drawer 40.

The third side surface C13 is positioned at one end of the drum cartridge C1 facing in a direction parallel to the second direction. The fourth side surface C14 is positioned at the other end of the drum cartridge C1 facing away from the third side surface C13.

The top surface C13 is positioned at an upper end of the drum cartridge C1. The bottom surface C16 is positioned at the lower end of the drum cartridge C1.

The drum cartridge C1 includes a handle H and a recess D at the top surface C15. The handle H is a part graspable by a user. The handle H is formed in a shape of the letter U and protrudes from the top surface C15.

The recess D is positioned under the handle H. A space that allows a user's finger(s) to be inserted therein is thereby formed between the handle H and the bottom of the recess D.

Figure 9A:
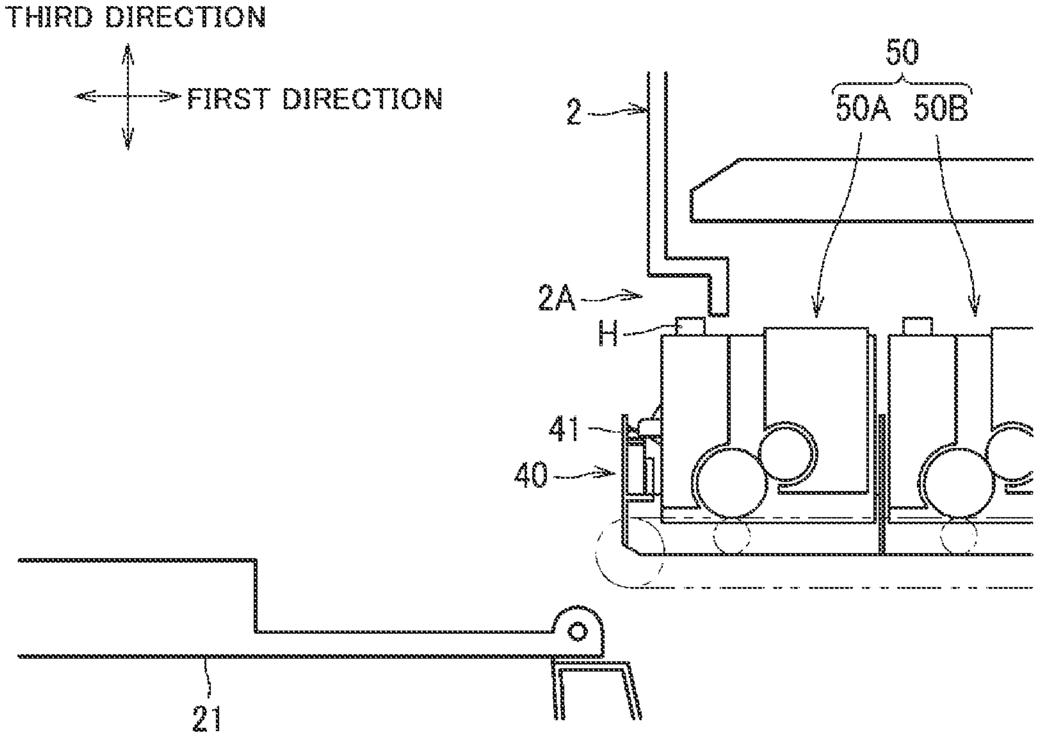
FIG. 9A is an illustration showing a handle accessible through an opening of the main housing.
Figure 9B:
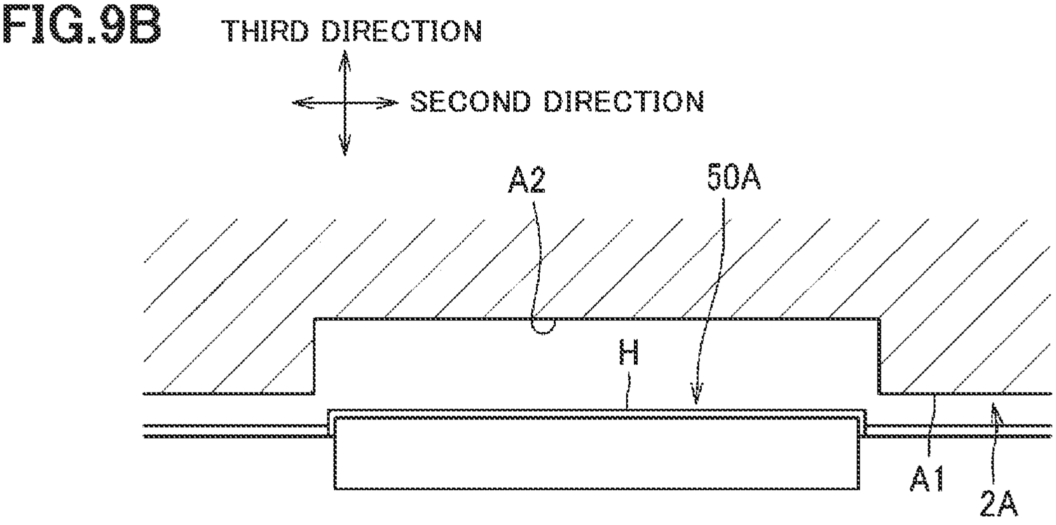
FIG. 9B is an illustration showing a recessed portion of the opening.

As shown in FIG. 9A, when the drawer 50 with the first cartridge 50A installed therein is positioned in the inside position, the handle H of the first cartridge 50A is not covered by the drawer 40 and is accessible through an opening 2A. Specifically, the handle H is positioned above an upper end of a first wall 41, which will be described later, of the drawer 40. As shown in FIG. 9B, an upper end A1 of the opening 2A has a recessed portion A2. The bottom of the recessed portion A2 is positioned farther, than the upper end A1, from the handle H. A space that allows a user's finger(s) to be inserted therein is thereby formed between the handle H and the bottom of the recessed portion A2.

Figure 5A:
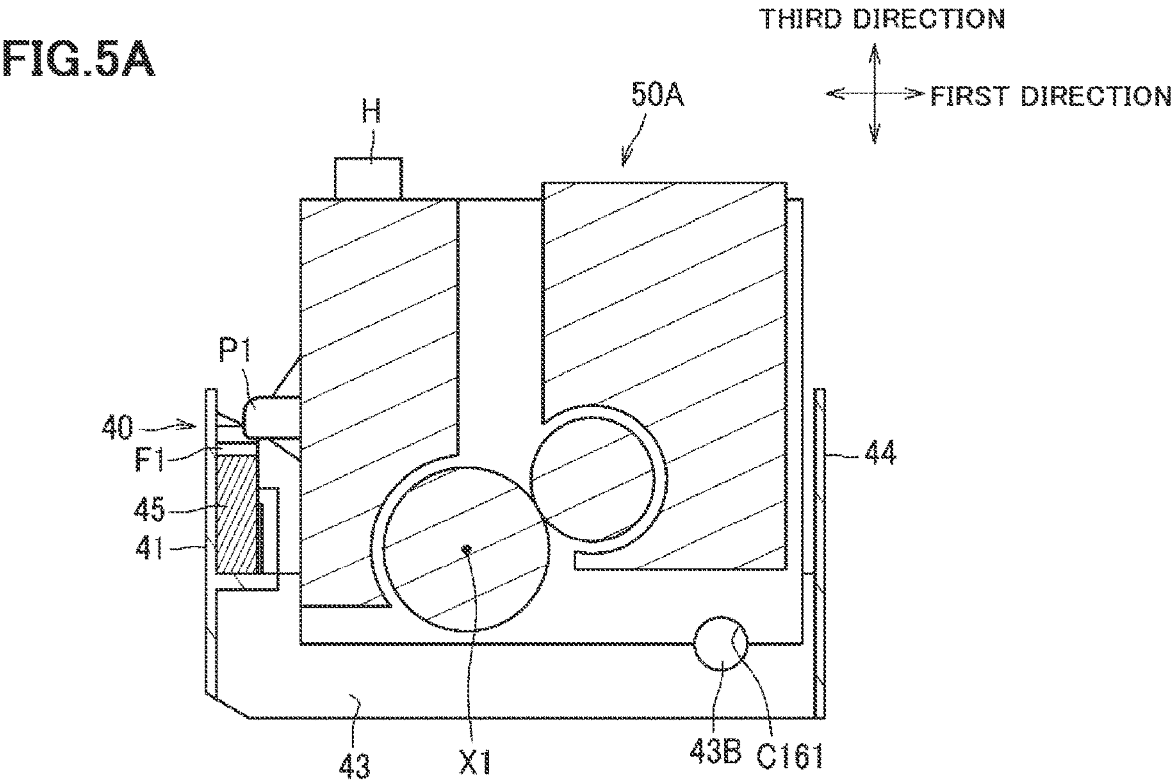
FIG. 5A is an illustration showing the relationship between a second protrusion and a location recess as observed when the first cartridge is positioned in a first position.
Figure 5B:
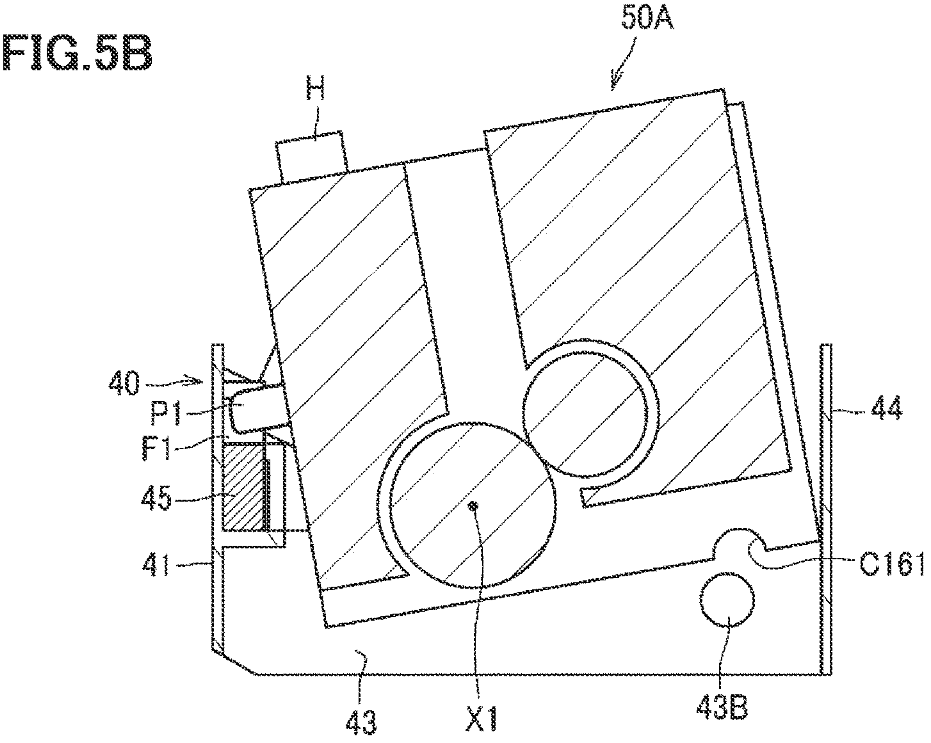
FIG. 5B is an illustration showing the relationship between the second protrusion and the location recess as observed when the first cartridge is positioned in a second position.

As shown in FIGS. 5A and 5B, the first cartridge 50A installed in the drawer 40 is rotatable about a drum axis A1. Specifically, the first cartridge 50A is rotatable between a first position shown in FIG. 5A and a second position shown in FIG. 5B.

The first position is a position in which the first cartridge 50A is positioned when an image is formed on a sheet S. The second position is a position in which the handle H is lower than in the first position.

As shown in FIG. 3A, the drum cartridge C1 includes a first projection P1 and two second projections P2 formed on the first side surface C11. The first projection P1 and the second projections P2 protrude from the first side surface C11.

The first projection P1 is positioned between the handle H and the third side surface C13 in the second direction. The first projection P1 is positioned between the two second projections P2 in the second direction.

One of the two second projections P2 is positioned between the first projection P1 and the third side surface C13 in the second direction. The other of the second projections P2 is positioned between the handle H and the fourth side surface C14 in the second direction.

The drum cartridge C1 includes a first boss B1 and a third projection P3 formed on the third side surface C13. The first boss B1 and a third projection P3 protrude from the third side surface C1.

The first boss B1 has an outer peripheral surface formed in the shape of a cylinder having a center on the drum axis X1. The drum cartridge C1 comprises a memory M under the third projection P3.

The memory M stores cartridge information related to the first cartridge 50A. The memory M is, for example, an IC chip. The memory M is not limited to an IC chip but may be any other medium as long as it can store cartridge information. The cartridge information includes at least one of identification information such as a serial number and life information related to the life of the cartridge.

Figure 7A:
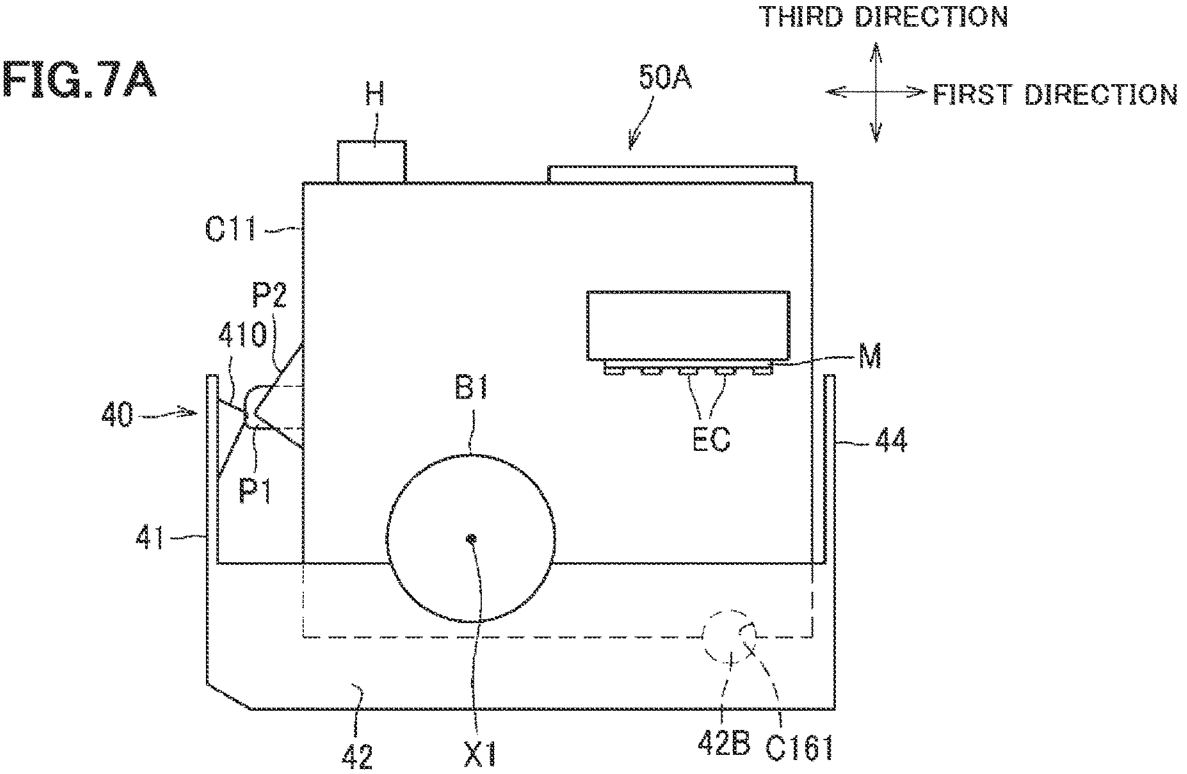
FIG. 7A is an illustration showing the relationship between a first protrusion and a location recess as observed when the first cartridge is positioned in the first position.
Figure 8A:
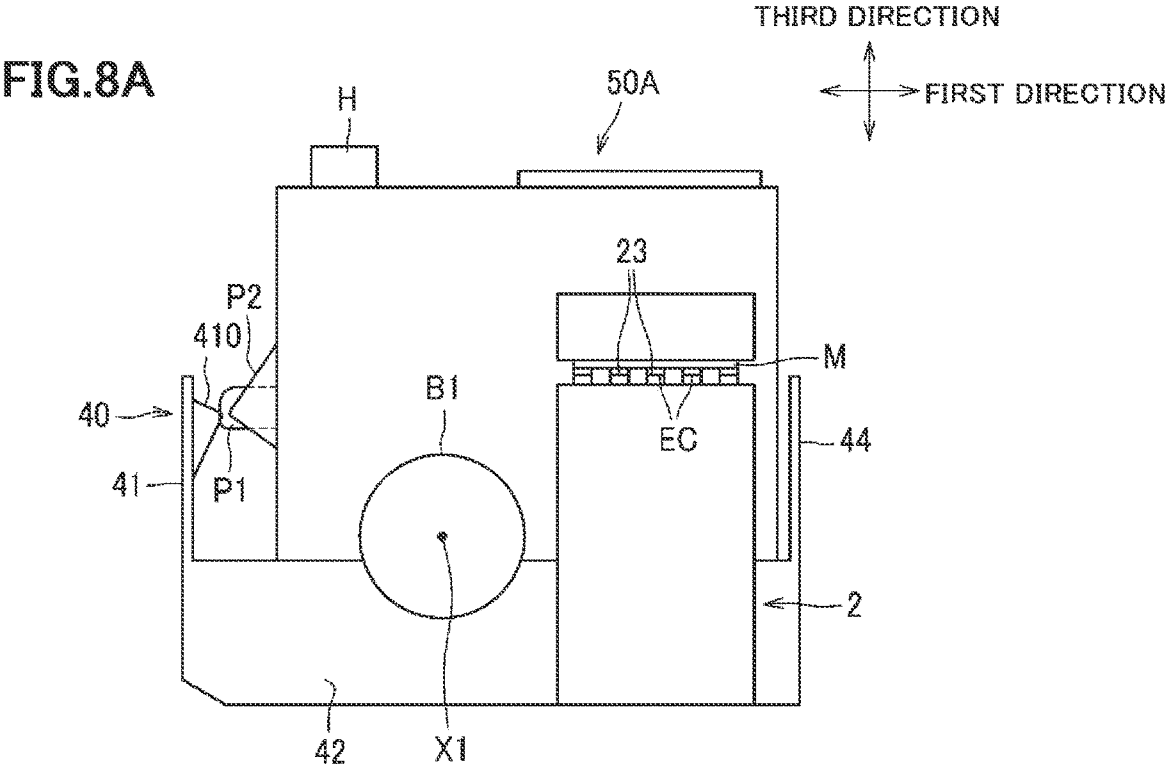
FIG. 8A is an illustration showing the relationship between an electrical contact and a housing contact as observed when the first cartridge is positioned in the first position.
Figure 8B:
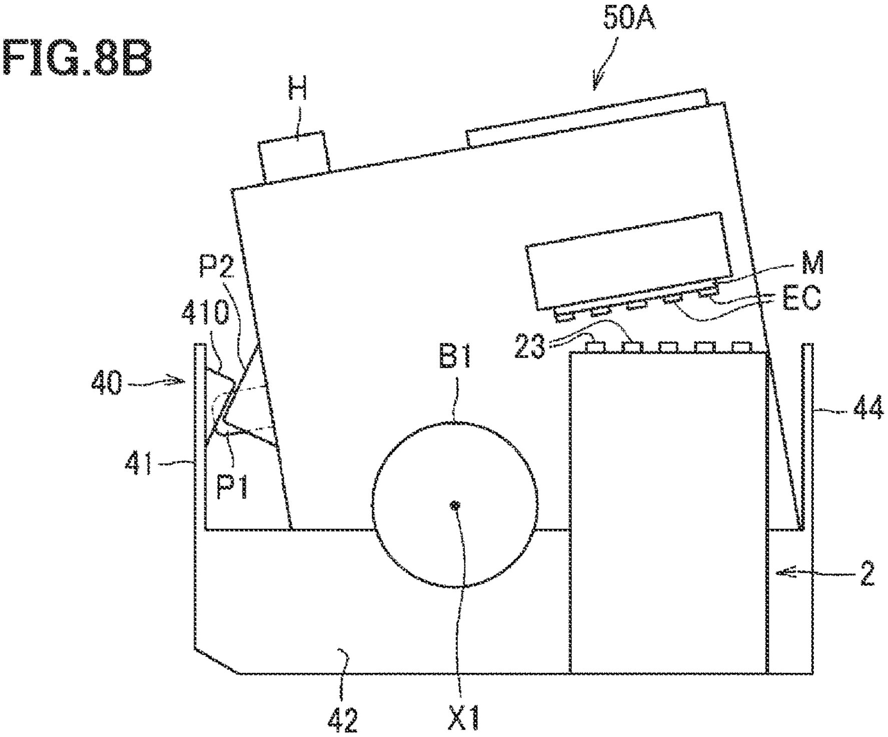
FIG. 8B is an illustration showing the relationship between the electrical contact and the housing contact as observed when the first cartridge is positioned in the second position.

As shown in FIG. 7A, the memory M includes a storage element (not shown) and an electrical contact EC. The electrical contact EC faces downward. As shown in FIGS. 8A and 8B, the main housing 2 comprises a housing contact 23 that contacts the electrical contact EC. The housing contact 23 faces upward.

The electrical contact EC contacts the housing contact 23 when the drawer 40 with the first cartridge 50A installed therein is installed in the main housing 2. The storage element of the memory M may be positioned in contact with the electrical contact EC or apart from the electrical contact EC.

When the first cartridge 50A rotates from the first position shown in FIG. 8A to the second position shown in FIG. 8B, the electrical contact EC moves away from the housing contact 23. When the first cartridge 50A is positioned in the first position, the electrical contact EC contacts the housing contact 23. When the first cartridge 50A is positioned in the second position, the electrical contact EC is positioned apart from the housing contact 23.

The drum axis X1 is positioned between the first side surface C11 and the electrical contact EC in the first direction. Thus, when the first projection P1 and the second projections P2 move downward, the electrical contact EC moves upward. Further, when the first projection P1 and the second projections P2 move upward, the electrical contact EC moves downward.

As shown in FIG. 3A, the drum cartridge C1 includes a second boss B2 formed on the fourth side surface C14. The second boss B2 protrudes from the fourth side surface C14. The second boss B2 is a cylindrical part having a center on the drum axis X1.

Figure 3B:
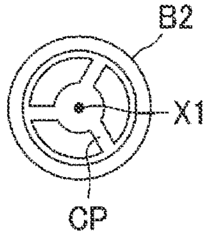
FIG. 3B is an illustration showing a drum coupling positioned inside a second boss.

As shown in FIG. 3B, the drum cartridge C1 includes a drum coupling CP inside the second boss B2. The drum coupling CP is a member for transferring a drive force to the photosensitive drum 51. The drum coupling CP is rotatable about the drum axis X1. The first cartridge 50A is rotatable between the first position and the second position about the drum coupling CP.

Figure 3C:
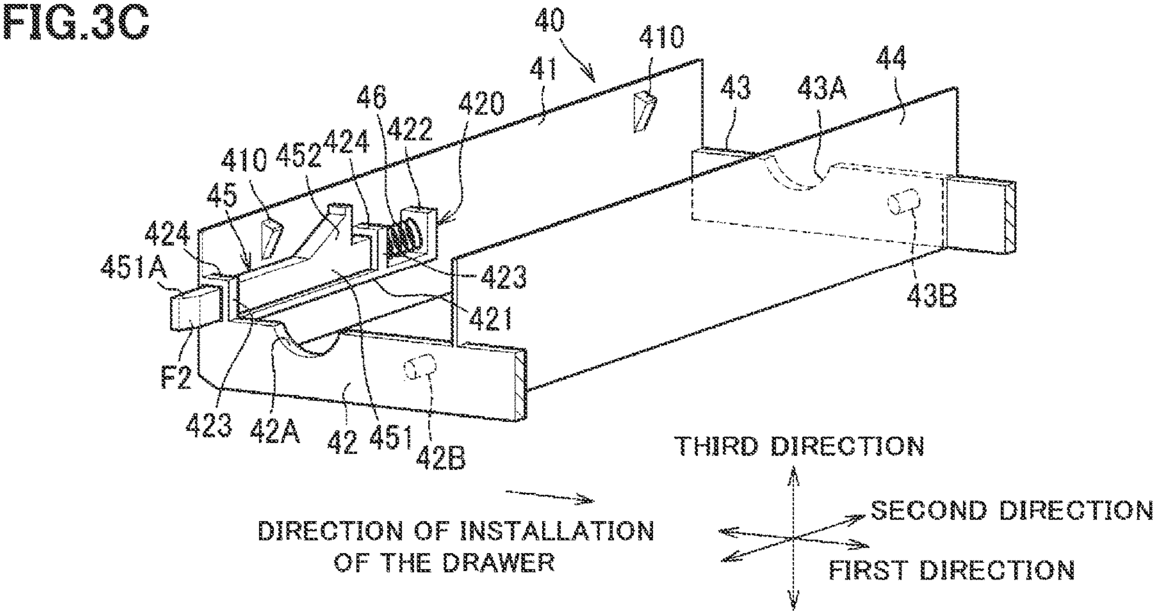
FIG. 3C is a perspective view showing structures of part of the drawer in the vicinity of the first cartridge.

As shown in FIG. 3C, the drawer 40 includes a first wall 41, a second wall 42, a third wall 43, a plurality of fourth walls 44, a lock member 45, and a spring 46. The first wall 41 is positioned upstream of the first cartridge 50A in the direction of installation of the drawer 40.

Each of the plurality of fourth walls 44 is positioned downstream of a corresponding cartridge 50 in the direction of installation of the drawer 40 (see FIG. 2). The second wall 42 connects ends of the first wall 41 and the fourth walls 44 facing in a direction parallel to the second direction. The third wall 43 connects the other ends of the first wall 41 and the fourth walls 44 facing in a direction parallel to the second direction.

The drawer 40 includes a first shaft support 42A and a first protrusion 42B formed on the second wall 42. The drawer 40 includes a second shaft support 43A and a second protrusion 43B formed on the third wall 43.

The first shaft support 42A and the second shaft support 43A are each configured as a concave with an arc-shaped cross section. The first shaft support 42A is positioned on an upper edge of the second wall 42. The second shaft support 43A is positioned on an upper edge of the third wall 43.

As shown in FIGS. 3A and 3C, the first boss B1 of the first cartridge 50A is positioned in the first shaft support 42A. The first boss B1 is rotatable in the first shaft support 42A. The second boss B2 of the first cartridge 50A is positioned in the second shaft support 43A. The second boss B2 is rotatable in the second shaft support 43A.

The first protrusion 42B protrudes from the second wall 42 toward the third wall 43. The second protrusion 43B protrudes from the third wall 43 toward the second wall 42. The first cartridge 50A includes location recesses C161 on the bottom surface C16. One location recess C161 is positioned at one end and another location recess C161 is positioned at the other end of the bottom surface C16 in the second direction.

Figure 7B:
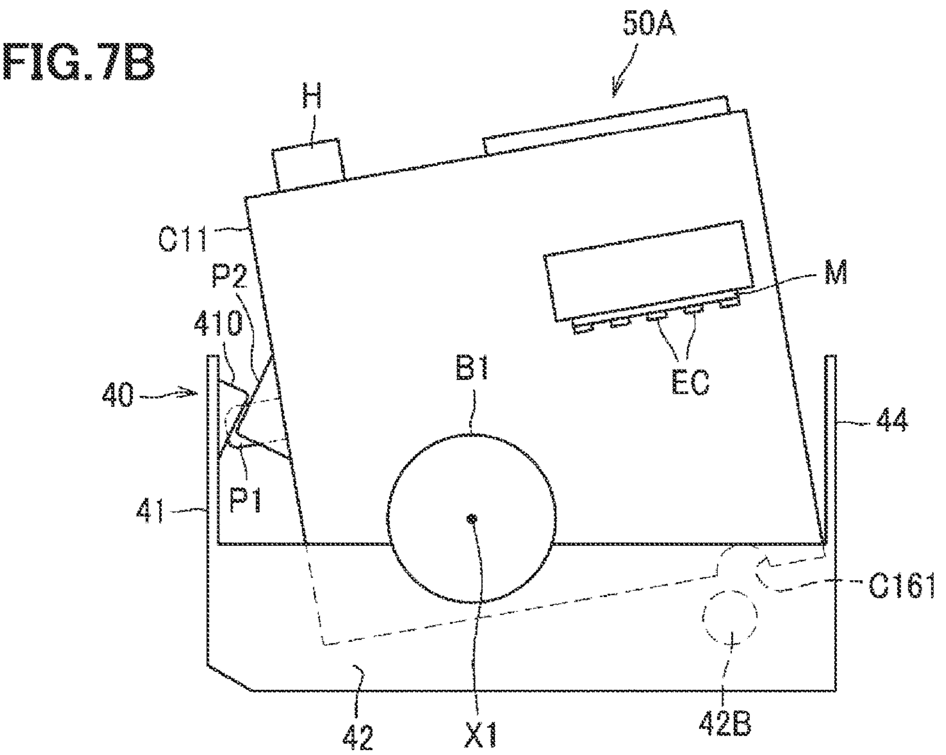
FIG. 7B is an illustration showing the relationship between the first protrusion and the location recess as observed when the first cartridge is positioned in the second position.

As shown in FIG. 7A, when the first cartridge 50A is positioned in the first position, the first protrusion 42B is fitted in the location recess C161. As shown in FIG. 7B, when the first cartridge 50A is positioned in the second position, the location recess C161 is positioned apart from the first protrusion 42B.

As shown in FIG. 5A, when the first cartridge 50A is positioned in the first position, the second protrusion 43B is fitted in the location recess C161. As shown in FIG. 5B, when the first cartridge 50A is positioned in the second position, the location recess C161 is positioned apart from the second protrusion 43B.

The first protrusion 42B and the second protrusion 43B each contact a corresponding location recess C161 to restrain the first cartridge 50A from rotating from the first position farther away from the second position. The first cartridge 50A is thereby kept in the first position by the first protrusion 42B and the second protrusion 43B.

The first protrusion 42B and the second protrusion 43B, each fitted into a corresponding location recess C161, also restrain the first cartridge 50A from moving in the front-back direction. The first cartridge 50A is thereby positioned in place in the front-back direction by the first protrusion 42B, the second protrusion 43B, and the respective location recesses C161.

When the first cartridge 50A is positioned in the second position, the first cartridge 50A contacts the fourth wall 44 of the drawer 40. The fourth wall 44 restrains the first cartridge 50A from rotating from the second position farther away from the first position. The first cartridge 50A is thereby kept in the second position by the fourth wall 44.

As shown in FIG. 3C, the drawer 40 includes two restriction portions 410 and a guide 420 formed on the first wall 41. The restriction portions 410 and the guide 420 protrude from the first wall 41 toward the fourth wall 44.

The restriction portions 410 are parts that restrain the first cartridge 50A positioned in the second position from being separated apart from the drawer 40. The restriction portions 410 are positioned at positions corresponding to the second projections P2 of the first cartridge 50A in the second direction.

As shown in FIG. 7A, when the first cartridge 50A is positioned in the first position, the second projections P2 do not overlap the restriction portions 410 as viewed from a direction parallel to the third direction. As shown in FIG. 7B, when the first cartridge 50A is positioned in the second position, the second projections P2 overlap the restriction portions 410 as viewed from a direction parallel to the third direction. Specifically, when the first cartridge 50A is positioned in the second position, the second projections P2 are positioned under the restriction portions 410. Thus, the first cartridge 50A is restrained from being pulled out when the first cartridge 50A is positioned in the second position.

As shown in FIG. 3C, the guide 420 is a part that guides the lock member 45 in such a manner that the lock member 45 is movable in directions parallel to the second direction. The guide 420 includes a first part 421, a second part 422, two third parts 423, and two fourth parts 424. The first part 421 is in contact with the bottom surface of the lock member 45. The first part 421 extends from the second wall 42 toward the third wall 43.

The second part 422 is positioned at an end of the first part 421 facing toward the third wall 43. The second part 422 protrudes upward from the first part 421.

One of the two third parts 423 extends upward from the second wall 42. The other of the third parts 423 extends upward from the first part 421. The lock member 45 is sandwiched between each of the third parts 423 and the first wall 41. The lock member 45 is thereby restrained from moving in directions parallel to the first direction.

The fourth parts 424 each extend from a corresponding third part 423 toward the first wall 41 and are connected to the first wall 41. The lock member 45 is sandwiched between one of the two fourth parts 424 and the second wall 42, and between the other of the fourth parts 424 and the first part 421. The lock member 45 is thereby restrained from moving in directions parallel to the third direction.

The lock member 45 comprises a base 451 and a protuberance 452. The base 451 is a portion elongated in the second direction. The base 451 is positioned between the first wall 41 and each third part 423 which are positioned apart from each other in the first direction. The base 451 is positioned between one of the fourth parts 424 and the second wall 42 and between the other of the fourth parts 424 and the first portion 421 which are positioned apart from each other in the third direction.

The base 451 has an end portion 451A. The end portion 451A protrudes outward from a side surface of the drawer 40. Specifically, the end portion 451A protrudes in a direction parallel to the second direction, away from the third wall 43 beyond the second wall 42.

The protuberance 452 protrudes upward from the base 451. The protuberance 452 is positioned between the two fourth parts 424 which are positioned apart from each other in the second direction.

Figure 4A:
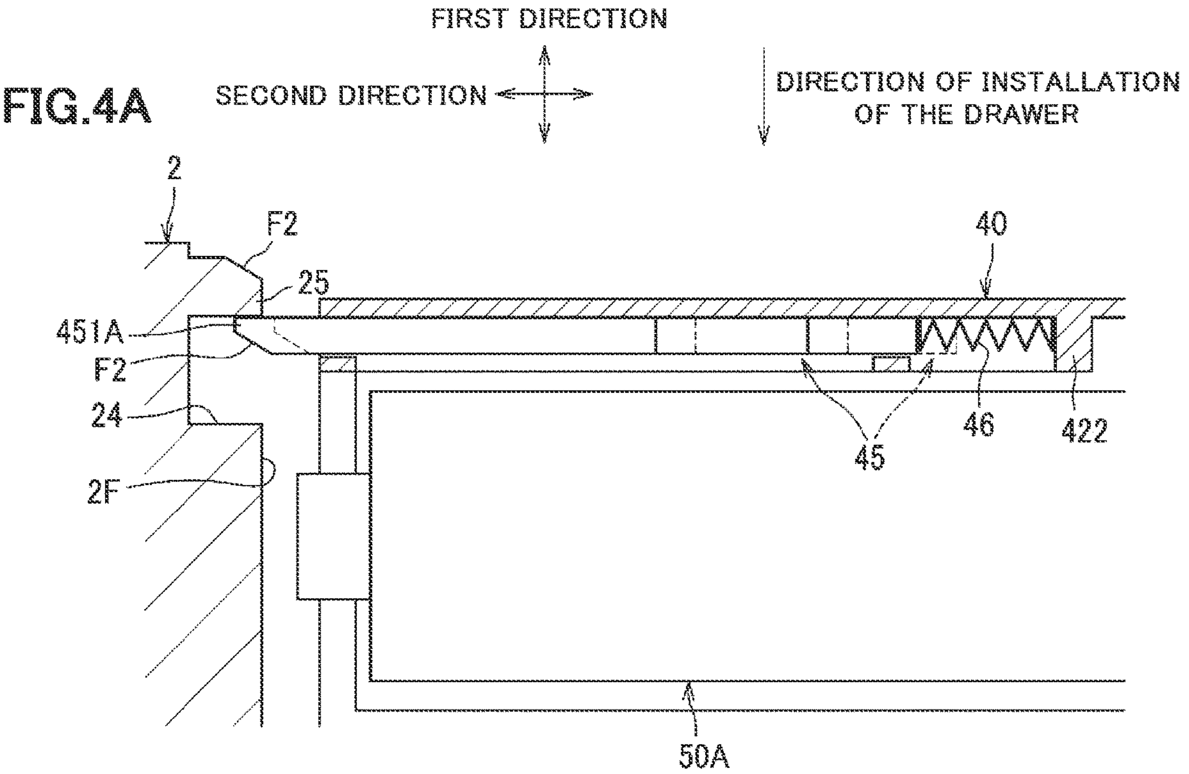
FIG. 4A is an illustration showing the relationship between a lock member and a recess of the main housing.

As shown in FIG. 4A, the lock member 45 is movable between a lock position shown by a solid line and an unlock position shown by a dashed line. The lock position is a position in which the drawer 40 is locked to the main housing 2. The unlock position is a position in which the drawer 40 is unlocked from the main housing 2.

The spring 46 biases the lock member 45 from the unlock position toward the lock position. The spring 46 is a helical compression spring. The spring 46 is positioned between the second part 422 and the lock member 45 which are positioned apart from each other in the second direction.

The main housing 2 includes a recess 24 and a housing contact portion 25. The recess 24 is a part in which the end portion 451A of the lock member 45 is positioned when the drawer 40 is positioned in the inside position and the lock member 45 is positioned in the lock position. The recess 24 is positioned on an inner surface 2F of the main housing 2 facing in a direction parallel to the second direction.

If there is a situation that forces the drawer 40 with the end portion 451A positioned in the recess 24 to move from the inside position to the outside position, the end portion 451A contacts an inner surface of the recess 24. Thus, the drawer 40 positioned in the inside position is restrained from moving to the outside position by the contact of the end portion 451A with the recess 24 and.

Figure 4B:
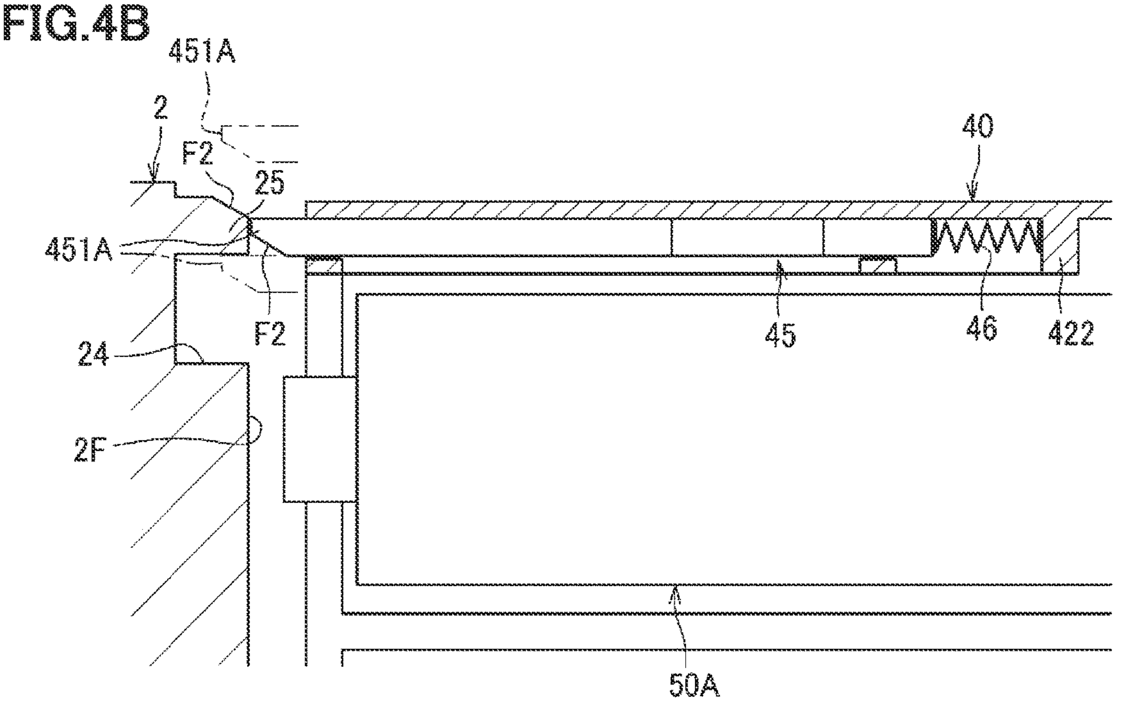
FIG. 4B is an illustration showing movement of the lock member made when the drawer is moved from the outside position to the inside position.

As shown in FIG. 4B, the housing contact portion 25 is a part of the main housing 2 contactable with the end portion 451A of the lock member 45 positioned in the lock position, in the process of the drawer 40 being moved from the outside position to the inside position. The housing contact portion 25 is positioned upstream of the recess 24 in the direction of installation of the drawer 40.

The housing contact portion 25 and the end portion 451A each have a second cam surface F2. Each of the second cam surfaces F2 is inclined with respect to the first direction. Specifically, each of the second cam surfaces F2 is inclined in such a manner that the further downstream in the direction of installation of the drawer, the closer to the first cartridge 50A the second cam surfaces F2 are positioned in the second direction. Thus, the second cam surfaces F2 contact each other in the process of the drawer 40 being moved from the outside position to the inside position, and cause the lock member 45 to move from the lock position to the unlock position against a biasing force of the spring 46.

Figure 6A:
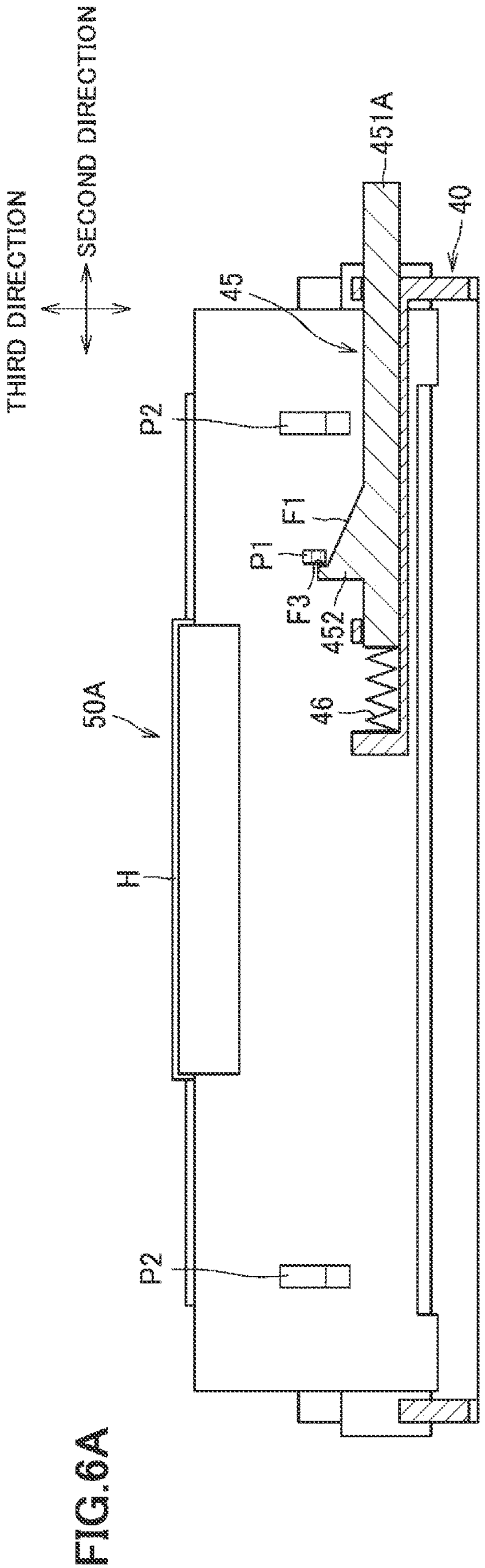
FIG. 6A is an illustration showing the relationship between a first projection and a first cam surface as observed when the first cartridge is positioned in the first position.
Figure 6B:
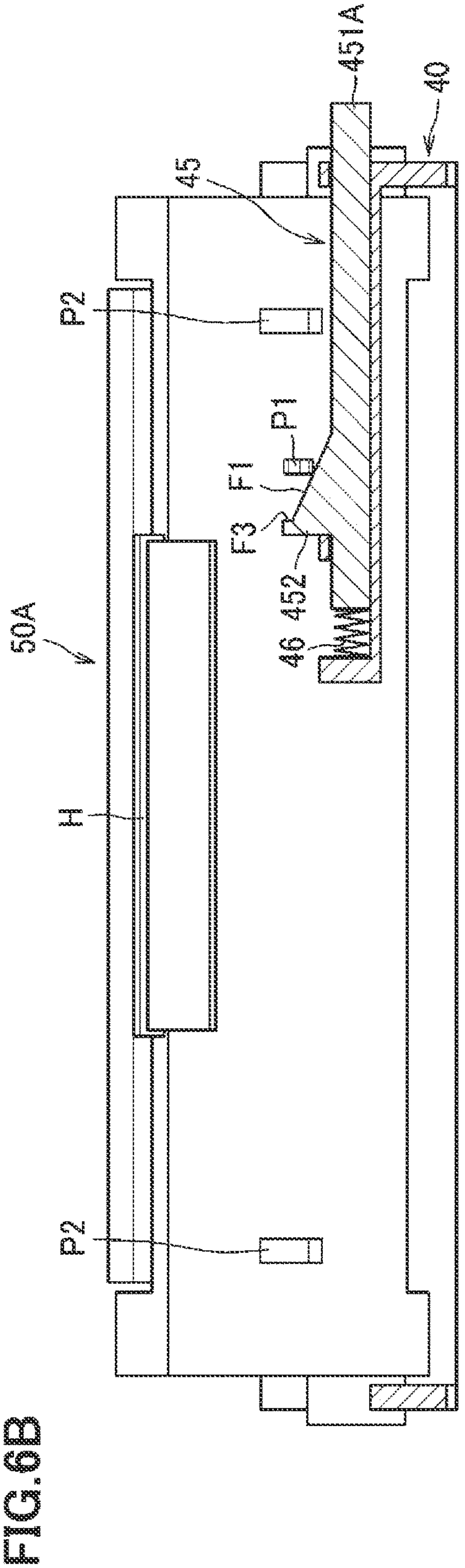
FIG. 6B is an illustration showing the relationship between the first projection and the first cam surface as observed when the first cartridge is positioned in the second position.

As shown in FIGS. 6A and 6B, the protuberance 452 of the lock member 45 has a first cam surface F1 and a contact surface F3. The first cam surface F1 is a surface of the lock member 45 that contacts the first projection P1 of the first cartridge 50A. The first cam surface F1 is inclined with respect to the third direction. Specifically, the first cam surface F1 is inclined in such a manner that the closer to the end portion 451A in the second direction, the farther from the first projection P1 the first cam surface is positioned in the third direction.

When the first cartridge 50A is positioned in the first position shown in FIG. 6A, the first projection P1 is positioned apart from the first cam surface F1. When the first cartridge 50A is rotated from the first position to the second position shown in FIG. 6B, the first projection P1 contacts the first cam surface F1 and pushes the first cam surface F1 against the biasing force of the spring 46. Thus, the first projection P1 can move the lock member 45 from the lock position shown in FIG. 6A to the unlock position shown in FIG. 6B.

The contact surface F3 is a surface that contacts the first projection P1 in the second direction when the first cartridge 50A is positioned in the first position shown in FIG. 6A. The lock member 45 is held in the lock position by the contact of the first projection P1 with the contact surface F3 and.

With the first cartridge 50A and the lock member 45 configured as described above, when the first cartridge 50A is positioned in the first position, as shown in FIG. 6A, the lock member 45 is positioned in the lock position. When the first cartridge 50A is positioned in the second position, as shown in FIG. 6B, the lock member 45 is positioned in the unlock position.

Although the second cartridge 50B is different from the first cartridge 50A in that it does not comprise the first projection P1 and the second projections P2, the other structures thereof are approximately the same as those of the first cartridge 50A. Further, the second cartridge 50B is configured not to rotate relative to the drawer 40. The structure for restraining the second cartridge 50B from rotating relative to the drawer 40 may be any kind of structure. For example, the two fourth walls 44 positioned at each side of the second cartridge 50B may include a guide for guiding the second cartridge 50B in the third direction.

Next, a procedure for replacing a cartridge 50 will be described.

When removing a used cartridge 50 from the main housing 2, a user first opens the front cover 21 as shown in FIG. 9A. Then, the user grasps the handle H of the first cartridge 50A. Since a recessed portion A2 is formed in the opening 2A as shown in FIG. 9B, the user can put his/her finger(s) into the recessed portion A2 and easily grasp the handle H Thereafter, the user rotates the first cartridge 50A from the first position to the second position, as shown in FIGS. 5A and 5B. The first projection P1 of the first cartridge 50A thereby pushes the first cam surface F1 of the lock member 45 to move the lock member 45 from the lock position to the unlock position, as shown in FIGS. 6A and 6B.

When the lock member 45 is positioned in the unlock position, the end portion 451A of the lock member 45 is positioned outside the recess 24 as shown in FIG. 4A by a dashed line, and the drawer 40 is unlocked from the main housing 2. As a result, the user can move the drawer 40 from the inside position to the outside position by pulling the handle toward the front while keeping first cartridge 50A in the second position.

Thereafter, in order to remove the first cartridge 50A from the drawer 40, the user rotates the first cartridge 50A from the second position to the first position and then pulls out the first cartridge 50A upward. In order to remove the second cartridge 50B from the drawer 40, the user simply pulls out the second cartridge 50B upward. Used cartridges 50 can be removed from the main housing 2 according to the above steps.

It is to be noted that the procedure to rotate the first cartridge 50A from the second position to the first position is different depending on the biasing force of the spring 46. For example, if the biasing force of the spring 46 is too small to cause the first cartridge 50A to rotate, the user grasps the handle H and rotates the first cartridge 50A from the second position to the first position. On the other hand, if the biasing force of the spring 46 is large enough to cause the first cartridge 50A to rotate, the user only has to take his/her hand off the handle H. That is, when the user takes his/her hand off the handle H, the lock member 45 moves toward the lock position by the biasing force of the spring 46, and the first cam surface F1 pushes the first projection P1 upward causing the first cartridge 50A to rotate from the second position to the first position.

When a new cartridge 50 is installed in the main housing 2, the user first installs the new cartridge 50 in the drawer 40 positioned in the outside position. Then, the user pushes, for example, the first wall 41 of the drawer 40 toward the inside position to move the drawer 40 from the outside position to the inside position.

In the process of the drawer 40 being moved from the outside position to the inside position, the second cam surface F2 of the lock member 45 positioned in the lock position contacts the second cam surface F2 of the housing contact portion 25, as shown in FIG. 4B. The lock member 45 which receives a counterforce from the second cam surface F2 of the housing contact portion 25 thereby moves from the lock position to the unlock position.

Thereafter, when the end portion 451A of the lock member 45 reaches the recess 24 of the main housing 2, the lock member 45 moves to the lock position and into the recess 24 by the biasing force of the spring 46. The drawer 40 is thereby locked to the main housing 2. A new cartridge 50 can be installed in the main housing 2 according to the above steps.

According to the above-described example, the following advantageous effects can be obtained.

Since the drawer 40 can be unlocked from the main housing 2 by rotating the first cartridge 50A, it is not necessary to provide a handle for releasing the lock of the drawer. Thus, the multicolor printer 1 can be downsized in the first direction which is the direction in which the drawer 40 moves.

Since the electrical contact EC moves away from the housing contact 23 when the first cartridge 50A rotates from the first position to the second position, the housing contact 23 can be restrained from obstructing the rotation of the first cartridge 50A from the first position to the second position.

Since the handle H of the first cartridge 50A is accessible through the opening 2A, the user can easily grasp the handle H of the first cartridge 50A.

Since the first projection P1 contacts the first cam surface F1 and thereby moves the lock member 45 from the lock position to the unlock position, the structure for unlocking the drawer 40 can be configured to have a simple structure.

Since the spring 46 biases the lock member 45 from the unlock position to the lock position, the lock member 45 can be moved by the spring 46 from the unlock position to the lock position when the first cartridge 50A is rotated from the second position to the first position.

Since the housing contact portion 25 and the end portion 451A each have a second cam surface F2, the lock member 45 can be moved from the lock position to the unlock position by the interaction of the second cam surfaces F2 even if the cartridge 50A is not rotated by the user. Therefore, the end portion 451A of the lock member 45 positioned in the lock position can be restrained from being caught on the housing contact portion 25 when the drawer 40 is moved from the outside position to the inside position.

Since the second projection P2 overlaps the restriction portion 410 as viewed from a direction parallel to the third direction when the first cartridge 50A is positioned in the second position, the first cartridge 50A positioned in the second position can be restrained from becoming accidentally detached from the drawer 40.

While the first example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the following description, members with structures approximately the same as the above-described first example will be identified by the same reference characters and explanation thereof will be omitted.

Figure 10A:
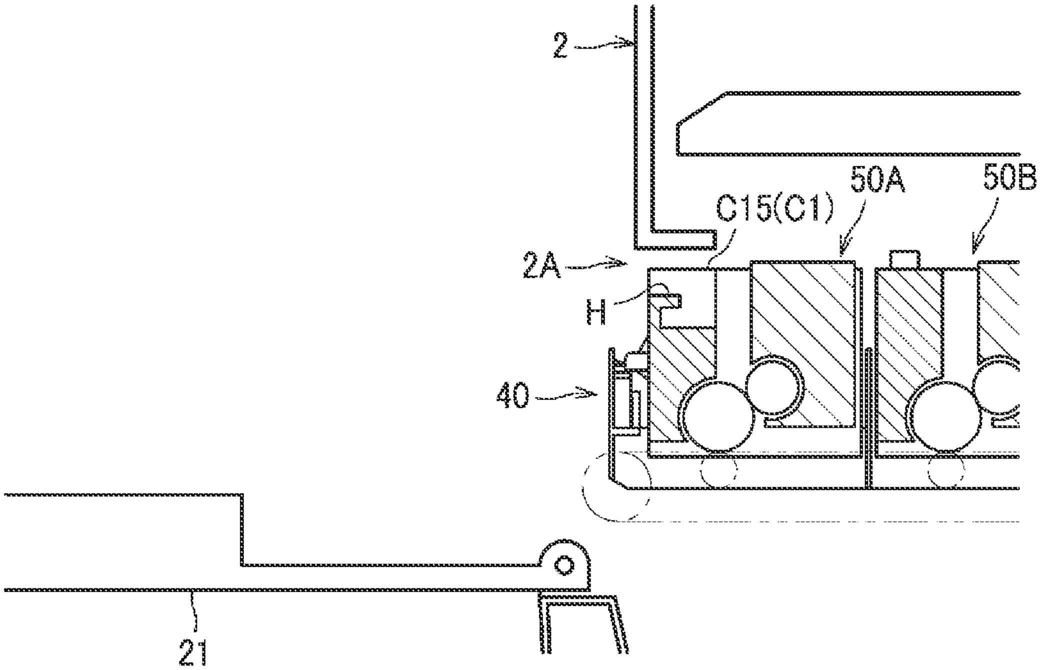
FIG. 10A is an illustration showing a first modification of the handle.

The configuration of the handle is not limited to that described in the first example. For example, as shown in FIG. 10A, the handle H may be positioned at a position lower than the upper surface C15 of the drum cartridge C1. In this configuration, a space for allowing a user's finger(s) to be inserted therein can be formed between the handle H and the upper surface C15 of the drum cartridge C1. In this configuration, it is not necessary to form a recessed portion on the upper end of the opening 2A.

Figure 10B:
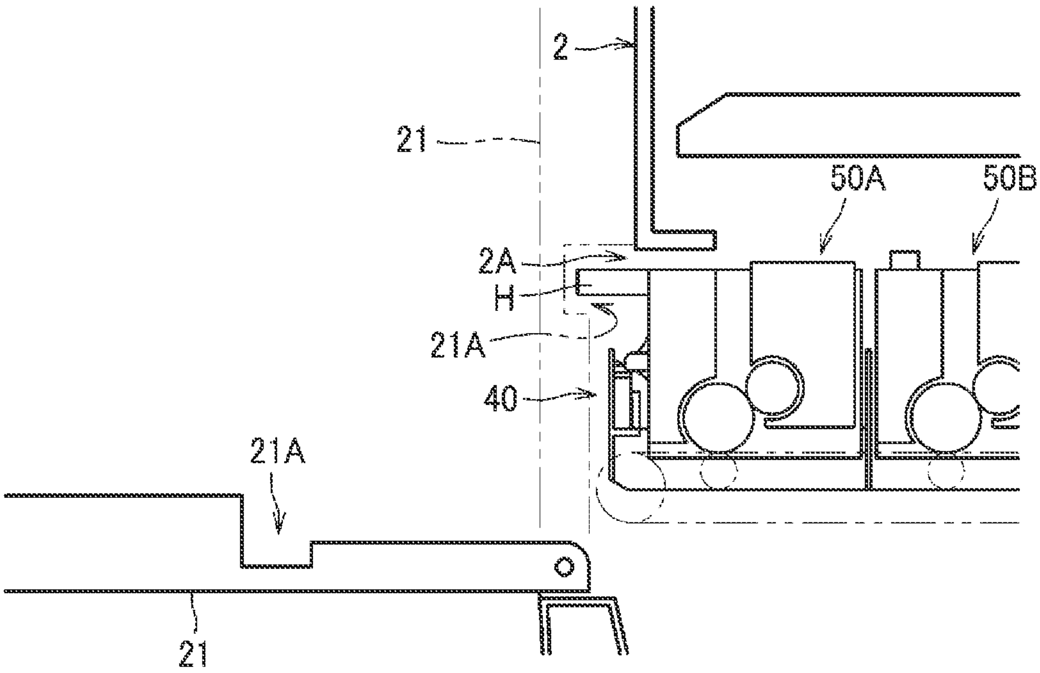
FIG. 10B is an illustration showing a second modification of the handle.

As shown in FIG. 10B, the handle H may protrude from the first cartridge 50A to an outside of the opening 2A in the first direction in a state where the drawer 40 with the first cartridge 50A installed therein is positioned at the inside position. In this configuration, the front cover 21 may have a recess 21A in which the handle H is positioned. Although the handle H protrudes outward beyond the opening 2A in this configuration, the handle may be positioned inside the opening 2A.

Figure 11A:
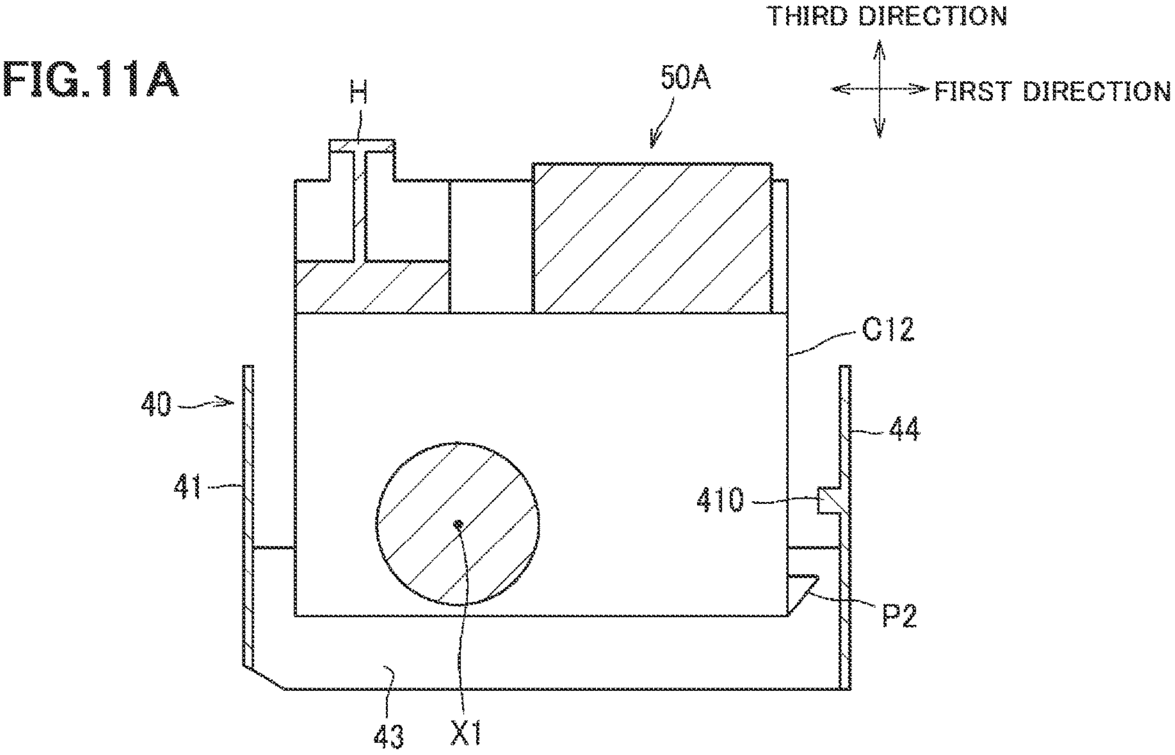
FIG. 11A is an illustration showing an alternative configuration modified in locations of a restriction portion and a second projection as observed when the first cartridge is positioned in the first position.
Figure 11B:
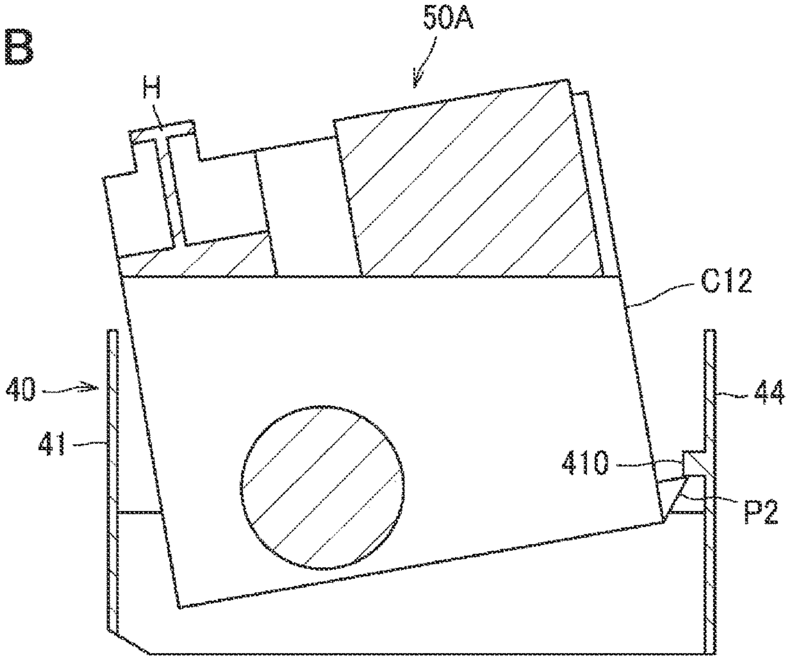
FIG. 11B is an illustration showing the alternative configuration of FIG. 11A as observed when the first cartridge is positioned in the second position.

The locations of the restriction portions 410 and the second projections P2 are not limited to those shown in the first example. For example, as shown in FIGS. 11A and 11B, a restriction portion 410 and a second projection P2 may be positioned downstream of the first cartridge 50A in the direction of installation of the drawer 40. Specifically, the restriction portion 410 may be formed on the fourth wall 44 of the drawer 40 and the second projection P2 may be formed on the second side surface C12 of the first cartridge 50A.

Although the second cam surfaces F2 are formed on both of the housing contact portion 25 and the end portion 451 in the first example, the second cam surface F2 may to be formed on at least one of the housing contact portion and the end portion.

The spring is not limited to the spring 46 of the first example, but may be, for example, a leaf spring, a wire spring, or other types of springs.

Although a multicolor printer 1 is given as the first but non-limiting example of an image forming apparatus, the image forming apparatus may, for example, be a monochrome printer, a copy machine, a multifunction printer, etc.

The cartridge may not necessarily be comprised of the first cartridge 50A of the first example which comprises the drum cartridge C1 and the development cartridge C2. For example, if a photosensitive drum is nonremovably provided on the drawer and a development cartridge is installable into and removable from the drawer, the cartridge may be comprised of the development cartridge.

Although the end portion 451A which is a part of the lock member 45 is configured to be positioned in the recess 24 or apart from the recess 24 in the second direction in the first example, the lock member may be configured such that the entire lock member is positioned in a recess or apart from the recess in the second direction.

The second example of the present disclosure will be described in detail referring to the drawings where appropriate. In the following description, a direction in which a drawer 1100 moves between a position inside a main housing 1010 and a position outside the main housing 1010 is referred to as "first direction". A direction in which an axis of a development roller 1042 is oriented is referred to as "second direction". The first direction is nonparallel to the second direction. Preferably, but not necessarily, the first direction is perpendicular to the second direction. A direction in which a cartridge 1020 is installed into or removed from the drawer 1100 is referred to as "third direction". The third direction is nonparallel to the second direction and to the first direction. Preferably, but not necessarily, the third direction is perpendicular to the second direction and to the first direction. The terms above and below (upward and downward) will also be used as appropriate with respect to the third direction. For example, as shown in FIG. 13, an exposure unit SU1 is positioned above the drawer 1100, and an intermediate transfer belt 1073 is positioned below the drawer 1100 in the third direction.

Figure 12:
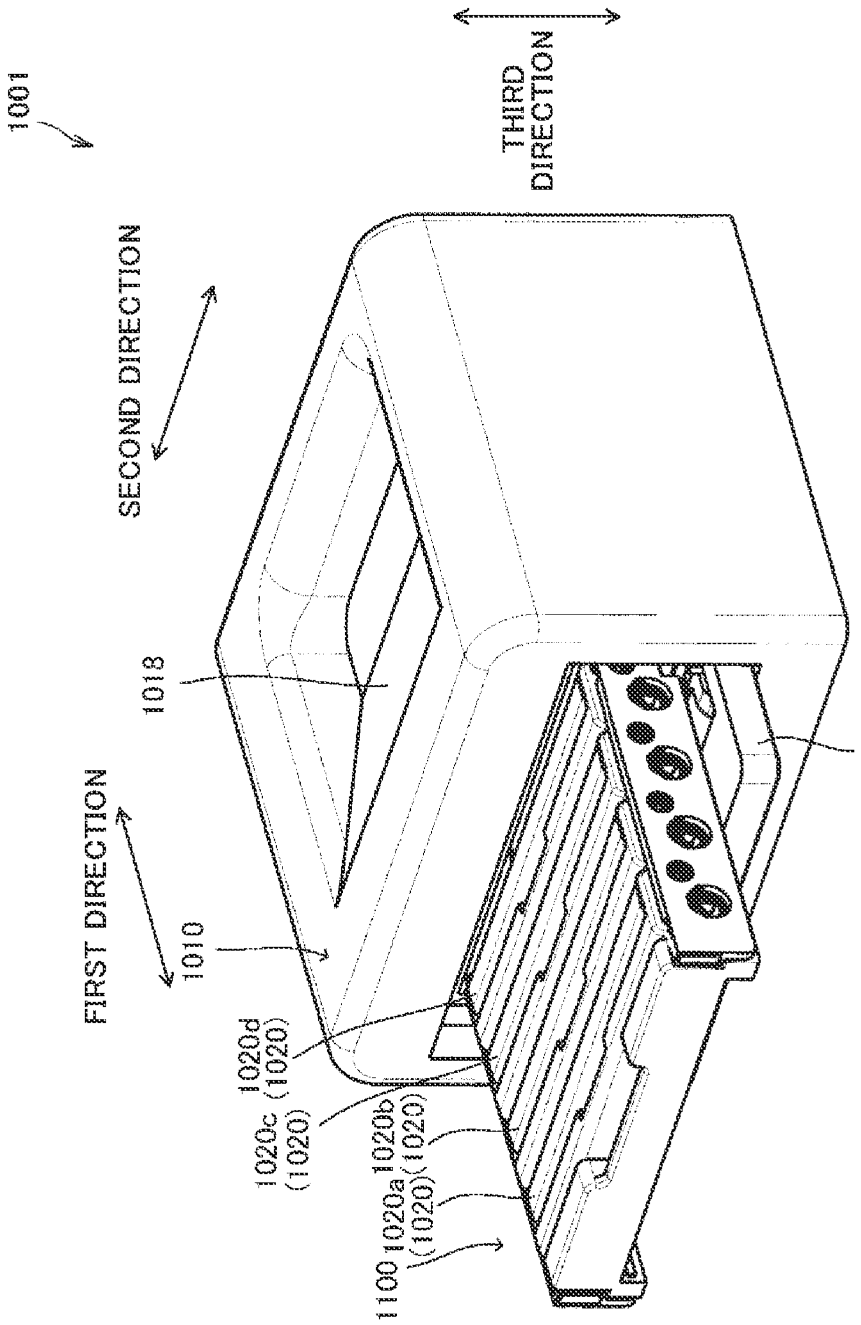
FIG. 12 is a perspective view of an image forming apparatus according to a second example.
Figure 13:
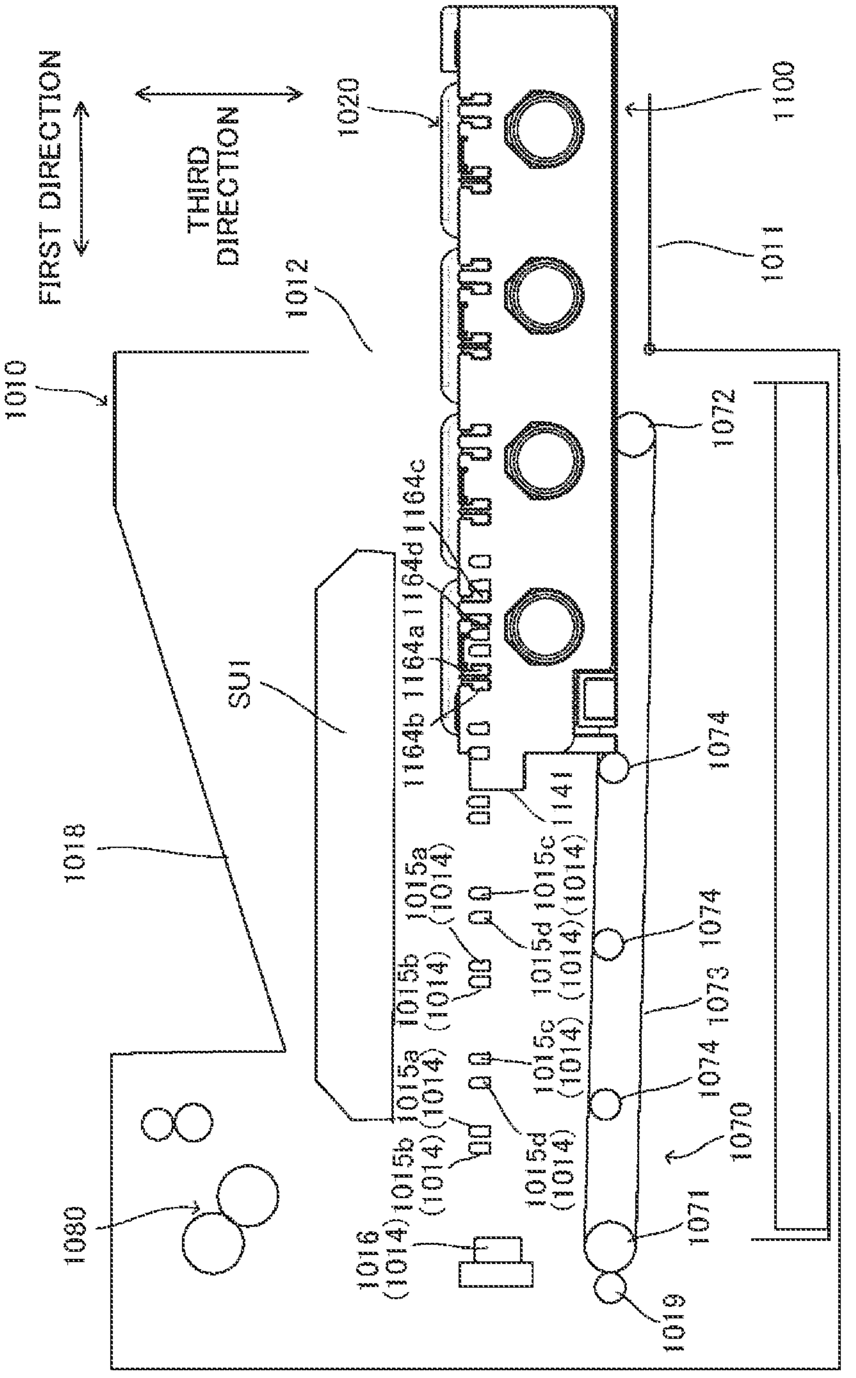
FIG. 13 is a schematic view of the image forming apparatus.

As shown in FIGS. 12, 13 and 14, an image forming apparatus 1001 comprises a main housing 1010, a transfer device 1070, and a drawer 1100.

The main housing 1010 has an opening 1012 and comprises a cover 1011, a lever 1013, and a housing electrode 1014. The cover 1011 is positioned at one end of the main housing 1010 facing in a direction parallel to the first direction. The cover 1011 is movable between a close position in which the opening 1012 is closed and an open position in which the opening 1012 is uncovered.

The lever 1013 is positioned at the other end of the main housing 1010 facing in a direction parallel to the first direction (i.e., opposite to the direction in which the one end of the main housing 1010 faces). The lever 1013 is positioned under the drawer 1100. The lever 1013 is rotatable about a lever axis X13 oriented in the second direction.

The housing electrode 1014 is electrically connected to cartridge electrodes 1033 of the cartridges 1020 via an intermediary electrode 1160, which will be described later, of the drawer 1100. The housing electrode 1014 includes a process housing electrode 1015 and a memory housing electrode 1016.

The process housing electrode 1015 is positioned inside the main housing 1010. The process housing electrode 1015 is positioned at one end of the main housing 1010 closer to one side of the main housing 1010 facing in a direction parallel to the second direction. In other words, when the drawer 1100 is installed, the process housing electrode 1015 is positioned at the same end of the main housing 1010 as that at which the intermediary electrode 1160 of the drawer 1100 is positioned.

The memory housing electrode 1016 is positioned inside the main housing 1010. The memory housing electrode 1016 is positioned at one end of the main housing 1010 closer to one side of the main housing 1010 facing in a direction parallel to the first direction. In other words, when the drawer 1100 is installed in the main housing 1010, the memory housing electrode 1016 is positioned at the same end of the main housing 1010 as that at which a connector 1141 of the drawer 1100 is positioned.

The transfer device 1070 is positioned below the drawer 1100 in the third direction. In other words, the transfer device 1070 is positioned at a side of the drawer 1100 opposite to a side on which an upper surface 1018 of the main housing 1010 is positioned in the third direction. The transfer device 1070 comprises a drive roller 1071, a follower roller 1072, an intermediate transfer belt 1073, and a plurality of primary transfer rollers 1074. The drive roller 1071 is positioned apart from the follower roller 1072 in the first direction. The intermediate transfer belt 1073 is an endless belt. The drive roller 1071 and the follower roller 1072 contact an inner surface of the intermediate transfer belt 1073. The intermediate transfer belt 1073 is looped around and stretched between the drive roller 1071 and the follower roller 1072. The primary transfer rollers 1074 are positioned to face an inner surface of the intermediate transfer belt 1073. The intermediate transfer belt 1073 is sandwiched between each of the primary transfer rollers 1074 and a corresponding photosensitive drum 1032 which will be described later. In this example, four primary transfer rollers 1074 are included in the transfer device 1070. However, one to three, or more than five primary transfer rollers 1074 may be included as long as the number of the primary transfer rollers 1074 is the same as that of the photosensitive drums 1032 which will be described later.

The drawer 1100 is movable in directions parallel to the first direction between a position inside the main housing 1010 and a position outside the main housing 1010. In FIG. 12, the drawer 1100 is positioned outside the main housing 1010. Each of a plurality of cartridges 1020 is individually installable into and removable from the drawer 1100. The plurality of cartridges 1020 installed in the drawer 1100 is installable into the main housing 1010 together with the drawer 1100. Each cartridge 1020 comprises a cartridge housing 1031, a photosensitive drum 1032, an IC chip 1036, a charge roller 1035, a development housing 1041, a development roller 1042, and a supply roller 1045. The cartridges 1020 installed in the drawer 1100 are aligned and spaced apart from one another in the first direction.

Each cartridge 1020 contains toner of a color different from colors of toner contained in the other cartridges 1020 (for example, cyan, magenta, yellow, and black). The number of cartridges 1020 installed in the drawer 1100 of the present example is four. More specifically, the cartridges 1020 include a first cartridge 1020*a*, a second cartridge 1020*b*, a third cartridge 1020*c*, and a fourth cartridge 1020*d*. The first cartridge 1020*a* comprises a first photosensitive drum 1032*a* and a first development roller 1042*a*. The second cartridge 1020*b* comprises a second photosensitive drum 1032*b* and a second development roller 1042*b*. The third cartridge 1020*c* comprises a third photosensitive drum 1032*c* and a third development roller 1042*c*. The fourth cartridge 1020*d* comprises a fourth photosensitive drum 1032*d* and a fourth development roller 1042*d*. However, the drawer 1100 may be configured to allow one to three, or more than five cartridges 1020 to be installed therein.

The image forming apparatus 1001 forms images according to the following processes.

As shown in FIG. 15, the image forming apparatus 1001 charges a surface of the photosensitive drum 1032 by applying a charge voltage to the charge roller 1035 while rotating the charge roller 1035 in contact with the photosensitive drum 1032. Next, the image forming apparatus 1001 exposes the surface of the photosensitive drum 1032 to light by the exposure unit SU1 (see FIG. 13) to form an electrostatic latent image on the surface of the photosensitive drum 1032. At the same time, the image forming apparatus 1001 applies a supply voltage to the supply roller 1045 and supplies toner contained in the development housing 1041 via the supply roller 1045 to the development roller 1042. Application of a development voltage to the development roller 1042 causes the toner on the development roller 1042 to adhere to the exposed portions on the surface of the photosensitive drum 1032 to form a toner image on the surface of the photosensitive drum 1032. Then, the intermediate transfer belt 1073 is sandwiched between the surface of the photosensitive drum 1032 with the toner image thereon and a corresponding primary transfer roller 1074 to thereby transfer the toner image onto the intermediate transfer belt 1073. The toner image transferred on the intermediate transfer belt 1073 is conveyed toward the drive roller 1071 and transferred onto a sheet by sandwiching the sheet between the intermediate transfer belt 1073 supported by the drive roller 1071 and a secondary transfer roller 1019 of the main housing 1010. The toner image transferred on the sheet is fixed on the sheet by a fixing device 1080 provided in the main housing 1010, and the sheet with the toner image fixed thereon is ejected onto the upper surface 1018 of the main housing 1010.

As shown in FIGS. 15, 16, and 17, each cartridge 1020 comprises a first unit 1030 and a second unit 1040.

The first unit 1030 comprises a cartridge housing 1031, a photosensitive drum 1032, a drum coupling 1032*a*, a cartridge electrode 1033, a charge roller 1035, and an IC chip 1036.

The cartridge housing 1031 is made of insulating plastic. The cartridge housing 1031 supports the photosensitive drum 1032 in a manner that allows the photosensitive drum 1032 to rotate. The cartridge housing 1031 comprises a first boss 1031*a*, a second boss 1031*b*, and a third boss 1031*c*. One end of the photosensitive drum 1032 facing in a direction parallel to the second direction is rotatably supported by the first boss 1031*a*. The other end of the photosensitive drum 1032 facing in a direction parallel to the second direction (i.e., opposite to the direction in which the one end of the photosensitive drum 1032 faces) is rotatably supported by the second boss 1031*b*. A development coupling 1040*a* of the second unit 1040 which will be described later is rotatably supported by the third boss 1031*c*. The first boss 1031*a* protrudes from one end of the cartridge housing 1031 facing in a direction parallel to the second direction. The second boss 1031*b* protrudes from the other end of the cartridge housing 1031 facing in a direction parallel to the second direction (i.e., opposite to the direction in which the one end of the cartridge housing 1031 faces). The third boss 1031*c* protrudes from the other end of the cartridge housing 1031 facing in a direction parallel to the second direction.

The second unit 1040 is supported by the cartridge housing 1031 to rotate relative to the first unit 1030 about a rotation axis oriented in the second direction.

The photosensitive drum 1032 is rotatable about a drum axis X11 oriented in the second direction. The photosensitive drum 1032 comprises a metal tube and a photosensitive layer applied to the surface of the tube. The tube is electrically connected to a drum grounding terminal 1034*c* which will be described later. Thus, when the photosensitive layer is charged, a potential difference develops between the surface of the photosensitive layer and the tube, whereby an electric field is generated.

The drum coupling 1032*a* is positioned at the other end of the photosensitive drum 1032 facing in a direction parallel to the second direction. The photosensitive drum 1032 receives a rotational force from the main housing 1010 via the drum coupling 1032 and rotates.

The cartridge electrode 1033 is positioned at the one end of the cartridge housing 1031 facing in a direction parallel to the second direction. The cartridge electrode 1033 comprises a process electrode 1034 and an IC chip 1036. The cartridge electrode 1033 is electrically connected to the intermediary electrode 1160 which will be described later, and is electrically connected to the main housing 1010 via the intermediary electrode 1160.

The process electrode 1034 comprises a development electrode 1034*a*, a supply electrode 1034*b*, a drum grounding terminal 1034*c*, and a charge electrode 1034*d*. The development electrode 1034*a* is electrically connected to the development roller 1042. The supply electrode 1034*b* is electrically connected to the supply roller 1045. The drum grounding terminal 1034*c* is electrically connected to the tube of the photosensitive drum 1032. The charge electrode 1034*d* is electrically connected to the charge roller 1035. The process electrode 1034 is exposed to the outside of the cartridge 1020 and is contactable with the intermediary electrode 1160 which will be described later.

The IC chip 1036 comprises a memory (not shown) and a memory electrode 1036*b*. The memory is capable of storing information related to the cartridge 1020. Specifically, the memory is capable of storing information on whether or not the cartridge 1020 is new, information on an amount of used toner, information on the color of toner contained in the cartridge 1020, etc. The memory electrode 1036*b* is electrically connected to the memory. The memory electrode 1036*b* is exposed to the outside of the cartridge 1020 and is contactable with the intermediary electrode 1160 which will be described later.

The second unit 1040 comprises a development coupling 1040*a*, a development housing 1041, a development roller 1042, a cam receiving recess 1043, an agitator 1044, a supply roller 1045, and a compression spring 1021 as an example of an elastic member.

The development coupling 1040*a* is positioned at the other end of the second unit 1040 facing in a direction parallel to the second direction. The development coupling 1040*a* is rotatable about a development coupling axis X12 which is a rotation axis oriented in the second direction. The development coupling 1040*a* receives a rotational force from the main housing 1010 and rotates. The development roller 1042 receives a rotational force from the development coupling 1040*a* via a gear (not shown) and rotates. The agitator 1044 receives a rotational force from the development coupling 1040*a* via a gear (not shown) and rotates. The supply roller 1045 also receives a rotational force from the development coupling 1040*a* via a gear (not shown) and rotates.

The development housing 1041 contains toner. The development housing 1041 is positioned between the one end of the cartridge housing 1031 and the other end of the cartridge housing 1031 facing in directions parallel to the second direction.

The development roller 1042 causes toner supplied to the supply roller 1045 to adhere to the electrostatic latent image on the surface of the photosensitive drum 1032. At this time, a development voltage is applied to the development roller 1042 by the development electrode 1034*a*.

The cam receiving recess 1043 contacts a translation cam 1170, which will be described later, of the drawer 1100. The cam receiving recess 1043 is positioned at the lower end of the second unit 1040. In other words, the cam receiving recess 1043 is positioned at the other end of the second unit 1040 facing in a direction parallel to the third direction. That is, the cartridge 1020 includes the cam receiving recess 1043 on the other end thereof facing in a direction parallel to the third direction.

The agitator 1044 is disposed inside the development housing 1041, and rotates about an agitator axis X14 oriented in the second direction to agitate toner contained in the development housing 1041.

The supply roller 1045 is positioned inside the development housing 1041, and supplies toner to the development roller 1042. At this time, a supply voltage is applied to the supply roller 1045 by the supply electrode 1034*b*.

As shown in FIGS. 22A and 22B, the second unit 1040 is rotatable relative to the first unit 1030 between a contact position in which the development roller 1042 is caused to contact the photosensitive drum 1032, and a separate position in which the development roller 1042 is separated apart from the photosensitive drum 1032. Since the development coupling 1040*a* is supported by the third boss 1031*c*, the second unit 1040 rotates relative to the first unit 1030 about the development coupling axis X12 (see FIG. 17).

The compression spring 1021 is a member that causes the development roller 1042 to be pressed against the photosensitive drum 1032. The compression spring 1021 is positioned at an outer surface of the development housing 1041 and contacts the first unit 1030. The compression spring 1021 pushes the development housing 1041 in such a manner that the development roller 1042 is brought into contact with and pressed against the photosensitive drum 1032. Thus, when an outside force is not applied to the cartridge 1020 (hereinafter referred to as normal conditions) the development roller 1042 is in contact with the photosensitive drum 1032. In other words, under normal conditions, the second unit 1040 is positioned in the contact position.

It is to be understood that even when the second unit 1040 rotates, the electrical connection between the development electrode 1034*a* and an electrode of the development roller 1042 is maintained. Specifically, an area of contact of the development electrode 1034*a* is greater than an area of contact of the electrode of the development roller 1042. Thus, when the second unit 1040 rotates, the electrode of the development roller 1042 moves in sliding contact with the development electrode 1034*a*. The electrical connection between the electrode of the development roller 1042 and the development electrode 1034*a* is thereby maintained even when the second unit 1040 rotates. Further, the electrical connection between the supply electrode 1034*b* and an electrode of the supply roller 1045 is maintained even when the second unit 1040 rotates. Specifically, an area of contact of the supply electrode 1034*b* is greater than an area of contact of the electrode of the supply roller 1045. Thus, when the second unit 1040 rotates, the electrode of the supply roller 1045 moves in sliding contact with the supply electrode 1034*b*. The electrical connection between the electrode of the supply roller 1045 and the supply electrode 1034*b* is thereby maintained even when the second unit 1040 rotates.

As shown in FIGS. 18, 19, and 20, the drawer 1100 comprises a first side frame 1110, a second side frame 1120, a latch 1130, an intermediary electrode 1160, and a translation cam 1170.

The first side frame 1110 is positioned at one end of the drawer 1100 facing in a direction parallel to the second direction. The first side frame 1110 includes first guide recesses 1111. Each first guide recess 1111 guides one end of a corresponding cartridge 1020 facing in a direction parallel to the second direction when the cartridge 1020 is installed into or removed from the drawer 1100. Specifically, each first guide recess 1111 guides a corresponding first boss 1031*a*.

The second side frame 1120 is positioned at the other end of the drawer 1100 facing in a direction parallel to the second direction (i.e., opposite to the direction in which the one end of the drawer 1100 faces). The second side frame 1120 includes second guide recesses 1121 and third guide recesses 1122. Each second guide recess 1121 and each third guide recess 1122 guide the other end of a corresponding cartridge 1020 facing in a direction parallel to the second direction (i.e., opposite to the direction in which the one end of the cartridge 1020 faces). Specifically, each second guide recess 1121 guides a corresponding second boss 1031*b*. Each third guide recess 1122 guides a corresponding third boss 1031*c*.

The latch 1130 includes a plurality of holes 1131 which allows ends of each cartridge 1020 facing in directions parallel to the second direction to be inserted therein. More specifically, when the latch 1130 is positioned in a lock position which will be described later in a state where the cartridges 1020 are installed in the drawer 1100, the plurality of holes 1131 allow the first boss 1031*a*, the second boss 1031*b*, and the third boss 1031*c* of each cartridge 1020 to be inserted therein.

The latch 1130 is rotatable about a rotation axis oriented in the first direction between a lock position in which each cartridge 1020 is locked to the drawer 1100, and an unlock position in which each cartridge 1020 is unlocked from the drawer 1100. When the latch 1130 is in the unlock position in a state where the cartridges 1020 are installed in the drawer 1100, the cartridges 1020 are removable from the drawer 1100 and replaceable. When the latch 1130 is in the lock position in a state where the cartridges 1020 are installed in the drawer 1100, the cartridges 1020 are locked to the drawer 1100 and cannot be removed from the drawer 1100. More specifically, when the latch 1130 is in the lock position in a state where the cartridges 1020 are installed in the drawer 1100, the ends of each cartridge 1020 facing in directions parallel to the second direction are inserted into corresponding holes 1131. The latch 1130 thereby restrains the cartridges 1020 from becoming accidentally detached from the drawer 1100. It is to be understood that the state in which the cartridge 1020 is locked to the drawer 1100 is a state in which the cartridge is restrained from becoming accidentally detached from the drawer 1100. Each cartridge 1020 is locked to the drawer 1100 by the latch 1130 of which the holes 1131 are greater than the first boss 1031*a* in this example. Thus, the cartridges 1020 are movable relative to the drawer 1100 by the gap between the hole 1131 of the latch 1130 and the first boss 1031*a*.

The latch 1130 comprises a first latch 1140 and a second latch 1150. The first latch 1140 is positioned at the one end of the drawer 1100 facing in a direction parallel to the second direction. The first latch 1140 is positioned at the first side frame 1110. The second latch 1150 is positioned at the other end of the drawer 1100 facing in a direction parallel to the second direction. The second latch 1150 is positioned at the second side frame 1120.

The first latch 1140 comprises a connector 1141, a conductor 1142, and a recess 1143. The connector 1141 is electrically connectable to the memory housing electrode 1016 of the main housing 1010. The conductor 1142 electrically connects the connector 1141 and a memory intermediary electrode 1161 which will be described later.

The connector 1141 is positioned at one end of the first latch 1140 facing in a direction parallel to the first direction. When the drawer 1100 is installed in the main housing 1010, the connector 1141 is electrically connected to the memory housing electrode 1016 of the main housing 1010. In this example, the connector 1141 is supported in a manner movable relative to the first latch 1140 in the third direction. Thus, the connector 1141 can absorb positional deviations when the connector 1141 is connected to the memory housing electrode 1016 of the main housing 1010.

The conductor 1142 is electrically connected to the memory intermediary electrode 1161. The conductor 1142 is positioned at an end of the first latch 1140 opposite to a center of rotation thereof.

The recess 1143 is positioned at the end of the first latch 1140 opposite to the center of rotation thereof. The conductor 1142 is positioned in the recess 1143 of the first latch 1140. The conductor 1142 positioned in the recess 1143 of the first latch 1140 is positioned between the first latch 1140 and an intermediary portion 1165 of a process intermediary electrode 1162 which will be described later and.

In the second example, the latch 1130 includes four memory intermediary electrodes 1161. Thus, four sets of conductors 1142, one set for each of the memory intermediary electrodes 1161, are provided. The four sets of conductors 1142 are connected to a single connector 1141 and are not electrically connected to each other. It is to be understood that, in the second example, one set of conductors 1142 refers to a plurality of conductors necessary for exchanging information with the single IC chip 1036.

The first latch 1140 has first holes 1145 each of which allows a corresponding first boss 1031*a* to be inserted therein. The second latch 1150 has second holes 1155 each of which allows a corresponding second boss 1031*b* to be inserted therein. The first holes 1145 and the second holes 1155 are examples of the holes 1131.

A rim 1132 around each of the holes 1131 includes a wedge-shaped portion 1132*a* and an arc portion 1132*b*. It is to be understood that, in this example, the rim 1132 is a part of the latch 1130 that surrounds each of the holes 1131 and is also referred to as "hole rim". The hole rim 1132 is positioned along the circumference of each of the holes 1131. More specifically, the hole rim 1132 is defined as the portion that a cylindrical portion of the first boss 1031*a* faces when the first boss 1031*a* is inserted into the hole 1131. The cylindrical portion of the first boss 1031*a* is contactable with the hole rim 1132.

The wedge-shaped portion 1132*a* is positioned at one of two ends of the hole rim 1132 facing in a direction parallel to the third direction and positioned farther from the intermediate transfer belt 1073. The wedge-shaped portion 1132*a* is configured such that the width of the hole 1131 in the first direction gradually becomes narrower in the upward direction (in a direction parallel to the third direction). In other words, the wedge-shaped portion 1132*a* is configured such that the farther from the intermediate transfer belt 1073 in the third direction, the narrower the width of the hole 1131 gradually becomes. The wedge-shaped portion 1132*a* has two linear surfaces. The wedge-shaped portion 1132*a* has a shape of the letter V formed by the two linear surfaces. Accordingly, when the first boss 1031*a* is lifted to an uppermost position relative to the drawer 1100, the wedge-shaped portion 1132*a* and the first boss 1031*a* contact each other at two points. In other words, when the cartridge 1020 is lifted to an uppermost position relative to the drawer 1100, the wedge-shaped portion 1132*a* and the first boss 1031*a* contact each other at two points. When the second boss 1031*b* is lifted to an uppermost position relative to the drawer 1100, the wedge-shaped portion 1132*a* and the second boss 1031*b* contact each other at two points. In other words, when the cartridge 1020 is lifted to an uppermost position relative to the drawer 1100, the wedge-shaped portion 1132*a* and the second boss 1031*b* contact each other at two points. It is to be understood that lifting the cartridge 1020 to the uppermost position relative to the drawer 1100 refers to moving the cartridge 1020 installed in the drawer 1100 in a direction parallel to the third direction to a side of the drawer 1100 opposite to a side on which the intermediate transfer belt 1073 is positioned, to a position in which the cartridge 1020 cannot be moved any more relative to the drawer 1100.

The arc portion 1132*b* is positioned at the other end of the hole rim 1132 facing in a direction parallel to the third direction and positioned closer to the intermediate transfer belt 1073. The arc portion 1132*b* is contactable with the first boss 1031*a* of the cartridge 1020. When the cartridge 1020 is lifted up, the arc portion 1132*b* is separated apart from the first boss 1031*a*.

The intermediary electrode 1160 is positioned at the first latch 1140. In other words, the intermediary electrode 1160 is positioned at the latch 1130.

It is to be understood that in the second example, since four cartridges 1020 are installed in the drawer 1100, the drawer 1100 includes four intermediary electrodes 1160. More specifically, the drawer 1100 comprises four memory intermediary electrodes 1161, four development intermediary electrodes 1162*a*, four supply intermediary electrodes 1162*b*, four drum intermediary electrodes 1162*c*, and four charge intermediary electrodes 1162*d* which will be described later. However, since each of the intermediary electrodes 1160 have a similar configuration, the intermediary electrode 1160 corresponding to one cartridge 1020 will be described below.

The intermediary electrode 1160 comprises a memory intermediary electrode 1161 and a process intermediary electrode 1162.

The memory intermediary electrode 1161 contacts a corresponding memory electrode 1036*b* when a corresponding cartridge 1020 is installed in the drawer 1100 and the latch 1130 is positioned in the lock position. The memory intermediary electrode 1161 is electrically connected to the connector 1141 of the first latch 1140 via a corresponding conductor 1142. The connector 1141 is electrically connectable to the memory housing electrode 1016 of the main housing 1010. When the drawer 1100 is installed in the main housing 1010, the memory intermediary electrode 1161 is electrically connected to the memory housing electrode 1016 of the main housing 1010 via the connector 1141. Thus, when the cartridge 1020 is installed in the drawer 1100 and the drawer 1100 is installed in the main housing 1010 with the latch 1130 positioned in the lock position, the memory electrode 1036*b* is electrically connected to the memory housing electrode 1016 of the main housing 1010 via the memory intermediary electrode 1161.

When the first latch 1140 is positioned in the lock position, the contact of the memory intermediary electrode 1161 faces upward. In other words, when the first latch 1140 is positioned in the lock position, the contact of the memory intermediary electrode 1161 faces in a direction in which the cartridge 1020 is removed from the drawer 1100. When the first latch 1140 is positioned in the lock position, the contact of the memory intermediary electrode 1161 is positioned at the end of the first latch 1140 opposite in the third direction to the rotation axis thereof. When the cartridge 1020 is installed in the drawer 1100 with the first latch 1140 positioned in the lock position, the memory electrode 1036*b* contacts the memory intermediary electrode 1161. Thus, the memory intermediary electrode 1161 is electrically connectable to the memory electrode 1036*b*.

The process intermediary electrode 1162 sandwiches the first latch 1140. When the cartridge 1020 is installed in the drawer 1100 with the latch 1130 positioned in the lock position, the process intermediary electrode 1162 contacts the process electrode 1034. The process intermediary electrode 1162 is thereby electrically connected to the process electrode 1034. Further, when the cartridge 1020 is installed in the drawer 1100 with the latch 1130 positioned in the lock position, the process intermediary electrode 1162 contacts the process housing electrode 1015. Thus, the process intermediary electrode 1162 is electrically connectable to the process housing electrode 1015.

The process intermediary electrode 1162 comprises a development intermediary electrode 1162*a*, a supply intermediary electrode 1162*b*, a drum intermediary electrode 1162*c*, and a charge intermediary electrode 1162*d*. The process housing electrode 1015 comprises a development housing electrode 1015*a*, a supply housing electrode 1015*b*, a drum housing electrode 1015*c*, and a charge housing electrode 1015*d*. The intermediary electrode 1160 is electrically connectable to the housing electrode 1014 by contacting the housing electrode 1014 when the cartridge 1020 is installed in the drawer 1100 with the latch 1130 positioned in the lock position.

More specifically, the development intermediary electrode 1162*a* includes a first development contact 1163*a* and a second development contact 1164*a*. The supply intermediary electrode 1162*b* includes a first supply contact 1163*b* and a second supply contact 1164*b*. The drum intermediary electrode 1162*c* includes a first drum contact 1163*c* and a second drum contact 1164*c*. The charge intermediary electrode 1162*d* comprises a first charge contact 1163*d* and a second charge contact 1164*d*. The first development contact 1163*a*, the first supply contact 1163*b*, the first drum contact 1163*c*, and the first charge contact 1163*d* are examples of a first contact 1163. The second development contact 1164*a*, the second supply contact 1164*b*, the second drum contact 1164*c*, and the second charge contact 1164*d* are examples of a second contact 1164.

The first development contact 1163*a* is electrically connectable to the development electrode 1034*a* by contacting the development electrode 1034*a*. The first supply contact 1163*b* is electrically connectable to the supply electrode 1034*b* by contacting the supply electrode 1034*b*. The first drum contact 1163*c* is electrically connectable to the drum grounding terminal 1034*c* by contacting the drum grounding terminal 1034*c*. The first charge contact 1163*d* is electrically connectable to the charge electrode 1034*d* by contacting the charge electrode 1034*d*.

The second development contact 1164*a* is electrically connectable to the development housing electrode 1015*a* by contacting the development housing electrode 1015*a*. The second supply contact 1164*b* is electrically connectable to the supply housing electrode 1015*b* by contacting the supply housing electrode 1015*b*. The second drum contact 1164*c* is electrically connectable to the drum housing electrode 1015*c* by contacting the drum housing electrode 1015*c*. The second charge contact 1164*d* is electrically connectable to the charge housing electrode 1015*d* by contacting the charge housing electrode 1015*d*.

In this way, the development electrode 1034*a* and the development housing electrode 1015*a* are electrically connectable via the development intermediary electrode 1162*a*. The supply electrode 1034*b* and the supply housing electrode 1015*b* are electrically connectable via the supply intermediary electrode 1162*b*. The drum grounding terminal 1034*c* and the drum housing electrode 1015*c* are electrically connectable via the drum intermediary electrode 1162*c*. Further, the charge electrode 1034*d* and the charge housing electrode 1015*d* are electrically connectable via the charge intermediary electrode 1162*d*.

The translation cam 1170 is made of POM. The translation cam 1170 is positioned at a lower end of the drawer 1100 facing in a direction parallel to the third direction. In other words, when the drawer 1100 is installed in the main housing 1010, the translation cam 1170 is positioned at an end of the drawer 1100 closer to the intermediate transfer belt 1073, of two ends of the drawer 1100 separate from each other in the third direction.

In the second example, the drawer 1100 includes two translation cams 1170. The first translation cam 1170 is positioned between the photosensitive layer of the photosensitive drum 1032 and the first boss 1031*a* in the second direction. The second translation cam 1170 is positioned between the photosensitive layer of the photosensitive drum 1032 and the second boss 1031*b* in the second direction. The translation cam 1170 is configured not to contact the photosensitive drum 1032, the first boss 1031*a*, or the second boss 1031*b*.

The translation cam 1170 is supported movably relative to the drawer 1100. In the second example, the translation cam 1170 is supported on the first side frame 1110 by a snap fit (not shown) provided on the first side frame 1110 so that it is not inadvertently detached from the first side frame 1110.

As shown in FIGS. 14A and 14B, the translation cam 1170 can be translated relative to the drawer 1100 in directions parallel to the first direction. The translation cam 1170 can be translated between a first position (see FIG. 14A) and second position (see FIG. 14B).

The translation cam 1170 contacts the cartridges 1020 when the cartridges 1020 are installed in the drawer 1100. More specifically, the translation cam 1170 includes protrusions 1171. When each cartridge 1020 is installed in the drawer 1100, a corresponding protrusion 1171 is fitted into the cam receiving recess 1043 of the cartridge 1020. Each protrusion 1171 has a tapered end. Each of the protrusions 1171 is thereby easily fitted into a corresponding cam receiving recess 1043. When the translation cam 1170 is translated in a directions parallel to the first direction with each protrusion 1171 fitted into a corresponding cam receiving recess 1043, each cam receiving recess 1043 receives a force from the protrusion 1171. Since each first unit 1030 is fixed to the drawer 1100 by the latch 1130, a corresponding second unit 1040 that receives the force rotates relative to the first unit 1030. The second unit 1040 rotates about the agitator axis X14. When the translation cam 1170 is positioned in the first position, each photosensitive drum 1032 contacts a corresponding development roller 1042. When the translation cam 1170 is positioned in the second position, each photosensitive drum 1032 is separated apart from the corresponding development roller 1042. Specifically, when the translation cam 1170 is positioned in the first position, each second unit 1040 is positioned in a position in which a corresponding photosensitive drum 1032 and a corresponding development roller 1042 contact each other. When the translation cam 1170 is translated to the second position, the second unit 1040 rotates and separates the development roller 1042 apart from the photosensitive drum 1032. Thus, when the translation cam 1170 is translated from the first position to the second position, the second unit 1040 rotates from a contact position in which the development roller 1042 and the photosensitive drum 1032 contact each other to a separate position in which the development roller 1042 and the photosensitive drum 1032 are separated apart from each other. Similarly, when the translation cam 1170 is translated from the second position to the first position, the second unit 1040 rotates from the separate position in which the development roller 1042 and the photosensitive drum 1032 are separated apart from each other to the contact position in which the development roller 1042 and the photosensitive drum 1032 contact each other.

When the drawer 1100 is installed in the main housing 1010, the translation cam 1170 contacts the main housing 1010.

The translation cam 1170 has a recess 1172 at one end facing in a direction parallel to the first direction. The lever 1013 of the main housing 1010 is fitted into the recess 1172. The lever 1013 is rotatable about a lever axis X13 oriented in the second direction. The translation cam 1170 is translated between the first position and the second position as the lever 1013 rotates. More specifically, the lever 1013 comprises a receiving part 1113*a* and a pushing part 1113*b*. The receiving part 1113*a* receives a force from the main housing 1010. The pushing part 1113*b* is fitted into the recess 1172 and contacts the translation cam 1170. When the receiving part 1113*a* receives a force F1 (see FIGS. 14A and 14B) from the main housing 1010, the lever 1013 rotates causing the pushing part 1113*b* to push the translation cam 1170 in a direction parallel to the first direction via the recess 1172. As a result, the translation cam 1170 moves to the second position. In this example, the force F1 is applied to the lever 1013 by a solenoid (not shown) provided in the main housing 1010. When the receiving part 1113*a* is not receiving the force F1 from the main housing 1010, the pressure member 1021 of the cartridge 1020 causes the second unit 1040 to rotate in a direction in which the development roller 1042 is moved toward and pressed against the photosensitive drum 1032. As a result, the translation cam 1170 is biased by the second unit 1040 and is translated to the first position.

Next, installation of the cartridges 1020 and the drawer 1100 into the main housing 1010 will be described beginning from description of the contact and separation of the intermediate transfer belt 1073 and the photosensitive drums 1032.

The intermediate transfer belt 1073 is movable in conjunction with the opening and closing action of the cover 1011. The movement of the intermediate transfer belt 1073 will be described referring to FIGS. 23A and 23B. The cover 1011 contacts a follower roller shaft 1072*a* of the follower roller 1072. The cover 1011 has an inclined surface 1011*a*. When the cover 1011 rotates with the inclined surface 1011*a* and the follower roller shaft 1072*a* in contact with each other, the follower roller shaft 1072*a* moves in a direction parallel to the third direction. The follower roller 1072 thereby moves in a direction parallel to the third direction. As a result, the intermediate transfer belt 1073 moves in conjunction with the opening and closing action of the cover 1011. More specifically, the follower roller 1072 moves relative to the main housing 1010 while the drive roller 1071 is fixed to the main housing 1010. Thus, the intermediate transfer belt 1073 rotates about the drive roller 1071 as the rotation axis. The intermediate transfer belt 1073 thereby moves, in conjunction with the opening and closing action of the cover 1011 in a state where the cartridges 1020 are installed in the drawer 1100, between a belt contact position in which the intermediate transfer belt 1073 contacts the photosensitive drum 1032 and a belt separate position in which the intermediate transfer belt 1073 is separated apart from the photosensitive drum 1032. As a result, when the cover 1011 is positioned in the close position, the intermediate transfer belt 1073 is positioned in the belt contact position, and when the cover 1011 is positioned in the open position, the intermediate transfer belt 1073 is positioned in the belt separate position. Further, in this case, the primary transfer rollers 1074 are kept in contact with the intermediate transfer belt 1073 while moving. When the intermediate transfer belt 1073 is in contact with the photosensitive drums 1032, the intermediate transfer belt 1073 is sandwiched between each photosensitive drum 1032 and a corresponding primary transfer roller 1074.

Next, the sequential action of installing the cartridges 1020 into the drawer 1100, installing the drawer 1100 into the main housing 1010, and moving the cover 1011 to the close position will be described.

The user pulls the drawer 1100 out of the main housing 1010 with the cover 1011 positioned in the open position and moves the latch 1130 to the unlock position, to install and/or remove the cartridges 1020. When the cartridges 1020 are installed into the drawer 1100, each cartridge 1020 is guided and positioned in place in the first direction relative to the drawer 1100 by the first guide recess 1111, the second guide recess 1121, and the third guide recess 1122 of the drawer 1100. After the plurality of cartridges 1020 are installed, the latch 1130 is moved to the lock position. Each of the cartridges 1020 is pushed in a direction parallel to the second direction in the process of the process intermediary electrode 1162 contacting a corresponding cartridge electrode 1033. Each cartridge 1020 is thereby positioned in place relative to the drawer 1100 in the second direction. When the drawer 1100 is installed in the main housing 1010, the connector 1141 is connected to the memory housing electrode 1016.

As shown in FIGS. 23A and 23B, when the cover 1011 is moved to the closed position, the follower roller 1072 is lifted up by the cover 1011. The transfer device 1070 is thereby lifted upward relative to the drawer 1100. In other words, the transfer device 1070 moves toward the drawer 1100 in a direction parallel to the third direction. More specifically, the follower roller 1072 is lifted up by the inclined surface 1011*a* of the cover 1011, which causes the intermediate transfer belt 1073 to move toward the drawer 1100. The intermediate transfer belt 1073 thereby contacts each of the photosensitive drums 1032. Further, when the follower roller 1072 is lifted up by the cover 1011, each photosensitive drum 1032 is pushed by the intermediate transfer belt 1073. Therefore, each of the cartridges 1020 is lifted upward relative to the drawer 1100. Each first boss 1031*a* thereby contacts a corresponding hole rim 1132 of the latch 1130. More specifically, the first boss 1031*a* contacts the wedge-shaped portion 1132*a* of the hole rim 1132. The cartridges 1020 are thereby positioned in place in the third direction relative to the drawer 1100. When each of the cartridges is lifted further upward with the first boss 1031*a* in contact with the wedge-shaped portion 1132*a* of the first latch 1140, the drawer 1100 is lifted in an upward direction parallel to the third direction. As a result, a protrusion 1101 of the drawer 1100 contacts the main housing 1010.

According to the above-described second example, the cartridge 1020 is fixed to the drawer 1100 by the first boss 1032*a* of the cartridge 1020 contacting the hole rim 1132*a* in a state where the intermediate transfer belt 1073 is in contact with the photosensitive drum 1032. Thus, since it is not necessary to attach a spring or the like to the latch 1130 to push the cartridge 1020, a force of the user for operating the latch 1130 can be reduced.

According to the above-described second example, since the intermediate transfer belt 1073 moves between the belt contact position in which the intermediate transfer belt 1073 contacts the photosensitive drum 1031 and the belt separate position in which the intermediate transfer belt 1073 is separated apart from the photosensitive drum 1031, positional accuracy of the drawer in the first direction is improved compared to when the drawer 1100 is moved.

According to the above-described second example, since the intermediate transfer belt 1073 moves in conjunction with the cover 1011, operation of the user is facilitated.

According to the above-described second example, since the shaft 1072*a* of the follower roller 1072 is lifted up by the cover 1011, the intermediate transfer belt 1073 can be lifted up in conjunction with the cover 1011.

According to the above-described second example, by the cartridge 1020 being lifted up in a state where the first boss 1031*a* is in contact with the hole rim 1132, the drawer 1100 is also lifted upward allowing the protrusion 1101 of the drawer 1100 to contact the main housing 1010. Thus, the drawer 1100 is also positioned in place in the third direction.

According to the above-described second example, since the first boss 1031*a* contacts the linear surfaces of the wedge-shaped portion 1132*a* when the intermediate transfer belt 1073 is positioned in the belt contact position, the first boss 1031*a* is positioned in place relative to the latch 1130. Thus, the cartridges 1020 are positioned in place relative to the drawer 1100 via the latch 1130.

According to the above-described second example, since the first boss 1031*a* covers the drum coupling 1032*a* and supports the drum coupling 1032*a* in a manner that allows the drum coupling 1032*a* to rotate, the photosensitive drum 1032 is positioned in place relative to the first boss 1031*a*. Thus, when the first boss 1031*a* contacts the hole rim 1132 and is positioned in place relative to the drawer 1100, the photosensitive drum 1032 is also positioned in place relative to the drawer 1100 via the drum coupling 1032*a*.

According to the above-described second example, when the cartridges 1020 are installed in the drawer 1100 and the latch 1130 is positioned in the lock position, the memory electrode 1036*b* and the memory intermediary electrode 1161 are kept in contact even if the cartridges 1020 move to some extent. Thus, the memory 1036 can be electrically connected to the memory housing electrode 1016 via the memory intermediary electrode 1161 even after the cartridges 1020 are positioned in place relative to the drawer 1100.

While the second example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the second example, the memory electrode is configured to face downward. However, as shown in FIG. 24, the memory electrode may be configured to face outward in a direction parallel to the second direction. In this case, the memory intermediary electrode is configured to face the inside of the drawer in a direction parallel to the second direction. Thus, the memory intermediary electrode can be electrically connected to the memory electrode.

Although the drawer includes two translation cams in the second example, the drawer may include one translation cam.

Although the photosensitive drum is charged by the charge roller in the second example, the photosensitive drum may be charged by a scorotron charger.

Although each of the cartridge electrodes, specifically, each of the memory electrodes, the development electrodes, the supply electrodes, the drum grounding terminals, the charge electrodes is electrically connected to the housing electrode via the intermediary electrode in the second example, each of the cartridge electrodes does not have to be electrically connected via the intermediary electrode. For example, only the memory electrode among the cartridge electrode of each cartridge may be positioned in direct contact and electrically connected with the housing electrode.

Although the process intermediary electrode is configured to sandwich the latch in the second example, the latch may have a hole and the process intermediary electrode may be configured to be inserted into the hole of the latch.

Although one pair of latches is configured to lock the plurality of cartridges in the second example, one pair of latches may be configured to lock only one cartridge.

Although both ends of each cartridge facing in directions parallel to the second direction are locked in the second example, only one end of the cartridge may be locked.

Although the cartridge housing includes a cartridge electrode in the second example, the cartridge may comprise a first side cover configured to support one end of the first unit and one end of the second unit facing in one direction parallel to the second direction, and a second side cover configured to support the other end of the first unit and the other end of the second unit facing in the other direction parallel to the second direction, and the first side cover may include the cartridge electrode. Further, the second side cover may include the second boss and the third boss. In this case, since the cartridge may be assembled by attaching the one ends of the first unit and the second unit to the first side cover, and then attaching the other ends of the first unit and the second unit to the second side cover, the cartridge is easily to assemble.

Although the arrangement of cartridge electrodes is the same in the plurality of cartridges in the second example, the arrangement of cartridge electrodes may be different in the plurality of cartridges. In this case, the cartridge electrode and the housing electrode can be electrically connected by changing the arrangement and/or shape of the intermediary electrode.

Although the second unit is biased by the compression spring in the second example, the spring is not limited to a compression spring but may be any other elastic member such as a tension spring or a leaf spring. Further, the elastic member may be configured to directly push the shaft of the development roller.

Although the hole in which the first boss is inserted and the hole in which the second boss is inserted have the same shapes in the second example, the holes may have shapes different from each other according to the shapes, locations, sizes, etc. of the first boss and the second boss.

The third example of the present disclosure will be described in detail referring to the drawings where appropriate. In the following description, a direction in which a drawer 2100 moves between a position inside a main housing 2010 and a position outside the main housing 2010 is referred to as "first direction". A direction in which an axis of a development roller 2042 is oriented is referred to as "second direction". The first direction is nonparallel to the second direction. Preferably, but not necessarily, the first direction is perpendicular to the second direction. A direction in which a cartridge 2020 is installed into or removed from the drawer 2100 is referred to as "third direction". The third direction is nonparallel to the second direction and to the first direction. Preferably, but not necessarily, the third direction is perpendicular to the second direction and to the first direction. The terms above and below (upward and downward) will also be used as appropriate with respect to the third direction. For example, as shown in FIG. 26, an exposure unit SU2 is positioned above the drawer 2100, and an intermediate transfer belt 2073 is positioned below the drawer 2100 in the third direction.

As shown in FIGS. 25, 26 and 27, an image forming apparatus 2001 comprises a main housing 2010, a transfer device 2070, and a drawer 2100.

The main housing 2010 has an opening 2012 and comprises a cover 2011, a lever 2013, and a housing electrode 2014.

The cover 2011 is positioned at one end of the main housing 2010 facing in a direction parallel to the first direction. The cover 2011 is movable between a close position in which the opening 2012 is closed and an open position in which the opening 2012 is uncovered.

The lever 2013 is positioned at the other end of the main housing 2010 facing in a direction parallel to the first direction (i.e., opposite to the direction in which the one end of the main housing 2010 faces). The lever 2013 is positioned under the drawer 2100. The lever 2013 is rotatable about a lever axis X23 oriented in the second direction.

The housing electrode 2014 is electrically connected to cartridge electrodes 2033 of the cartridges 2020 via an intermediary electrode 2160, which will be described later, of the drawer 2110. The housing electrode 2014 includes a process housing electrode 2015 and a memory housing electrode 2016.

The process housing electrode 2015 is positioned inside the main housing 2010. The process housing electrode 2015 is positioned at one end of the main housing 2010 closer to one side of the main housing 2010 facing in a direction parallel to the second direction. In other words, when the drawer 2100 is installed, the process housing electrode 2015 is positioned at the same end of the main housing 2010 as that at which the intermediary electrode 2160 of the drawer 2100 is positioned.

The memory housing electrode 2016 is positioned inside the main housing 2010. The memory housing electrode 2016 is positioned at one end of the main housing 2010 closer to one side of the main housing 2010 facing in a direction parallel to the first direction. In other words, when the drawer 2100 is installed in the main housing 2010, the memory housing electrode 2016 is positioned at the same end of the main housing 2010 as that at which a connector 2141 of the drawer 2100 is positioned.

The transfer device 2070 is positioned below the drawer 2100 in the third direction. In other words, the transfer device 2070 is positioned at a side of the drawer 2100 opposite to a side on which an upper surface 2018 of the main housing 2010 is positioned in the third direction. The transfer device 2070 comprises a drive roller 2071, a follower roller 2072, an intermediate transfer belt 2073, and a plurality of primary transfer rollers 2074. The drive roller 2071 is positioned apart from the follower roller 2072 in the first direction. The intermediate transfer belt 2073 is an endless belt. The intermediate transfer belt 2073 is looped around and stretched between the drive roller 2071 and the follower roller 2072. The primary transfer rollers 2074 are positioned to face an inner surface of the intermediate transfer belt 2073. The intermediate transfer belt 2073 is sandwiched between each of the primary transfer rollers 2074 and a corresponding photosensitive drum 2032 which will be described later. In this example, four primary transfer rollers 2074 are included in the transfer device 2070. However, one to three, or more than five primary transfer rollers 2074 may be included as long as the number of the primary transfer rollers 2074 is the same as that of the photosensitive drums 2032 which will be described later.

The drawer 2100 is movable in directions parallel to the first direction between a position inside the main housing 2010 and a position outside the main housing 2010. In FIG. 25, the drawer 2100 is positioned outside the main housing 2010. Each of a plurality of cartridges 2020 is individually installable into and removable from the drawer 2100. The plurality of cartridges 2020 installed in the drawer 2100 is installable into the main housing 2010 together with the drawer 2100. Each cartridge 2020 comprises a cartridge housing 2031, a photosensitive drum 2032, an IC chip 2036, a charge roller 2035, a development housing 2041, a development roller 2042, and a supply roller 2045. The cartridges 2020 installed in the drawer 2100 are aligned and spaced apart from one another in the first direction.

Each cartridge 2020 contains toner of a color different from colors of toner contained in the other cartridges 2020 (for example, cyan, magenta, yellow, and black). The number of cartridges 2020 installed in the drawer 2100 of the present example is four. More specifically, the cartridges 2020 include a first cartridge 2020*a*, a second cartridge 2020*b*, a third cartridge 2020*c*, and a fourth cartridge 2020*d*. The first cartridge 2020*a* comprises a first unit 2030 including a first photosensitive drum 2032*a*, and a second unit 2040 including a first development roller 2042*a*. The second cartridge 2020*b* comprises a third unit 2030*b* including a second photosensitive drum 2032*b*, and a fourth unit 2040*b* including a second development roller 2042*b*. The third cartridge 2020*c* comprises a fifth unit 2030*c* including a third photosensitive drum 2032*c*, and a sixth unit 2040*c* including a third development roller 2042*c*. The fourth cartridge 2020*d* comprises a seventh unit 2030*d* including a fourth photosensitive drum 2032*d* and an eighth unit 2040*d* including a fourth development roller 2042*d*. However, the drawer 2100 may be configured to allow one to three, or more than five cartridges 2020 to be installed therein.

The image forming apparatus 2001 forms images according to the following processes.

As shown in FIG. 28, the image forming apparatus 2001 charges a surface of the photosensitive drum 2032 applying a charge voltage to the charge roller 2035 while rotating the charge roller 2035 in contact with the photosensitive drum 2032. Next, the image forming apparatus 2001 exposes the surface of the photosensitive drum 2032 to light by the exposure unit SU2 (see FIG. 26) to form an electrostatic latent image on the surface of the photosensitive drum 2032. At the same time, the image forming apparatus 2001 applies a supply voltage to the supply roller 2045 and supplies toner contained in the development housing 2041 via the supply roller 2045 to the development roller 2042. Application of a development voltage to the development roller 2042 causes the toner on the development roller 2042 to adhere to the exposed portions on the surface of the photosensitive drum 2032 to form a toner image on the surface of the photosensitive drum 2032. Then, the intermediate transfer belt 2073 is sandwiched between the surface of the photosensitive drum 2032 with the toner image thereon and a corresponding primary transfer roller 2074 to thereby transfer the toner image onto the intermediate transfer belt 2073. The toner image transferred on the intermediate transfer belt 2073 is conveyed toward the drive roller 2071 and transferred onto a sheet by sandwiching the sheet between the intermediate transfer belt 2073 supported by the drive roller 2071 and a secondary transfer roller 2019 of the main housing 2010. The toner image transferred on the sheet is fixed on the sheet by a fixing device 2080 provided in the main housing 2010, and the sheet with the toner image fixed thereon is ejected onto the upper surface 2018 of the main housing 2010.

As shown in FIGS. 28, 29, and 30, each cartridge 2020 comprises a first unit 2030 and a second unit 2040.

The first unit 2030 comprises a cartridge housing 2031, a photosensitive drum 2032, a drum coupling 2032*a*, a cartridge electrode 2033, a charge roller 2035, and an IC chip 2036.

The cartridge housing 2031 is made of insulating plastic. The cartridge housing 2031 supports the photosensitive drum 2032 in a manner that allows the photosensitive drum 2032 to rotate. The cartridge housing 2031 comprises a first boss 2031*a*, a second boss 2031*b*, and a third boss 2031*c*. One end of the photosensitive drum 2032 facing in a direction parallel to the second direction is rotatably supported by the first boss 2031*a*. The other end of the photosensitive drum 2032 facing in a direction parallel to the second direction (i.e., opposite to the direction in which the one end of the photosensitive drum 2032 faces) is rotatably supported by the second boss 2031*b*. A development coupling 2040*a* of the second unit 2040 which will be described later is rotatably supported by the third boss 2031*c*. The first boss 2031*a* protrudes from one end of the cartridge housing 2031 facing in a direction parallel to the second direction. The second boss 2031*b* protrudes from the other end of the cartridge housing 2031 facing in a direction parallel to the second direction (i.e., opposite to the direction in which the one end of the cartridge housing 2031 faces). The third boss 2031*c* protrudes from the other end of the cartridge housing 2031 facing in a direction parallel to the second direction.

The second unit 2040 is supported by the cartridge housing 2031 to rotate relative to the first unit 2030 about a rotation axis oriented in the second direction.

The photosensitive drum 2032 is rotatable about a drum axis X21 oriented in the second direction. The photosensitive drum 2032 comprises a metal tube and a photosensitive layer applied to the surface of the tube. The tube is electrically connected to a drum grounding terminal 2034*c* which will be described later. Thus, when the photosensitive layer is charged, a potential difference develops between the surface of the photosensitive layer and the tube, whereby an electric field is generated.

The drum coupling 2032*a* is positioned at the other end of the photosensitive drum 2032 facing in a direction parallel to the second direction. The drum coupling 2032*a* is rotatably supported by a cylindrical portion of the first boss 2031*a*. The photosensitive drum 2032 receives a rotational force from the main housing 2010 via the drum coupling 2032*a* and rotates.

The cartridge electrode 2033 is positioned at the one end of the cartridge housing 2031 facing in a direction parallel to the second direction. The cartridge electrode 2033 comprises a process electrode 2034 and an IC chip 2036. The cartridge electrode 2033 is electrically connected to the intermediary electrode 2160 which will be described later, and is electrically connected to the main housing 2010 via the intermediary electrode 2160.

The process electrode 2034 comprises a development electrode 2034*a*, a supply electrode 2034*b*, a drum grounding terminal 2034*c*, and a charge electrode 2034*d*. The development electrode 2034*a* is electrically connected to the development roller 2042. The supply electrode 2034*b* is electrically connected to the supply roller 2045. The drum grounding terminal 2034*c* is electrically connected to the tube of the photosensitive drum 2032. The charge electrode 2034*d* is electrically connected to the charge roller 2035. The process electrode 2034 is exposed to the outside of the cartridge 2020 and is contactable with the intermediary electrode 2160 which will be described later.

The IC chip 2036 comprises a memory 2036*a* and a memory electrode 2036*b*. The memory 2036*a* is capable of storing information related to the cartridge 2020. Specifically, the memory 2036*a* is capable of storing information on whether or not the cartridge 2020 is new, information on an amount of used toner, information on the color of toner contained in the cartridge 2020, etc. The memory electrode 2036*b* is electrically connected to the memory 2036*a*. The memory electrode 2036*b* is exposed to the outside of the cartridge 2020 and is contactable with the intermediary electrode 2160 which will be described later.

The second unit 2040 comprises a development coupling 2040*a*, a development housing 2041, a development roller 2042, a cam receiving recess 2043, an agitator 2044, a supply roller 2045, and a compression spring 2021 as an example of an elastic member.

The development coupling 2040*a* is positioned at the other end of the second unit 2040 facing in a direction parallel to the second direction. The development coupling 2040*a* is rotatably supported by a cylindrical portion of the third boss 2031*c*. The development coupling 2040*a* is rotatable about a development coupling axis X22 which is a rotation axis oriented in the second direction. The development coupling 2040*a* receives a rotational force from the main housing 2010 and rotates. The development roller 2042 receives a rotational force from the development coupling 2040*a* via a gear (not shown) and rotates. The agitator 2044 receives a rotational force from the development coupling 2040*a* via a gear (not shown) and rotates. The supply roller 2045 also receives a rotational force from the development coupling 2040*a* via a gear (not shown) and rotates.

The development housing 2041 contains toner. The development housing 2041 is positioned between the one end of the cartridge housing 2031 and the other end of the cartridge housing 2031 facing in directions parallel to the second direction.

The development roller 2042 is rotatable about a development axis oriented in the second direction. The development roller 2042 causes toner supplied to the supply roller 2045 to adhere to the electrostatic latent image on the surface of the photosensitive drum 2032. At this point, a development voltage is applied to the development roller 2042 by the development electrode 2034*a*.

The cam receiving recess 2043 contacts a translation cam 2170, which will be described later, of the drawer 2100. The cam receiving recess 2043 is positioned at the lower end of the second unit 2040. In other words, the cam receiving recess 2043 is positioned at the other end of the second unit 2040 facing in a direction parallel to the third direction. That is, the cartridge 2020 includes the cam receiving recess 2043 on the other end thereof facing in a direction parallel to the third direction.

The agitator 2044 is disposed inside the development housing 2041, and rotates about an agitator axis X24 oriented in the second direction to agitate toner contained in the development housing 2041.

The supply roller 2045 is positioned inside the development housing 2041, and supplies toner to the development roller 2042. At this time, a supply voltage is applied to the supply roller 2045 by the supply electrode 2034*b*.

As shown in FIGS. 35A and 35B, the second unit 2040 is rotatable relative to the first unit 2030 between a contact position in which the development roller 2042 is caused to contact the photosensitive drum 2032, and a separate position in which the development roller 2042 is separated apart from the photosensitive drum 2032. Since the development coupling 2040*a* is supported by the third boss 2031*c*, the second unit 2040 rotates relative to the first unit 2030 about the development coupling axis X22 (see FIG. 30).

The compression spring 2021 is a member that causes the development roller 2042 to be pressed against the photosensitive drum 2032. The compression spring 2021 is positioned at an outer surface of the development housing 2041 and contacts the first unit 2030. The compression spring 2021 pushes the development housing 2041 in such a manner that the development roller 2042 is brought into contact with and pressed against the photosensitive drum 2032. Thus, when an outside force is not applied to the cartridge 2020 (hereinafter referred to as normal conditions) the development roller 2042 is in contact with the photosensitive drum 2032. In other words, under normal conditions, the second unit 2032 is positioned in the contact position.

It is to be understood that even when the second unit 2040 rotates, the electrical connection between the development electrode 2034*a* and an electrode of the development roller 2042 is maintained. Specifically, an area of contact of the development electrode 2034*a* is greater than an area of contact of the electrode of the development roller 2042. Thus, when the second unit 2040 rotates, the electrode of the development roller 2042 moves in sliding contact with the development electrode 2034*a*. The electrical connection between the electrode of the development roller 2042 and the development electrode 2034*a* is thereby maintained even when the second unit 2040 rotates. Further, the electrical connection between the supply electrode 2034*b* and an electrode of the supply roller 2045 is maintained even when the second unit 2040 rotates. Specifically, an area of contact of the supply electrode 2034*b* is greater than an area of contact of the electrode of the supply roller 2045. Thus, when the second unit 2040 rotates, the electrode of the supply roller 2045 moves in sliding contact with the supply electrode 2034*b*. The electrical connection between the electrode of the supply roller 2045 and the supply electrode 2034*b* is thereby maintained even when the second unit 2040 rotates.

As shown in FIGS. 31, 32, and 33, the drawer 2100 comprises a first side frame 2110, a second side frame 2120, a latch 2130, an intermediary electrode 2160, and a translation cam 2170.

The first side frame 2110 is positioned at one end of the drawer 2100 facing in a direction parallel to the second direction. The first side frame 2110 includes first guide recesses 2111. Each first guide recess 2111 guides one end of a corresponding cartridge 2020 facing in a direction parallel to the second direction when the cartridge 2020 is installed into or removed from the drawer 2100. Specifically, each first guide recess 2111 guides a corresponding first boss 2031*a*.

The second side frame 2120 is positioned at the other end of the drawer 2100 facing in a direction parallel to the second direction (i.e., opposite to the direction in which the one end of the drawer 2100 faces). The second side frame 2120 includes second guide recesses 2121 and third guide recesses 2122. Each second guide recess 2121 and each third guide recess 2122 guide the other end of a corresponding cartridge 2020 facing in a direction parallel to the second direction (i.e., opposite to the direction in which the one end of the cartridge 2020 faces). Specifically, each second guide recess 2121 guides a corresponding second boss 2031*b*. Each third guide recess 2122 guides a corresponding third boss 2031*c*.

The latch 2130 includes a plurality of holes 2131 which allows ends of each cartridge 2020 facing in directions parallel to the second direction to be inserted therein. More specifically, when the latch 2130 is positioned in a lock position which will be described later in a state where the cartridges 2020 are installed in the drawer 2100, the plurality of holes 2131 allow the first boss 2031*a*, the second boss 2031*b*, and the third boss 2031*c* of each cartridge 2020 to be inserted therein.

The latch 2130 is rotatable about a rotation axis oriented in the first direction between a lock position in which each cartridge 2020 is locked to the drawer 2100, and an unlock position in which each cartridge 2020 is unlocked from the drawer 2100. When the latch 2130 is in the unlock position in a state where the cartridges 2020 are installed in the drawer 2100, the cartridges 2020 are removable from the drawer 2100 and replaceable. When the latch 2130 is in the lock position in a state where the cartridges 2020 are installed in the drawer 2100, the cartridges 2020 are locked to the drawer 2100 and cannot be removed from the drawer 2100. More specifically, when the latch 2130 is in the lock position in a state where the cartridges 2020 are installed in the drawer 2100, the ends of each cartridge 2020 facing in directions parallel to the second direction are inserted into corresponding holes 2131. The latch 2130 thereby restrains the cartridges 2020 from becoming accidentally detached from the drawer 2100.

The latch 2130 comprises a first latch 2140 and a second latch 2150. The first latch 2140 is positioned at the one end of the drawer 2100 facing in a direction parallel to the second direction. The first latch 2140 is positioned at the first side frame 2110. The second latch 2150 is positioned at the other end of the drawer 2100 facing in a direction parallel to the second direction. The second latch 2150 is positioned at the second side frame 2120.

The first latch 2140 comprises a connector 2141, a conductor 2142, and a recess 2143. The connector 2141 is electrically connectable to the memory housing electrode 2016 of the main housing 2010. The conductor 2142 electrically connects the connector 2141 and a memory intermediary electrode 2161 which will be described later.

The connector 2141 is positioned at one end of the first latch 2140 facing in a direction parallel to the first direction. When the drawer 2100 is installed in the main housing 2010, the connector 2141 is electrically connected to the memory housing electrode 2016 of the main housing 2010. In this example, the connector 2141 is supported in a manner movable relative to the first latch 2140 in the third direction. Thus, the connector 2141 can absorb positional deviations when the connector 2141 is connected to the memory housing electrode 2016 of the main housing 2010.

The conductor 2142 is electrically connected to the memory intermediary electrode 2161. The conductor 2142 is positioned at an end of the first latch 2140 opposite to a center of rotation thereof.

The recess 2143 is positioned at the end of the first latch 2140 opposite to the center of rotation thereof. The conductor 2142 is positioned in the recess 2143 of the first latch 2140. The conductor 2142 positioned in the recess 2143 of the first latch 2140 is positioned between an intermediary portion 2165 of a process intermediary electrode 2162 which will be described later and the first latch 2140.

In the third example, the latch 2130 includes four memory intermediary electrodes 2161. Thus, four sets of conductors 2142, one set for each of the memory intermediary electrodes 2161, are provided. The four sets of conductors 2142 are connected to a single connector 2141 and are not electrically connected to each other. It is to be understood that, in the third example, one set of conductors 2142 refers to a plurality of conductors necessary for exchanging information with the single IC chip 2036.

The intermediary electrode 2160 is positioned at the first latch 2140. In other words, the intermediary electrode 2160 is positioned at the latch 2130.

It is to be understood that in the third example, since four cartridges 2020 are installed in the drawer 2100, the drawer 2100 includes four intermediary electrodes 2160. More specifically, the drawer 2100 comprises four memory intermediary electrodes 2161, four development intermediary electrodes **2162*a*, four supply intermediary electrodes 2162*b*, four drum intermediary electrodes 2162*c*, and four charge intermediary electrodes 2162*d* which will be described later. However, since each of the intermediary electrodes 2160 have a similar configuration, the intermediary electrode 2160 corresponding to one cartridge 2020** will be described below.

The intermediary electrode 2160 comprises a memory intermediary electrode 2161 and a process intermediary electrode 2162.

The memory intermediary electrode 2161 contacts a corresponding memory electrode **2036*b* when a corresponding cartridge 2020 is installed in the drawer 2100 and the latch 2130 is positioned in the lock position. The memory intermediary electrode 2161 is electrically connected to the connector 2141 of the first latch 2140 via a corresponding conductor 2142. The connector 2141 is electrically connectable to the memory housing electrode 2016 of the main housing 2010. When the drawer 2100 is installed in the main housing 2010, the memory intermediary electrode 2161 is electrically connected to the memory housing electrode 2016 of the main housing 2010 via the connector 2141. Thus, when the cartridge 2020 is installed in the drawer 2100 and the drawer 2100 is installed in the main housing 2010 with the latch 2130 positioned in the lock position, the memory electrode 2036*b* is electrically connected to the memory housing electrode 2016 of the main housing 2010 via the memory intermediary electrode 2161**.

When the first latch 2140 is positioned in the lock position, the contact of the memory intermediary electrode 2161 faces upward. In other words, when the first latch 2140 is positioned in the lock position, the contact of the memory intermediary electrode 2161 faces in a direction in which the cartridge 2020 is removed from the drawer 2100. When the first latch 2140 is positioned in the lock position, the contact of the memory intermediary electrode 2161 is positioned at the end of the first latch 2140 opposite in the third direction to the rotation axis thereof. When the cartridge 2020 is installed in the drawer 2100 with the first latch 2140 positioned in the lock position, the memory electrode **2036*b* contacts the memory intermediary electrode 2161. Thus, the memory intermediary electrode 2161 is electrically connectable to the memory electrode 2036*b***.

The process intermediary electrode 2162 sandwiches the first latch 2140. When the cartridge 2020 is installed in the drawer 2100 with the latch 2130 positioned in the lock position, the process intermediary electrode 2162 contacts the process electrode 2034. The process intermediary electrode 2162 is thereby electrically connected to the process electrode 2034. Further, when the cartridge 2020 is installed in the drawer 2100 with the latch 2130 positioned in the lock position, the process intermediary electrode 2162 contacts the process housing electrode 2015. Thus, the process intermediary electrode 2162 is electrically connectable to the process housing electrode 2015.

The process intermediary electrode 2162 comprises a development intermediary electrode **2162*a*, a supply intermediary electrode 2162*b*, a drum intermediary electrode 2162*c*, and a charge intermediary electrode 2162*d*. The process housing electrode 2015 comprises a development housing electrode 2015*a*, a supply housing electrode 2015*b*, a drum housing electrode 2015*c*, and a charge housing electrode 2015*d*. The intermediary electrode 2160 is electrically connectable to the housing electrode 2014 by contacting the housing electrode 2014 when the cartridge 2020 is installed in the drawer 2100 with the latch 2130** positioned in the lock position.

More specifically, the development intermediary electrode **2162*a* includes a first development contact 2163*a* and a second development contact 2164*a*. The supply intermediary electrode 2162*b* includes a first supply contact 2163*b* and a second supply contact 2164*b*. The drum intermediary electrode 2162*c* includes a first drum contact 2163*c* and a second drum contact 2164*c*. The charge intermediary electrode 2162*d* comprises a first charge contact 2163*d* and a second charge contact 2164*d*. The first development contact 2163*a*, the first supply contact 2163*b*, the first drum contact 2163*c*, and the first charge contact 2163*d* are examples of a first contact 2163. The second development contact 2164*a*, the second supply contact 2164*b*, the second drum contact 2164*c*, and the second charge contact 2164*d* are examples of a second contact 2164**.

The first development contact **2163*a* is electrically connectable to the development electrode 2034*a* by contacting the development electrode 2034*a*. The first supply contact 2163*b* is electrically connectable to the supply electrode 2034*b* by contacting the supply electrode 2034*b*. The first drum contact 2163*c* is electrically connectable to the drum grounding terminal 2034*c* by contacting the drum grounding terminal 2034*c*. The first charge contact 2163*d* is electrically connectable to the charge electrode 2034*d* by contacting the charge electrode 2034*d***.

The second development contact **2164*a* is electrically connectable to the development housing electrode 2015*a* by contacting the development housing electrode 2015*a*. The second supply contact 2164*b* is electrically connectable to the supply housing electrode 2015*b* by contacting the supply housing electrode 2015*b*. The second drum contact 2164*c* is electrically connectable to the drum housing electrode 2015*c* by contacting the drum housing electrode 2015*c*. The second charge contact 2164*d* is electrically connectable to the charge housing electrode 2015*d* by contacting the charge housing electrode 2015*d***.

In this way, the development electrode **2034*a* and the development housing electrode 2015*a* are electrically connectable via the development intermediary electrode 2162*a*. The supply electrode 2034*b* and the supply housing electrode 2015*b* are electrically connectable via the supply intermediary electrode 2162*b*. The drum grounding terminal 2034*c* and the drum housing electrode 2015*c* are electrically connectable via the drum intermediary electrode 2162*c*. Further, the charge electrode 2034*d* and the charge housing electrode 2015*d* are electrically connectable via the charge intermediary electrode 2162*d***.

The translation cam 2170 is made of POM. The translation cam 2170 is positioned at a lower end of the drawer 2100 facing in a direction parallel to the third direction. In other words, when the drawer 2100 is installed in the main housing 2010, the translation cam 2170 is positioned at an end of the drawer 2100 closer to the intermediate transfer belt 2073, of two ends of the drawer 2100 separate from each other in the third direction.

In the third example, the drawer 2100 includes two translation cams 2170. The first translation cam 2170 is positioned between the photosensitive layer of the photosensitive drum 2032 and the first boss 2031*a* in the second direction. The second translation cam 2170 is positioned between the photosensitive layer of the photosensitive drum 2032 and the second boss 2031*b* in the second direction. The translation cam 2170 is configured not to contact the photosensitive drum 2032, the first boss 2031*a*, or the second boss 2031*b*.

The translation cam 2170 is supported movably relative to the drawer 2100. In the third example, the translation cam 2170 is supported on the first side frame 2110 by a snap fit (not shown) provided on the first side frame 2110 so that it is not inadvertently detached from the first side frame 2110.

As shown in FIGS. 27A and 27B, the translation cam 2170 can be translated relative to the drawer 2100 in directions parallel to the first direction. The translation cam 2170 can be translated between a first position (see FIG. 27A) and second position (see FIG. 27B).

The translation cam 2170 contacts the cartridges 2020 when the cartridges 2020 are installed in the drawer 2100. More specifically, the translation cam 2170 includes protrusions 2171 thereon. When each cartridge 2020 is installed in the drawer 2100, a corresponding protrusion 2171 is fitted into the cam receiving recess 2043 of the cartridge 2020. Each protrusion 2171 has a tapered end. Each of the protrusions 2171 is thereby easily fitted into a corresponding cam receiving recess 2043. When the translation cam 2170 is translated in directions parallel to the first direction with each protrusion 2171 fitted into a corresponding cam receiving recess 2043, each cam receiving recess 2043 receives a force from the protrusion 2171. Since each first unit 2030 is fixed to the drawer 2100 by the latch 2130, a corresponding second unit 2040 that receives the force rotates relative to the first unit 2030. The second unit 2040 rotates about the agitator axis X24. When the translation cam 2170 is positioned in the first position, each photosensitive drum 2032 contacts a corresponding development roller 2042. When the translation cam 2170 is positioned in the second position, each photosensitive drum 2032 is separated apart from the corresponding development roller 2042. Specifically, when the translation cam 2170 is positioned in the first position, each second unit 2040 is positioned in a position in which a corresponding photosensitive drum 2032 and a corresponding development roller 2042 contact each other. When the translation cam 2170 is translated to the second position, the second unit 2040 rotates and separates the development roller 2042 apart from the photosensitive drum 2032. Thus, when the translation cam 2170 is translated from the first position to the second position, the second unit 2040 rotates from a contact position in which the development roller 2042 and the photosensitive drum 2032 contact each other to a separate position in which the development roller 2042 and the photosensitive drum 2032 are separated apart from each other. Similarly, when the translation cam 2170 is translated from the second position to the first position, the second unit 2040 rotates from the separate position in which the development roller 2042 and the photosensitive drum 2032 are separated apart from each other to the contact position in which the development roller 2042 and the photosensitive drum 2032 contact each other.

When the drawer 2100 is installed in the main housing 2010, the translation cam 2170 contacts the main housing 2010.

The translation cam 2170 has a recess 2172 at one end facing in a direction parallel to the first direction. The lever 2013 of the main housing 2010 is fitted into the recess 2172. The lever 2013 is rotatable about a lever axis X23 oriented in the second direction. The translation cam 2170 is translated between the first position and the second position as the lever 2013 rotates. More specifically, the lever 2013 comprises a receiving part 2013*a* and a pushing part 2013*b*. The receiving part 2013*a* receives a force from the main housing 2010. The pushing part 1113*b* is fitted into the recess 2172 and contacts the translation cam 2170. When the receiving part 2013*a* receives a force F2 (see FIGS. 27A and 27B) from the main housing 2010, the lever 2013 rotates causing the pushing part 2013*b* to push the translation cam 2170 in a direction parallel to the first direction via the recess 2172. As a result, the translation cam 2170 moves to the second position. In this example, the force F2 is applied to the lever 2013 by a solenoid (not shown) provided in the main housing 2010. When the receiving part 2013*a* is not receiving the force F2 from the main housing 2010, the pressure member 2021 of the cartridge 2020 causes the second unit 2040 to rotate in a direction in which the development roller 2042 is moved toward and pressed against the photosensitive drum 2032. As a result, the translation cam 2170 is biased by the second unit 2040 and is translated to the first position.

Next, installation of the cartridges 2020 and the drawer 2100 into the main housing 2010 will be described beginning from description of the contact and separation of the intermediate transfer belt 2073 and the photosensitive drums 2032.

The intermediate transfer belt 2073 is movable in conjunction with the opening and closing action of the cover 2011. The movement of the intermediate transfer belt 2073 will be described referring to FIGS. 36A and 36B. The cover 2011 contacts a follower roller shaft 2072*a* of the follower roller 2072. The cover 2011 has an inclined surface 2011*a*. When the cover 2011 rotates with the inclined surface 2011*a* and the follower roller shaft 2072*a* in contact with each other, the follower roller shaft 2072*a* moves in directions parallel to the third direction. The follower roller 2072 thereby moves in directions parallel to the third direction. As a result, the intermediate transfer belt 2073 moves in conjunction with the opening and closing action of the cover 2011. More specifically, the follower roller 2072 moves relative to the main housing 2010 while the drive roller 2071 is fixed to the main housing 2010. Thus, the intermediate transfer belt 2073 rotates about the drive roller 2071 as the rotation axis. The intermediate transfer belt 2073 thereby moves, in conjunction with the opening and closing action of the cover 2011 in a state where the cartridges 2020 are installed in the drawer 2100, between a belt contact position in which the intermediate transfer belt 2073 contacts the photosensitive drum 2032 and a belt separate position in which the intermediate transfer belt 2073 is separated apart from the photosensitive drum 2032. As a result, when the cover 2011 is positioned in the close position, the intermediate transfer belt 2073 is positioned in the belt contact position, and when the cover 2011 is positioned in the open position, the intermediate transfer belt 2073 is positioned in the belt separate position. Further, in this case, the primary transfer rollers 2074 are kept in contact with the intermediate transfer belt 2073 while moving. When the intermediate transfer belt 2073 is in contact with the photosensitive drums 2032, the intermediate transfer belt 2073 is sandwiched between each photosensitive drum 2032 and a corresponding primary transfer roller 2074.

Next, the sequential action of installing the cartridges 2020 into the drawer 2100, installing the drawer 2100 into the main housing 2010, and moving the cover 2011 to the close position will be described.

The user pulls the drawer 2100 out of the main housing 2010 with the cover 2011 positioned in the open position and moves the latch 2130 to the unlock position, to install and/or remove the cartridges 2020. When the cartridges 2020 are installed into the drawer 2100, each cartridge 2020 is guided and positioned in place in the first direction relative to the drawer 2100 by the first guide recess 2111, the second guide recess 2121, and the third guide recess 2122 of the drawer 2100. After the plurality of cartridges 2020 are installed, the latch 2130 is moved to the lock position. Each of the cartridges 2020 is pushed in a direction parallel to the second direction in the process of the process intermediary electrode 2162 contacting a corresponding cartridge electrode 2033. Each cartridge 2020 is thereby positioned in place relative to the drawer 2100 in the second direction. When the drawer 2100 is installed in the main housing 2010, the connector 2141 is connected to the memory housing electrode 2016.

As shown in FIGS. 36A and 36B, when the cover 2011 is moved to the closed position, the follower roller 2072 is lifted up by the cover 2011. The transfer device 2070 is thereby lifted upward relative to the drawer 2100. In other words, the transfer device 2070 moves toward the drawer 2100 in a direction parallel to the third direction. More specifically, the follower roller 2072 is lifted up by the inclined surface 2011*a* of the cover 2011, which causes the intermediate transfer belt 2073 to move toward the drawer 2100. The intermediate transfer belt 2073 thereby contacts each of the photosensitive drums 2032. Further, when the follower roller 2072 is lifted up by the cover 2011, each photosensitive drum 2032 is pushed by the intermediate transfer belt 2073. Therefore, each of the cartridges 2020 is lifted upward relative to the drawer 2100. Each first boss 2031*a* thereby contacts a rim 2132 around a corresponding hole 2131 of the first latch 2140. More specifically, the first boss 2031*a* contacts a wedge-shaped portion 2132*a* of the rim 2132 around the hole 2121. The cartridges 2020 are thereby positioned in place in the third direction relative to the drawer 2100. When each of the cartridges is lifted further upward with the first boss 2031*a* in contact with the wedge-shaped portion 1132*a* of the latch 2130, the drawer 2100 is lifted in an upward direction parallel to the third direction. As a result, a protrusion 2101 of the drawer 2100 contacts the main housing 2010.

According to the above-described third example, the photosensitive drum 2032 and the development roller 2042 can be brought into contact with and separated apart from each other, with the cartridge 2020 locked to the drawer 2100 by the latch 2130 of the drawer 2100. Thus, in the image forming apparatus 2001, the photosensitive drum 2032 and the development roller 2042 can be adequately separated apart from each other.

According to the above-described third example, the second unit 2040 is rotatable about the center of the cylindrical portion of the third boss 2031*c* as the center of rotation, between the contact position and the separate position. Since the photosensitive drum 2032 and the development roller 2042 can thereby be brought into contact with and separated apart from each other without the third boss 2031*c* moving, the latch 2130 can be formed in a simple structure.

According to the above-described third example, since the second unit 2040 rotates about the development coupling axis X22, the position of the development coupling 2040*a* relative to the drawer 2100 does not change. Thus, the connection between the main housing 2010 and the development coupling 2040*a* can be maintained.

According to the above-described third example, since the protrusion 2171 of the translation cam 2170 is configured to be fitted into a corresponding cam receiving recess 2043 of the second unit 2040, it is not necessary to provide a protrusion on the cartridge 2020.

According to the above-described third example, since the translation cam 2170 is positioned at the lower end of the drawer 2100 (i.e., one end facing in a direction parallel to the third direction), the cartridge 2020 is simultaneously contactable with the translation cam 2170 when the cartridge 2020 is installed in the drawer 2100. Thus, the translation cam 2170 can be easily positioned in place relative to the cartridge 2020 installed in the drawer 2100.

According to the above-described third example, since the translation cam 2170 is pushed by the compression spring 2021 via the second unit to be positioned in the first position, the photosensitive drum 2032 and the development roller 2042 can stably contact each other when images are formed in the image forming apparatus 2001.

According to the above-described third example, the translation cam 2170 can be translated from the first position to the second position by the lever 2013 of the main housing 2010. Further, since the drawer 2100 can be installed into the main housing 2010 with the lever 2013 positioned in a first rotation position positioned apart from the recess, the drawer 2100 and the lever 2013 can be configured not to interfere with each other.

According to the above-described third example, since the translation cam 2170 is positioned in the second position when the lever 2013 is positioned in a second rotation position, the photosensitive drum 2032 and the development roller 2042 can be separated apart by the image forming apparatus 2001. Further, since the translation cam 2170 is pushed via the second unit 2040 by the compression spring 2021 and positioned in the first position when the lever 2013 is positioned in the first rotation position, the photosensitive drum 2032 and the development roller 2042 can be caused to contact each other by the image forming apparatus 2001. Thus, the main housing 2010 may apply a force only when separating the photosensitive drum 2032 and the development roller 2042 apart, and can be formed in a simple structure.

According to the above-described third example, since the latch 2130 locks the first unit 2030 including the first photosensitive drum 2032 contactable with the intermediate transfer belt 2073, the intermediate transfer belt 2073 and the first photosensitive drum 2032 can be kept in contact even when the second unit 2040 is positioned in the separate position. Thus, when cleaning the drum or in a similar situation, toner on the first photosensitive drum 2032 can spewed out onto the intermediate transfer belt 2073 with only the development roller 2042 separated apart from the first photosensitive drum 2032.

According to the above-described third example, the first boss 2031*a* is positioned in place relative to the drawer 2100 by the first boss 2031*a* contacting the rim 2132 around a corresponding hole of the latch 2130. The first unit 2030 is thereby positioned in place relative to the intermediate transfer belt 2073.

According to the above-described third example, since the first boss 2031*a* supports the first drum coupling 2032*a* so that the first drum coupling 2032*a* is rotatable together with the first photosensitive drum 2032, and the first boss 2031*a* contacts the rim 2132 of a corresponding hole of the latch 2130, the first photosensitive drum 2032 is positioned in place relative to the drawer 2100. The first photosensitive drum 2032 is thereby stably contactable with the intermediate transfer belt 2073. Further, since the first drum coupling 2032 is also positioned in place relative to the drawer 2100, the first drum coupling 2032*a* and the main housing 2010 can also be accurately connected.

According to the above-described third example, the first photosensitive drum 2032*a* and the first development roller 2042*a* of the first cartridge 2020*a*, and the second photosensitive drum 2032*b* and the second development roller 2042*b* of the second cartridge 2020*b* can be brought into contact with and separated apart from each other at once by the translation cam 2170. Thus, the plurality of photosensitive drums 2032 and the plurality of corresponding development rollers 2042 can be brought into contact with and separated apart from each other by a simple configuration.

While the third example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the third example, the memory electrode is configured to face downward. However, as shown in FIG. 37, the memory electrode may be configured to face an outside of the cartridge in a direction parallel to the second direction. In this case, the memory intermediary electrode is configured to face the inside of the drawer in a direction parallel to the second direction. Thus, the memory intermediary electrode can be electrically connected to the memory electrode.

Although the drawer includes two translation cams in the third example, the drawer may include one translation cam.

Although the photosensitive drum is charged by the charge roller in the third example, the photosensitive drum may be charged by a scorotron charger.

Although each of the cartridge electrodes, specifically, each of the memory electrode, the development electrode, the supply electrode, the drum grounding terminal, and the charge electrode are electrically connected to the housing electrode via the intermediary electrode in the third example, the electrical connection of the cartridge electrodes may be established without the intermediary electrode. For example, the memory electrode may be configured to directly contact and be electrically connected to the housing electrode.

Although the process intermediary electrode is configured to sandwich the latch in the third example, the latch may have a hole and the process intermediary electrode may be configured to be inserted into the hole of the latch.

Although one latch is configured to lock a plurality of cartridges in the third example, one latch may be configured to lock only one cartridge.

Although both ends of the cartridge facing directions parallel to the second direction are locked in the third example, only one end of the cartridge may be locked.

Although the cartridge housing includes a cartridge electrode in the third example, the cartridge may comprise a first side cover configured to support one end of the first unit and one end of the second unit facing in directions parallel to the second direction, and a second side cover configured to support the other end of the first unit and the other end of the second unit facing in directions parallel to the second direction, and the first side cover may include the cartridge electrode. Further, the second side cover may include a second boss and a third boss. In this case, since the cartridge may be assembled by attaching the one ends of the first unit and the second unit facing in directions parallel to the second direction to the first side cover, and then attaching the other ends of the first unit and the second unit facing in directions parallel to the second direction to the second side cover, the cartridge is easily to assemble.

Although the arrangement of cartridge electrodes is the same in the plurality of cartridges in the third example, the arrangement of cartridge electrodes may be different in the plurality of cartridges. In this case, the cartridge electrode and the housing electrode may be electrically connected by changing the arrangement and/or shape of the intermediary electrode.

Although the second unit is biased by the compression spring in the third example, the biasing member is not limited to a compression spring but may be any other elastic member such as a tension spring or a leaf spring. Further, the elastic member may be configured to directly push the shaft of the development roller.

The fourth example of the present disclosure will be described in detail referring to the drawings where appropriate. In the following description, a direction in which a drawer 3100 moves between a position inside a main housing 3010 and a position outside the main housing 3010 is referred to as "first direction". A direction in which an axis of a development roller 3042 is oriented is referred to as "second direction". The first direction is nonparallel to the second direction. Preferably, but not necessarily, the first direction is perpendicular to the second direction. A direction in which a cartridge 3020 is installed into or removed from the drawer 3100 is referred to as "third direction". The third direction is nonparallel to the second direction and to the first direction. Preferably, but not necessarily, the third direction is perpendicular to the second direction and to the first direction. The terms above and below (upward and downward) will also be used as appropriate with respect to the third direction. For example, as shown in FIG. 39, an exposure unit SU3 is positioned above the drawer 3100, and an intermediate transfer belt 3073 is positioned below the drawer 3100 in the third direction.

As shown in FIGS. 38, 39 and 40, an image forming apparatus 3001 comprises a main housing 3010, a transfer device 3070, and a drawer 3100.

The main housing 3010 has an opening 3012 and comprises a cover 3011, a lever 3013, and a housing electrode 3014.

The cover 3011 is positioned at one end of the main housing 3010 facing in a direction parallel to the first direction. The cover 3011 is movable between a close position in which the opening 3012 is closed and an open position in which the opening 3012 is uncovered.

The lever 3013 is positioned at the other end of the main housing 3010 facing in a direction parallel to the first direction (i.e., opposite to the direction in which the one end of the main housing 3010 faces). The lever 3013 is positioned under the drawer 3100. The lever 3013 is rotatable about a lever axis X33 oriented in the second direction.

The housing electrode 3014 is electrically connected to cartridge electrodes 3033 of the cartridges 3020 via an intermediary electrode 3160, which will be described later, of the drawer 3100. The housing electrode 3014 includes a process housing electrode 3015 and a memory housing electrode 3016.

The process housing electrode 3015 is positioned inside the main housing 3010. The process housing electrode 3015 is positioned at one end of the main housing 3010 closer to one side of the main housing 1010 facing in a direction parallel to the second direction. In other words, when the drawer 3100 is installed, the process housing electrode 3015 is positioned at the same end of the main housing 3010, in the second direction, as that at which the intermediary electrode 3160 of the drawer 3100 is positioned.

The memory housing electrode 3016 is positioned inside the main housing 3010. The memory housing electrode 3016 is positioned at one end of the main housing 3010 closer to one side of the main housing 1010 facing in a direction parallel to the first direction. In other words, when the drawer 3100 is installed in the main housing 3010, the memory housing electrode 3016 is positioned at the same end of the main housing 3010, in the first direction, as that at which a connector 3141 of the drawer 3100 is positioned.

The transfer device 3070 is positioned below the drawer 3100 in the third direction. In other words, the transfer device 3070 is positioned at a side of the drawer 3100 opposite to a side on which an upper surface 3018 of the main housing 3010 is positioned in the third direction. The transfer device 3070 comprises a drive roller 3071, a follower roller 3072, an intermediate transfer belt 3073, and a plurality of primary transfer rollers 3074. The drive roller 3071 is positioned apart from the follower roller 3072 in the first direction. The intermediate transfer belt 3073 is an endless belt. The intermediate transfer belt 3073 is looped around and stretched between the drive roller 3071 and the follower roller 3072. The primary transfer rollers 3074 are positioned to face an inner surface of the intermediate transfer belt 3073. The intermediate transfer belt 3073 is sandwiched between each of the primary transfer rollers 3074 and a corresponding photosensitive drum 3032 which will be described later. In this example, four primary transfer rollers 3074 are included in the transfer device 3070. However, one to three, or more than five primary transfer rollers 3074 may be included as long as the number of the primary transfer rollers 3074 is the same as that of the photosensitive drums 3032 which will be described later.

The drawer 3100 is movable in directions parallel to the first direction between a position inside the main housing 3010 and a position outside the main housing 3010. In FIG. 51, the drawer 3100 is positioned outside the main housing 3010. Each of a plurality of cartridges 3020 is individually installable into and removable from the drawer 3100. The plurality of cartridges 3020 installed in the drawer 3100 is installable into the main housing 3010 together with the drawer 3100. Each cartridge 3020 comprises a cartridge housing 3031, a photosensitive drum 3032, an IC chip 3036, a charge roller 3035, a development housing 3041, a development roller 3042, and a supply roller 3045. The cartridges 3020 installed in the drawer 3100 are aligned and spaced apart from one another in the first direction.

Each cartridge 3020 contains toner of a color different from colors of toner contained in the other cartridges 3020 (for example, cyan, magenta, yellow, and black). The number of cartridges 3020 installed in the drawer 3100 of the present example is four. More specifically, the cartridges 3020 include a first cartridge 3020*a*, a second cartridge 3020*b*, a third cartridge 3020*c*, and a fourth cartridge 3020*d*. The first cartridge 3020*a* comprises a first photosensitive drum 3032*a* and a first development roller 3042*a*. The second cartridge 3020*b* comprises a second photosensitive drum 3032*b* and a second development roller 3042*b*. The third cartridge 3020*c* comprises a third photosensitive drum 3032*c* and a third development roller 3042*c*. The fourth cartridge 3020*d* comprises a fourth photosensitive drum 3032*d* and a fourth development roller 3042*d*. However, the drawer 3100 may be configured to allow one to three, or more than five cartridges 3020 to be installed therein.

The image forming apparatus 3001 forms images according to the following processes.

As shown in FIG. 41, the image forming apparatus 3001 charges a surface of the photosensitive drum 3032 by applying a charge voltage to the charge roller 3035 while rotating the charge roller 3035 in contact with the photosensitive drum 3032. Next, the image forming apparatus 3001 exposes the surface of the photosensitive drum 3032 to light by the exposure unit SU3 (see FIG. 52) to form an electrostatic latent image on the surface of the photosensitive drum 3032. At the same time, the image forming apparatus 3001 applies a supply voltage to the supply roller 3045 and supplies toner contained in the development housing 3041 via the supply roller 3045 to the development roller 3042. Application of a development voltage to the development roller 3042 causes the toner on the development roller 3042 to adhere to the exposed portions on the surface of the photosensitive drum 3032 to form a toner image on the surface of the photosensitive drum 3032. Then, the intermediate transfer belt 3073 is sandwiched between the surface of the photosensitive drum 3032 with the toner image thereon and a corresponding primary transfer roller 3074 to thereby transfer the toner image onto the intermediate transfer belt 3073. The toner image transferred on the intermediate transfer belt 3073 is conveyed toward the drive roller 3071 and transferred onto a sheet by sandwiching the sheet between the intermediate transfer belt 3073 supported by the drive roller 3071 and a secondary transfer roller 3019 of the main housing 3010. The toner image transferred on the sheet is fixed on the sheet by a fixing device 3080 provided in the main housing 3010, and the sheet with the toner image fixed thereon is ejected onto the upper surface 3018 of the main housing 3010.

As shown in FIGS. 41, 42, and 43, each cartridge 3020 comprises a first unit 3030 and a second unit 3040.

The first unit 3030 comprises a cartridge housing 3031, a photosensitive drum 3032, a drum coupling 3032*a*, a cartridge electrode 3033, a charge roller 3035, and an IC chip 3036.

The cartridge housing 3031 is made of insulating plastic. The cartridge housing 3031 supports the photosensitive drum 3032 in a manner that allows the photosensitive drum 3032 to rotate. The cartridge housing 3031 comprises a first boss 3031*a*, a second boss 3031*b*, and a third boss 3031*c*. One end of the photosensitive drum 3032 facing in a direction parallel to the second direction is rotatably supported by the first boss 3031*a*. The other end of the photosensitive drum 3032 facing in a direction parallel to the second direction (i.e., opposite to the direction in which the one end of the photosensitive drum 3032 faces) is rotatably supported by the second boss 3031*b*. A development coupling 3040*a* of the second unit 3040 which will be described later is rotatably supported by the third boss 3031*c*. The first boss 3031*a* protrudes from one end of the cartridge housing 3031 facing in a direction parallel to the second direction. The second boss 3031*b* protrudes from the other end of the cartridge housing 3031 facing in a direction parallel to the second direction (i.e., opposite to the direction in which the one end of the cartridge housing 3031 faces). The third boss 3031*c* protrudes from the other end of the cartridge housing 3031 facing in a direction parallel to the second direction.

The second unit 3040 is supported by the cartridge housing 3031 to rotate relative to the first unit 3030 about a rotation axis oriented in the second direction.

The photosensitive drum 3032 is rotatable about a drum axis X31 oriented in the second direction. The photosensitive drum 3032 comprises a metal tube and a photosensitive layer applied to the surface of the tube. The tube is electrically connected to a drum grounding terminal 3034*c* which will be described later. Thus, when the photosensitive layer is charged, a potential difference develops between the surface of the photosensitive layer and the tube, whereby an electric field is generated.

The drum coupling 3032*a* is positioned at the other end of the photosensitive drum 3032 facing in a direction parallel to the second direction. The photosensitive drum 3032 receives a rotational force from the main housing 3010 via the drum coupling 3032 and rotates.

The cartridge electrode 3033 is positioned at the one end of the cartridge housing 3031 facing in a direction parallel to the second direction. The cartridge electrode 3033 comprises a process electrode 3034 and an IC chip 3036. The cartridge electrode 3033 is electrically connected to the intermediary electrode 3160 which will be described later, and is electrically connected to the main housing 3010 via the intermediary electrode 3160.

The process electrode 3034 comprises a development electrode 3034*a*, a supply electrode 3034*b*, a drum grounding terminal 3034*c*, and a charge electrode 3034*d*. The development electrode 3034*a* is electrically connected to the development roller 3042. The supply electrode 3034*b* is electrically connected to the supply roller 3045. The drum grounding terminal 3034*c* is electrically connected to the tube of the photosensitive drum 3032. The charge electrode 3034*d* is electrically connected to the charge roller 3035. The process electrode 3034 is exposed to the outside of the cartridge 3020 and is contactable with the intermediary electrode 3160 which will be described later.

The IC chip 3036 comprises a memory 3036*a* and a memory electrode 3036*b*. The memory 3036*a* is capable of storing information related to the cartridge 3020. Specifically, the memory 3036*a* is capable of storing information on whether or not the cartridge 3020 is new, information on an amount of used toner, information on the color of toner contained in the cartridge 3020, etc. The memory electrode 3036*b* is electrically connected to the memory 3036*a*. The memory electrode 3036*b* is exposed to the outside of the cartridge 3020 and is contactable with the intermediary electrode 3160 which will be described later.

The second unit 3040 comprises a development coupling 3040*a*, a development housing 3041, a development roller 3042, a cam receiving recess 3043, an agitator 3044, a supply roller 3045, and a compression spring 3021 as an example of an elastic member.

The development coupling 3040*a* is positioned at the other end of the second unit 3040 facing in a direction parallel to the second direction. The development coupling 3040*a* is rotatable about a development coupling axis X32 which is a rotation axis oriented in the second direction. The development coupling 3040*a* receives a rotational force from the main housing 3010 and rotates. The development roller 3042 receives a rotational force from the development coupling 3040*a* via a gear (not shown) and rotates. The agitator 3044 receives a rotational force from the development coupling 3040*a* via a gear (not shown) and rotates. The supply roller 3045 also receives a rotational force from the development coupling 3040*a* via a gear (not shown) and rotates.

The development housing 3041 contains toner. The development housing 3041 is positioned between the one end of the cartridge housing 3031 and the other end of the cartridge housing 3031 facing in directions parallel to the second direction.

The development roller 3042 causes toner supplied to the supply roller 3045 to adhere to the electrostatic latent image on the surface of the photosensitive drum 3032. At this point, a development voltage is applied to the development roller 3042 by the development electrode 3034*a*.

The cam receiving recess 3043 contacts a translation cam 3170 of the drawer 3100 which will be described later. The cam receiving recess 3043 is positioned at the lower end of the second unit 3040. In other words, the cam receiving recess 3043 is positioned at the other end of the second unit 3040 facing in a direction parallel to the third direction. That is, the cartridge 3020 includes the cam receiving recess 3043 on the other end thereof facing in a direction parallel to the third direction.

The agitator 3044 is disposed inside the development housing 3041, and rotates about an agitator axis X34 oriented in the second direction to agitate toner contained in the development housing 3041.

The supply roller 3045 is positioned inside the development housing 3041, and supplies toner to the development roller 3042. At this time, a supply voltage is applied to the supply roller 3045 by the supply electrode 3034*b*.

As shown in FIG. 61, the second unit 3040 is rotatable relative to the first unit 3030 between a contact position in which the development roller 3042 is caused to contact the photosensitive drum 3032, and a separate position in which the development roller 3042 is separated apart from the photosensitive drum 3032. Since the development coupling 3040*a* is supported by the third boss 3031*c*, the second unit 3040 rotates relative to the first unit 3030 about the development coupling axis X32 (see FIG. 43).

The compression spring 3021 is a member that causes the development roller 3042 to be pressed against the photosensitive drum 3032. The compression spring 3021 is positioned at an outer surface of the development housing 3041 and contacts the first unit 3030. The compression spring 3021 pushes the development housing 3041 in such a manner that the development roller 3042 is brought into contact with and pressed against the photosensitive drum 3032. Thus, when an outside force is not applied to the cartridge 3020 (hereinafter referred to as normal conditions) the development roller 3042 is in contact with the photosensitive drum 3032. In other words, under normal conditions, the second unit 3040 is positioned in the contact position.

It is to be understood that even when the second unit 3040 rotates, the electrical connection between the development electrode 3034*a* and an electrode of the development roller

3042 is maintained. Specifically, an area of contact of the development electrode 3034*a* is greater than an area of contact of the electrode of the development roller 3042. Thus, when the second unit 3040 rotates, the electrode of the development roller 3042 moves in sliding contact with the development electrode 3034*a*. The electrical connection between the electrode of the development roller 3042 and the development electrode 3034*a* is thereby maintained even when the second unit 3040 rotates. Further, the electrical connection between the supply electrode 3034*b* and an electrode of the supply roller 3045 is maintained even when the second unit 3040 rotates. Specifically, an area of contact of the supply electrode 3034*b* is greater than an area of contact of the electrode of the supply roller 3045. Thus, when the second unit 3040 rotates, the electrode of the supply roller 3045 moves in sliding contact with the supply electrode 3034*b*. The electrical connection between the electrode of the supply roller 3045 and the supply electrode 3034*b* is thereby maintained even when the second unit 3040 rotates.

As shown in FIGS. 44, 45, and 46, the drawer 3100 comprises a first side frame 3110, a second side frame 3120, a latch 3130, an intermediary electrode 3160, and a translation cam 3170.

The first side frame 3110 is positioned at one end of the drawer 3100 facing in a direction parallel to the second direction. The first side frame 3110 includes first guide recesses 3111. Each first guide recess 3111 guides one end of a corresponding cartridge 3020 facing in a direction parallel to the second direction when the cartridge 3020 is installed into or removed from the drawer 3100. Specifically, each first guide recess 3111 guides a corresponding first boss 3031*a*.

The second side frame 3120 is positioned at the other end of the drawer 3100 facing in a direction parallel to the second direction (i.e., opposite to the direction in which the one end of the drawer 3100 faces). The second side frame 3120 includes second guide recesses 3121 and third guide recesses 3122. Each second guide recess 3121 and each third guide recess 3122 guide the other end of a corresponding cartridge 3020 facing in a direction parallel to the second direction (i.e., opposite to the direction in which the one end of the cartridge 3020 faces). Specifically, each second guide recess 3121 guides a corresponding second boss 3031*b*. Each third guide recess 3122 guides a corresponding third boss 3031*c*.

The latch 3130 includes a plurality of holes 3131 which allows ends of each cartridge 3020 facing in directions parallel to the second direction to be inserted therein. More specifically, when the latch 3130 is positioned in a lock position which will be described later in a state where the cartridges 3020 are installed in the drawer 3100, the plurality of holes 3131 allow the first boss 3031*a*, the second boss 3031*b*, and the third boss 3031*c* of each cartridge 3020 to be inserted therein.

The latch 3130 is rotatable about a rotation axis oriented in the first direction between a lock position in which each cartridge 3020 is locked to the drawer 3100, and an unlock position in which each cartridge 3020 is unlocked from the drawer 3100. When the latch 3130 is in the unlock position in a state where the cartridges 3020 are installed in the drawer 3100, the cartridges 3020 are installable into and removable from the drawer 3100. When the latch 3130 is in the lock position in a state where the cartridges 3020 are installed in the drawer 3100, the cartridges 3020 are locked to the drawer 3100 and cannot be removed from the drawer 3100. More specifically, when the latch 3130 is in the lock position in a state where the cartridges 3020 are installed in the drawer 3100, the ends of each cartridge 3020 facing in directions parallel to the second direction are inserted into corresponding holes 3131. The latch 3130 thereby restrains the cartridges 3020 from becoming accidentally detached from the drawer 3100.

The latch 3130 comprises a first latch 3140 and a second latch 3150. The first latch 3140 is positioned at the one end of the drawer 3100 facing in a direction parallel to the second direction. The first latch 3140 is positioned at the first side frame 3110. The second latch 3150 is positioned at the other end of the drawer 3100 facing in a direction parallel to the second direction. The second latch 3150 is positioned at the second side frame 3120.

The first latch 3140 comprises a connector 3141, a conductor 3142, and a recess 3143. The connector 3141 is electrically connectable to the memory housing electrode 3016 of the main housing 3010. The conductor 3142 electrically connects the connector 3141 and a memory intermediary electrode 3161 which will be described later.

The connector 3141 is positioned at one end of the first latch 3140 facing in a direction parallel to the first direction. When the drawer 3100 is installed in the main housing 3010, the connector 3141 is electrically connected to the memory housing electrode 3016 of the main housing 3010. In this example, the connector 3141 is supported in a manner movable relative to the first latch 3140 in the third direction. Thus, the connector 3141 can absorb positional deviations when the connector 3141 is connected to the memory housing electrode 3016 of the main housing 3010.

The conductor 3142 is electrically connected to the memory intermediary electrode 3161. The conductor 3142 is positioned at an end of the first latch 3140 opposite to a center of rotation thereof.

The recess 3143 is positioned at the end of the first latch 3140 opposite to the center of rotation thereof. The conductor 3142 is positioned in the recess 3143 of the first latch 3140. The conductor 3142 positioned in the recess 3143 of the first latch 3140 is positioned between an intermediary portion 3165 of a process intermediary electrode 3162 which will be described later and the first latch 3140.

In the fourth example, the latch 3130 includes four memory intermediary electrodes 3161. Thus, four sets of conductors 3142, one set for each of the memory intermediary electrodes 3161, are provided. The four sets of conductors 3142 are connected to a single connector 3141 and are not electrically connected to each other. It is to be understood that, in the fourth example, one set of conductors 3142 refers to a plurality of conductors necessary for exchanging information with the single IC chip 3036.

The intermediary electrode 3160 is positioned at the first latch 3140. In other words, the intermediary electrode 3160 is positioned at the latch 3130.

It is to be understood that in the fourth example, since four cartridges 3020 are installed in the drawer 3100, the drawer 3100 includes four intermediary electrodes 3160. More specifically, the drawer 3100 comprises four memory intermediary electrodes 3161, four development intermediary electrodes 3162*a*, four supply intermediary electrodes 3162*b*, four drum intermediary electrodes 3162*c*, and four charge intermediary electrodes 3162*d* which will be described later. However, since each of the intermediary electrodes 3160 have a similar configuration, the intermediary electrode 3160 corresponding to one cartridge 3020 will be described below.

The intermediary electrode 3160 comprises a memory intermediary electrode 3161 and a process intermediary electrode 3162.

The memory intermediary electrode 3161 contacts a corresponding memory electrode 3036*b* when a corresponding cartridge 3020 is installed in the drawer 3100 and the latch 3130 is positioned in the lock position. The memory intermediary electrode 3161 is electrically connected to the connector 3141 of the first latch 3140 via a corresponding conductor 3142. The connector 3141 is electrically connectable to the memory housing electrode 3016 of the main housing 3010. When the drawer 3100 is installed in the main housing 3010, the memory intermediary electrode 3161 is electrically connected to the memory housing electrode 3016 of the main housing 3010 via the connector 3141. Thus, when the cartridge 3020 is installed in the drawer 3100 and the drawer 3100 is installed in the main housing 3010 with the latch 3130 positioned in the lock position, the memory electrode 3036*b* is electrically connected to the memory housing electrode 3016 of the main housing 3010 via the memory intermediary electrode 3161.

When the first latch 3140 is positioned in the lock position, the contact of the memory intermediary electrode 3161 faces upward. In other words, when the first latch 3140 is positioned in the lock position, the contact of the memory intermediary electrode 3161 faces in a direction in which the cartridge 3020 is removed from the drawer 3100. When the first latch 3140 is positioned in the lock position, the contact of the memory intermediary electrode 3161 is positioned at the end of the first latch 3140 opposite in the third direction to the rotation axis thereof. When the cartridge 3020 is installed in the drawer 3100 with the first latch 3140 positioned in the lock position, the memory electrode 3036*b* contacts the memory intermediary electrode 3161. Thus, the memory intermediary electrode 3161 is electrically connectable to the memory electrode 3036*b*.

The process intermediary electrode 3162 sandwiches the first latch 3140. When the cartridge 3020 is installed in the drawer 3100 with the latch 3130 positioned in the lock position, the process intermediary electrode 3162 contacts the process electrode 3034. The process intermediary electrode 3162 is thereby electrically connected to the process electrode 3034. Further, when the cartridge 3020 is installed in the drawer 3100 with the latch 3130 positioned in the lock position, the process intermediary electrode 3162 contacts the process housing electrode 3015. Thus, the process intermediary electrode 3162 is electrically connectable to the process housing electrode 3015.

The process intermediary electrode 3162 comprises a development intermediary electrode 3162*a*, a supply intermediary electrode 3162*b*, a drum intermediary electrode 3162*c*, and a charge intermediary electrode 3162*d*. The process housing electrode 3015 comprises a development housing electrode 3015*a*, a supply housing electrode 3015*b*, a drum housing electrode 3015*c*, and a charge housing electrode 3015*d*. The intermediary electrode 3160 is electrically connectable to the housing electrode 3014 by contacting the housing electrode 3014 when the cartridge 3020 is installed in the drawer 3100 with the latch 3130 positioned in the lock position.

More specifically, the development intermediary electrode 3162*a* includes a first development contact 3163*a* and a second development contact 3164*a*. The supply intermediary electrode 3162*b* includes a first supply contact 3163*b* and a second supply contact 3164*b*. The drum intermediary electrode 3162*c* includes a first drum contact 3163*c* and a second drum contact 3164*c*. The charge intermediary electrode 3162*d* comprises a first charge contact 3163*d* and a second charge contact 3164*d*. The first development contact 3163*a*, the first supply contact 3163*b*, the first drum contact 3163*c*, and the first charge contact 3163*d* are examples of a first contact 3163. The second development contact 3164*a*, the second supply contact 3164*b*, the second drum contact 3164*c*, and the second charge contact 3164*d* are examples of a second contact 3164.

The first development contact 3163*a* is electrically connectable to the development electrode 3034*a* by contacting the development electrode 3034*a*. The first supply contact 3163*b* is electrically connectable to the supply electrode 3034*b* by contacting the supply electrode 3034*b*. The first drum contact 3163*c* is electrically connectable to the drum grounding terminal 3034*c* by contacting the drum grounding terminal 3034*c*. The first charge contact 3163*d* is electrically connectable to the charge electrode 3034*d* by contacting the charge electrode 3034*d*.

The second development contact 3164*a* is electrically connectable to the development housing electrode 3015*a* by contacting the development housing electrode 3015*a*. The second supply contact 3164*b* is electrically connectable to the supply housing electrode 3015*b* by contacting the supply housing electrode 3015*b*. The second drum contact 3164*c* is electrically connectable to the drum housing electrode 3015*c* by contacting the drum housing electrode 3015*c*. The second charge contact 3164*d* is electrically connectable to the charge housing electrode 3015*d* by contacting the charge housing electrode 3015*d*.

In this way, the development electrode 3034*a* and the development housing electrode 3015*a* are electrically connectable via the development intermediary electrode 3162*a*. The supply electrode 3034*b* and the supply housing electrode 3015*b* are electrically connectable via the supply intermediary electrode 3162*b*. The drum grounding terminal 3034*c* and the drum housing electrode 3015*c* are electrically connectable via the drum intermediary electrode 3162*c*. Further, the charge electrode 3034*d* and the charge housing electrode 3015*d* are electrically connectable via the charge intermediary electrode 3162*d*.

The translation cam 3170 is made of POM. The translation cam 3170 is positioned at a lower end of the drawer 3100 facing in a direction parallel to the third direction. In other words, when the drawer 3100 is installed in the main housing 3010, the translation cam 3170 is positioned at an end of the drawer 3100 closer to the intermediate transfer belt 3073, of two ends of the drawer 3100 separate from each other in the third direction.

In the fourth example, the drawer 3100 includes two translation cams 3170. The first translation cam 3170 is positioned between the photosensitive layer of the photosensitive drum 3032 and the first boss 3031*a* in the second direction. The second translation cam 3170 is positioned between the photosensitive layer of the photosensitive drum 3032 and the second boss 3031*b* in the second direction. The translation cam 3170 is configured not to contact the photosensitive drum 3032, the first boss 3031*a*, or the second boss 3031*b*.

The translation cam 3170 is supported movably relative to the drawer 3100. In the fourth example, the translation cam 3170 is supported on the first side frame 3110 by a snap fit (not shown) provided on the first side frame 3110 so that it is not inadvertently detached from the first side frame 3110.

As shown in FIGS. 40A and 40B, the translation cam 3170 can be translated relative to the drawer 3100 in directions parallel to the first direction. The translation cam

3170 can be translated between a first position (see FIG. 40A) and second position (see FIG. 40B).

The translation cam 3170 contacts the cartridges 3020 when the cartridges 3020 are installed in the drawer 3100. More specifically, the translation cam 3170 includes protrusions 3171 thereon. When each cartridge 3020 is installed in the drawer 3100, a corresponding protrusion 3171 is fitted into a corresponding cam receiving recess 3043 of the cartridge 3020. Each protrusion 3171 has a tapered end. Each of the protrusions 3171 is thereby easily fitted into a corresponding cam receiving recess 3043. When the translation cam 3170 is translated in directions parallel to the first direction with each protrusion 3171 fitted into a corresponding cam receiving recess 3043, each cam receiving recess 3043 receives a force from the protrusion 3171. Since each first unit 3030 is fixed to the drawer 3100 by the latch 3130, a corresponding second unit 3040 that receives the force rotates relative to the first unit 3030. The second unit 3040 rotates about the agitator axis X34. When the translation cam 3170 is positioned in the first position, each photosensitive drum 3032 contacts a corresponding development roller 3042. When the translation cam 3170 is positioned in the second position, each photosensitive drum 3032 is separated apart from the corresponding development roller 3042. Specifically, when the translation cam 3170 is positioned in the first position, each second unit 3040 is positioned in a position in which a corresponding photosensitive drum 3032 and a corresponding development roller 3042 contact each other. When the translation cam 3170 is translated to the second position, the second unit 3040 rotates and separates the development roller 3042 apart from the photosensitive drum 3032. Thus, when the translation cam 3170 is translated from the first position to the second position, the second unit 3040 rotates from a contact position in which the development roller 3042 and the photosensitive drum 3032 contact each other to a separate position in which the development roller 3042 and the photosensitive drum 3032 are separated apart from each other. Similarly, when the translation cam 3170 is translated from the second position to the first position, the second unit 3040 rotates from the separate position in which the development roller 3042 and the photosensitive drum 3032 are separated apart from each other to the contact position in which the development roller 3042 and the photosensitive drum 3032 contact each other.

When the drawer 3100 is installed in the main housing 3010, the translation cam 3170 contacts the main housing 3010.

The translation cam 3170 has a recess 3172 at one end facing in a direction parallel to the first direction. The lever 3013 of the main housing 3010 is fitted into the recess 3172. The lever 3013 is rotatable about a lever axis X33 oriented in the second direction. The translation cam 3170 is translated between the first position and the second position as the lever 3013 rotates. More specifically, the lever 3013 comprises a receiving part 3013*a* and a pushing part 3013*b*. The receiving part 3013*a* receives a force from the main housing 3010. The pushing part 3013*b* is fitted into the recess 3172 and contacts the translation cam 3170. When the receiving part 3013*a* receives a force F3 (see FIGS. 40A and 40B) from the main housing 3010, the lever 3013 rotates causing the pushing part 3013*b* fitted in the recess 3172 to push the translation cam 3170 in the first direction. As a result, the translation cam 3170 moves to the second position. In this example, the force F3 is applied to the lever 3013 by a solenoid (not shown) provided in the main housing 3010. When the receiving part 3013*a* is not receiving the force F3 from the main housing 3010, the pressure member 3021 of the cartridge 3020 causes the second unit 3040 to rotate in a direction in which the development roller 3042 is moved toward and pressed against the photosensitive drum 3032. As a result, the translation cam 3170 is biased by the second unit 3040 and is translated to the first position.

Next, installation of the cartridges 3020 and the drawer 3100 into the main housing 3010 will be described beginning from description of the contact and separation of the intermediate transfer belt 3073 and the photosensitive drums 3032.

The intermediate transfer belt 3073 is movable in conjunction with the opening and closing action of the cover 3011. The movement of the intermediate transfer belt 3073 will be described referring to FIGS. 49A and 49B. The cover 3011 contacts a follower roller shaft 3072*a* of the follower roller 3072. The cover 3011 has an inclined surface 3011*a*. When the cover 3011 rotates with the inclined surface 3011*a* and the follower roller shaft 3072*a* in contact with each other, the follower roller shaft 3072*a* moves in directions parallel to the third direction. The follower roller 3072 thereby moves in directions parallel to the third direction. As a result, the intermediate transfer belt 3073 moves in conjunction with the opening and closing action of the cover 3011. More specifically, the follower roller 3072 moves relative to the main housing 3010 while the drive roller 3071 is fixed to the main housing 3010. Thus, the intermediate transfer belt 3073 rotates about the drive roller 3071 as the rotation axis. The intermediate transfer belt 3073 thereby moves, in conjunction with the opening and closing action of the cover 3011 in a state where the cartridges 3020 are installed in the drawer 3100, between a contact position in which the intermediate transfer belt 3073 contacts the photosensitive drum 3032 and a separate position in which the intermediate transfer belt 3073 is separated apart from the photosensitive drum 3032. As a result, when the cover 3011 is positioned in the close position, the intermediate transfer belt 3073 is positioned in the contact position, and when the cover 3011 is positioned in the open position, the intermediate transfer belt 3073 is positioned in the separate position. Further, in this case, the primary transfer rollers 3074 are kept in contact with the intermediate transfer belt 3073 while moving. When the intermediate transfer belt 3073 is in contact with the photosensitive drums 3032, the intermediate transfer belt 3073 is sandwiched between each photosensitive drum 3032 and a corresponding primary transfer roller 3074.

Next, the sequential action of installing the cartridges 3020 into the drawer 3100, installing the drawer 3100 into the main housing 3010, and moving the cover 3011 to the close position will be described.

The user pulls the drawer 3100 out of the main housing 3010 with the cover 3011 positioned in the open position and moves the latch 3130 to the unlock position, to install and/or remove the cartridges 3020. When the cartridges 3020 are installed into the drawer 3100, each cartridge 3020 is guided and positioned in place in the first direction relative to the drawer 3100 by the first guide recess 3111, the second guide recess 3121, and the third guide recess 3122 of the drawer 3100. After the plurality of cartridges 3020 are installed, the latch 3130 is moved to the lock position. Each of the cartridges 3020 is pushed in a direction parallel to the second direction in the process of the process intermediary electrode 3162 contacting a corresponding cartridge electrode 3033. Each cartridge 3020 is thereby positioned in place relative to the drawer 3100 in the second direction. When the drawer 3100 is installed in the main housing 3010, the connector 3141 is connected to the memory housing electrode 3016.

As shown in FIGS. 49A and 49B, when the cover 3011 is moved to the closed position, the follower roller 3072 is lifted up by the cover 3011. The transfer device 3070 is thereby lifted upward relative to the drawer 3100. In other words, the transfer device 3070 moves toward the drawer 3100 in a direction parallel to the third direction. More specifically, the follower roller 3072 is lifted up by the inclined surface 3011*a* of the cover 3011, which causes the intermediate transfer belt 3073 to move toward the drawer 3100. The intermediate transfer belt 3073 thereby contacts each of the photosensitive drums 3032. Further, when the follower roller 3072 is lifted up by the cover 3011, each photosensitive drum 3032 is pushed by the intermediate transfer belt 3073. Therefore, each of the cartridges 3020 is lifted upward relative to the drawer 3100. Each first boss 3031*a* thereby contacts a rim 3132 around a corresponding hole 3131 of the latch 3130. More specifically, the first boss 3031*a* contacts a wedge-shaped portion 1132*a* of the rim 3132 around the hole 3121. The cartridges 3020 are thereby positioned in place in the third direction relative to the drawer 3100. When each of the cartridges 3020 is lifted further upward with the first boss 3031*a* in contact with the wedge-shaped portion 1132*a* of the latch 3130, the drawer 3100 is lifted in an upward direction parallel to the third direction. As a result, a protrusion 3101 of the drawer 3100 contacts the main housing 3010.

According to the above-described fourth example, the photosensitive drum 3032 and the development roller 3042 in the cartridge 3020 can be brought into contact with and separated apart from each other by the translation cam 3170 included in the drawer 3100. Thus, the development roller 3042 and the photosensitive drum 3032 in the cartridge 3020 installed in the drawer 3100 can be easily positioned in place relative to each other by translation cam 3170.

According to the above-described fourth example, the first photosensitive drum 3032*a* and the first development roller 3042*a* in the first cartridge 3020*a*, and the second photosensitive drum 3032*b* and the second development roller 3042*b* in the second cartridge 3020*b* can be brought into contact with and separated apart from each other at once by the translation cam 3170. Thus, the plurality of photosensitive drums 3032 and the plurality of corresponding development rollers 3042 can be brought into contact with and separated apart from each other by a simple configuration.

According to the above-described fourth example, the development roller 3042 is movable between a position in which the development roller 3042 is in contact with the photosensitive drum 3032 and a position in which the development roller 3042 is separated apart from the photosensitive drum 3032 when the second unit 3040 including the development roller 3042 rotates in response to translation of the translation cam 3170. Since the photosensitive drum 3032 does not move, the possibility of undesirable change in the position at which the toner image on the photosensitive drum 3032 is transferred onto the intermediate transfer belt 3073 can be reduced.

According to the above-described fourth example, since a configuration in which the protrusions 3171 of the translation cam 3170 are fitted into the cam receiving recess 3043 of a corresponding second unit 3040 is provided, it is not necessary to provide a protrusion on the cartridge 3020 to cause the cartridge 3020 and the translation cam 3170 to contact each other.

According to the above-described fourth example, the cartridge 3020 can be locked to the drawer 3100 by the latch 3130 positioned on the ends of the cartridge 3020 facing in directions parallel to the second direction. Thus, the cartridge 3020 can be restrained from becoming accidentally detached from the drawer 3100.

According to the above-described fourth example, the first unit 3030 of the cartridge 3020 can be locked to the drawer 3100 by the latch 3130 positioned on the ends of the cartridge 3020 facing in directions parallel to the second direction. Thereby, rotation of only the second unit 3040 is facilitated while the first unit 3030 is locked to the drawer 3100 which makes it easier to cause the photosensitive drum 3032 and the development roller 3042 to be brought into contact with and separated apart from each other.

According to the above-described fourth example, since the translation cam 3170 is positioned at the lower end of the drawer 3100 facing in a direction parallel to the third direction, the cartridge 3020 is contactable with the translation cam 3170 at the same time as that at which the cartridge 3020 is installed into the drawer 3100. The translation cam 3170 can thereby be easily positioned in place relative to the cartridge 3020 installed in the drawer 3100.

According to the above-described fourth example, when a force is not applied to the lever 3013 from the housing 3010, a force in the direction in which the development roller 3042 pushes the photosensitive drum 3032 is applied by the compression spring 3021. The translation cam 3170 is thereby pushed and positioned at the first position via the cartridge 3020. Thus, when it is not necessary to separate the photosensitive drum 3032 and the development roller 3042 apart from each other, the photosensitive drum 3032 and the development roller 3042 are kept in contact with each other. Accordingly, the translation cam may be moved to the second position only when the photosensitive drum 3032 and the development roller 3042 are to be positioned apart from each other which thereby allows a simple structure.

According to the above-described fourth example, since the drawer 3100 can be installed in the main housing 3010 with the lever 3013 being positioned in a first rotation position apart from the recess, the drawer 3100 and the lever 3013 can be configured not to interfere with each other. Further, by rotating the lever 3013 of the drawer 3100 installed in the main housing 3010 to a second rotation position, the translation cam 3170 can be moved from the first position to the second position.

According to the above-described fourth example, the translation cam 3170 of the drawer 3100 installed in the main housing 3100 is positioned in the second position only when a force is applied to the lever 3013 from the main housing 3010, and the translation cam 3170 is positioned in the first position when a force is not applied to the lever 3013 from the main housing 3010. Accordingly, the lever 3013 may be operated only when the photosensitive drum 3032 and the development roller 3042 are to be separated apart from each other which thereby allows a simple structure.

While the fourth example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the fourth example, the memory electrode is configured to face downward. However, as shown in FIG. 50, the memory electrode may be configured to face an outside of the cartridge in a direction parallel to the second direction. In this case, the memory intermediary electrode will be configured to face the inside of the drawer in a direction parallel to the second direction. Thus, the memory intermediary electrode can be electrically connected to the memory electrode.

Although the drawer includes two translation cams in the fourth example, the drawer may include one translation cam.

Although the photosensitive drum is charged by the charge roller in the fourth example, the photosensitive drum may be charged by a scorotron charger.

Although each of the cartridge electrodes, specifically, each of the memory electrode, the development electrode, the supply electrode, the drum grounding terminal, and the charge electrode are electrically connected to the housing electrode via the intermediary electrode in the fourth example, each of the cartridge electrodes do not have to be electrically connected via the intermediary electrode. For example, the memory electrode may be configured to directly contact and be electrically connected to the housing electrode.

Although the process intermediary electrode is configured to sandwich the latch in the fourth example, the latch may have a hole and the process intermediary electrode may be configured to be inserted into the hole of the latch.

Although one pair of latches configured to lock a plurality of cartridges is provided in the fourth example, one pair of latches may be configured to lock only one cartridge.

Although both ends of the cartridge facing directions parallel to the second direction are locked in the fourth example, the cartridge may be locked at only one of the ends thereof.

Although the cartridge housing includes a cartridge electrode in the fourth example, the cartridge may comprise a first side cover configured to support one end of the first unit and one end of the second unit facing in directions parallel to the second direction, and a second side cover configured to support the other end of the first unit and the other end of the second unit facing in directions parallel to the second direction, and the first side cover may include the cartridge electrode. Further, the second side cover may include a second boss and a third boss. In this case, since the cartridge may be assembled by attaching the one ends of the first unit and the second unit facing in a direction parallel to the second direction to the first side cover, and then attaching the other ends of the first unit and the second unit facing in a direction parallel to the second direction to the second side cover, the cartridge is easy to assemble.

Although the arrangement of cartridge electrodes is the same among the plurality of cartridges in the fourth example, the arrangement of cartridge electrodes may be different among the plurality of cartridges. In this case, the cartridge electrode and the housing electrode may be electrically connected to each other by changing the arrangement and/or shape of the intermediary electrode.

Although the second unit is biased by the compression spring in the fourth example, the biasing member is not limited to a compression spring but may be any other elastic member such as a tension spring or a leaf spring. Further, the elastic member may be configured to directly push the shaft of the development roller.

The fifth example of the present disclosure will be described in detail referring to the drawings where appropriate.

As shown in FIG. 51, a multicolor printer 4001 as an example of an image forming apparatus comprises a main housing 4002, a sheet feeder unit 4003, an image forming unit 4004, and an ejection unit 4005. The sheet feeder unit 4003 feeds sheets S to the image forming unit 4004. The image forming unit 4004 forms an image on each sheet S. The ejection unit 4005 ejects each sheet to the outside of the main housing 4002.

The main housing 4002 has an opening 4002A and a front cover 4021. The front cover 4021 is rotatable between an open position (see FIG. 52) in which the opening is uncovered 4002A and a close position in which the opening 4002A is closed.

The sheet feeder unit 4003 is arranged in a lower part of the main housing 4002. The sheet feeder unit 4003 comprises a sheet tray 4031 and a feeding mechanism 4032. The sheet tray 4031 is installable into and removable from the main housing 4002. The feeding mechanism 4032 conveys sheets S one by one from the sheet tray 4031 to the image forming unit 4004.

The image forming unit 4004 comprises a drum unit DU4, a scanner unit SU4, a belt unit BU4, and a fixing unit FU4.

The drum unit DU4 comprises a drawer 4040 and four cartridges 4050. Four cartridges 4050 can be installed in the drawer 4040. As shown in FIGS. 51 and 52, the drawer 4040 is movable relative to the main housing 4002 in directions parallel to a first direction. Specifically, the drawer 4040 is movable through the opening 4002A of the main housing 4002 between a first position inside the main housing 4002 and a second position outside the main housing 4002.

Herein, the opening 4002A is an opening through which the drawer 4040 can pass. The opening 4002A is positioned at one end E41 of the main housing 4002 facing in a direction parallel to the first direction The first position is a position in which the drawer 4040 is positioned when an image forming process is executed. The second position is a position in which the drawer 4040 is positioned when the cartridges 4050 are installed into or removed from the drawer 4040. In this example, the first direction is perpendicular to a second direction which will be described later and a third direction which is the up-down direction.

Each of the four cartridges 4050 contains toner of a color different from colors of toner contained in the other cartridges 4050. The four cartridges 4050 are aligned in the first direction. The cartridges 4050 are respectively installable into and removable from the drawer 4040. The cartridges 4050 each comprise a photosensitive drum 4051 and a development roller 4052. Although not shown in the drawings, each of the cartridges 4050 also comprises a charge roller that charges the photosensitive drum 4051, and other components.

The photosensitive drum 4051 is rotatable about a drum axis X41 oriented in the second direction non-parallel to the first direction. In this example, the second direction is perpendicular to the first direction and to the third direction.

The development roller 4052 supplies toner to the photosensitive drum 4051. The development roller 4052 is rotatable about a rotation axis parallel to the drum axis X41.

The scanner unit SU4 is positioned above the drum unit DU4. The scanner unit SU4 emits laser light toward each of the photosensitive drums 4051.

The belt unit BU4 is positioned below the drum unit DU4. The belt unit BU4 comprises a drive roller 4061, a follower roller 4062, an intermediate transfer belt 4063, four primary transfer rollers 4064, and a secondary transfer roller 4065.

The intermediate transfer belt 4063 is an endless belt. The drive roller 4061 and the follower roller 4062 cause the intermediate transfer belt 4063 to rotate.

The drive roller 4061, the follower roller 4062, and the primary transfer rollers 4064 are positioned to face an inner surface of the intermediate transfer belt 4063. The intermediate transfer belt 4063 is sandwiched between each of the primary transfer rollers 4064 and a corresponding photosensitive drum 4051.

The secondary transfer roller 4065 is positioned to face an outer surface of the intermediate transfer belt 4063. The intermediate transfer belt 4063 is sandwiched between the secondary transfer roller 4065 and the drive roller 4061.

The fixing unit FU4 is positioned at a position higher than that of the intermediate transfer belt 4063. The fixing unit FU4 comprises a heating roller 4071 and a pressure roller 4072. The pressure roller 4072 is pressed against the heating roller 4071.

The ejection unit 4005 is positioned in an upper part of the main housing 4002. The ejection unit 4005 comprises an ejection roller 4009 and an output tray 4022. The ejection roller 4009 conveys each sheet S toward the output tray 4022.

In the multicolor printer 4001, first of all, the charge roller charges a surface of the photosensitive drum 4051. Subsequently, the scanner unit SU4 exposes the surface of the photosensitive drum 4051 to light to thereby form an electrostatic latent image thereon.

Next, the development roller 4052 supplies toner to the electrostatic latent image formed on the surface of the photosensitive drum 4051 to thereby form a toner image on the surface of the photosensitive drum 4051. Then, the toner image on the surface of the photosensitive drum 4051 is transferred onto the intermediate transfer belt 4063.

The toner image on the intermediate transfer belt 4063 is transferred onto a sheet S when the sheet S passes through between the intermediate transfer belt 4063 and the secondary transfer roller 4065. Thereafter, the toner image on the sheet S is fixed onto the sheet S at the fixing unit FU4. The sheet S is subsequently ejected onto the output tray 4022 by the ejection roller 4009.

As shown in FIGS. 53A and 53B, the drawer 4040 comprises a frame F4, four first lock levers R41, and four second lock levers R42. The frame F4 is a frame in which the cartridges 4040 are to be installed. The frame F4 includes a first side frame F41, a second side frame F42, a third side frame F43, and a fourth side frame F44.

The first side frame F41 and the second side frame F42 are arranged and spaced apart in the second direction. The first side frame F41 contacts one end of each cartridge 4050 facing in a direction parallel to the second direction when the cartridge 4050 is installed in the drawer 4040. The second side frame F42 contacts the other end of each cartridge 4050 facing in a direction parallel to the second direction (i.e., opposite to the direction in which the one end of each cartridge 4050 faces) when the cartridge 4050 is installed in the drawer 4040.

The third side frame F43 and the fourth side frame F44 are arranged and spaced apart in the first direction. The third side frame F43 and the fourth side frame F44 connect the first side frame F41 and the second side frame F42. Specifically, the third side frame F43 connects one end of the first side frame F41 and one end of the second side frame F42 both facing in a direction parallel to the first direction. The fourth side frame F44 connects the other end of the first side frame F41 and the other end of the second side frame F42 both facing in a direction parallel to the first direction (i.e., opposite to the direction in which the one ends of the first side frame F41 the second side frame F42 face).

The first lock lever R41 and the second lock lever R42 are levers for locking each cartridge 4050 to the drawer 4040. Specifically, the first lock lever R41 and the second lock lever R42 lock each cartridge 4050 to the frame F4.

The four first lock levers R41 are positioned at one end of the drawer 4040 facing in a direction parallel to the second direction. Specifically, the four first lock levers R41 are positioned at the first side frame F41. The four first lock levers R41 are aligned in the first direction. One first lock lever R41 is provided for each of the four cartridges 4050. Specifically, each of the first lock levers R41 is positioned at one end of a corresponding cartridge 4050 facing in a direction parallel to the second direction.

The four second lock levers R42 are positioned at the other end of the drawer 4040 facing in a direction parallel to the second direction (i.e., opposite to the direction in which the one end of the drawer 4040 faces). Specifically, the four second lock levers R42 are positioned at the second side frame F42. The four second lock levers R42 are aligned in the first direction. One second lock lever R42 is provided for each of the four cartridges 4050. Specifically, each of the second lock levers R42 is positioned at the other end of a corresponding cartridge 4050 facing in a direction parallel to the second direction (i.e., opposite to the direction in which the one end of the cartridge 4050 faces).

As shown in FIG. 54A, each first lock lever R41 is rotatable about a first lever axis X42 oriented in the first direction. The first lock lever R41 is rotatably attached to the first side frame F41.

As shown in FIG. 54B, each second lock lever R42 is rotatable about a second lever axis X43 oriented in the first direction. The second lock lever R42 is rotatably attached to the second side frame F42.

As shown in FIG. 55A, each cartridge 4050 comprises a first side surface 4511, a cover 4512, a first boss 4513, a first protrusion 4514, a development electrode 4515, a drum grounding terminal 4516, a charge electrode 4517, a supply electrode 4518, and a memory M4. The first side surface 4511 is positioned at one end of the cartridge 4050 facing in a direction parallel to the second direction. The cover 4512, the first boss 4513, the first protrusion 4514, the development electrode 4515, the drum grounding terminal 4516, the charge electrode 4517, and the supply electrode 4518 protrude from the first side surface 4511. The development electrode 4515, the drum grounding terminal 4516, the charge electrode 4517, and the supply electrode 4518 are provided in this sequence in a direction parallel to the first direction.

The cover 4512 extends from the first side surface 4511 in a direction parallel to the second direction. The memory M4 is affixed to the undersurface of the cover 4512. In other words, the cover 4512 covers the memory M4 from above.

The memory M4 stores cartridge information related to the cartridge 4050. The memory M4 is, for example, an IC chip. The memory M4 is not limited to an IC chip but may be any other medium as long as it can store cartridge information. The cartridge information consists of at least one of identification information such as a serial number and life information related to the life of the cartridge.

The memory M4 comprises a storage element and an electrical contact (not shown). The electrical contact is positioned at the one end of the cartridge 4050 facing in a direction parallel to the second direction. The electrical contact is positioned on the underside of the memory M4. The electrical contact faces downward. The electrical contact contacts a housing contact provided in the main housing 4002 when the drawer 4040 with the cartridges 4050 installed therein is installed in the main housing 4002. The storage element of the memory M4 may be in contact with or positioned apart from the electrical contact.

The first boss 4513 is a cylinder positioned about the drum axis X41. As shown in FIG. 55B, the first protrusion 4514 is positioned between the development electrode 4515 and the drum axis X41 in the third direction. The first side frame F41 of the drawer 4040 has a recess F411. The first boss 4513 is fitted into the recess F411 when the cartridge 4050 is installed into the drawer 4040.

The development electrode 4515 is electrically connected to the development roller 4052. The development electrode 4515 is an electrode for supplying a voltage to the development roller 4052.

The drum grounding terminal 4516 is electrically connected to the photosensitive drum 4051. The drum grounding terminal 4516 is a terminal for grounding a shaft of the photosensitive drum 4051.

The charge electrode 4517 is electrically connected to the charge roller (not shown) for charging the photosensitive drum 4051. The charge electrode 4517 is an electrode for supplying a voltage to the charge roller.

The supply electrode 4518 is electrically connected to a supply roller (not shown) for supplying toner to the development roller 4052. The supply electrode 4518 is an electrode for supplying a voltage to the supply roller.

As shown in FIGS. 55C and 55D, each first lock lever R41 comprises a side wall R411 and a flange R412. The side wall R411 faces a corresponding cartridge 4050 in the second direction when the first lock lever R41 is positioned in a lock position P41 which will be described later (see FIG. 57A). The lower end of the side wall R411 is rotatably attached to the first side frame F41 (see FIG. 55B).

When the first lock lever R41 is positioned in the lock position P41 which will be described later, the flange R412 protrudes from the side wall R411 toward a side opposite to a side on which the cartridge 4050 is positioned (see FIG. 57A). When the first lock lever R41 is positioned in the lock position P41, the flange R412 is positioned between the memory M4 and the development electrode 4515, the drum grounding terminal 4516, the charge electrode 4517, and the supply electrode 4518. In the following description, "the development electrode 4515, the drum grounding terminal 4516, the charge electrode 4517, and the supply electrode 4518" is also referred to as "the development electrode 4515 and other electrodes".

The flange R412 has a curved surface R4121. The curved surface R4121 is positioned on a downstream end of the flange R412 in a direction of installation of the drawer 4040. Herein, the direction of installation of the drawer 4040 is a direction from the second position toward the first position. The curved surface R4121 is an arc-shaped curved surface of which a center of curvature is positioned on an axis parallel to the third direction when the first lock lever R41 is positioned in the lock position P41 which will be described later.

The first lock lever R41 further comprises a pressure member 4080. As shown in FIG. 55B, the pressure member 4080 pushes the cartridge 4050 against the drawer 4040. Specifically, the pressure member 4080 pushes the cartridge 4050 against the first side frame F41. The pressure member 4080 comprises a contact member 4081 and a second spring 4082.

The contact member 4081 contacts the first protrusion 4514 of the cartridge 4050. The contact member 4081 is movably attached to the side wall R411.

The second spring 4082 biases the contact member 4081 toward the first protrusion 4514 of the cartridge 4050. The second spring 4082 is positioned between the side wall R411 and the contact member 4081.

As shown in FIG. 56A, each cartridge 4050 comprises a second side surface 4521, a second boss 4522, a third boss 4523, and a second protrusion 4524. The second side surface 4521 is positioned at the other end of the cartridge 4050 facing in a direction parallel to the second direction (i.e., opposite to the direction in which the one end of the cartridge 4050 faces). The second boss 4522, the third boss 4523, and the second protrusion 4524 protrude from the second side surface 4521.

The second boss 4522 is a cylinder. A development coupling C41 for transferring a drive force to the development roller 4052 and other components is positioned inside the second boss 4522 and is rotatable relative to the second boss 4522. The third boss 4523 is a cylinder having a center on the drum axis X41. A drum coupling C42 for transferring a drive force to the photosensitive drum 4051 is positioned inside the third boss 4523 and is rotatable relative to the third boss 4523.

As shown in FIG. 56B, the second protrusion 4524 is positioned between a center 4522A of the second boss 4522 and the drum axis X41 in the third direction. The second side frame F42 of the drawer 4040 has a recess F421. The third boss 4523 is fitted into the recess F421 when the cartridge 4050 is installed in the drawer 4040.

As shown in FIGS. 56C and 56D, each second lock lever R42 comprises a side wall R421 and a flange R422. The side wall R421 faces a corresponding cartridge 4050 in the second direction when the second lock lever R42 is positioned in a lock position P44 which will be described later (see FIG. 57B). The lower end of the side wall R421 is rotatably attached to the second side frame F42 (see FIG. 56B). The side wall R421 has a hole R4211 into which the second boss 4522 is to be inserted.

When the second lock lever R42 is positioned in the lock position P44 which will be described later, the flange R422 protrudes from the side wall R421 toward a side opposite to a side on which the cartridge 4050 is positioned (see FIG. 57B). The flange R422 has a curved surface R4221. The curved surface R4221 is positioned on a downstream end of the flange R422 in the direction of installation of the drawer 4040. The curved surface R4221 is an arc-shaped curved surface of which a center of curvature is positioned on an axis parallel to the third direction when the second lock lever R42 is positioned in the lock position P44 which will be described later.

The second lock lever R42 further comprises a pressure member 4090. As shown in FIG. 56B, the pressure member 4090 pushes the cartridge 4050 against the drawer 4040. Specifically, the pressure member 4090 pushes the cartridge 4050 against the second side frame F42. The pressure member 4090 comprises a contact member 4091 and a second spring 4092.

The contact member 4091 is a member that contacts the second protrusion 4524 of the cartridge 4050. The contact member 4091 is movably attached to the side wall R421.

The second spring 4092 is a spring that biases the contact member 4091 toward the second protrusion 4524 of the cartridge 4050. The second spring 4092 is positioned between the side wall R421 and the contact member 4091.

As shown in FIG. 57A, the first lock lever R41 is rotatable among a lock position P41, an unlock position P42, and a release position P43. In other words, the first lock lever R41 is rotatable from the lock position P41, through the unlock position P42, to the release position P43.

The lock position P41 is a position in which the first lock lever R41 locks the cartridge 4050 to the drawer 4040. When the first lock lever R41 is positioned in the lock position P41, the pressure member 4080 contacts the first protrusion 4514 and biases the cartridge 4050 with a predetermined biasing force.

When the first lock lever R41 is positioned in the lock position P41, the cartridge 4050 overlaps the side wall R411 of the first lock lever R41 as viewed in a direction parallel to the third direction (the direction in which the cartridge 4050 is installed into or removed from the drawer 4040).

As shown in FIG. 55B, when the first lock lever R41 is positioned in the lock position P41, a part of the side wall R411 is positioned above the development electrode 4515 and other electrodes. When the first lock lever R41 is positioned in the lock position P41, a part of the side wall R411 is positioned below the memory M4.

The unlock position P42 is a position in which the first lock lever R41 unlocks the cartridge 4050 from the drawer 4040. When the first lock lever R41 is positioned in the unlock position P42, the pressure member 4080 moves out of contact with the first protrusion 4514. Thus, the biasing force of the pressure member 4080 exerted when the first lock lever R41 is positioned in the unlock position P42 is smaller than the biasing force of the pressure member 4080 exerted when the first lock lever R41 is positioned in the lock position P41.

When the first lock lever R41 is positioned in the unlock position P42, the cartridge 4050 does not overlap the first lock lever R41 as viewed in a direction parallel to the third direction. In other words, the part of the side wall R411 that was positioned over the development electrode 4515 and other electrodes when the first lock lever R41 was positioned in the lock position P41 is positioned at positions different from those of the development electrode 4515 and other electrodes in the second direction. Thus, when the first lock lever R41 is positioned in the unlock position P2, the cartridge 4050 can be removed from the drawer 4040 without the development electrode 4515 and other electrodes interfering with the cartridge 4050. Further, when the first lock lever R41 is positioned in the unlock position P2, the part of the side wall R411 is positioned at a position different from that of the memory M4 in the second direction.

The release position P43 is a position farther, than the unlock position P2, from the lock position P41. The biasing force of the pressure member 4080 exerted when the first lock lever R41 is in the release position P43 is smaller than the biasing force of the pressure member 4080 exerted when the first lock lever P41 is in the lock position P41. In the release position P43, the position of an upper portion of the first lock lever R41 can be positioned further apart from the cartridge 4050 than that in the unlock position P42.

As shown in FIG. 57B, the second lock lever R42 is rotatable among a lock position P44, an unlock position P45, and a release position P46. Since the positional relationship of the cartridge 4050 and the second lock lever R42 in the lock position P44, the unlock position P45, and the release position P46 is approximately the same as the positional relationship of the cartridge 4050 and the first lock lever R41 in the lock position P41, the unlock position P42, and the release position P43, only the points of the former different from the latter will be described below.

When the second lock lever R42 is positioned in the lock position P44 as shown in FIG. 56B, the second boss 4522 is inserted into the hole R4211 of the second lock lever R42. When the second lock lever R42 is positioned in the unlock position P45, the hole R4211 of the second lock lever R42 is positioned in a position different from the second boss 4522 in the second direction. That is, the second boss 4522 is positioned outside the hole R4211.

As shown in FIGS. 55D and 56D, the drawer 4040 further comprises first springs 4041. The first springs 4041 are springs for respectively retaining the lock levers R41, R42 in their unlock positions P42, P45. Since the first springs 4041 provided on the side of the first lock levers P41 and the first springs 4041 provided on the side of the second lock levers R42 have approximately the same structures and functions, only the first springs 4041 on the side of the first lock levers R41 will be described below as an illustrative example.

The first spring 4041 biases the first lock lever R41 positioned in the release position P43 toward the unlock position P42. Further, the first spring 4041 biases the first lock lever R41 positioned in the lock position P41 toward the unlock position P42.

Herein, the biasing force of the second spring 4082 is greater than the biasing force of the first spring 4041. Specifically, a force that retains the first lock lever R41 in the lock position P41 by the second spring 4082 is greater than a force that pushes the first lock lever R41 by the first spring 4041 toward the unlock position P42. Thus, in the lock position P41, the first lock lever R41 will not move out of the lock position P41 by the biasing force of the first spring 4041. When the lock lever R41 is positioned between the lock position P41 and the unlock position P42, specifically, when the pressure member 4080 is out of contact with the first protrusion 4514, the first lock lever R41 is rotated toward the unlock position P42 by the biasing force of the first spring 4041.

The first spring 4041 is a torsion spring. One end of the first spring 4041 is in contact with the first lock lever R41. The other end of the first spring 4041 is in contact with the frame F4.

As shown in FIG. 58, the main housing 4002 comprises a first wall 4210 and a second wall 4220. The first wall 4210 is positioned at one end of the main housing 4002 facing in a direction parallel to the second direction. The second wall 4220 is positioned at the other end of the main housing 4002 facing in a direction parallel to the second direction (i.e., opposite to the direction in which the one end of the main housing 4002 faces).

The second wall 4220 includes a housing inner surface 4221, a bulge 4222, and an inclined surface 4223. The housing inner surface 4221 is a surface that faces, in directions parallel to the second direction, the drawer 4040 positioned in the first position (see FIG. 60C). The bulge 4222 bulges out from the housing inner surface 4221. The bulge 4222 extends in a direction parallel to the first direction.

The inclined surface 4223 is a surface that contacts each second lock lever R42 and causes the second lock lever R42 to rotate from the unlock position P45 to the lock position P44 when the drawer 4040 with the cartridges 4050 installed therein, with the second lock lever R42 positioned in the unlock position, moves from the second position to the first position. Specifically, as shown in FIG. 59, the inclined surface 4223 is contactable with the curved surface R4221 of a corresponding flange R422 of each second lock lever R42 positioned in the unlock position P45.

The inclined surface 4223 is positioned at the one end E41 of the main housing 4002. The inclined surface 4223 is inclined with respect to the first direction. Specifically, the inclined surface 4223 is inclined in such a manner that the closer to the downstream side in the direction of installation of the drawer 4040, the closer the inclined surface 4223 is to the drawer 4040 in a direction parallel to the second direction. When the drawer 4040 is positioned in the second position and the second lock lever R42 is positioned in the unlock position P45, the inclined surface 4223 is opposed to the flange R422 of each second lock lever R42 in a direction parallel to the first direction.

As shown in FIG. 58, the bulge 4222 includes a part of the inclined surface 4223. Specifically, a part of the inclined surface 4223 is positioned at an upstream end of the bulge 4222 in the direction of installation of the drawer 4040.

The bulge 4222 further includes a restriction surface 4224. The restriction surface 4224 restricts rotation of each second lock lever R42 from the lock position P44 to the unlock position P45. The restriction surface 4224 extends from the inclined surface 4223 to the other end E42 (see FIG. 60A) of the main housing 4002 in the first direction. The restriction surface 4224 faces the flange R422 of each second lock lever R42 when the drawer 4040 is positioned in the first position (see FIG. 60C).

As shown in FIG. 59, the first wall 4210 includes a housing inner surface 4211, a bulge 4212, an inclined surface 4213, and a restriction surface 4214. Since the housing inner surface 4211, the bulge 4212, the inclined surface 4213, and the restriction surface 4214 of the first wall 4210 respectively have approximately the same structures and functions as those of the housing inner surface 4221, the bulge 4222, the inclined surface 4223, and the restriction surface 4224 of the second wall 4220, a detail description thereof will be omitted. A brief description of only the inclined surface 4213 will be given below.

The inclined surface 4213 is a surface that contacts each first lock lever R41 and causes the first lock lever R41 to rotate from the unlock position P42 to the lock position P41 when the drawer 4040 with the cartridges 4050 installed therein, with the first lock lever R41 positioned in the unlock position P42, moves from the second position to the first position. Specifically, the inclined surface 4213 is contactable with the curved surface R4121 of a corresponding flange R412 of each first lock lever R41 positioned in the unlock position P42.

Next, the operations performed and advantageous effects achieved by each of the parts of the main housing 4002 when the cartridge 4050 is replaced will be described.

In order to remove a cartridge 4050 from the main housing 4002, the user first moves the drawer 4040, as shown in FIG. 52, from the first position inside the main housing 4002 to the second position outside the main housing 4002. Thereafter, the user rotates each of the lock levers R41, R42 from their lock positions P41, P44 to their unlock positions P42, P45. The cartridge 4050 is thereby unlocked from the drawer 4040.

In this operation, for example, if the user takes his/her hand off the first lock lever R41 before the first lock lever R41 reaches the unlock position P42, the first lock lever R41 rotates to the unlock position P42 by the biasing force of the first spring 4041. Thus, the first lock lever R41 can be restrained from stopping between the lock position P41 and the unlock position P42 and causing the development electrode 4515 and other electrodes to interfere with the first lock lever R41 when the cartridge 4050 is removed; thus, the structure with the first spring 4041 is advantageous in comparison with an alternative structure that does not include the first spring 4041.

Further, if the user takes his/her hand off the first lock lever R41 after rotating the first lock lever R41, for example, to the release position P43, the first lock lever R41 also rotates to the unlock position P42 by the biasing force of the first spring 4041. That is, after the user unlocks the cartridge 4050 by rotating the first lock lever R41, the first lock lever R41 rotates to the unlock position P42 and is retained in the unlock position P42 regardless of the position at which the user takes his/her hand off the first lock lever R41. The second lock lever R42 operates in a manner similar to that of the first lock lever R41.

Subsequently, the user removes the cartridge 4050 from the drawer 4040 and then installs a new cartridge 4050 into the drawer 4040.

Thereafter, as the user moves the drawer 4040 from the second position to the first position with each of the lock levers R41, R42 remaining at their unlock position P42, P45, each of the lock levers R41, R42 positioned at their unlock position P42, P45 contacts a part of the main housing 4002, specifically, a corresponding inclined surface 4213, 4223, as shown in FIGS. 60A and 60B.

Then, as the user moves the drawer 4040 further toward the first position, each of the lock levers R41, R42 are pushed by the corresponding inclined surface 4213, 4223 and rotate, as shown in FIGS. 60B, 60C from their unlock position P42, P45 to their lock position P41, P44. The lock levers R41, R42 thereby lock the cartridges 4050 to the drawer 4040.

After each of the lock levers R41, R42 reaches their lock position P41, P44, each of the lock levers R41, R42 faces a corresponding restriction surface 4214, 4224 in a direction parallel to the second direction. The lock levers R41, R42 are thereby restricted from rotating from their lock position P41, P44 to their unlock position P42, P45 by the corresponding restriction surface 4214, 4224.

According to the above, the following advantageous effects can be obtained by the fifth example.

Since each of the lock levers R41, R42 contacts a corresponding inclined surface 4213, 4223 of the main housing 4002 and rotates to the lock position P41, P44 when the drawer 4040 in which cartridges 4050 are installed, with each of the lock levers R41, R42 in the unlock position P42, P45, is moved from the second position to the first position, the cartridges 4050 can be locked to the drawer 4040 by the lock levers R41, R42 even if the user forgets to lock the cartridges 4050 to the drawer 4040.

Since each of the lock levers R41, R42 can be rotated to the release position P43, P46, it is easier to remove the cartridge 4050. Further, since each lock lever R41, R42 returns to the unlock position P42, P45 by the first spring 4041 when a user takes his/her hand off the lock lever R41, R42 rotated to the release position P43, P46, each lock lever R41, R42 can be reliably caused to contact a corresponding inclined surface 4213, 4223 of the main housing 4002 and rotate to the lock position P41, P44 when the drawer 4040 is moved from the second position to the first position.

While the fifth example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the following description, parts having approximately the same structures as the fifth example are designated by the same reference characters and detailed explanations thereof will be omitted.

Although parts of the main housing 4002 that contact the lock levers R41, R42 are the inclined surfaces 4213, 4223 inclined with respect to the first direction in the above-described fifth example, parts of the main housing 4002 that contact a corresponding lock lever R41, R42 may be surfaces perpendicular to the first direction. Also in this case, for example, by forming the curved surfaces of the respective lock levers R41, R42 as surfaces inclined with respect to the first direction, it is possible to cause each of the lock levers R41, R42 to rotate from the unlock position P42, P45 to the lock position P41, P44 by the parts of the main housing 4002.

Although the bulges 4212, 4222 form parts of respective inclined surfaces 4213, 4223 in the above-described fifth example, a bulge, for example, may include the whole inclined surface.

Although the main housing 4002 is configured to include bulges 4212, 4222 in the above-described fifth example, the main housing 4002 need not include bulges. In this case, the inner surfaces of the housing may be configured to function as restriction surfaces.

Although the main housing 4002 is configured to include restriction surfaces 4214, 4224 in the above-described fifth example, the main housing 4002 need not include restriction surfaces.

Although the lock levers R41, R42 are configured to include respective flanges R412, R422 in the above-described fifth example, the flanges R412, R422 need not be provided. For example, an inclined surface may contact a side wall of the lock lever.

Although the cartridge 4050 does not overlap the first lock lever R41 positioned in the unlock position P42 as viewed in a direction parallel to the third direction (the direction in which the cartridge 4050 is installed into or removed from the drawer 4040) in the above-described fifth example, the cartridge 4050 may overlap the first lock lever R41 positioned in the unlock position P42 as viewed in the direction parallel to the third direction. In this case, the first lock lever 41 is rotated to the release position P43 to remove the cartridge 4050 from the drawer 4040.

Although the lock levers R41, R42 are rotatable from the lock position P41, P44 to the release position P43, P46 in the above-described fifth example, the lock levers may be rotatable from the lock position to the unlock position, not to the release position. In this case, the first spring need not be provided, and the lock lever may be retained in the unlock position by contact with the frame.

Although a multicolor printer 4001 is given as an example of an image forming apparatus in the above-described fifth example, the image forming apparatus may be a monochrome printer, a copy machine, a multifunction printer, etc.

The first spring 4041 and the second spring 4082 are not limited to those in the above-described fifth example, but may be any other spring such as a leaf spring, a wire spring, etc.

The sixth example of the present disclosure will be described in detail referring to the drawings where appropriate.

As shown in FIG. 61, a multicolor printer 5001 as an example of an image forming apparatus comprises a main housing 5002, a sheet feeder unit 5003, an image forming unit 5004, and an ejection unit 5005. The sheet feeder unit 5003 feeds sheets S to the image forming unit 5004. The image forming unit 5004 forms an image on each sheet S. The ejection unit 5005 ejects each sheet to the outside of the main housing 5002.

The main housing 5002 has an opening 5002A and a front cover 5021. The front cover 5021 is rotatable between an open position (see FIG. 62) in which the opening 5002A is uncovered and a close position in which the opening 5002A is closed.

The sheet feeder unit 5003 is arranged in a lower part of the main housing 5002. The sheet feeder unit 5003 comprises a sheet tray 5031 and a feeding mechanism 5032. The sheet tray 5031 is installable into and removable from the main housing 5002. The feeding mechanism 5032 conveys sheets S one by one from the sheet tray 5031 to the image forming unit 5004.

The image forming unit 5004 comprises a drum unit DU5, a scanner unit SU5, a belt unit BU5, and a fixing unit FU5.

The drum unit DU5 comprises a drawer 5040 and four cartridges 5050. Four cartridges 5050 can be installed in the drawer 5040. As shown in FIGS. 61 and 62, the drawer 5040 is movable relative to the main housing 5002 in directions parallel to a first direction. Specifically, the drawer 5040 is movable through the opening 5002A of the main housing 5002 between a first position inside the main housing 5002 and a second position outside the main housing 5002.

Herein, the opening 5002A is an opening through which the drawer 5040 can pass. The opening 5002A is positioned at one end E51 of the main housing 5002 facing in a direction parallel to the first direction The first position is a position in which the drawer 5040 is positioned when an image is formed on a sheet S. The second position is a position in which the drawer 5040 is positioned when the cartridges 5050 are installed into or removed from the drawer 5040. In this example, the first direction is perpendicular to a second direction which will be described later and to a third direction which is the up-down direction.

Each of the four cartridges 5050 contains toner of a color different from colors of toner contained in the other cartridges 5050. In this example, the four cartridges 5050 respectively contain toner of yellow, magenta, cyan, and black. The four cartridges 5050 are aligned in the first direction. The cartridges 5050 are respectively installable into and removable from the drawer 5040. The cartridges 5050 each comprise a photosensitive drum 5051 and a development roller 5052. Although not shown in the drawings, each of the cartridges 5050 also comprises a charge roller that charges the photosensitive drum 5051, and other components.

The photosensitive drum 5051 is rotatable about a drum axis X51 oriented in the second direction non-parallel to the first direction. In this example, the second direction is perpendicular to the first direction and to the third direction.

The development roller 5052 supplies toner to the photosensitive drum 5051. The development roller 5052 is rotatable about a development axis X52 oriented in the second direction.

The scanner unit SU5 is positioned above the drum unit DU5. The scanner unit SU5 emits laser light toward each of the photosensitive drums 5051.

The belt unit BU5 is positioned below the drum unit DU5. The belt unit BU5 comprises a drive roller 5061, a follower roller 5062, an intermediate transfer belt 5063, four primary transfer rollers 5064, and a secondary transfer roller 5065.

The intermediate transfer belt 5063 is an endless belt. The drive roller 5061 and the follower roller 5062 cause the intermediate transfer belt 5063 to rotate.

The drive roller 5061, the follower roller 5062, and the primary transfer rollers 5064 are positioned to face an inner surface of the intermediate transfer belt 5063. The intermediate transfer belt 5063 is sandwiched between each of the primary transfer rollers 5064 and a corresponding photosensitive drum 5051.

The secondary transfer roller 5065 is positioned to face an outer surface of the intermediate transfer belt 5063. The intermediate transfer belt 5063 is sandwiched between the secondary transfer roller 5065 and the drive roller 5061.

The fixing unit FU5 is positioned at a position higher than that of the intermediate transfer belt 5063. The fixing unit FU5 comprises a heating roller 5071 and a pressure roller 5072. The pressure roller 5072 is pressed against the heating roller 5071.

The ejection unit 5005 is positioned in an upper part of the main housing 5002. The ejection unit 5005 comprises an ejection roller 5009 and an output tray 5022. The ejection roller 5009 conveys each sheet S toward the output tray 5022.

In the multicolor printer 5001, first of all, the charge roller charges a surface of the photosensitive drum 5051. Subsequently, the scanner unit SU5 exposes the surface of the photosensitive drum 5051 to light to thereby form an electrostatic latent image thereon.

Next, the development roller 5052 supplies toner to the electrostatic latent image formed on the surface of the photosensitive drum 5051 to thereby form a toner image on the surface of the photosensitive drum 5051. Then, the toner image on the surface of the photosensitive drum 5051 is transferred onto the intermediate transfer belt 5063.

The toner image on the intermediate transfer belt 5063 is transferred onto a sheet S when the sheet S passes through between the intermediate transfer belt 5063 and the secondary transfer roller 5065. Thereafter, the toner image on the sheet S is fixed onto the sheet S at the fixing unit FU5. The sheet S is subsequently ejected onto the output tray 5022 by the ejection roller 5009.

As shown in FIG. 63, the drawer 5040 comprises a drawer frame F5, four first lock levers R51, and four second lock levers R52. The drawer frame F5 is a frame in which the cartridges 5040 are to be installed. The drawer frame F5 includes a first side frame F51, a second side frame F52, a third side frame F53, and a fourth side frame F54.

The first side frame F51 and the second side frame F52 are positioned apart from each other in the second direction. The first side frame F51 contacts one end of each cartridge 5050 facing in a direction parallel to the second direction when the cartridge 5050 is installed in the drawer 5040. The second side frame F52 contacts the other end of each cartridge 5050 facing in a direction parallel to the second direction (i.e., opposite to the direction in which the one end of each cartridge 5050 faces) when the cartridge 5050 is installed in the drawer 5040. Specifically, the first side frame F51 includes a recess F511. The recess F511 is dented in a downward direction. The one end of the cartridge 5050 facing in a direction parallel to the second direction, specifically, a first boss 5513 which will be described later, is fitted into the recess F511. The second side frame F52 includes a recess F521. The recess F521 is dented in a downward direction. The other end of the cartridge 5050 facing in a direction parallel to the second direction, specifically, a third boss 5523 which will be described later, is fitted into the recess F521.

The third side frame F53 and the fourth side frame F54 are positioned apart from each other in the first direction. The third side frame F53 and the fourth side frame F54 connect the first side frame F51 and the second side frame F52. Specifically, the third side frame F53 connects one end of the first side frame F51 and one end of the second side frame F52 both facing in a direction parallel to the first direction. The fourth side frame F54 connects the other end of the first side frame F51 and the other end of the second side frame F52 both facing in a direction parallel to the first direction (i.e., opposite to the direction in which the one ends of the first side frame F51 the second side frame F52 face).

The first lock levers R51 and the second lock levers R52 are levers, each pair of which is provided for locking a corresponding cartridge 5050 to the drawer 5040. Specifically, each first lock lever R51 locks the one end of the cartridge 5050 facing in a direction parallel to the second direction to the draw frame F5. Each second lock lever R52 locks the other end of the cartridge 5050 facing in a direction parallel to the second direction (i.e., opposite to the direction in which the one end of the cartridge 5050 faces) to the drawer frame F5.

The four first lock levers R51 are positioned at the first side frame F51. In other words, the four first lock levers R51 are positioned at one end of the drawer 5040 facing in a direction parallel to the second direction. The four first lock levers R51 are aligned in the first direction. One first lock lever R51 is provided for each of the four cartridges 5050.

Each first lock lever R51 is rotatable about a first lever axis X53 oriented in the first direction. The first lock lever R51 is rotatably attached to the first side frame F51. The first lock lever R51 is rotatable between a first lock position in which the one end of the cartridge 5050 facing in a direction parallel to the second direction is locked to the drawer frame F5 and a first unlock position in which the one end of the cartridge 5050 is unlocked from the drawer frame F5.

The four second lock levers R52 are positioned at the second side frame F52. In other words, the four second lock levers R52 are positioned at the other end of the drawer 5040 facing in a direction parallel to the second direction (i.e., opposite to the direction in which the one end of the drawer 5040 faces). The four second lock levers R52 are aligned in the first direction. One second lock lever R52 is provided for each of the four cartridges 5050.

Each second lock lever R52 is rotatable about a second lever axis X54 oriented in the first direction. The second lock lever R52 is rotatably attached to the second side frame F52. The second lock lever R51 is rotatable between a second lock position in which the other end of the cartridge 5050 facing in a direction parallel to the second direction is locked to the drawer frame F5 and a second unlock position in which the other end of the cartridge 5050 is unlocked from the drawer frame F5.

As shown in FIG. 64A, each cartridge 5050 comprises a first side surface 5511, a cover 5512, a first boss 5513, a first protrusion 5514, a development electrode 5515, a drum grounding terminal 5516, a charge electrode 5517, a supply electrode 5518, a handle 5519, a color identification label L5 and a memory M5. The first side surface 5511, the cover 5512, the first boss 5513, the first protrusion 5514, the supply electrode 5518, the charge electrode 5517, the drum grounding terminal 5516, the development electrode 5515, and the memory M5 are positioned at the one end of the cartridge 5050 facing in a direction parallel to the second direction. The development electrode 5515, the drum grounding terminal 5516, the charge electrode 5517, and the supply electrode 5518 are provided in this sequence in a direction parallel to the first direction.

The cover 5512 extends from the first side surface 5511 in the second direction. The memory M5 is affixed to the undersurface of the cover 5512. In other words, the cover 5512 covers the memory M5 from above (see FIG. 66).

The memory M5 stores cartridge information related to the cartridge 5050. The memory M5 is, for example, an IC chip. The memory M5 is not limited to an IC chip but may be any other medium as long as it can store cartridge information. The cartridge information consists of at least one of identification information such as a serial number and life information related to the life of the cartridge.

The memory M5 comprises a storage element (not shown) and an electrical contact EC5. The electrical contact EC5 is positioned at the one end of the cartridge 5050 facing in a direction parallel to the second direction. As shown in FIG. 6, the electrical contact EC5 faces downward. The electrical contact EC5 contacts a housing contact 5023 which will be described later when the drawer 5040 with the cartridges 5050 installed therein is installed in the main housing 5002. The storage element of the memory M5 may be in contact with or positioned apart from the electrical contact EC5.

As shown in FIGS. 65A and 65B, at least a part of the first lock lever R51, specifically, a flange R512 is positioned further apart, than the electrical contact EC5, from the second side frame F52 when the first lock lever R51 is positioned in the first lock position.

As shown in FIGS. 64A and 64B, the first boss 5513 is a cylinder with a center on the drum axis X51. The first boss 5513 protrudes from the first side surface 5511 in a direction parallel to the second direction. The first boss 5513 is fitted into the recess F511 when the cartridge 5050 is installed into the drawer 5040.

The first protrusion 5514 is positioned between the development electrode 5515 and the drum axis X51 in the third direction. The first protrusion 5514 protrudes from the first side surface 5511 in a direction parallel to the second direction.

The development electrode 5515 is electrically connected to the development roller 5052. The development electrode 5515 is an electrode for supplying a voltage to the development roller 5052. When the first lock lever R51 is positioned in the first lock position, at least a part of the first lock lever R51, specifically, the flange R512 is positioned further apart, than the development electrode 5515, from the second side frame F52 (see FIGS. 65A and 65B). It is to be understood that, when the first lock lever R51 is positioned in the first lock position, as viewed from above as shown in FIG. 65B, an end of the development electrode 5515 is positioned behind the first lock lever R51 and cannot be seen. On the other hand, when the first lock lever R51 is positioned in the first unlock position, as shown in FIG. 65A, the development electrode 5515 can be seen from above.

The drum grounding terminal 5516 is electrically connected to the photosensitive drum 5051. The drum grounding terminal 5516 is a terminal for grounding a shaft of the photosensitive drum 5051. When the first lock lever R51 is positioned in the first lock position, at least a part of the first lock lever R51, specifically, the flange R512, is positioned further apart, than the drum grounding terminal 5516, from the second side frame F52 (see FIGS. 65A and 65B).

The charge electrode 5517 is electrically connected to the charge roller (not shown) for charging the photosensitive drum 5051. The charge electrode 5517 is an electrode for supplying a voltage to the charge roller. When the first lock lever R51 is positioned in the first lock position, at least a part of the first lock lever R51, specifically, the flange R512, is positioned further apart, than the charge electrode 5517, from the second side frame F52 (see FIGS. 65A, 65B and 66).

The supply electrode 5518 is electrically connected to a supply roller (not shown) for supplying toner to the development roller 5052. The supply electrode 5518 is an electrode for supplying a voltage to the supply roller. When the first lock lever R51 is positioned in the first lock position, at least a part of the first lock lever R51, specifically, the flange R512, is positioned further apart, than the supply electrode 5518, from the second side frame F52 (see FIGS. 65A, 65B and 66).

The handle 5519 is positioned at the top surface of the cartridge 5050. The handle 5519 can be grasped by the user and is used when the cartridge 5050 is installed into or removed from the drawer 5040.

The color identification label L5 is affixed to the handle 5519. The color identification label L5 is a label for identifying the color of toner in the cartridge 5050. For example, a color identification label L5 indicating yellow is affixed to the cartridge 5050 in which toner of yellow is stored. Information other than information for identifying color may also be indicated on the color identification label L5.

As shown in FIGS. 64C and 64D, each first lock lever R51 comprises a side wall R511 and a flange R512. When the first lock lever R51 is positioned in the first lock position, the side wall R511 and a corresponding cartridge 5050 face each other in the second direction (see FIG. 70A). The lower end of the side wall R511 is rotatably attached to the first side frame F51 (see FIG. 63).

When the first lock lever R51 is positioned in the first lock position, the flange R512 extends from the upper end of the side wall R511 in a direction away from the cartridge 5050 parallel to the second direction. The flange R512 has a first recess R5121. The first recess R5121 is dented in a downward direction when the first lock lever R51 is positioned in the first lock position. The first recess R5121 allows a user's finger(s) to be inserted therein when the first lock lever R51 is positioned in the first lock position.

The first lock lever R51 further comprises a pressure member 5080. As shown in FIG. 64B, the pressure member 5080 pushes the cartridge 5050 against the drawer 5040. Specifically, the pressure member 5080 pushes the cartridge 5050 against the first side frame F51. The pressure member 5080 comprises a contact member 5081 and a spring 5082.

The contact member 5081 contacts the first protrusion 5514 of the cartridge 5050. The contact member 5081 is movably attached to the side wall R511.

The spring 5082 biases the contact member 5081 toward the first protrusion 5514 of the cartridge 5050. The spring 5082 is positioned between the side wall R511 and the contact member 5081. The spring 5082 is a compression spring.

As shown in FIG. 67A, each cartridge 5050 comprises a second side surface 5521, a second boss 5522, a third boss 5523, and a second protrusion 5524. The second side surface 5521, the second boss 5522, the third boss 5523, and the second protrusion 5524 are positioned at the other end of the cartridge 5050 facing in a direction parallel to the second direction. The second boss 5522, the third boss 5523, and the second protrusion 5524 protrude from the second side surface 5521.

The second boss 5522 is a cylinder. A development coupling C51 for transferring a drive force to the development roller 5052 and other components is positioned inside the second boss 5522 and is rotatable relative to the second boss 5522. The third boss 5523 is a cylinder having a center on the drum axis X51. A drum coupling C52 for transferring a drive force to the photosensitive drum 5051 is positioned inside the third boss 5523 and is rotatable relative to the third boss 5523.

As shown in FIG. 67B, the second protrusion 5524 is positioned between a center 5522A of the second boss 5522 and the drum axis X51 in the third direction. The third boss 5523 is fitted into the recess F521 when the cartridge 5050 is installed in the drawer 5040.

As shown in FIGS. 67C and 67D, each second lock lever R52 comprises a side wall R521. The side wall R521 and a corresponding cartridge 5050 face each other in the second direction when the second lock lever R52 is positioned in the second lock position (see FIG. 65B). The lower end of the side wall R521 is rotatably attached to the second side frame F52 (see FIG. 63). The side wall R521 has a hole R5211 into which the second boss 5522 is to be inserted.

The second lock lever R52 further comprises a pressure member 5090. As shown in FIG. 67B, the pressure member 5090 pushes the cartridge 5050 against the drawer 5040. Specifically, the pressure member 5090 pushes the cartridge 5050 against the second side frame F52. The pressure member 5090 comprises a contact member 5091 and a spring 5092.

The contact member 5091 contacts the second protrusion 5524 of the cartridge 5050. The contact member 5091 is movably attached to the side wall R521.

The spring 5092 biases the contact member 5091 toward the second protrusion 5524 of the cartridge 5050. The spring 5092 is positioned between the side wall R521 and the contact member 5091. The spring 5092 is a compression spring.

Herein, when the first lock lever R51 is positioned in the first lock position, the pressure member 5080 contacts the first protrusion 5514 and biases the cartridge 5050 with a predetermined biasing force (see FIG. 64B). Similarly, when the second lock lever R52 is positioned in the second lock position, the pressure member 5090 contacts the second protrusion 5524 and biases the cartridge 5050 with a predetermined biasing force (see FIG. 67B). The ends of the cartridge 5050 facing in directions parallel to the second direction are thereby pushed by the pressure members 5080, 5090.

As shown in FIG. 68, the main housing 5002 further comprises housing contacts 5023, electrode contacts 5024, and grounding contacts 5025. Each housing contact 5023 is a contact which allows a controller (not shown) in the main housing 5002 to read cartridge information of the cartridge 5050.

Specifically, as shown in FIGS. 69 and 70A, when the drawer 5040 is installed in the main housing 5002, each housing contact 5023 contacts the electrical contact EC5 of the memory M5 on each cartridge 5050. As shown in FIG. 68, when the drawer 5040 moves from the second position to the first position, the housing contacts 5023 pass through space under the flanges R512 of the first lock levers R51.

It is to be understood that when the drawer 5040 moves from the second position to the first position, the drawer 5040 is guided by a guide rail (not shown) to slide in a direction parallel to the first direction. The drawer 5040 having slid toward the first position moves a bit downward and reaches the first position. When the drawer 5040 moves a bit downward as described above, each photosensitive drum 5051 contacts the intermediate transfer belt 5063, the electrical contact EC5 of each memory M5 contacts a corresponding housing contact 5023, each development electrode 5515, charge electrode 5517, and supply electrode 5518 contacts a corresponding electrode contact 5024, and each drum grounding terminal 5516 contacts a corresponding grounding contact 5025.

According to the above-described sixth example of the multicolor printer 5001, the following advantageous effects can be obtained In the multicolor printer 5001, when the first lock lever R51 is positioned in the first lock position, at least a part of the first lock lever R51 is positioned further apart, than the electrical contact EC5 of the memory M5, from the second side frame F52 in a direction parallel to the second direction. Thus, it is possible to restrain the user from touching the electrical contact EC5 of the memory when operating the first lock lever R51.

When the first lock lever R51 is positioned in the first lock position, at least a part of the first lock lever R51 is positioned further apart, than the drum grounding terminal 5516, from the second side frame F52 in the direction parallel to the second direction. Thus, it is possible to restrain the user from touching the drum grounding terminal 5516 when operating the first lock lever R51.

When the first lock lever R51 is positioned in the first lock position, at least a part of the first lock lever R51 is positioned further apart, than the development electrode 5515, from the second side frame F52 in the direction parallel to the second direction. Thus, it is possible to restrain the user from touching the development electrode 5515 when operating the first lock lever R51.

When the first lock lever R51 is positioned in the first lock position, at least a part of the first lock lever R51 is positioned further apart, than the supply electrode 5518, from the second side frame F52 in the direction parallel to the second direction. Thus, it is possible to restrain the user from touching the supply electrode 5518 when operating the first lock lever R51.

When the first lock lever R51 is positioned in the first lock position, at least a part of the first lock lever R51 is positioned further apart, than the charge electrode 5517, from the second side frame F52 in the direction parallel to the second direction. Thus, it is possible to restrain the user from touching the charge electrode 5517 when operating the first lock lever R51.

The memory M5 is affixed to the undersurface of the cover 512 and the electrical contact EC5 of the memory M5 faces downward. Thus, the electrical contact EC5 can be restrained from being soiled.

The flange R512 of the first lock lever R51 has a first recess R5121 that allows a user's finger(s) to be inserted therein when the first lock lever R51 is positioned in the first lock position. Thus, the user can easily rotate the first lock lever from the first lock position to the first unlock position by inserting his/her finger(s) into the first recess R5121.

Each of the housing contacts 5023 that contact the electrical contacts EC5 of a corresponding memory M5 passes through space under the flanges R512 of the first lock levers R51 when the drawer 5040 moves from the second position to the first position. Thus, the housing contacts 5023 and the first lock levers R51 can be restrained from interfering with each other when the drawer 5040 moves from the second position to the first position.

The color identification label L5 for identifying the color of toner in each cartridge 5050 is affixed to a corresponding handle 5519. Thus, the user can easily identify the color of toner in the cartridge 5050.

The drawer 5040 comprises a second lock lever R52 for locking the cartridge 5050 to the drawer frame F5. Thus, the cartridge 5050 is securely locked to the drawer 5040.

A first variation of the sixth example will be described.

In the above-described sixth example, as shown in FIG. 63, the first lock lever R51 is flush with the upper end of the cartridge 5050 when the first lock lever R51 is positioned in the first lock position, whereas, in the first variation as shown in FIG. 71, at least a part of a first lock lever R53 is positioned at a position higher than that of the upper end of the cartridge 5050 when the first lock lever R53 is positioned in a first lock position.

Specifically, in a drum unit DU52 of the first variation, a part of the first lock lever R53, specifically a part of a flange R532, is positioned at a position higher than that of the upper end of the cartridge when the first lock lever R53 is positioned in the first lock position. Similarly, a part of a second lock lever R54, specifically a part of a flange R542, is positioned at a position higher than that of the upper end of the cartridge when the second lock lever R54 is positioned in a second lock position.

According to such a drum unit DU52, similar to the sixth example, it is possible to restrain the user from touching the electrical contact EC5 of the memory M5 when operating the first lock lever R53. Further, since a part of the first lock lever R53 and a part of the second lock lever R54 are positioned at positions higher than that of the upper end of the cartridge 5050, it is easy for the user to visually identify and operate the first lock lever R53 and the second lock lever R54.

Next, a second variation of the sixth example will be described.

In the above-described sixth example, one first lock lever R51 is provided for each of the four cartridges 5050, whereas, in the second variation, one first lock lever R55 can lock the four cartridges 5050 altogether.

As shown in FIG. 72, the first lock lever R55 provided on the drum unit DU53 of the second variation comprises a plurality of lock portions R551. Specifically, the first lock lever includes four lock portions R551 and can lock four cartridges 5050 with one lock lever R55.

In such a drum unit DU53, the user can lock a plurality of cartridges 5050 to the drawer frame at once by operating one first lock lever R55.

Next, a third variation of the sixth example will be described.

Although the first lock lever R51 positioned in the first lock position is flush with the cover 5512 that covers the memory M5 from above, in the second direction in the above-described sixth example as shown in FIG. 63, the first lock lever may protrude further outward in a direction parallel to the second direction than the cover 512.

For example, as shown in FIG. 73, in a drum unit DU54 of the third variation, an end of a first lock lever R56 positioned in a first lock position is positioned further outward in the second direction than a cover 5512. Specifically, when the first lock lever R56 is positioned in the first lock position, at least a portion of the first lock lever R56 is positioned further apart, than the cover 5512 that covers the memory M5 from above, from the second side frame F52 in a direction parallel to the second direction.

According to the third variation, similar to the sixth example, it is possible to restrain the user from touching the electrical contact EC5 of the memory M5 when operating the first lock lever R56.

While the sixth example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the color identification label L5 is affixed to the handle 5519 in the sixth example, the color identification label L5 may be affixed to a position other than the handle 5519.

For example, as shown in FIG. 74, color identification labels L52 and the handle 5519 may be aligned in the second direction. Further, the color identification labels L52 may be affixed to both of the handle 5519 and a portion between the handle 5519 and the cover 5512.

Although the electrical contact EC5 of the memory M5 provided on the cartridge is facing downward in the above-described sixth example, the electrical contact EC5 may face in any other direction.

Although the supply electrode 5518, the charge electrode 5517, the drum grounding terminal 5516, and the development electrode 5515 are aligned in this sequence in a direction parallel to the first direction in the above-described sixth example, these components may be aligned in a different sequence.

Although the springs 5082, 5092 are compression springs in the above-described sixth example, the springs may, for example, be leaf springs, wire springs, etc.

Although a plurality of cartridges are installable into the drawer in the above-described sixth example, the drawer may be configured to allow only one cartridge to be installed therein.

Although the cartridge includes a development roller in the above-described sixth example, the cartridge need not include a development roller.

Although the image forming apparatus is a multicolor printer in the above-described sixth example, the image forming apparatus may be a monochrome image forming apparatus, a copy machine, or a multifunction printer or may be an apparatus that exposes photosensitive drums to light using LEDs.

The seventh example of the present disclosure will be described in detail referring to the drawings where appropriate.

As shown in FIG. 75, a multicolor printer 6001 as an example of an image forming apparatus comprises a main housing 6002, a sheet feeder unit 6003, an image forming unit 6004, and an ejection unit 6005. The sheet feeder unit 6003 feeds sheets S to the image forming unit 6004. The image forming unit 6004 forms an image on each sheet S. The ejection unit 6005 ejects each sheet to the outside of the main housing 6002.

The main housing 6002 has an opening 6002A and a front cover 6021. The front cover 6021 is rotatable between an open position (see FIG. 76) in which the opening 6002A is uncovered and a close position in which the opening 6002A is closed.

The sheet feeder unit 6003 is arranged in a lower part of the main housing 6002. The sheet feeder unit 6003 comprises a sheet tray 6031 and a feeding mechanism 6032. The sheet tray 6031 is installable into and removable from the main housing 6002. The feeding mechanism 6032 conveys sheets S one by one from the sheet tray 6031 to the image forming unit 6004.

The image forming unit 6004 comprises a drum unit DU6, a scanner unit SU6, a belt unit BU6, and a fixing unit FU6.

The drum unit DU6 comprises a drawer 6040 and four cartridges 6050. Four cartridges 6050 can be installed in the drawer 6040. As shown in FIGS. 75 and 76, the drawer 6040 is installable into and removable from the main housing 6002. The drawer 6040 is movable relative to the main housing 6002 in directions parallel to a first direction. Specifically, the drawer 6040 is movable in directions parallel to the first direction through the opening 6002A of the main housing 6002 between a first position inside the main housing 6002 and a second position outside the main housing 6002.

Herein, the opening 6002A is an opening through which the drawer 6040 can pass. The opening 6002A is positioned at one end E61 of the main housing 6002 facing in a direction parallel to the first direction The position inside the main housing 6002 is a position in which the drawer 6040 is positioned when an image is formed on a sheet S. The position outside the main housing 6002 is a position in which the drawer 6040 is positioned when the cartridges 6050 are installed into or removed from the drawer 6040.

Each of the four cartridges 6050 contains toner of a color different from colors of toner contained in the other cartridges 6050. The four cartridges 6050 are aligned in the first direction. The cartridges 6050 are respectively installable into and removable from the drawer 6040. The cartridges 6050 each comprise a photosensitive drum 6051 and a development roller 6052. Although not shown in the drawings, each of the cartridges 6050 also comprises a charge roller that charges the photosensitive drum 6051, a supply roller that supplies toner to the development roller 6052, and other components.

The photosensitive drum 6051 is rotatable about a drum axis X61 oriented in a second direction non-parallel to the first direction. In this example, the second direction is perpendicular to the first direction. Further, a third direction is non-parallel to the first direction and to the second direction. In this example, the third direction is perpendicular to the first direction and to the second direction. The third direction corresponds to the up-down direction of the multicolor printer 6001.

The development roller 6052 supplies toner to the photosensitive drum 6051. The development roller 6052 is rotatable about a roller axis X62 oriented in the second direction, parallel to the drum axis X61.

The scanner unit SU6 is positioned above the drum unit DU6. The scanner unit SU6 emits laser light, shown by an alternate long and short dashed lines, toward each of the photosensitive drums 6051.

The belt unit BU6 is positioned below the drum unit DU6. The belt unit BU6 comprises a drive roller 6061, a follower roller 6062, an intermediate transfer belt 6063, four primary transfer rollers 6064, and a secondary transfer roller 6065.

The intermediate transfer belt 6063 is an endless belt contactable with the photosensitive drums 6051. The drive roller 6061 and the follower roller 6062 cause the intermediate transfer belt 6063 to rotate. The drive roller 6061, the follower roller 6062, and the primary transfer rollers 6064 are positioned to face an inner surface of the intermediate transfer belt 6063. The intermediate transfer belt 6063 is sandwiched between each of the primary transfer rollers 6064 and a corresponding photosensitive drum 6051. The secondary transfer roller 6065 is positioned to face an outer surface of the intermediate transfer belt 6063. The intermediate transfer belt 6063 is sandwiched between the secondary transfer roller 6065 and the drive roller 6061.

The fixing unit FU6 is positioned at a position higher than that of the intermediate transfer belt 6063. The fixing unit FU6 comprises a heating roller 6071 and a pressure roller 6072. The pressure roller 6072 is pressed against the heating roller 6071.

The ejection unit 6005 is positioned in an upper part of the main housing 6002. The ejection unit 6005 comprises an ejection roller 6009 and an output tray 6022. The ejection roller 6009 conveys each sheet S toward the output tray 6022.

In the multicolor printer 6001, first of all, the charge roller charges a surface of the photosensitive drum 6051. Subsequently, the scanner unit SU6 exposes the surface of the photosensitive drum 6051 to light to thereby form an electrostatic latent image thereon. Next, the development roller 6052 supplies toner to the electrostatic latent image formed on the surface of the photosensitive drum 6051 to thereby form a toner image on the surface of the photosensitive drum 6051.

The toner image on the surface of the photosensitive drum 6051 is transferred onto the intermediate transfer belt 6063. The toner image on the intermediate transfer belt 6063 is transferred onto a sheet S when the sheet S passes through between the intermediate transfer belt 6063 and the secondary transfer roller 6065. Thereafter, the toner image on the sheet S is fixed onto the sheet S at the fixing unit FU6. The sheet S on which the toner image is fixed is subsequently ejected onto the output tray 6022 by the ejection roller 6009.

As shown in FIGS. 77A and 77B, the drawer 6040 comprises a frame F6, four first lock levers 6110, and four second lock levers 6120. The frame F6 is a frame in which the cartridges 6050 are to be installed. The frame F6 includes a first side frame F61, a second side frame F62, a third side frame F63, and a fourth side frame F64.

The first side frame F61 and the second side frame F62 are arranged and spaced apart in the second direction. The first side frame F61 is positioned at one side of each cartridge 6050 facing in a direction parallel to the second direction when the cartridge 6050 is installed in the drawer 6040. The second side frame F62 is positioned at the other side of each cartridge 6050 facing in a direction parallel to the second direction (i.e., opposite to the direction in which the one side of each cartridge 6050 faces) when the cartridge 6050 is installed in the drawer 6040.

The third side frame F63 and the fourth side frame F64 are arranged and spaced apart in the first direction. The third side frame F63 and the fourth side frame F64 connect the first side frame F61 and the second side frame F62. Specifically, the third side frame F63 connects one end of the first side frame F61 and one end of the second side frame F62 both facing in a direction parallel to the first direction. The fourth side frame F64 connects the other end of the first side frame F61 and the other end of the second side frame F62 both facing in a direction parallel to the first direction (i.e., opposite to the direction in which the one ends of the first side frame F61 the second side frame F62 face).

The first lock lever 6110 and the second lock lever 6120 are levers for locking each cartridge 6050 to the drawer 6040.

The four first lock levers 6110 are positioned at one end of the drawer 6040 facing in a direction parallel to the second direction. Specifically, the four first lock levers 6110 are positioned at the first side frame F61. The four first lock levers 6110 are aligned in the first direction. The drawer 6040 comprises one first lock lever 6110 for each of the four cartridges 6050. Each of the first lock levers 6110 is positioned at one side of a corresponding cartridge 6050 facing in a direction parallel to the second direction (which is the same direction as the direction in which the one end of the drawer 6040 faces).

Each first lock lever 6110 is rotatably attached to the first side frame F61. Specifically, each first lock lever 6110 is rotatable about a first lever axis X63 oriented in the first direction, between a first lock position shown in FIG. 77A and a first unlock position shown in FIG. 77B.

The four second lock levers 6120 are positioned at the other end of the drawer 6040 facing in a direction parallel to the second direction (i.e., opposite to the direction in which the one end of drawer 6040 faces). Specifically, the four second lock levers 6120 are positioned at the second side frame F62. The four second lock levers 6120 are aligned in the first direction. The drawer 6040 comprises one second lock lever 6120 for each of the four cartridges 6050. Each of the second lock levers 6120 is positioned on the other side of a corresponding cartridge 6050 facing in a direction parallel to the second direction (i.e., opposite to the direction in which the one side of the cartridge 6050 faces).

Each second lock lever 6120 is rotatably attached to the second side frame F62. Specifically, each second lock lever 6120 is rotatable about a second lever axis X64 oriented in the first direction, between a second lock position shown in FIG. 77A and a second unlock position shown in FIG. 77B.

As shown in FIGS. 78A and 78B, each cartridge 6050 further comprises a drum frame 6051F, a development frame 6052F, a tension spring 6056, a drum coupling C61, a development coupling C62, a drum gear G61, a development roller gear G62, and an idle gear G63.

The drum frame 6051F supports the photosensitive drum 6051 in a manner that allows the photosensitive drum 6051 to rotate. The drum frame 6051F also supports the charge roller (not shown) in a manner that allows the charge roller to rotate. The photosensitive drum 6051 and the charge roller may be supported by the drum frame 6051F directly or via a bearing or the like.

The development frame 6052F supports the development roller 6052 in a manner that allows the development roller 6052 to rotate. The development frame 6052F also supports the supply roller (not shown) in a manner that allows the supply roller to rotate. The development frame 6052F includes a toner containing chamber (not shown) that can contain toner. The development roller 6052 and the supply roller may be supported by the development frame 6052F directly or via a bearing or the like.

The drum frame 6051F is movable relative to the development frame 6052F between a contact position shown in FIGS. 78A and 78B and a separate position shown in FIGS. 79A and 79B. Specifically, the drum frame 6051F is rotatable relative to the development frame 6052F between the contact position and the separate position.

As shown in FIGS. 78A and 78B, the photosensitive drum 6051 contacts the development roller 6052 when the drum frame 6051F is positioned in the contact position. The photosensitive drum 6051 contacts the intermediate transfer belt 6063 when the drum frame 6051F is positioned in the contact position in a state where the drawer 6040 with the cartridge 6050 installed therein is installed in the main housing 6002.

As shown in FIGS. 79A and 79B, the photosensitive drum 6051 is positioned apart from the development roller 6052 when the drum frame 6051F is positioned in the separate position. The photosensitive drum 6051 is positioned apart from the intermediate transfer belt 6063 when the drum frame 6051F is positioned in the separate position in the state where the drawer 6040 with the cartridge 6050 installed therein is installed in the main housing 6002.

The tension spring 6056 biases the drum frame 6051F from the separate position toward the contact position. Although not shown in the figures, the cartridge 6050 includes the tension spring 6056 on one side and the other side thereof facing in directions parallel to the second direction. The tension spring 6056 is a coil spring. One end of the tension spring 6056 is connected to a lower portion of the drum frame 6051F. The other end of the tension spring 6056 is connected to a lower portion of the development frame 6052F. The tension spring 6056 biases the drum frame 6051F to rotate about bosses 6512, 6522 (see FIG. 82A) which will be described later in a direction in which the photosensitive drum 6051 approaches the development roller 6052.

The drum coupling C61 is a member that causes the photosensitive drum 6051 to rotate. The drum coupling C61 is rotatably attached to the drum frame 6051F.

The drum gear G61 is positioned at one end of the photosensitive drum 6051 facing in a direction parallel to the second direction. The drum gear G61 is rotatable together with the photosensitive drum 6051. The drum gear G61 is engaged with a gear (not shown) of the drum coupling C61. The photosensitive drum 6051 is caused to rotate by a drive force input to the drum coupling C61.

The development coupling C62 is a member that causes the development roller 6052 to rotate. The development coupling C62 is rotatably attached to the development frame 6052F.

The idle gear G63 is rotatably attached to the development frame 6052F. The idle gear G63 is engaged with a gear (not shown) of the development coupling C62.

The development roller gear G62 is positioned at one end of the development roller 6052 facing in a direction parallel to the second direction. The development roller gear G62 is rotatable together with the development roller 6052. The development roller gear G62 is engaged with the idle gear G63. The development roller 6052 is caused to rotate by a drive force input to the development coupling C62.

As shown in FIG. 80A, the drum frame 6051F comprises a first drum side surface 6511 and a first boss 6512. The development frame 6052F comprises a first development side surface 6531, a first boss aperture 6532, a third boss 6533, and a first protrusion 6534.

The first drum side surface 6511 is positioned at one end of the drum frame 6051F facing in a direction parallel to the second direction.

The first boss 6512 protrudes from the first drum side surface 6511 in a direction parallel to the second direction. The first boss 6512 is a cylinder. That is, the first boss 6512 includes a cylindrical hollow 512A. The drum coupling C61 is positioned inside the cylindrical hollow 512A and is rotatable relative to the first boss 6512.

The first development side surface 6531 is positioned at one end of the development frame 6052F facing in a direction parallel to the second direction. The first boss aperture 6532 is an aperture in which the first boss 6512 is to be fitted. The first boss 6512 is rotatably fitted in the first boss aperture 6532. The first boss 6512 protrudes further outward, than the first development side surface 6531, in a direction parallel to the second direction. In other words, an end of the first boss 6512 facing in the direction parallel to the second direction is positioned at a position farther, than the first development side surface 6531, away from the first drum side surface 6511 in the direction parallel to the second direction. As shown in FIGS. 81A and 81B, the first side frame F61 of the drawer 6040 includes a first recess F611. The first boss 6512 is fitted into the first recess F611 when the cartridge 6050 is installed into the drawer 6040. The first side frame F61 includes four first recesses F611, one for each of the four cartridges 6050.

Returning to FIG. 80A, the third boss 6533 protrudes from the first development side surface 6531 in the direction parallel to the second direction. The third boss 6533 is a cylinder. The development coupling C62 is positioned inside the third boss 6533 and is rotatable relative to the third boss 6533. The third boss 6533 includes an aperture (not shown) for allowing a gear (not shown) of the development coupling C62 and the idle gear G63 to be engaged. The first protrusion 6534 protrudes from the first development side surface 6531 in the direction parallel to the second direction.

As shown in FIG. 80B, the first lock lever 6110 comprises a plate-shaped first lever body 6110A. The first lever body 6110A comprises a first handle 6111, a third boss aperture 6112, a first indentation 6113, and a first receiving hole 6114.

As shown in FIGS. 81A and 81B, when the first lock lever 6110 is positioned in the first lock position, the first indentation 6113 is positioned at one end of the first lever body 6110A in a direction parallel to the first direction. The first handle 6111 is positioned at the other end of the first lever body 6110A away from the first indentation 6113. Further, the first handle 6111 is positioned at one end of the first lever body 6110A facing in a direction parallel to the third direction. The first lock lever 6110 is configured such that the other end of the first lever body 6110A facing away from the first handle 6111 in a direction parallel to the third direction is rotatably attached to the first side frame F61.

The first handle 6111 is a portion operated by a user when the first lock lever 6110 is to be moved. Specifically, the first handle 6111 is held by the user when the first lock lever 6110 is rotated between the first lock position and the first unlock position (see FIG. 80B).

The third boss aperture 6112 is an aperture in which the third boss 6533 is fitted when the first lock lever 6110 is rotated from the first unlock position to the first lock position in a state where the cartridge 6050 is installed in the drawer 6040. The third boss aperture 6112 exposes the development coupling C62 to the outside of the drawer 6040 when the first lock lever 6110 is positioned in the first lock position in a state where the cartridge 6050 is installed in the drawer 6040.

The first indentation 6113 is a dented portion in which a first separation member 6210 that moves from a first position to a second position in a direction parallel to the second direction, which will be described later, is inserted when the first lock lever 6110 is positioned in the first lock position. The first indentation 6113 is dented away from the first handle 6111 in a direction parallel to the third direction, when the first lock lever 6110 is positioned in the first lock position. Specifically, the first indentation 6113 is dented in a downward direction relative to the first handle 611.

The first receiving hole 6114 is a hole in which the first protrusion 6534 is received when the first lock lever 6110 is rotated from the first unlock position to the first lock position in a state where the cartridge 6050 is installed in the drawer 6040.

As shown in FIG. 81B, the first lock lever 6110 further comprises a first pressure member 6130. The first pressure member 6130 is a member that pushes the cartridge 6050 against the first side frame F61 of the drawer 6040. The first pressure member 6130 comprises a first contact member 6131 and a first spring 6132.

The first contact member 6131 contacts the first protrusion 6534 when the first lock lever 6110 is positioned in the first lock position. The first contact member 6131 is slidably attached to the first lever body 6110A. Specifically, the first contact member 6131 is slidable in directions parallel to the third direction when the first lock lever 6110 is positioned in the first lock position.

The first spring 6132 biases the first contact member 6131 toward the first protrusion 6534. The first spring 6132 is a coil spring.

The first lock lever 6110 contacts the development frame 6052F when the first lock lever 6110 is positioned in the first lock position. Specifically, the third boss aperture 6112 is fitted on the third boss 6533 when the first lock lever 6110 is positioned in the first lock position. The inner circumferential surface of the third boss aperture 6112 thereby contacts the outer circumferential surface of the third boss 6533. Thus, the first lock lever 6110 locks the development frame 6052F of the cartridge 6050 to the drawer 6040.

The first spring 6132 pushes the first protrusion 6534 via the first contact member 6131 toward the bottom of the first recess F611 when the first lock lever 6110 is positioned in the first lock position. In this way, the first spring 6132 pushes the development frame 6052F in such a manner that the first boss 6512 moves toward the bottom of the first recess F611.

As shown in FIG. 80B, the first lock lever 6110 is separated apart from the development frame 6052F when the first lock lever 6110 is positioned in the first unlock position. Specifically, when the first lock lever 6110 is moved from the first lock position to the first unlock position, the third boss aperture 6112 is disengaged from the third boss 6533 so that the first lock lever 6110 does not contact the cartridge 6050 anymore. When the first lock lever 6110 is positioned in the first unlock position, the development frame 6052F is unlocked from the drawer 6040.

As shown in FIG. 82A, the drum frame 6051F further comprises a second drum side surface 6521 and a second boss 6522. The development frame 6052F further comprises a second development side surface 6541, a second boss aperture 6542, a fourth boss 6543, a second protrusion 6544, and a cover 6545. Each cartridge 6050 further comprises a memory M6, a drum grounding terminal 6051E, a development electrode 6052E, a charge electrode 6053E, and a supply electrode 6054E.

The second drum side surface 6521 is positioned on the other end of the drum frame 6051F facing in a direction parallel to the second direction (i.e., opposite to the direction in which the one end of the drum frame 6051F faces).

The second boss 6522 protrudes from the second drum side surface 6521 in the direction parallel to the second direction, which is the same direction as that in which the second drum side surface 6521 faces.

The second development side surface 6541 is positioned at the other end of the development frame 6052F facing in a direction parallel to the second direction (i.e., opposite to the direction in which the one end of the development frame 6052F faces).

The second boss aperture 6542 is an aperture in which the second boss 6522 is to be fitted. The second boss 6522 is rotatably fitted in the second boss aperture 6542.

The second boss 6522 and the first boss 6512 described above (see FIG. 80A) are rotatable relative to the development frame 6052F about a rotation axis X65 oriented in the second direction. Thus, the drum frame 6051F is rotatable relative to the development frame 6052F between the contact position and the separate position about the first boss 6512 and the second boss 6522.

The second boss 6522 protrudes further outward, than the second development side surface 6541, in the direction parallel to the second direction. In other words, an end of the second boss 6522 facing in the direction parallel to the second direction is positioned at a position farther, than the second development side surface 6541, away from the second drum side surface 6521 in the direction parallel to the second direction. As shown in FIGS. 83A and 83B, the second side frame F62 of the drawer 6040 includes a second recess F621. The second boss 6522 is fitted into the second recess F621 when the cartridge 6050 is installed into the drawer 6040. The second side frame F61 includes four second recesses F611, one for each of the four cartridges 6050.

Returning to FIG. 82A, the fourth boss 6543 protrudes from the second development side surface 6541 in the direction parallel to the second direction. The second protrusion 6544 protrudes from the second development side surface 6541 in the direction parallel to the second direction.

The cover 6545 extends from the second development side surface 6541 in the direction parallel to the second direction. The cover 6545 is positioned at one end of the second development side surface 6541 closer to a side of the second development side surface 6541 facing in a direction parallel to the third direction. The memory M6 is positioned at the undersurface of the cover 6545. In other words, the cover 6545 covers the memory M6 from above.

The memory M6 stores cartridge information related to the cartridge 6050. The memory M6 is, for example, an IC chip. The memory M6 is not limited to an IC chip but may be any other medium as long as it can store cartridge information. The cartridge information consists of at least one of identification information such as a serial number and life information related to the life of the cartridge.

As shown in FIG. 83B, the memory M6 comprises a storage element (not shown) and an electrical contact M62. The electrical contact M62 is positioned on the underside of the memory M6. The electrical contact M62 is positioned at the one end of the development frame 6052F facing in the direction parallel to the second direction. The electrical contact M62 faces downward. The electrical contact M62 contacts a housing contact included in the main housing 6002 when the drawer 6040 with the cartridge 6050 installed therein is installed in the main housing 6002. The storage element of the memory M6 may be positioned at the same position as or a position different from that of the electrical contact M62.

The development electrode 6052E, the drum grounding terminal 6051E, the charge electrode 6053E, and the supply electrode 6054E are aligned in this sequence in a line parallel to the first direction. The development electrode 6052E, the drum grounding terminal 6051E, the charge electrode 6053E, and the supply electrode 6054E are positioned at the one end of the development frame 6052F facing in the direction parallel to the second direction.

The drum grounding terminal 6051E is electrically connected to the photosensitive drum 6051. The drum grounding terminal 6051E is a terminal for grounding a shaft of the photosensitive drum 6051.

The development electrode 6052E is electrically connected to the development roller 6052. The development electrode 6052E is an electrode for supplying a voltage to the development roller 6052.

The charge electrode 6053E is electrically connected to the charge roller. The charge electrode 6053E is an electrode for supplying a voltage to the charge roller.

The supply electrode 6054E is electrically connected to the supply roller. The supply electrode 6054E is an electrode for supplying a voltage to the supply roller.

Figure 82B:
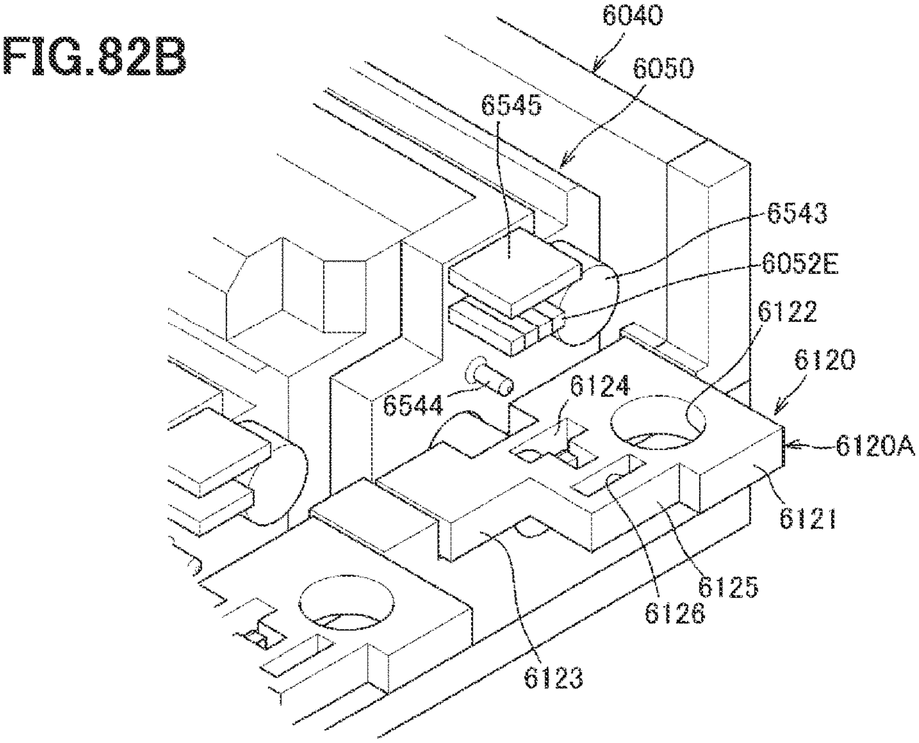

As shown in FIG. 82B, the second lock lever 6120 comprises a second lever body 6120A. The second lever body 6120A comprises a second handle 6121, a fourth boss aperture 6122, a second indentation 6123, a second receiving hole 6124, a third indentation 6125, and an electrode aperture 6126.

In the seventh example, the second lock lever 6120 and the first lock lever 6110 described above are common parts. That is, the first lock lever 6110 and the second lock lever 6120 have the same structure. Thus, the second handle 6121, the fourth boss aperture 6122, the second indentation 6123, the second receiving hole 6124, and the second pressure member 6140 which will be described later have the same configurations as the first handle 6111, the third boss aperture 6112, the first indentation 6113, the first receiving hole 6114 and the first pressure member 6130; therefore, detailed explanations thereof will be omitted.

As shown in FIGS. 83A and 83B, when the second lock lever 6120 is positioned in the second lock position, an end of the second lever body 6120A facing in a direction parallel to the third direction is rotatably attached to the second side frame F62.

The second handle 6121 is a portion operated by a user when the second lock lever 6120 is moved. Specifically, the second handle 6121 is held by the user when the second lock lever 6120 is rotated between the second lock position and the second unlock position (see FIG. 82B).

The fourth boss aperture 6122 is an aperture into which the fourth boss 6543 is fitted when the second lock lever 6120 is rotated from the second unlock position to the second lock position in a state where the cartridge 6050 is installed in the drawer 6040.

The second indentation 6123 is a dented portion into which a second separation member 6220 that moves from a third position to a fourth position in a direction parallel to the second direction, which will be described later, is inserted when the second lock lever 6120 is positioned in the second lock position. The second indentation 6123 is dented further downward, than the third indentation 6125, when the second lock lever 6120 is positioned in the second lock position.

The second receiving hole 6124 is a hole in which the second protrusion 6544 is received when the second lock lever 6120 is rotated from the second unlock position to the second lock position in a state where the cartridge 6050 is installed in the drawer 6040.

The third indentation 6125 is dented in the downward direction with respect to the handle 6121 when the second lock lever 6120 is positioned in the second lock position.

The third indentation 6125 is positioned between the second handle 6121 and the second indentation 6123 which are positioned apart from each other in the first direction. The electrical contact M62 of the memory M6 is positioned in the third indentation 6125 when the cartridge 6050 is installed in the drawer 6040 and the second lock lever 6120 is positioned in the second lock position. The electrical contact M62 is thereby positioned in a position corresponding to the third indentation 6125 between the second handle 6121 and the second indentation 6123 which are positioned apart from each other in the first direction when the cartridge 6050 is installed in the drawer 6040 and the second lock lever 6120 is positioned in the second lock position.

The electrode aperture 6126 is an aperture in which the development electrode 6052E, the drum grounding terminal 6051E, the charge electrode 6053E, and the supply electrode 6054E are received when the cartridge 6050 is installed in the drawer 6040 and the second lock lever 6120 is positioned in the second lock position.

It is to be understood that since the lock levers 6110, 6120 are common parts in the seventh example, the first lock lever 6110 also includes portions similar to the third indentation 6125 and the electrode aperture 6126. However, these portions do not have functions like the third indentation 6125 and the electrode aperture 6126 of the second lock lever 6120.

As shown in FIG. 83B, the second lock lever 6120 further comprises a second pressure member 6140. The second pressure member 6140 is a member that pushes the cartridge 6050 against the second side frame F62 of the drawer 6040. The second pressure member 6140 comprises a second contact member 6141 and a second spring 6142.

The second contact member 6141 contacts the second protrusion 6544 when the second lock lever 6120 is positioned in the second lock position.

The second spring 6142 biases the second contact member 6141 toward the second protrusion 6544.

The second lock lever 6120 contacts the development frame 6052F when the second lock lever 6120 is positioned in the second lock position. Specifically, when the second lock lever 6120 is positioned in the second lock position, the fourth boss aperture 6122 is fitted on the fourth boss 6543. The inner circumferential surface of the fourth boss aperture 6122 thereby contacts the outer circumferential surface of the fourth boss 6543. Thus, the second lock lever 6120 locks the development frame 6052F of the cartridge 6050 to the drawer 6040.

The second spring 6142 pushes the second protrusion 6544 via the second contact member 6141 toward the bottom of the second recess F621 when the second lock lever 6120 is positioned in the second lock position. In this way, the second spring 6142 pushes the development frame 6052F in such a manner that the second boss 6522 is moved toward the bottom of the second recess F621.

As shown in FIG. 82B, the second lock lever 6120 is separated apart from the development frame 6052F when the second lock lever 6120 is positioned in the second unlock position. Specifically, when the second lock lever 6120 is moved from the second lock position to the second unlock position, the fourth boss aperture 6122 is disengaged from the fourth boss 6543 so that the second lock lever 6120 does not contact the cartridge 6050 anymore. When the second lock lever 6120 is positioned in the second unlock position, the development frame 6052F is unlocked from the drawer 6040.

As shown in FIGS. 84A and 84B, the multicolor printer 6001 further comprises a first separation member 6210 and a first cam 6310. Although not shown, the multicolor printer 6001 comprises four first separation members 6210 and four first cams 6310, one for each of the four cartridges 6050. The first separation member 6210 and the first cam 6310 are positioned at the one side of a corresponding cartridge 6050 facing in a direction parallel to the second direction.

The first separation member 6210 includes a first shaft 6211 and a first contact portion 6212.

The first shaft 6211 is supported by the main housing 6002 slidably in directions parallel to the second direction. The first separation member 6210 is thereby supported by the main housing 6002 slidably in directions parallel to the second direction.

The first contact portion 6212 is a portion contactable with a cam surface CF6 of the first cam 6310 which will be described later. The first contact portion 6212 protrudes from the side surface of the first shaft 6211.

The first separation member 6210 is slidable in directions parallel to the second direction relative to the main housing 6002 between a first position shown in FIGS. 84A and 84B and a second position shown in FIGS. 85A and 85B. The first separation member 6210 is biased in a direction from the second position toward the first position by a spring (not shown).

As shown in FIGS. 86A and 86B, the first cam 6310 is a member that rotates to move the first separation member 6210 between the first position and the second position. The first cam 6310 includes a disk portion 6311, a gear portion 6312, and a cam portion 6313.

The gear portion 6312 is formed on the outer circumference of the disk portion 6311. The first cam 6310 is caused to rotate in a predetermined direction of rotation by a drive force input to the gear portion 6312.

The cam portion 6313 protrudes from the disk portion 6311 in a direction parallel to the second direction. The cam portion 6313 has a cam surface CF6 on an end surface facing in the direction parallel to the second direction. The cam surface CF6 includes a first cam surface CF61, a second cam surface CF62, a third cam surface CF63, and a fourth cam surface CF64.

The first cam surface CF61 is a surface for holding the first separation member 6210 in the first position.

The third cam surface CF63 is a surface for holding the first separation member 6210 in the second position. The third cam surface CF63 is positioned closer, than the first cam surface CF61, to the cartridge 6050 in the second direction.

The second cam surface CF62 is a surface that causes the first separation member 6210 to move from the first position toward the second position. The second cam surface CF62 connects the first cam surface CF61 and the third cam surface CF63.

The fourth cam surface CF64 is a surface that causes the first separation member 6210 to move from the second position to the first position. The fourth cam surface CF64 connects the third cam surface CF63 and the first cam surface CF61.

The second cam surface CF62 and the fourth cam surface CF64 are inclined with respect to the second direction.

When the first separation member 6210 is positioned in the first position as shown in FIG. 86A, the first contact portion 6212 contacts the first cam surface CF61. When the first separation member 6210 is positioned in the second position as shown in FIG. 86B, the first contact portion 6212 contacts the third cam surface CF63.

When the first separation member 6210 moves from the first position to the second position, the first separation member 6210 contacts a first inclined surface 6515 of the drum frame 6051F to move the drum frame 6051F from the contact position to the separate position.

As shown in FIGS. 84 and 85, the drum frame 6051F includes a first inclined surface 6515 and a first restriction surface 6516 which are provided for the first separation member 6210 to contact. When the cartridge 6050 is installed in the drawer 6040, the first inclined surface 6515 and the first restriction surface 6516 are positioned at the one end of the drum frame 6051E facing in a direction parallel to the second direction.

The first inclined surface 6515 is a surface that is pushed by the first separation member 6210 moving from the first position to the second position and thereby causes the drum frame 6051F to rotate from the contact position to the separate position. The first inclined surface 6515 is inclined with respect to the second direction. Specifically, the first inclined surface 6515 has one end and another end (an upper end in FIG. 84B) positioned apart from the one end in the first direction. The first inclined surface is inclined in such a manner that the closer to the other end of the first inclined surface, the closer to the first side frame F61 of the drawer 6040 the first inclined surface is positioned in the second direction. When the first separation member 6210 is positioned in the first position in a state in which the drawer 6040 with the cartridges 6050 installed therein is installed in the main housing 6002, the first separation member 6210 overlaps the first inclined surface 6515 as viewed in a direction parallel to the second direction (see also FIG. 81B).

The first restriction surface 6516 is a surface that restricts, upon contact with the first separation member 6210, the rotation of the drum frame 6051F from the separate position to the contact position. That is, the first restriction surface 6516 is a surface which holds the drum frame 6051F in the separate position. The first restriction surface 6516 extends in a direction parallel to the second direction from the one end of the first inclined surface. Specifically, the direction in which the first restriction surface 6516 extends in is a direction parallel to the second direction away from the first side frame F61.

As shown in FIGS. 87A and 87B, the multicolor printer 6001 further comprises a second separation member 6220 and a second cam 6320. Although not shown, the multicolor printer 6001 comprises four second separation members 6220 and four second cams 6320, each one for each of the four cartridges 6050. The second separation member 6220 and the second cam 6320 are positioned at the other side of a corresponding cartridge 6050 facing in a direction parallel to the second direction. The drum frame 6051F includes a second inclined surface 6525 and a second restriction surface 6526.

In the seventh example, the second shaft 6221 and the second contact portion 6222, which will be described later, of the second separation member 6220, the second cam 6320, the second inclined surface 6525, and the second restriction surface 6526 have structures that are approximately symmetrical about a plane perpendicular to the second direction to the first shaft 6211 and the first contact portion 6212 of the first separation member 6210, the first cam 6310, the first inclined surface 6515, and the first restriction surface 6516, thus detail descriptions thereof will be omitted in the following description.

The second separation member 6220 includes a second shaft 6221 and a second contact portion 6222. The second separation member 6220 is supported by the main housing 6002 slidably in directions parallel to the second direction. The second contact portion 6222 is a portion contactable with a cam surface CF6 of the second cam 6320 which will be described later.

The second separation member 6220 is slidable in directions parallel to the second direction relative to the main housing 6002 between a third position shown in FIGS. 87A and 87B and a fourth position shown in FIGS. 88A and 88B. The second separation member 6220 is biased in a direction from the fourth position toward the third position by a spring (not shown).

The second cam 6320 is a member that rotates to move the second separation member 6220 between the third position and the fourth position. The second cam 6320 includes a disk portion 6321, a gear portion 6322, and a cam portion 6323. The cam portion 6323 has the cam surface CF6 on an end surface thereof facing in a direction parallel to the second direction. The cam surface CF6 includes the first cam surface CF61, the second cam surface CF62, the third cam surface CF63, and the fourth cam surface CF64.

When the second separation member 6220 is positioned in the third position as shown in FIGS. 87A and 87B, the second contact portion 6222 contacts the first cam surface CF61. When the second separation member 6220 is positioned in the fourth position as shown in FIGS. 88A and 88B, the second contact portion 6222 contacts the third cam surface CF63.

When the second separation member 6220 moves from the third position to the fourth position, the second separation member 6220 contacts the drum frame 6051F to move the drum frame 6051F from the contact position to the separate position. Specifically, the second inclined surface 6525 is pushed by the second separation member 6220 moving from the third position to the fourth position and causes the drum frame 6051F to rotate from the contact position to the separate position. The drum frame 6051F is restrained from rotating from the separate position to the contact position when the first separate member 6210 moved to the fourth position contacts the second restriction surface 6526.

Next, the operations performed for installation of the cartridges 6050 in the main housing 6002 and the operation of the multicolor printer 6001 after the installation will be described.

When the cartridges 6050 are to be installed in the main housing 6002, the user first installs the cartridges 6050 in the drawer 6050 as shown in FIG. 77B.

Subsequently, the user rotates each of the first lock levers 6110 from the first unlock position to the first lock position, as shown in FIG. 77A. Further, the user rotates each of the second lock levers 6120 from the second unlock position to the second lock position. In this way, the development frame 6052F of each cartridge 6050 is locked on the drawer 6040 so that the cartridge 6050 is not accidentally detached from the drawer 6040.

Next, the user moves the drawer 6040 in which the cartridges 6050 are installed from a position outside the main housing 6002 as shown in FIG. 76, through the opening 6002A, to a position inside the main housing 6002 as shown in FIG. 75. Thereafter, the user rotates the front cover 6021 to close the opening 6002A. The cartridges 6050 are thereby installed in the main housing 6002 together with the drawer 6040.

At this point in time, as shown in FIGS. 84A and 84B, the first contact portion 6212 of each first separation member 6210 is in contact with the first cam surface CF61 of a corresponding first cam 6310. That is, the first separation member 6210 is positioned in the first position. Further, as shown in FIGS. 87A and 87B, the second contact portion 6222 of each second separation member 6220 is in contact with the first cam surface CF61 of a corresponding second cam 6320. That is, the second separation member 6220 is positioned in the third position. In this case, the drum frame 6051F of each cartridge 6050 is positioned in the contact position. That is, each of the photosensitive drums 6051 is in contact with a corresponding development roller 6052.

When the front cover 6021 is closed, the multicolor printer 6001 causes the cams 6310, 6320 to rotate, as shown in FIGS. 84 and 87. The respective contact portions 6212, 6222 of the separation members 6210, 6220 are thereby guided from the first cam surface CF61 to the second cam surface CF62. Thereafter, each first separation member 6210 slides from the first position to the second position shown in FIGS. 85A and 86B along the second cam surface CF62, and each second separation member 6220 slides from the third position to the fourth position shown in FIGS. 88A and 88B along the second cam surface CF62.

At this point in time, the first inclined surface 6515 of each drum frame 6051F is pushed by a corresponding first separation member 6210, and the second inclined surface 6525 of each drum frame 6051F is pushed by a corresponding second separation member 6220. Each drum frame 6051F thereby rotates from the contact position to the separate position against the biasing force of the tension spring 6056 (see FIG. 78A).

Subsequently, the contact portions 6212, 6222 of each of the separation members 6210, 6220 are guided from a corresponding second cam surface C652 to a corresponding third cam surface C6F3. Each first separation member 6210 is thereby positioned in the second position. At this point in time, the first separation member 6210 contacts a corresponding first restriction surface 6516. Further, each second separation member 6220 is positioned in the fourth position. At this point in time, the second separation member 6220 contacts a corresponding second restriction surface 6526. In this case, the drum frame 6051F of each cartridge 6050 is positioned in the separate position. That is, each photosensitive drum 6051 is positioned apart form a corresponding development roller 6052.

When an image is formed on a sheet S in the multicolor printer 6001, each photosensitive drum 6051 is caused to contact a corresponding development roller 6052. In this case, the multicolor printer 6001 first causes, as shown in FIGS. 85 and 88, the cams 6310, 6320 to rotate. The contact portion 6212, 6222 of each separation member 6210, 6220 is thereby guided from a corresponding third cam surface CF63 to a corresponding fourth cam surface CF64. Then, each first separation member 6210 slides from the second position to the first position shown in FIGS. 84A and 84B by the biasing force of the spring (not shown), and each second separation member 6220 slides from the fourth position to the third position shown in FIGS. 87A and 87B by the biasing force of the spring (not shown).

Thereafter, the contact portion 6212, 6222 of each separation member 6210, 6220 is guided from a corresponding fourth cam surface CF64 to a corresponding first cam surface CF61. Each first separation member 6210 is thereby positioned in the first position. Further, each second separation member 6220 is positioned in the third position. In this case, each drum frame 6051F is caused to rotate from the separate position to the contact position by the biasing force of a corresponding tension spring (see FIG. 78A). When each drum frame 6051F is positioned in the contact position, each photosensitive drum 6051 contacts a corresponding development roller 6052.

After completion of forming an image on the sheet S, the multicolor printer 6001 causes the cams 6310, 6320 to rotate to separate each photosensitive drum 6051 apart from a corresponding development roller 6052 once again.

According to the above-described multicolor printer 6001, each photosensitive drum 6051 can be separated apart from a corresponding development roller 6052 by moving each separation member 6210, 6220 to the second position or the fourth position. Thus, the time period during which each photosensitive drum 6051 contacts a corresponding development roller 6052 can be reduced. Since adhesion or the like of toner between the photosensitive drum 6051 and the development roller 6052 can be restrained, the life of the photosensitive drum 6051 and the development roller 6052 can be extended.

Since the first lock lever 6110 has a first indentation 6113 which receives the first separation member 6210, upsizing of the cartridge 6050 in a direction perpendicular to the second direction can be restrained compared to an alternative configuration in which the first separation member is positioned at a position outside the space to be occupied by the first lock lever without an indentation specifically designed for receiving a first separation member.

The drum coupling C61 does not move relative to the development frame 6052F when the drum frame 6051F moves between the contact position shown in FIG. 81B and the separate position shown in FIG. 89A. Thus, a joint (not shown) of the main housing 6002 for inputting the drive force to the drum coupling C61 can be restrained from becoming complex in structure.

Since the lock levers 6110, 6120 are positioned on both sides of the cartridge 6050 facing in directions parallel to the second direction, the development frame 6052F of the cartridge 6050 can be securely and stably locked to the drawer 6040.

Since the separation members 6210, 6220 are positioned on both sides of the cartridge 6050 facing in directions parallel to the second direction, the drum frame 6051F can be moved stably relative to the development frame 6052F between the contact position and the separate position.

Since the second lock lever 6120 has a second indentation 6123 which receives the second separation member 6220, upsizing of the cartridge 6050 in a direction perpendicular to the second direction can be restrained compared to an alternative configuration in which the second separation member is positioned outside the space to be occupied by the second lock lever without an indentation specifically designed for receiving a second separation member.

Since the first lock lever 6110 includes a first handle 6111 to be operated by a user, operability of the first lock lever 6110 when moving the first lock lever 6110 between the first lock position and the first unlock position can be improved.

Similarly, since the second lock lever 6120 includes a second handle 6121 to be operated by a user, operability of the second lock lever 6120 when moving the second lock lever 6120 between the second lock position and the second unlock position can be improved.

The electrical contact M62 of the memory M6 is positioned in the third indentation 6125 of the second lock lever 6120 when the cartridge 6050 is installed in the drawer 6040 and the second lock lever 6120 is positioned in the second lock position. Thus, upsizing of the cartridge 6050 in a direction perpendicular to the second direction can be restrained compared to an alternative configuration in which the electrical contact is positioned at a position outside the space to be occupied by the second lock lever without an indentation specifically designed for receiving an electrical contact.

The electrical contact M62, the development electrode 6052E and the other electrodes are positioned at the development frame 6052F locked to the drawer 6040, and not at the drum frame 6051F that moves relative to the development frame 6052 and the drawer 6040. The electrical contact M62, the development electrode 6052E and the other electrodes thereby do not move relative to the development frame 6052F when the drum frame 6051F moves between the contact position shown in FIG. 83B and the separate position shown in FIG. 89B.

Thus, the housing contact (not shown) of the main housing 6002 which is electrically connectable with the electrical contact M62 can be restrained from becoming complex in structure. Similarly, the housing contact (not shown) of the main housing 6002 which is electrically connectable with the development electrode 652E and the other electrodes can be restrained from becoming complex in structure.

Since the photosensitive drum 6051 is also separated apart from the intermediate transfer belt 6063 when the drum frame 6051F is positioned in the separate position, the time period during which the photosensitive drum 6051 contacts the intermediate transfer belt can be reduced. The life of the photosensitive drum 6051 and the intermediate transfer belt 6063 can thereby be extended.

While the seventh example of the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the following description, parts having approximately the same structures as the seventh example are designated by the same reference characters and detailed explanations thereof will be omitted.

Although the first lock lever 6110 includes the first indentation 6113 in which the first separation member 6210 can be received in the above-described seventh example, the first lock lever 6110 may, for example, be configured to include a first aperture 6113A in which the first separation member 6210 can be received as shown in FIG. 90A, instead of the first indentation 6113.

Similarly, although the second lock lever 6120 includes the second indentation 6123 in which the second separation member 6220 can be received in the above-described seventh example, the second lock lever 6120 may, for example, be configured to include a second aperture 6123A in which the second separation member 6220 can be received as shown in FIG. 90B, instead of the second indentation 6123.

The second lock lever 6120 shown in FIG. 90B includes a third aperture 6125A in which the cover 6545 (see FIGS. 83A and 83B) of the cartridge 6050 is received in a state in which the cartridge 6050 is installed in the drawer 6040 and the second lock lever 6120 is positioned in the second lock position. Although not shown in the drawings, when the cover 6545 is received in the third aperture 6125A, the electrical contact M62 of the memory M6 positioned on the undersurface of the cover 6545 is positioned between the second handle 6121 and the second aperture 6123A which are positioned apart from each other in the first direction.

Although the drum frame 6051F includes the first boss 6512 and the drum coupling C61 is positioned inside the cylindrical hollow 512A of the first boss 6512 in the above-described seventh example, the drum frame 6051F may, for example, not include the first boss 6512 and the outer circumferential surface of the drum coupling C61 may be exposed, as shown in FIG. 91A. In this case, the drum coupling C61 may be directly fitted in the first recess F611 (see FIGS. 81A and 81B) of the drawer 6040 when the cartridge 6050 is installed in the drawer 6040. Further, the outer circumferential surface of the development coupling C62 may also be exposed.

Although the multicolor printer 6001 comprises a first separation member 6210 supported by the main housing 6002 movably between the first position and the second position in the above-described seventh example, the drawer may, for example, comprise a first separation member supported by the frame of the drawer movably between a first position and a second position. That is, the first separation member may be provided at a body of the image forming apparatus or at the drawer. The same applies to the second separation member.

Although the separation members 6210, 6220 are positioned on both sides of the cartridge 6050 facing in directions parallel to the second direction in the above-described seventh example, a separation member may be positioned on only one side of the cartridge facing in a direction parallel to the second direction as long as the drum frame is movable between the contact position and the separate position. For example, the second separation member may not be included.

Although the first lock lever 6110 and the second lock lever 6120 are common parts in the above-described seventh example, they need not be common parts.

Although the lock levers 6110, 6120 are positioned on both sides of the cartridge 6050 facing in directions parallel to the second direction in the above-described seventh example, a lock lever may be positioned on only one side of the cartridge facing in a direction parallel to the second direction as long as the cartridge can be locked to the drawer. For example, the second lock lever may not be included.

Further, a configuration not including a lock lever, as shown in FIGS. 91A, 91B and 91C is also conceivable.

In the configuration shown in FIGS. 91A, 91B and 91C, the multicolor printer 6001 comprises a separation member 6230. The separation member 6230 also serves as a lock lever. The separation member 6230 is supported on the main housing 6002 slidably in directions parallel to the third direction. The separation member 6230 is positioned on one side of the cartridge 6050 facing in a direction parallel to the second direction. It is to be understood that the separation member 6230 may be positioned on both sides of the cartridge 6050 facing in directions parallel to the second direction. The separation member 6230 includes a separation member body 6231, an inclined surface 6232, and a lock protrusion 6233.

The inclined surface 6232 is a surface that pushes the drum frame 6051F to rotate the drum frame 6051F from a contact position to a separate position. The inclined surface 6232 is inclined with respect to the third direction. Specifically, the inclined surface 6232 has one end and another end positioned apart from the one end in the first direction. The inclined surface 6232 is inclined in such a manner that the closer to the other end of the inclined surface 6232 (closer to the left in FIG. 91B), the farther the inclined surface 6232 is positioned from the cartridge 6050 in the third direction.

The lock protrusion 6233 protrudes from the separation member body 6231 in a direction parallel to the third direction. Specifically, the lock protrusion 6233 protrudes in a direction parallel to the third direction toward the cartridge 6050.

The separation member 6230 is slidable relative to the main housing 6002 in directions parallel to the third direction between a fifth position shown in FIG. 91B by a chain double-dashed line and a sixth position shown in FIG. 91C. Specifically, the separation member 6230 is slidable among the fifth position, a seventh position shown in FIG. 91B by a solid line, and the sixth position. The seventh position is a position between the fifth position and the sixth position.

The lock protrusion 6233 is fitted in a lock recess 6535 of the development frame 6052F when the separation member 6230 is positioned in either of the seventh position or the sixth position. Thus, the separation member 6230 locks the development frame 6052F to the drawer 6040 when the separation member 6230 is positioned in the sixth position and the seventh position.

Further, the lock protrusion 6233 is disengaged from the lock recess 6535 when the separation member 6230 is positioned in the fifth position. Thus, the separation member 6230 unlocks the development frame 6052F from the drawer 6040 when the separation member 6230 is positioned in the fifth position.

In the configuration shown in FIGS. 91A, 91B and 91C, in order to install the cartridge 6050 in the main housing 6002, the user first installs the cartridges 6050 in the drawer 6050. Then, the user installs the drawer 6040 with the cartridges 6050 installed therein in the main housing 6002. At this point in time, the separation member 6230 is positioned in the fifth position shown by the chain double-dashed line in FIG. 91B. When the separation member 6230 is positioned in the fifth position, the drum frame 6051F is positioned in the contact position.

In this condition, the multicolor printer 6001 causes the separation member 6230 to move from the fifth position toward the sixth position lower than the fifth position. When the separation member 6230 is positioned in the seventh position, the lock protrusion 6233 is fitted in the lock recess 6535. At this point in time, the inclined surface 6232 of the separation member 6230 contacts the drum frame 6051F.

Thereafter, the multicolor printer 6001 causes the separation member 6230 to move from the seventh position to the sixth position. This causes the inclined surface 6232 to push the drum frame 6051F. The drum frame 6051F thereby moves from the contact position toward the separate position against the biasing force of the tension spring 6056. When the separation member 6230 is positioned in the sixth position shown in FIG. 91C, the drum frame 6051F is positioned in the separate position. Thus, the photosensitive drum 6051 is separated apart from the development roller 6052.

To cause the photosensitive drum 6051 to contact the development roller 6052, the multicolor printer 6001 causes the separation member 6230 to move from the sixth position to the seventh position higher than the sixth position. The drum frame 6051F thereby moves from the separate position toward the contact position by the biasing force of the tension spring 6056. When the separation member 6230 is positioned in the seventh position, the drum frame 6051F is positioned in the contact position. Thus, the photosensitive drum 6051 contacts the development roller 6052.

Although the electrical contact M62 of the memory M6 is facing downward in the above-described seventh example, the electrical contact M62 may face any other direction.

Although the electrical contact M62 of the memory M6 is positioned at the development frame 6052F in the above-described seventh example, the electrical contact M62 may be positioned at the drum frame. The same applies to the electrodes such as the development electrode 6052E.

Although a coil spring is given as an example of the first spring 6132 and the second spring 6142 in the above-described seventh example, the first spring 6132 and/or the second spring 6142 may be a spring other than a coil spring, such as a torsion spring, a leaf spring, etc.

Although each photosensitive drum 6051 contacts the intermediate transfer belt 6063 when each drum frame 6051F is positioned in the contact position, and each photosensitive drum 6051 is spaced apart from the intermediate transfer belt 6063 when each drum frame 6051F is positioned in the separate position in the above-described seventh example, each photosensitive drum may, for example, remain in contact with the intermediate transfer belt when each drum frame is positioned in the separate position. Further, each photosensitive drum may, for example, be configured to contact the intermediate transfer belt when each drum frame is positioned in the separate position and to be separated apart from the intermediate transfer belt when the first separation member moves to a position further away, than the second position, from the first position.

Although the multicolor printer 6001 transfers the toner image onto the photosensitive drum 6051 on a sheet S via the intermediate transfer belt 6063 in the above-described seventh example, the toner image on the photosensitive drum may be directly transferred onto a sheet conveyed on the transfer belt. In other words, although the intermediate transfer belt 6063 is given as an example of an endless belt in the above-described example, the endless belt may, for example, be a conveyor belt.

Although a multicolor printer 6001 is given as an example of an image forming apparatus in the above-described seventh example, the image forming apparatus may be a monochrome printer or the like. Further, the image forming apparatus is not limited to a printer, and may, for example, be a copy machine, a multifunction printer, etc.

The elements described in the above example embodiments and its modified examples may be implemented selectively and in combination.

What is claimed is:

1. A process cartridge comprising:

a development roller rotatable about a first axis extending in a first direction, the first direction being an axial direction of the first axis;

a photosensitive drum;

a frame having a first outer surface and a second outer surface spaced apart from the first outer surface in the first direction, a first electrode positioned at the first outer surface, the first electrode including a first electrical contact surface facing outward in the first direction;

a second electrode positioned at the first outer surface, the second electrode including a second electrical contact surface facing outward in the first direction;

a third electrode positioned at the first outer surface, the third electrode including a third electrical contact surface facing outward in the first direction; and a fourth electrode positioned at the first outer surface, the fourth electrode including a fourth electrical contact surface facing outward in the first direction; and a memory positioned at the first outer surface, the memory including a memory contact surface facing outward in the first direction, wherein the first electrical contact surface, the second electrical contact surface, the third electrical contact surface, the fourth electrical contact surface and the memory contact surface are spaced away from each other at the first outer surface.

2. The process cartridge according to claim 1, wherein the memory includes a plurality of the contact surfaces.

3. The process cartridge according to claim 1, wherein the first electrical contact surface, the second electrical contact surface, the third electrical contact surface, the fourth electrical contact surface and the memory contact surface are perpendicular to the first direction.

4. The process cartridge according to claim 1, wherein the process cartridge is for use with a drawer which is movable in a second direction crossing the first direction relative to a main housing of an image forming apparatus in a state where the process cartridge is attached to the drawer.

5. The process cartridge according to claim 4, wherein the second direction is perpendicular to the first direction.

6. The process cartridge according to claim 1, wherein the first electrical contact surface is electrically connected to the development roller.

7. The process cartridge according to claim 1 further comprising:

a supply roller, wherein the second electrical contact surface is electrically connected to the supply roller.

8. The process cartridge according to claim 1, wherein the third electrical contact surface is electrically connected to the photosensitive drum.

9. The process cartridge according to claim 1 further comprising:

a charge roller, wherein the fourth electrical contact surface is electrically connected to the charge roller.

10. The process cartridge according to claim 1 further comprising:

a development coupling rotatable with the development roller, the development coupling positioned at the second outer surface of the frame.

11. The process cartridge according to claim 1, wherein the first electrical contact surface, the second electrical contact surface, the third electrical contact surface, the fourth electrical contact surface and the memory contact surface are positioned at a flush surface.

12. The process cartridge according to claim 1, wherein the first electrical contact surface, the second electrical contact surface, the third electrical contact surface, the fourth electrical contact surface and the memory contact surface are positioned at a continuous plane.

* * * * *